(12) United States Patent
Jang et al.

(10) Patent No.: US 10,778,830 B2
(45) Date of Patent: Sep. 15, 2020

(54) ELECTRONIC DEVICE AND METHOD FOR PERFORMING TASK USING EXTERNAL DEVICE BY ELECTRONIC DEVICE

(71) Applicant: Samsung Electronics Co., Ltd., Suwon-si, Gyeonggi-do (KR)

(72) Inventors: Yong-Seok Jang, Suwon-si (KR); Hyun-Ah Oh, Yongin-si (KR); Bo-Kun Choi, Seoul (KR); Gi-Beom Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/166,949

(22) Filed: Oct. 22, 2018

(65) Prior Publication Data
US 2019/0132436 A1    May 2, 2019

(30) Foreign Application Priority Data

Oct. 27, 2017    (KR) .................. 10-2017-0141342

(51) Int. Cl.
*H04W 4/12*    (2009.01)
*H04M 1/725*    (2006.01)
(Continued)

(52) U.S. Cl.
CPC ...... *H04M 1/72533* (2013.01); *G06F 16/951* (2019.01); *G08C 17/02* (2013.01); *H04L 12/282* (2013.01); *H04L 12/2818* (2013.01); *H04L 67/025* (2013.01); *H04W 4/12* (2013.01); *H04W 4/80* (2018.02); *G08C 2201/50* (2013.01);
(Continued)

(58) Field of Classification Search
CPC ......... H04M 1/72533; H04M 2250/74; H04M 1/7253; H04L 12/2818; H04L 12/282; H04L 67/025; H04L 2012/2841; G06F 16/951; G08C 17/02; G08C 2201/93; G08C 2201/50; H04W 4/12; H04W 4/80
See application file for complete search history.

(56) References Cited

U.S. PATENT DOCUMENTS

2008/0125041 A1    5/2008   Angelhag et al.
2011/0083111 A1    4/2011   Forutanpour et al.
(Continued)

FOREIGN PATENT DOCUMENTS

JP    2007-121576 A    5/2007
JP    2010-510737 A    4/2010
KR    10-2012-0020608 A    3/2012

*Primary Examiner* — Chuong A Ngo
(74) *Attorney, Agent, or Firm* — Jefferson IP Law, LLP

(57) ABSTRACT

An electronic device and a method for performing a task using an external device by an electronic device are provided. The electronic device includes a housing, a display positioned inside the housing and exposed through a first portion of the housing, a microphone positioned inside the housing and exposed through a second portion of the housing, at least one speaker positioned inside the housing and exposed through a third portion of the housing, a wireless communication circuit positioned inside the housing, a processor positioned inside the housing and electrically connected with the display, the microphone, the speaker, and the wireless communication circuit, and a memory positioned inside the housing and electrically connected to the processor.

20 Claims, 64 Drawing Sheets

(51) Int. Cl.
*H04W 4/80* (2018.01)
*H04L 29/08* (2006.01)
*H04L 12/28* (2006.01)
*G08C 17/02* (2006.01)
*G06F 16/951* (2019.01)

(52) U.S. Cl.
CPC .. *G08C 2201/93* (2013.01); *H04L 2012/2841* (2013.01); *H04M 1/7253* (2013.01); *H04M 2250/74* (2013.01)

(56) References Cited

U.S. PATENT DOCUMENTS

| | | |
|---|---|---|
| 2012/0052829 A1 | 3/2012 | Lee et al. |
| 2016/0081060 A1 | 3/2016 | Chen et al. |
| 2016/0156682 A1* | 6/2016 | Jeon ........................ G06F 1/163 709/204 |
| 2017/0148436 A1* | 5/2017 | Sugiura .................. G10L 15/14 |

* cited by examiner

ELECTRONIC DEVICE AND METHOD FOR PERFORMING TASK USING EXTERNAL DEVICE BY ELECTRONIC DEVICE

CROSS-REFERENCE TO RELATED APPLICATION(S)

This application is based on and claims priority under 35 U.S.C. § 119 of a Korean patent application number 10-2017-0141342, filed on Oct. 27, 2017, in the Korean Intellectual Property Office, the disclosure of which is incorporated by reference herein in its entirety.

BACKGROUND

1. Field

The disclosure relates to an electronic device and a method for performing a task using an external device by the electronic device.

2. Description of Related Art

Recently, due to the development of semiconductor technology and wireless communication technology, communication functions are included in various objects to form a network, so that objects can be conveniently controlled. Connection to a network by an object having such a communication function included therein in this way is referred to as the "internet-of-things (IoT)".

"Internet-of-things (IoT)" refers to intelligent technologies and services in which information between people and objects and between objects and objects is bi-directionally communicated on the basis of communication technologies such as the Internet. Using the internet-of-things, for example, a user may control an external device capable of communicating with an electronic device through the electronic device.

The above information is presented as background information only to assist with an understanding of the disclosure. No determination has been made, and no assertion is made, as to whether any of the above might be applicable as prior art with regard to the disclosure.

SUMMARY

A user registers, in an electronic device, an external device that can be controlled and installs an application for controlling the external device, and then the user may execute the application and perform a task using the external device through a screen provided through the application. This method may be complicated because the user has to individually select and register, in the electronic device, an external device or install an application corresponding to the external device every time a new external device is to be used, and may be inconvenient because a task using the external device can be performed only through the installed application.

For example, when it is desired to control multiple external devices existing in the vicinity of the electronic device, there may be inconvenience in that the user has to individually register multiple electronic devices or individually install applications corresponding to the multiple external devices and individually remove the multiple external devices through different screens, that is, through application screens respectively corresponding to the multiple external devices.

According to various embodiments, without registering an external device or installing an application corresponding to the external device, the electronic device may perform a task using the external device by identifying the external device on the basis of a user's voice and direction information of the electronic device.

According to various embodiments, an electronic device may identify an external device more accurately by identifying the external device on the basis of first information relating to the external device, which relates to a voice received from a user, and second information based on an external device signal received in the state in which the electronic device is oriented toward a specific direction.

Aspects of the disclosure are to address at least the above-mentioned problems and/or disadvantages and to provide at least the advantages described below. Accordingly, an aspect of the disclosure is to provide an electronic device including a housing, a display positioned inside the housing and exposed through a first portion of the housing, a microphone positioned inside the housing and exposed through a second portion of the housing, at least one speaker positioned inside the housing and exposed through a third portion of the housing, a wireless communication circuit positioned inside the housing, at least one processor positioned inside the housing and electrically connected with the display, the microphone, the speaker, and the wireless communication circuit, and a memory positioned inside the housing and electrically connected to the at least one processor, wherein the memory stores instructions that, when executed, cause the at least one processor to receive a user input including a request for performing a task using at least one external device, through the display or the microphone, identify the at least one external device, based at least partially on at least one signal obtained through the wireless communication circuit, transmit data associated with the user input to an external server via the wireless communication circuit, transmit information on the at least one external device, to the external server via the wireless communication circuit, along with the data or after transmitting the data, receive a response including information on a sequence of states of the electronic device to perform at least a part of the task using the external device, from the external server via the wireless communication circuit, and perform the task by obtaining the sequence of the states.

Additional aspects will be set forth in part in the description which follows and, in part, will be apparent from the description, or may be learned by practice of the presented embodiments.

In accordance with an aspect of the disclosure, a method for performing a task using an external device by an electronic device is provided. The method includes receiving a user input including a request for performing a task using at least one external device, identifying the at least one external device based at least partially on at least one signal obtained via a wireless communication circuit, transmitting data associated with the user input to an external server via the wireless communication circuit, transmitting information on the at least one external device to the external server via the wireless communication circuit, along with the data or after transmitting the data, receiving a response including information on a sequence of states of the electronic device to perform at least a part of the task using the external device, from the external server via the wireless communication circuit, and performing the task by obtaining the sequence of the states.

According to an embodiment of the disclosure, provided is a storage medium that stores a program for performing a task using an external device, wherein, in an electronic device, the program performs: receiving a user input including a request for performing a task using at least one external device, identifying the at least one external device based at least partially on at least one signal obtained via a wireless communication circuit, transmitting data associated with the user input to an external server via the wireless communication circuit, transmitting information on the at least one external device to the external server via the wireless communication circuit, along with the data or after transmitting the data, receiving a response including information on a sequence of states of the electronic device to perform at least a part of the task using the external device, from the external server via the wireless communication circuit, and performing the task by obtaining the sequence of the states.

According to various embodiments, an electronic device may receive input (e.g., voice input or touch input) from a user, select an external device on the basis of direction information of the electronic device, and perform a task using the selected external device.

Further, according to various embodiments, the electronic device may select an external device through first information relating to the external electronic device, which is obtained on the basis of voice information according to a voice signal uttered by a user, and second information obtained on the basis of a phase difference of an external device signal received in the state in which the electronic device is oriented toward a specific direction, and may perform a task using the selected external device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
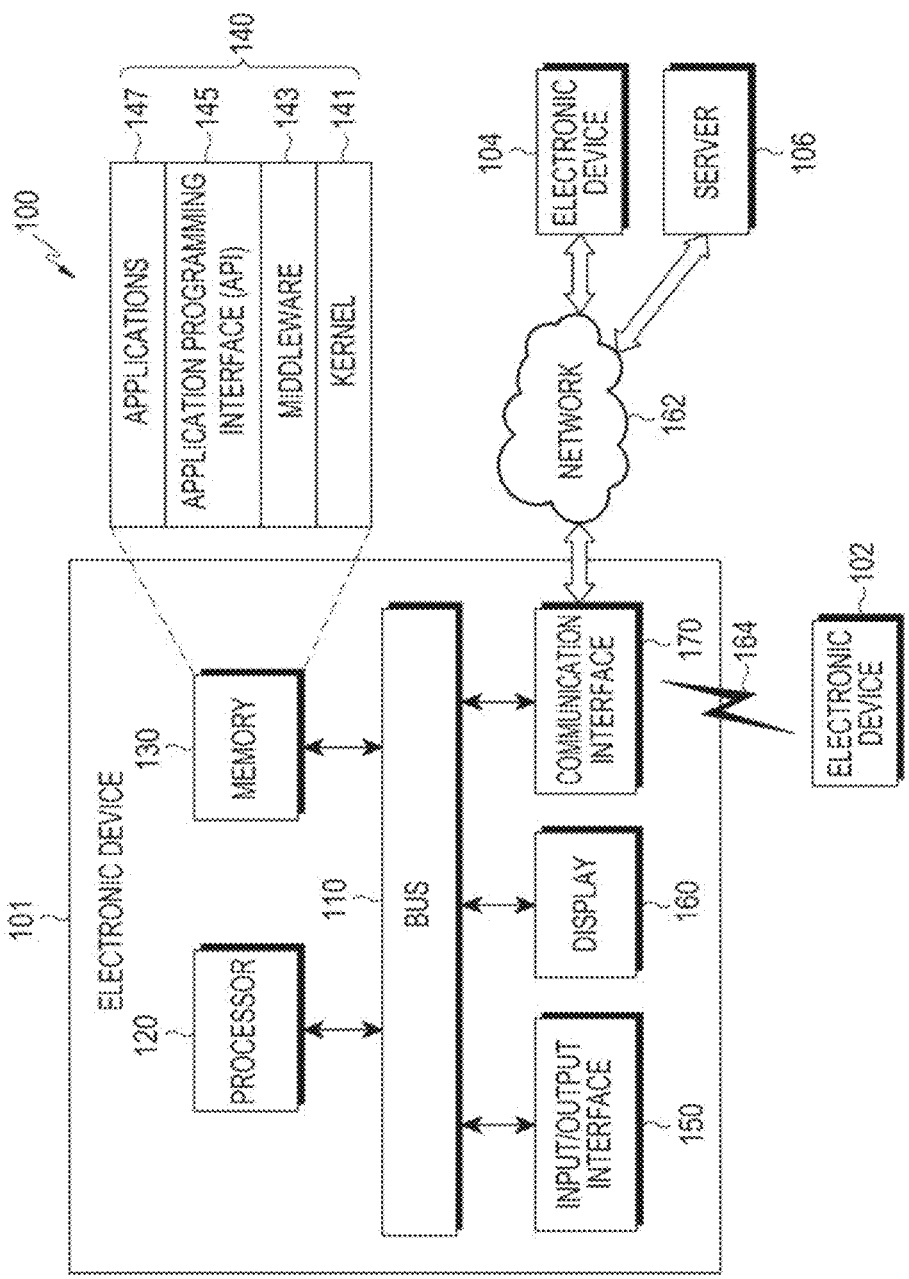
FIG. 1 is a block diagram illustrating a network environment including an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured to" as used in various embodiments may be interchangeably used with, for example, "suitable for", "having the capacity to", "designed to", "adapted to", "made to", or "capable of" in terms of hardware or software, depending on the circumstances. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or application processor (AP)) that can perform the corresponding operations by executing one or more software programs stored in a memory device.

An electronic device according to various embodiments may include at least one of, for example, a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a head-mounted device (HMD)), a fabric or clothing integrated type (e.g., electronic clothing), a body-mounted type (e.g., a skin pad, or tattoo), and a bio-implantable type (e.g., an implantable circuit). In some embodiments, the electronic device may include at least one of, for example, a television, a digital versatile disc (DVD) player, an audio device, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and Play Station™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global navigation satellite system (GNSS), an event data recorder (EDR), a flight data recorder (FDR), a Vehicle Infotainment device, an electronic device for a ship (e.g., a navigation device for a ship or a gyrocompass), an avionics device, a security device, an automotive head unit, a robot for home or industry, a drone, an automated teller machine (ATM) in a bank, a point-of-sales (POS) terminal in a shop, or an IoT device (e.g., a light bulb, various sensors, a sprinkler device, a fire alarm, a thermostat, a streetlamp, a toaster, various sporting goods, a hot water tank, a heater, a boiler, etc.). According to some embodiments, an electronic device may include at least one of a part of furniture, a building/structure, or a vehicle, an electronic board, an electronic-signature-receiving device, a projector, and various types of measurement instruments (e.g., a water meter, an electric meter, a gas meter, a radio wave meter, and the like). In various embodiments, the electronic device may be flexible, or may be a combination of one or more of the aforementioned various devices. The electronic device according to an embodiment is not limited to the above-described devices. In the disclosure, the term "user" may indicate a person using an electronic device or a device (e.g., an artificial intelligence electronic device) using an electronic device.

FIG. 1 is a block diagram illustrating a network environment including an electronic device according to an embodiment of the disclosure.

An electronic device 101 within a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may connect elements 110-170 to each other, and may include a circuit that transfers communication between the elements (e.g., a control message or data). The processor 120 may include one or more among a central processing unit, an application processor, a communications processor (CP). The processor 120, for example, may carry out operations or data processing relating to the control and/or communication of at least one other element of the electronic device 101.

The memory 130 may include a volatile and/or non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an "operating system". The kernel 141 may control or manage system resources (e.g., the bus 110, the processor 120, or the memory 130) used for executing an operation or function implemented by other programs (e.g., the middleware 143, the API 145, or the application 147). Furthermore, the kernel 141 may provide an interface through which the middleware 143, the API 145, or the application programs 147 may access the individual elements of the electronic device 101 to control or manage system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (e.g., the bus 110, the processor 120, the memory 130, or the like) of the electronic device 101 to one or more of the application programs 147, and may process the one or more task requests. The API 145 is an interface through which the applications 147 control functions provided from the kernel 141 or the middleware 143, and may include, for example, at least one interface or function (e.g., instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display, for example, various types of content (e.g., text, images, videos, icons, and/or symbols) for a user. The display 160 may include a touch screen and may receive, for example, a touch, gesture, proximity, or hovering input using an electronic pen or a body part of the user. The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may include, for example, cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, as exemplified as short-range communication 164 of FIG. 1, the wireless communication may include at least one of Wi-Fi, Li-Fi, Bluetooth (BT), Bluetooth Low Energy (BLE), ZigBee, near field communication (NFC), magnetic secure transmission, radio frequency (RF) communication, or a body area network (BAN). According to an embodiment, the wired communication may include GNSS. The GNSS may be, for example, a global positioning system (GPS), a global navigation satellite system (GLONASS), a BeiDou Navigation Satellite System (hereinafter, referred to as "BeiDou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), power line communication, a plain old telephone service (POTS), etc. The network 162 may include at least one of a telecommunications network, for example, a computer network (e.g., local area network (LAN) or wide area network (WAN)), the Internet, and a telephone network.

Each of the first and second external electronic devices 102 and 104 may be of a type identical to or different from that of the electronic device 101. According to various embodiments, all or some of the operations executed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself, or after additional processing thereof. Another electronic device (e.g., the electronic device 102 or 104, or the server 106) may execute the requested functions or the additional functions, and may transfer information about the result of the execution to the electronic device 101. The electronic device 101 may provide the received result as it is or additionally process the received result and provide the requested functions or services. To achieve this, for example, cloud computing, distributed computing, or client-server computing technology may be used.

Figure 2:
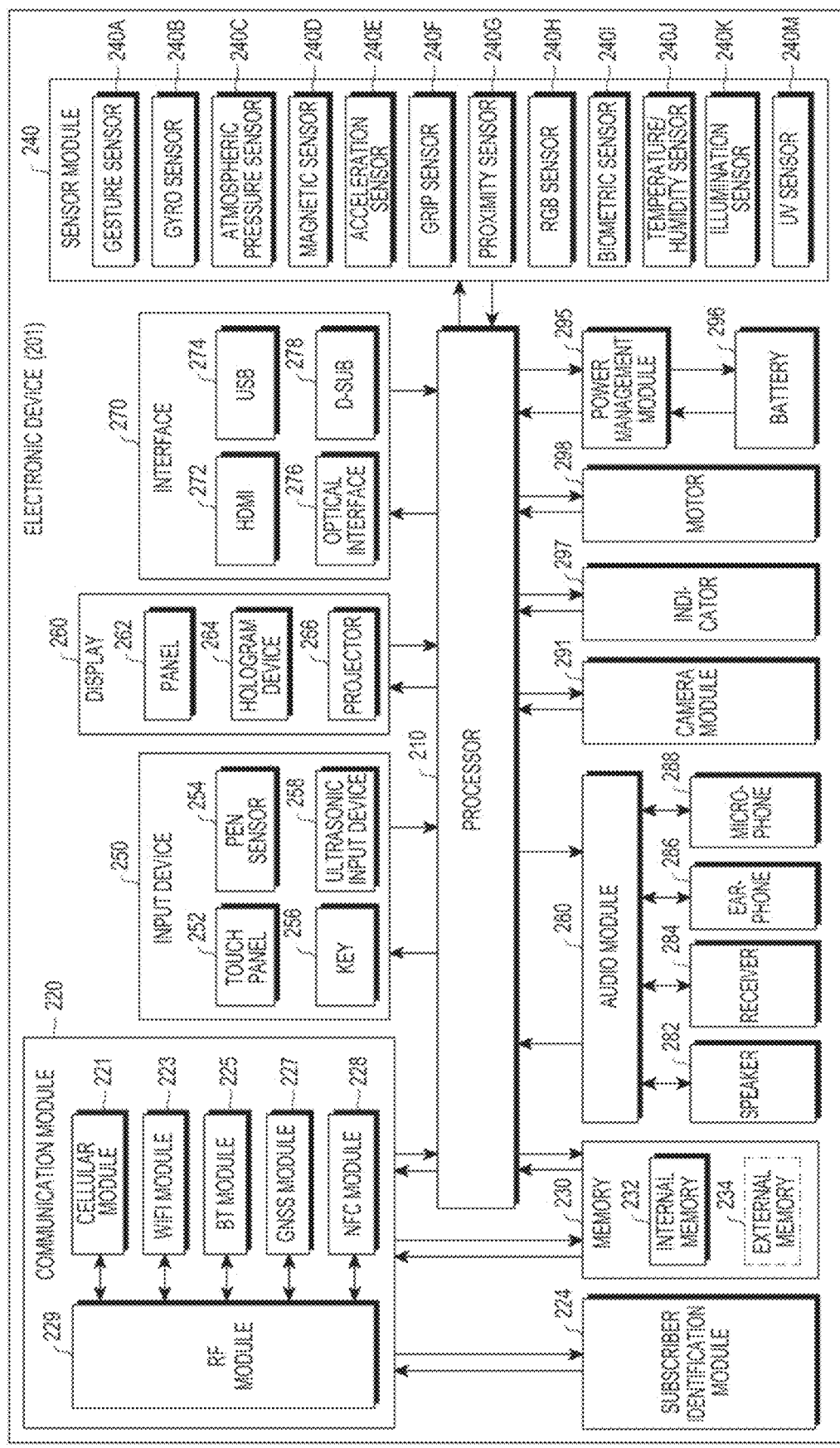
FIG. 2 is a block diagram of the electronic device according to an embodiment of the disclosure.

FIG. 2 is a block diagram of the electronic device according to an embodiment of the disclosure.

The electronic device 201 may include, for example, all or part of the electronic device 101 illustrated in FIG. 1. The electronic device 201 may include at least one processor 210 (e.g., an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be implemented by, for example, a system on chip (SoC). According to an embodiment, the processor 210 may further include a graphic processing unit (GPU) and/or an image signal processor. The processor 210 may also include at least some of the elements illustrated in FIG. 2 (e.g., a cellular module 221). The processor 210 may load, in a volatile memory, instructions or data received from at least one of the other elements (e.g., a non-volatile memory), process the loaded instructions or data, and store the result data in the non-volatile memory.

The communication module 220 may have a configuration that is the same as or similar to that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (e.g., a SIM card). According to an embodiment, the cellular module 221 may perform at least some of the functions that the processor 210 may provide. According to an embodiment, the cellular module 221 may include a communications processor (CP). According to some embodiments, at least some (e.g., two or more) of the cellular module 221, the Wi-Fi module 223, the BT module 225, the GNSS module 227, and the NFC module 228 may be included in one integrated chip (IC) or IC package. The RF module 229 may transmit/receive, for example, a communication signal (e.g., an RF signal). The RF module 229 may include, for example, a transceiver, a power amp module (PAM), a frequency filter, a low-noise amplifier (LNA), an antenna, or the like. According to another embodiment, at least one of the cellular module 221, the Wi-Fi module 223, the BT module 225, the GPS module 227, and the NFC module 228 may transmit/receive an RF signal through a separate RF module. The subscriber identification module 224 may include, for example, a card that includes a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an internal memory 232 or an external memory 234. The internal memory 232 may include, for example, at least one of a volatile memory (e.g., a DRAM, an SRAM, an SDRAM, or the like) and a non-volatile memory (e.g., a one time programmable read-only memory (OTPROM), a PROM, an erasable PROM (EPROM), an electronically erasable PROM (EEPROM), a mask ROM, a flash ROM, a flash memory, a hard disc drive, or a solid state drive (SSD)). The external memory 234 may include a flash drive, for example, a compact flash (CF), a secure digital (SD), a Micro-SD, a Mini-SD, an eXtreme Digital (xD), a multimedia card (MMC), a memory stick, and the like. The external memory 234 may be functionally or physically connected to the electronic device 201 through any of various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may be, for example, at least one of a capacitive type, a resistive type, an infrared type, and an ultrasonic type. The touch panel 252 may further include a control circuit. The touch panel 252 may further include a tactile layer to provide a tactile reaction to a user. The (digital) pen sensor 254 may be, for example, a part of the touch panel or may include a separate recognition sheet. The key 256 may include, for example, a physical button, an optical key, or a keypad. The ultrasonic input device 258 may detect ultrasonic waves, which are generated by an input tool, through a microphone (e.g., a microphone 288) and may identify data corresponding to the detected ultrasonic waves.

The display 260 (e.g., the display 160) may include a panel 262, a hologram device 264, a projector 266, and/or a control circuit for controlling the same. The panel 262 may be implemented to be, for example, flexible, transparent, or wearable. The panel 262 may include the touch panel 252, and one or more modules. According to an embodiment, the panel 262 may include a pressure sensor (or a force sensor) which may measure a strength of pressure of a user's touch. The pressure sensor may be integrated with the touch panel 252, or may be implemented as one or more sensors separate from the touch panel 252. The hologram device 264 may show a three-dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication circuit 170 illustrated in FIG. 1. Additionally or alternatively, the interface 270 may include, for example, a mobile high-definition link (MHL) interface, a SD card/MMC interface, or an infrared data association (IrDA) standard interface.

The audio module 280 may convert, for example, sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (e.g., a front sensor or a rear sensor), a lens, an image signal processor (ISP), or a flash (e.g., an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC or the charger IC may have a wired and/or wireless charging method. Examples of the wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, a remaining charge of the battery 296, and a voltage, the current, or a temperature while charging. The battery 296 may include, for example, a rechargeable battery or a solar battery.

The indicator 297 may display a particular state, for example, a booting state, a message state, a charging state, or the like of the electronic device 201 or a part (e.g., the processor 210) of the electronic device 201. The motor 298 may convert an electrical signal into mechanical vibration, and may generate vibration, a haptic effect, or the like. The electronic device 201 may include a mobile TV support device that can process media data according to a standard, such as digital multimedia broadcasting (DMB), digital video broadcasting (DVB), Mediaflo™, and the like. Each of the above-described component elements of hardware according to the disclosure may be configured with one or more components, and the names of the corresponding component elements may vary on the basis of the type of electronic device. In various embodiments, an electronic device (e.g., the electronic device 201) may omit some elements or may further include additional elements, or some of the elements of the electronic device may be combined with each other to configure one entity, in which case the electronic device may perform the functions of the corresponding elements in a manner identical to that prior to the combination thereof.

Figure 3:
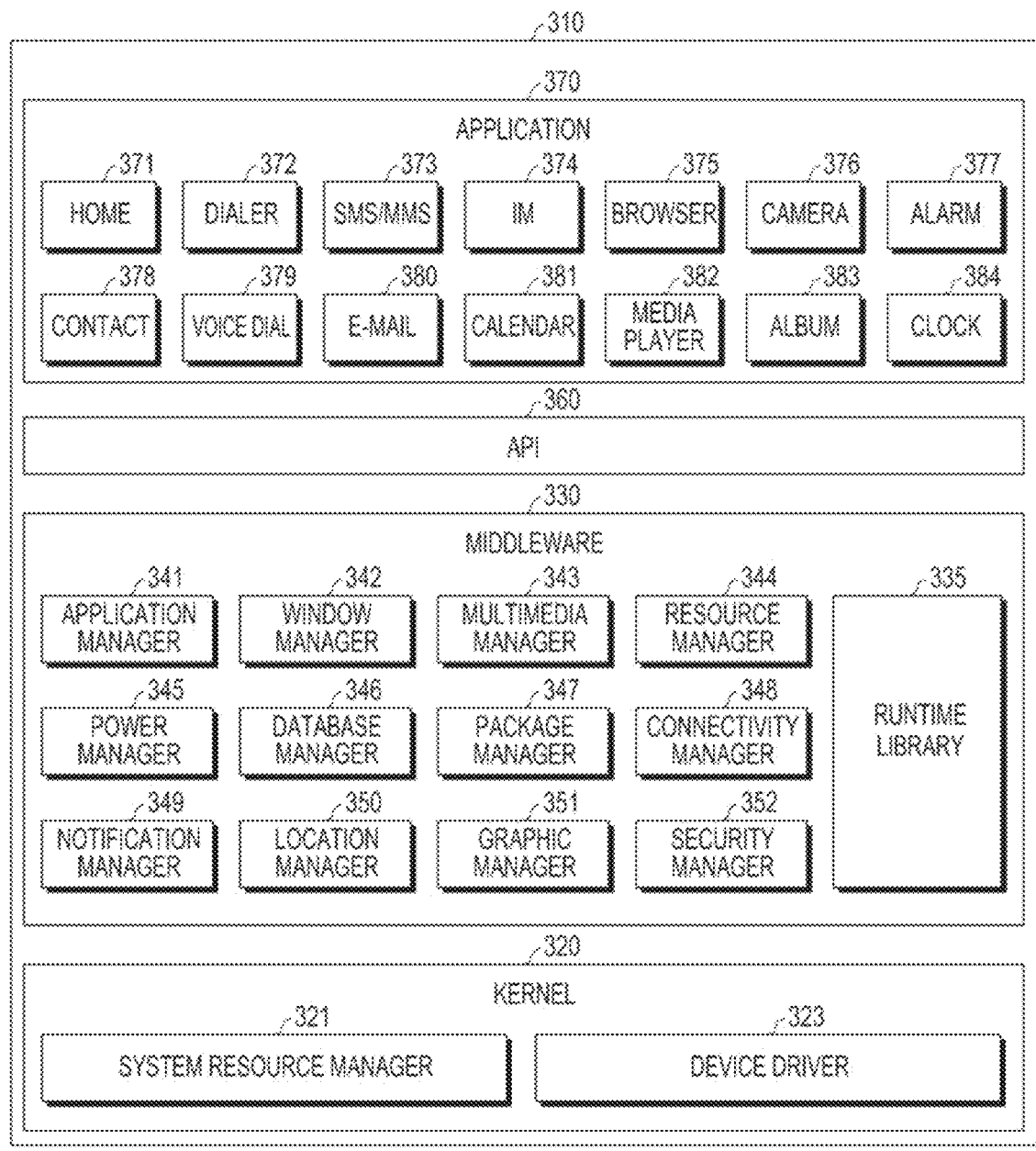
FIG. 3 is a block diagram of a program module according to an embodiment of the disclosure.

FIG. 3 is a block diagram of a program module according to an embodiment of the disclosure.

According to an embodiment, the program module 310 (e.g., the program 140) may include an operating system (OS) that controls resources relating to an electronic device (e.g., the electronic device 101) and/or various applications (e.g., the application programs 147) that are driven on the operating system. The operating system may include, for example, Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least a part of the program module 310 may be preloaded on the electronic device, or may be downloaded from an external electronic device (e.g., the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can use the limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage input/output, manage memory, or process arithmetic functions. The application manager 341 may manage, for example, the life cycles of the applications 370. The window manager 342 may manage GUI resources used for a screen. The multimedia manager 343 may identify a format required for reproducing media files and may perform encoding or decoding of the media files using a codec according to the format. The resource manager 344 may manage source a code of the applications 370 or space in memory. The power manager 345 may manage, for example, the capacity, temperature, or power of the battery, and may determine or provide information of power necessary for operation of the electronic device by using the corresponding information. According to an embodiment, the power manager 345 may operate in conjunction with a basic input/output system (BIOS). The database manager 346 may, for example, create, query, or modify a database to be used in the applications 370, for example. The package manager 347 may manage the installation or update of an application that is distributed in the form of a package file.

The connectivity manager 348 may, for example, manage wireless connections. The notification manager 349 may provide an event to the user, for example, an arrival message, an appointment, a proximity notification, and the like. The location manager 350 may manage, for example, the location information of the electronic device. The graphic manager 351 may manage, for example, a graphical effect to be provided to the user or a user interface related thereto. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operating systems. The middleware 330 may dynamically delete some existing elements or may add new elements.

The API 360 is, for example, a set of API programming functions, and may be provided with different configurations according to the operating system. For example, in the case of Android or iOS, one API set may be provided for each platform, and in the case of Tizen, two or more API sets may be provided for each platform.

The applications 370 may include home 371, a dialer 372, short message service (SMS)/multimedia message service (MMS) 373, instant message (IM) 374, a browser 375, a camera 376, an alarm 377, a contact 378, a voice dialer 379, an email 380, a calendar 381, a media player 382, an album 383, a watch 384, healthcare (e.g., measuring the amount of exercise or blood glucose, etc.), or an environmental information (e.g., atmospheric pressure, humidity, or temperature information) providing application. According to an embodiment, the applications 370 may include an information exchange application that can support the exchange of information between the electronic device and an external electronic device. The information exchange application may include, for example, a notification relay application for transferring specific information to an external electronic device, or a device management application for managing the external electronic device. For example, a notification transfer application may transfer notification information generated by another application on the electronic device to an external electronic device, or may receive notification information from the external electronic device and provide the same to the user. The device management application may install, delete, or update, for example, a function (e.g., turning on/off an external electronic device itself (or some element parts thereof) or adjusting the brightness (or resolution) of the display) of an external electronic device communicating with the electronic device or an application operating in the external electronic device. According to an embodiment, the applications 370 may include applications (e.g., a health care application of a mobile medical appliance) that are designated according to the attributes of an external electronic device. According to an embodiment, the applications 370 may include applications received from an external electronic device. At least some of the program modules 310 may be implemented (e.g., executed) by software, firmware, hardware (e.g., the processor 210), or a combination of two or more thereof and may include a module, a program, a routine, an instruction set, or a process for performing one or more functions.

Figure 4:
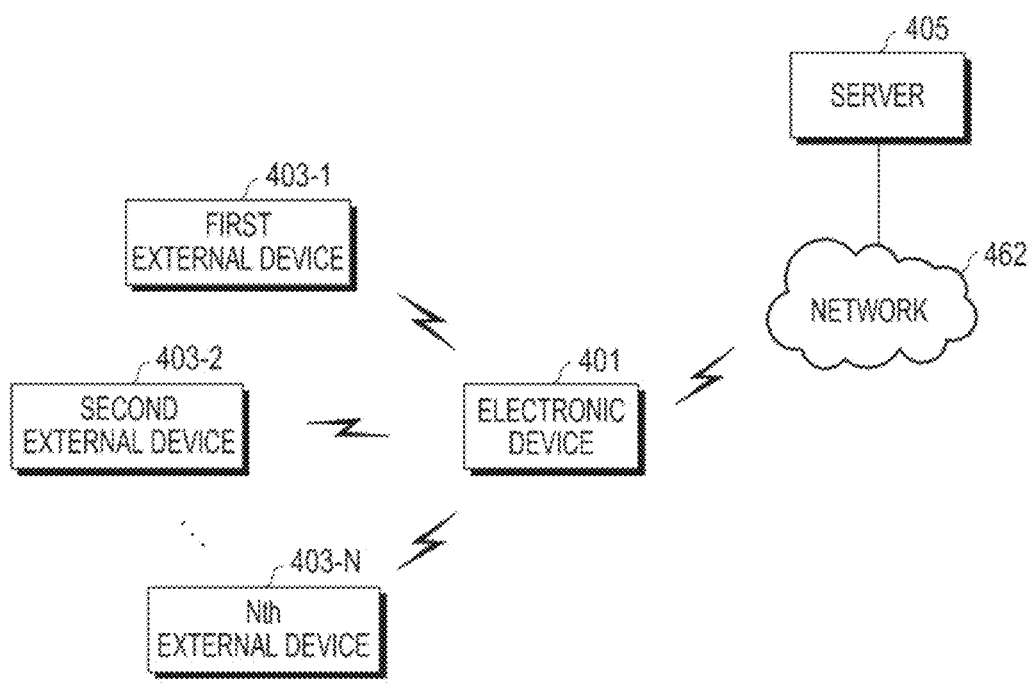
FIG. 4 is a diagram illustrating a system according to an embodiment of the disclosure.

FIG. 4 is a diagram illustrating a system according to an embodiment of the disclosure.

Referring to FIG. 4, a system according to various embodiments may include an electronic device 401, a first external device to an Nth external device 403-1 to 403-N, and a server 405.

The electronic device 401 (e.g., 101 of FIG. 1 or 201 of FIG. 2) and the first to Nth external devices 403-1 to 403-N (e.g., 102 of FIG. 1) may support respective communication protocols enabling bidirectional communication. According to an embodiment, the communication protocols may include at least one among a Bluetooth protocol, a Bluetooth low energy (BLE) protocol, a Wi-Fi protocol, a beacon protocol, a ZigBee protocol, and a near field communication (NFC) protocol. According to an embodiment, the communication protocols may further include another communication protocol designated for an Internet-of-Things (IoT) service. The first to Nth external devices 403-1 to 403-N are examples for explaining an external device existing in the vicinity of the electronic device 401, and may be one or more external devices.

According to various embodiments, each of the first to Nth external devices 403-1 to 403-N may be a device configured to be able to receive a wireless communication signal from the electronic device 401 through a communication circuit and operate according to the received signal. According to various embodiments, each of the first to Nth external devices 403-1 to 403-N may be an electronic device connected through a network for a service (e.g., a ubiquitous service, a home network service, an IoT service, or the like). According to various embodiments, the first to Nth external devices 403-1 to 403-N may include at least one among a refrigerator, a washing machine, a TV, a cooktop, an audio player, an air conditioner, a stand, a smart curtain, a smart light, an electronic water purifier, an electronic kneader, an electronic oven, a coffee machine, a CD player, a speaker, a printer, a notebook computer, a PC, a memory device, a keyboard, a mouse, a camera, a projector, smart glasses, a smart watch, a wireless earphone, a tablet, a robot device, and a drone device. In addition, the first to Nth external devices 403-1 to 403-N may include one of other various electronic devices. According to various embodiments, the first to Nth external devices 403-1 to 403-N may broadcast packets including their own device information at each specified interval, or may broadcast packets including their own device information in response to a request from the electronic device 401. According to various embodiments, the device information may include at least one of device recognition information, device function information, device status information, and device event information. According to an embodiment, the device recognition information is information that enables device recognition, and may include at least one among a device ID, a manufacturer, a serial number, and a media access control (MAC) address. According to an embodiment, the device function information (device capability data) may include at least one function which may be performed by the device. According to an embodiment, the device status information (device status data) may include at least one status indicating the current status of the device. According to an embodiment, the device event information (device event data) may include at least one event occurring in the device.

The electronic device 401 may receive a user input. According to various embodiments, the electronic device 401 may receive a user input including a request for performing a task using at least one external device. According to various embodiments, the user input may be one among a voice signal input of a user through a microphone, a gesture input made by the user through a motion sensor, a touch input made by the user through a touch screen, key inputs made using various keys, and the like. According to various embodiments, the electronic device 401 may obtain data associated with the user input, and may transmit the data associated with the user input to the server 405 (e.g., 106 of FIG. 1) through a wireless network 462 (e.g., 162 of FIG. 1). The data associated with the user input may be used for obtaining information necessary for performing a task using an external device. According to an embodiment, the electronic device 401 may receive, through the microphone, a voice signal corresponding to a request for performing the task using at least one external device, and may convert the received voice signal into voice data. The voice data may be used for obtaining information necessary for performing the task using the external device. According to various embodiments, the electronic device 401 may autonomously obtain information necessary for performing the task using the external device, by using the voice data, or may transmit the voice data to the server 405 and may obtain information necessary for performing the task using the external device from the server 405.

The electronic device 401 may obtain at least one wireless communication signal through the communication circuit. For example, the electronic device 401 may receive a signal broadcasted from each of the first to Nth external devices 403-1 to 403-N. The electronic device 401 may receive a signal periodically broadcasted from each of the first to Nth external devices 403-1 to 403-N, and may receive signals broadcasted from the first to Nth external devices 403-1 to 403-N after requesting the signals from the first to Nth external devices 403-1 to 403-N.

According to an embodiment, the electronic device 401 may include a plurality of antennas, and may receive at least one wireless communication signal via the plurality of antennas. For example, the electronic device 401 may receive signals from the respective first to Nth external devices 403-1 to 403-N via the plurality of antennas. When at least one signal is received by the plurality of antennas, phase differences may occur between the signals received by the plurality of antennas. According to an embodiment, when signals transmitted from the first external device 403-1 are received through two antennas of the electronic device 401, a phase difference may occur between the signals received through the two antennas due to the difference between the times of arrival of the signals at the two antennas. According to various embodiments, the electronic device 401 may receive signals from the respective first to Nth external devices 403-1 to 403-N via the plurality of antennas, may detect a phase difference for the signals from the respective first to Nth external devices 403-1 to 403-N, and may determine an external device corresponding to a signal having a phase difference equal to or smaller than a predetermined threshold value from among the signals from the first to Nth external devices 403-1 to 403-N. The electronic device 401 may obtain second information of the external device corresponding to the signal having the phase difference equal to or smaller than the predetermined threshold value. For example, the second information may include device recognition information of the external device corresponding to the signal having the phase difference equal to or smaller than the predetermined threshold value.

The electronic device 401 may identify at least one external device on the basis of a signal received from at least one external device. According to various embodiments, the electronic device 401 may identify at least one external device by using device recognition information included in at least one external device signal, or may identify at least one external device to perform a task, by using first information obtained based on data associated with a user input and second information obtained based on at least one external device signal. According to an embodiment, the device recognition information is information that enables device recognition, and may include at least one among a device ID, a manufacturer, a serial number, and a media access control (MAC) address.

The electronic device 401 may identify a device ID of at least one external device corresponding to a signal, which is received via the plurality of antennas and has a phase difference equal to or smaller than a predetermined threshold value, from among device IDs of external devices included in the first information (e.g., a list of external devices) obtained based on voice data. For example, among external devices identified by a voice signal uttered by a user, the electronic device 401 may identify the external device intended by the user, by identifying the external device toward which the user orients the electronic device 401.

According to various embodiments, when a device ID of at least one external device corresponding to a signal received via the plurality of antennas, which has a phase difference thereof equal to or smaller than a designated threshold value, is not included in device IDs of external devices included in first information (e.g., a list of external devices) obtained based on voice data, the electronic device 401 may re-obtain second information of the at least one external device. For example, when at least one external device corresponding to a signal having a phase difference equal to or smaller than the designated threshold value is absent, the designated threshold value may be adjusted (e.g., adjusting the phase difference upwards) to obtain the second information.

For example, when the second information of the at least one external device is re-obtained, the electronic device 401 may adjust the threshold value for phase difference comparison, and may obtain the second information of the at least one external device corresponding to a signal, which is received via the plurality of antennas and has a phase difference equal to or smaller than an adjusted threshold value. In another example, in order to re-obtain second information, the electronic device 401 may output information for providing an instruction to a user to indicate a direction again, and re-receive signals of the respective first to Nth external devices 403-1 to 403-N via the plurality of antennas, so as to obtain the second information of the at least one external device.

According to an embodiment, as the upper end of the electronic device 401 is oriented toward an external device, the plurality of antennas included in the upper end of the electronic device 401 may be oriented in the direction of the external device, and as the direction in which the plurality of antennas are oriented corresponds to the external device, the electronic device 401 may identify the external device, toward which the electronic device 401 is oriented, on the basis of a signal received in the direction of the external device.

The electronic device 401 may obtain information for performing a task related to the identified at least one external device by using data associated with the user input and information of the identified at least one external device. For example, the electronic device 401 may autonomously obtain information for performing a task related to the identified at least one external device on the basis of data associated with the user input and information of the identified at least one external device. In another example, the electronic device 401 may obtain information for performing a task related to at least one external device identified by the server 405, by currently or sequentially transmitting data associated with the user input and information on the identified at least one external device.

According to various embodiments, information for performing the task related to the identified at least one external device may include sequence information of states related to one or more operations of the electronic device 401 for performing the task related to the at least one external device or of states related to a combination of the one or more operations. According to an embodiment, the sequence information of the states related to the combination of the one or more operations may include information that allows the electronic device to separately or sequentially perform the one or more operations. According to an embodiment, the information that allows the electronic device to separately or sequentially perform the one or more operations may include rule path information related to at least a part of the one or more operations. For example, the rule path information may include information that allows the electronic device 401 to execute a specific application and perform the one or more operations via the executed specific application, or may include status information of the one or more operations for performing a user instruction in the electronic device 401.

According to various embodiments, the task related to the identified at least one external device may be at least one among a task for displaying service information corresponding to the identified at least one external device, a task for transmitting a control instruction to the identified at least one external device, and a task for transmitting, to the identified at least one external device, an instruction that allows the identified at least one external device to interwork with another external device. In addition, any task performed by the electronic device 401 using an external device may be possible. According to an embodiment, the sequence information of the states of the electronic device 401 for performing the task for displaying service information corresponding to the identified at least one external device may include information that allows operations to be separately or sequentially performed, the operations including an operation of connecting for communication with the identified at least one external device, an operation of obtaining service information corresponding to the identified at least one external device, and an operation of displaying the service information corresponding to the identified at least one external device.

The server 405 may separately or concurrently receive data associated with the user input and information on the identified at least one external device from the electronic device 401. The server 405 may obtain information for performing the task related to the identified at least one external device on the basis of data associated with the user input and information on the identified at least one external device, and may transmit information for performing the task related to the identified at least one external device to the electronic device 401.

According to various embodiments, the server 405 may receive voice data as data associated with the user input, and the electronic device 401 may receive, from the server 405, device recognition information as information of at least one external device identified based on the voice data. According to an embodiment, the device recognition information is information that enables device recognition, and may include at least one among a device ID, a manufacturer, a serial number, and a media access control (MAC) address.

According to various embodiments, the server 405 may obtain first information of at least one external device by using data associated with the user input, and may transmit the obtained first information to the electronic device 401. Further, the server 405 may obtain information for performing a task related to the identified at least one external device, by using data associated with the user input and information of the identified at least one external device, and may transmit the information for performing the task related to the identified at least one external device to the electronic device 401. According to various embodiments, the server 405 may be a single server or a plurality of servers, and when the server is a plurality of server, the plurality of servers may include a server (hereinafter, referred to as "a first server") that obtains first information used for identifying at least one external device, and a server (hereinafter, referred to as "a second server") that obtains information for performing a task related to the identified at least one external device. For example, the first server may be an intelligent server, and the second server may be an IoT server.

According to an embodiment, the server 405 may perform voice recognition on the basis of voice data received from the electronic device 401, may recognize a speaker who has spoken, and may perform syntactic analysis and semantic analysis for a voice signal via a natural-language-understanding module, so as to identify a user's intention. For example, the server 405 may determine, according to the results of the analyses of voice data, whether a user has an intention of indication, or the user has an intention to provide an instruction, and may designate indication information (e.g., an indication target or a demonstrative pronoun) relating to the intention of indication or instruction information (e.g., an instruction or a function) corresponding to the intention to provide an instruction, wherein the designated indication information or instruction information is converted into text. The server 405 may obtain information related to an indication target, a demonstrative pronoun, an instruction, or a function on the basis of the indication information or the instruction information.

According to various embodiments, the server 405 may obtain first information for identifying at least one external device on the basis of information related to at least a part of the obtained indication target, the demonstrative pronoun, the instruction, or the function. According to an embodiment, the first information may include an external device list related to the indication information or the instruction information. For example, the external device list may include a device ID of at least one external device related to the indication information or the instruction information. In addition, the first information may further include information indicating that the electronic device 401 requires second information for identifying the external device. For example, the server 405 may obtain the external device list related to the indication target or the instruction from among a plurality of predesignated external devices on the basis of information related to the indication target, the demonstrative pronoun, the instruction, or the function, and may obtain information indicating that the second information for identifying the external device is required, on the basis of the demonstrative pronoun from among pre-stored information. For example, when "that" (demonstrative pronoun) and "Turn on the light" (instruction) are obtained as information related to an indication target, a demonstrative pronoun, an instruction, or a function through natural-language understanding and voice recognition for voice data corresponding to "That, turn on the light", the server 405 may obtain an external device list related to "Turn on the light" (instruction), and may obtain information indicating that second information for identifying the external device is required in relation to "that" (demonstrative pronoun). The server 405 may transmit, to the electronic device 401, the external device list and the first information including information indicating that the second information is required.

According to various embodiments, the server 405 may obtain the obtained information related to the indication target, the demonstrative pronoun, the instruction, or the function, and information for performing a task related to an identified at least one external device by using information of the identified at least one external device. For example, when "that" (demonstrative pronoun) and "Turn on the light" (instruction) are obtained as information related to an indication target, a demonstrative pronoun, an instruction, or a function, and device recognition information for a smart light is obtained as information of an identified at least one external device, the server 405 may obtain information for performing a task of providing an instruction to turn off the power of the smart light. For example, the server 405 may obtain sequence information of states related to one or more operations necessary for the electronic device 401 to provide an instruction to turn off the power of the smart light, or of states related to a combination of the one or more operations. The server 405 may transmit, as information for performing the identified task, information including sequence information of states related to one or more operations of the electronic device 401 or of states related to a combination of the one or more operations to the electronic device 401. According to an embodiment, the sequence information of states related to a combination of the one or more operations may include information that allows the electronic device to perform the one or more operations separately or sequentially. According to an embodiment, the information that allows the electronic device to perform the one or more operations separately or sequentially may include rule path information related to at least a part of the one or more operations. For example, the rule path information may include information that enables the electronic device 401 to execute a specific application and perform one or more operations via the executed specific application, or may include status information of one or more operations for performing a user instruction by the electronic device 401.

Figure 5A:
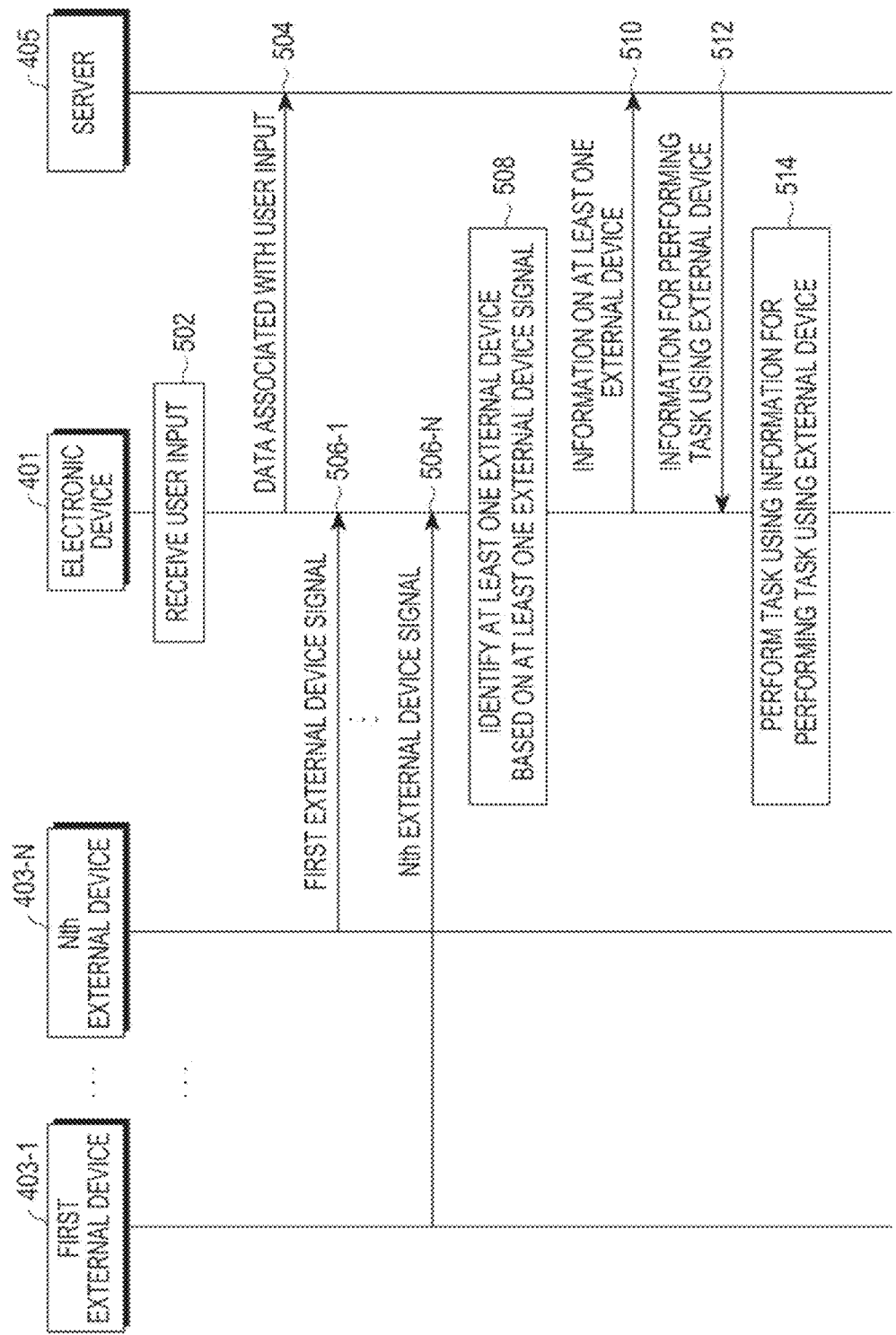
FIGS. 5A and 5B are flow diagrams illustrating operations of the system according to various embodiments of the disclosure.
Figure 5B:
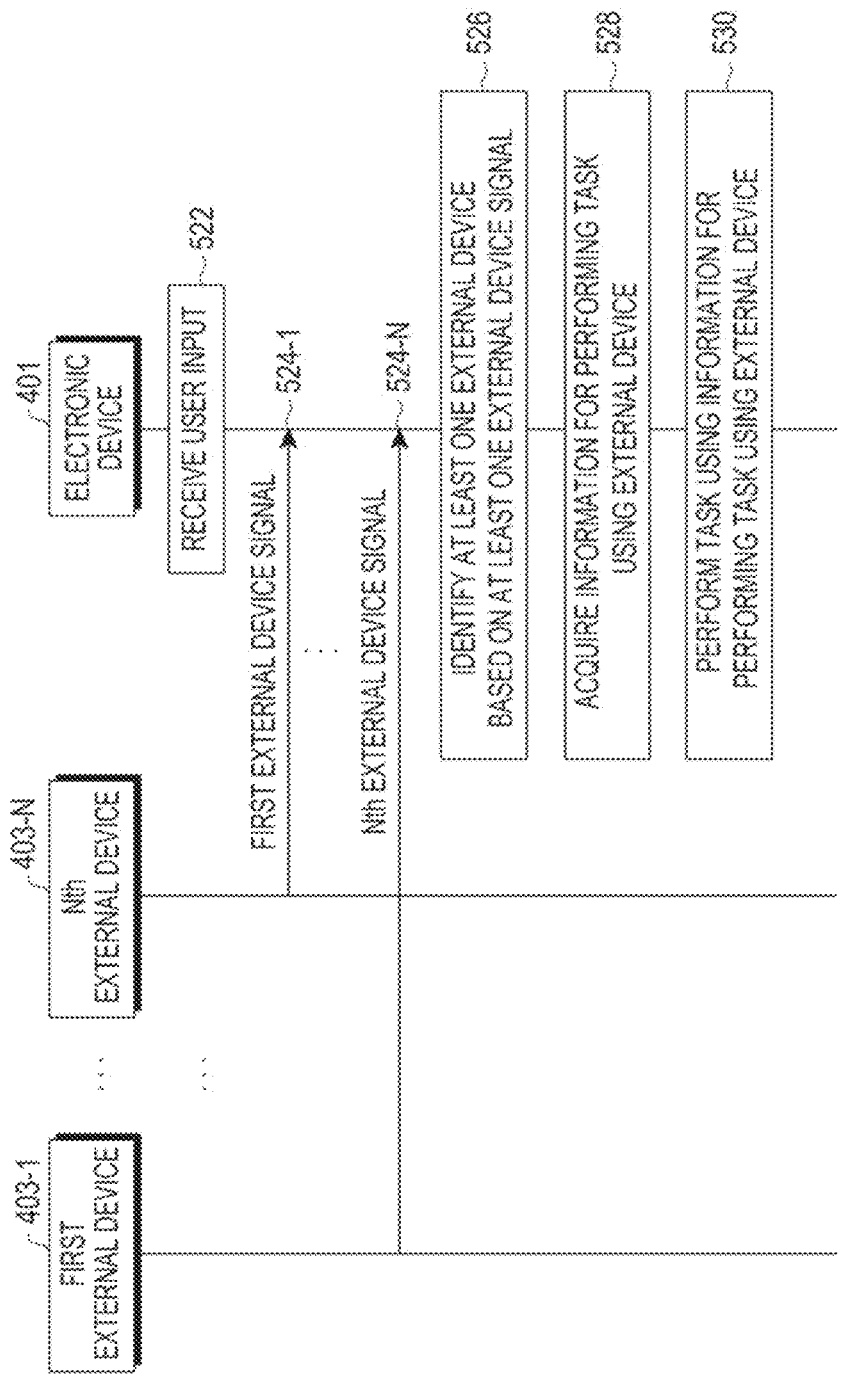

FIGS. 5A and 5B are flow diagrams illustrating operations of the system according to various embodiments of the disclosure.

Referring to FIG. 5A, the electronic device 401 (e.g., 101 of FIG. 1, or 201 of FIG. 2) may receive a user input in operation 502. The electronic device 401 may convert the received user input into data associated with the user input. According to an embodiment, the electronic device 401 may receive a voice signal uttered by a user through a microphone. For example, the user may utter a voice including an instruction, such as "Turn off the light", "What is that?", "Play music using that", "Turn that off 10 minutes later", and "Does that need to be charged?", etc., or a voice including an instruction and a demonstrative pronoun. The electronic device 401 may receive the uttered voice signal through a microphone, and may convert the received voice signal into voice data that is data associated with the user input.

The electronic device 401 may transmit data associated with the user input to the server 405 in operation 504. According to various embodiments, upon reception of the voice data transmitted from the electronic device 401, the external server 405 may perform voice recognition on the basis of the voice data, may perform natural-language understanding to obtain information relating to an indication target, a demonstrative pronoun, an instruction, or a function, and may obtain first information for identifying at least one external device on the basis of the obtained information related to the indication target, the demonstrative pronoun, the instruction, or the function and transmit the obtained first information to the electronic device 401. According to an embodiment, the first information may include an external device list. The external device list may include device recognition information of at least one external device. In addition, the first information may further include information indicating that the electronic device 401 requires second information for identifying the external device. According to various embodiments, the electronic device 401 may autonomously obtain the first information for identifying at least one external device on the basis of the voice data, without transmitting the voice data to the external server 405.

The electronic device 401 may obtain at least one signal through a communication circuit in operations 506-1 to 506-N. For example, the electronic device 401 may receive a signal broadcasted from each of first to Nth external devices 403-1 to 403-N. The electronic device 401 may receive a signal periodically broadcasted from each of first to Nth external devices 403-1 to 403-N, and may request signals from the first to Nth external devices 403-1 to 403-N and then receive the signals broadcasted from the first to Nth external devices 403-1 to 403-N. According to various embodiments, the electronic device 401 may include a plurality of antennas, and may receive at least one wireless communication signal via the plurality of antennas. For example, the electronic device 401 may receive signals from the respective first to Nth external devices 403-1 to 403-N via the plurality of antennas included in the electronic device 401. When at least one signal is received by the plurality of antennas, phase differences may occur between the signals received by the plurality of antennas. According to an embodiment, when signals transmitted from the first external device 403-1 are received through two antennas of the electronic device 401, a phase difference may occur between the signals received through the two antennas due to the difference between the times of arrival of the signals at the two antennas. According to various embodiments, the electronic device 401 may receive signals from the respective first to Nth external devices 403-1 to 403-N via the plurality of antennas, may detect a phase difference for the signals from the respective first to Nth external devices 403-1 to 403-N, and may determine an external device corresponding to a signal having a phase difference equal to or smaller than a predetermined threshold value from among the signals from the first to Nth external devices 403-1 to 403-N. The electronic device 401 may obtain second information of the external device corresponding to the signal having the phase difference equal to or smaller than the predetermined threshold value. For example, the second information may include device recognition information of the external device corresponding to the signal having the phase difference equal to or smaller than the predetermined threshold value.

The electronic device 401 may identify at least one external device on the basis of at least one external device signal in operation 508. According to various embodiments, the electronic device 401 may identify at least one external device by using device recognition information included in the signal received from the at least one external device, or may identify at least one external device, in which a phase difference of signals received via the plurality of antennas is equal to or smaller than the predetermined threshold value, on the basis of the phase difference of the received signal and device recognition information of each of the at least one external device.

The electronic device 401 may transmit information of the at least one external device to the server 405 in operation 510. According to various embodiments, the electronic device 401 may transmit device recognition information of the identified at least one external device to the server 405.

The server 405 may obtain information for performing a task using the external device on the basis of data associated with the user input received from the electronic device 401 and information of the at least one external device. According to various embodiments, the server 405 may receive voice data as data associated with the user input, and may receive device recognition information as information of the at least one external device. According to various embodiments, when voice data and device recognition information are received, the server 405 may determine at least one external device to perform a task using the received voice data and device recognition information. For example, the server 405 may determine at least one external device corresponding to device recognition information, in which a phase difference of signals received by the electronic device 401 via the plurality of antennas is equal to or smaller than the predetermined threshold value, from among external devices included in the first information (e.g., an external device list) obtained based on the voice data. Further, the server 405 may perform voice recognition based on the received voice data, and may perform natural-language understanding for the recognized voice so as to obtain information related to an indication target, a demonstrative pronoun, an instruction, or a function. According to various embodiments, the server 405 may provide external devices included in the first information (e.g., an external device list) obtained based on the voice data to the electronic device 401, and the electronic device 401 may determine at least one external device corresponding to device recognition information, in which a phase difference of signals received via the plurality of antennas is equal to or smaller than the predetermined threshold value, so as to provide information on the determined at least one external device to the server 405.

The server 405 may obtain information for performing a task including at least a part of an instruction or function related to the at least one external device determined based on the determined at least one external device and information related to an indication target, a demonstrative pronoun, an instruction, or a function. For example, when "that" (demonstrative pronoun) and "Turn on the light" (instruction) are obtained as information related to an indication target, a demonstrative pronoun, an instruction, or a function, and the at least one external device to perform the task is a smart light, the server 405 may obtain information for performing the task of providing an instruction to turn off the power of the smart light. The server 405 may transmit the information for performing the task using the external device to the electronic device 401 in operation 512. For example, the server 405 may transmit, as information for performing the task of providing an instruction to turn off the power of the smart light, sequence information of states related to one or more operations of the electronic device 401 or of states related to a combination of the one or more operations to the electronic device 401. According to an embodiment, the sequence information of states related to the combination of the one or more operations may include information that allows the electronic device to perform the one or more operations separately or sequentially.

According to an embodiment, the sequence information of states related to the combination of the one or more operations, that is, the information that allows the electronic device 401 to separately or sequentially perform the one or more operations, may include rule path information related to the one or more operations of the electronic device 401. For example, the rule path information may include information that enables the electronic device 401 to execute a specific application and perform the one or more operations via the executed specific application, or may include status information of the one or more operations for performing a user instruction by the electronic device 401. For example, the sequence information of states related to the one or more operations necessary for the electronic device 401 to provide an instruction to turn off the power of the smart light, or of states related to the combination of the one or more operations may include information that allows the electronic device to separately or sequentially perform an operation of connecting for communication with the smart light, an operation of transmitting a power-off instruction to the smart light, and an operation of receiving a power-off result from the smart light.

The electronic device 401 may perform the task using information for performing the task using the external device, in operation 514. According to an embodiment, the electronic device 401 may separately or sequentially perform the operation of connecting for communication with the smart light, the operation of transmitting the power-off instruction to the smart light, and the operation of receiving the power-off result from the smart light, by using the sequence information of states of the one or more operations of the electronic device 401, which are necessary for providing an instruction to turn off the power of the smart light, or of states of the combination of the one or more operations, so as to perform the task of providing an instruction to turn off the power of the smart light.

Referring to FIG. 5B, the electronic device 401 (e.g., 101 of FIG. 1, or 201 of FIG. 2) may receive a user input in operation 522. The electronic device 401 may convert the received user input into data associated with the user input. According to various embodiments, the user input may be one of various inputs, such as an input by a voice signal uttered by a user, a touch input according to a touch applied by the user on a touch screen of the electronic device 401, a gesture input in the state in which the user grasps the electronic device 401, and the like. According to an embodiment, when a touch input is received from a user, for example, when a touch input corresponding to power-off is made on the touch screen, the electronic device 401 may obtain first information for identifying at least one external device on the basis of information related to power-off. According to an embodiment, the first information may include an external device list the power of which can be turned off. The external device list may include device recognition information of at least one external device. Further, the first information may further include information indicating that the electronic device 401 requires second information for identification of the external device. According to various embodiments, when there is at least one user input among various inputs, such as an input of a voice signal uttered by a user, a gesture input by the user, and the like, the electronic device 401 may surely obtain the first information for identifying at least one external device on the basis of the input.

The electronic device 401 may obtain at least one signal through a communication circuit in operations 524-1 to 524-N. For example, the electronic device 401 may receive a signal broadcasted from each of first to Nth external devices 403-1 to 403-N. The electronic device 401 may receive a signal periodically broadcasted from each of the first to Nth external devices 403-1 to 403-N, and may request signals from the first to Nth external devices 403-1 to 403-N and then receive the signals broadcasted from the first to Nth external devices 403-1 to 403-N. According to various embodiments, the electronic device 401 may include a plurality of antennas, and may receive at least one wireless communication signal via the plurality of antennas. For example, the electronic device 401 may receive signals from the respective first to Nth external devices 403-1 to 403-N via the plurality of antennas. When at least one signal is received by the plurality of antennas, phase differences may occur between the signals received by the plurality of antennas. According to an embodiment, when signals transmitted from the first external device 403-1 are received through two antennas, a phase difference may occur between the signals received through the two antennas due to the difference between the times of arrival of the signals at the two antennas. According to various embodiments, the electronic device 401 may receive signals from the respective first to Nth external devices 403-1 to 403-N via the plurality of antennas, may detect a phase difference for the signals from the respective first to Nth external devices 403-1 to 403-N, and may determine an external device corresponding to a signal having a phase difference equal to or smaller than a predetermined threshold value from among the signals from the first to Nth external devices 403-1 to 403-N. The electronic device 401 may obtain second information of the external device corresponding to the signal having the phase difference equal to or smaller than the predetermined threshold value. For example, the second information may include device recognition information of the external device corresponding to the signal having the phase difference equal to or smaller than the predetermined threshold value.

The electronic device 401 may identify at least one external device on the basis of a signal received from the at least one external device, in operation 526. According to various embodiments, the electronic device 401 may identify at least one external device by using device recognition information included in at least one external device signal, or may identify at least one external device by using first information obtained based on data associated with the user input and second information obtained based on the at least one external device signal. For example, the electronic device 401 may identify at least one external device corresponding to a signal, which is received via the plurality of antennas and has a phase difference equal to or smaller than a predetermined threshold value, according to the second information, from among external devices included in the first information (e.g., an external device list) obtained based on the voice data. For example, among external devices primarily identified by the voice uttered by the user, an external device to perform a task may be identified by secondarily identifying the external device toward which the user orients the electronic device 401.

The electronic device 401 may obtain information for performing a task using an external device on the basis of data associated with the user input and information of at least one external device, in operation 528. According to various embodiments, when the data related to the user input is voice data, and the information of at least one external device is device recognition information, the electronic device 401 may perform voice recognition on the basis of the voice data, and may perform natural-language understanding for the recognized voice, so as to obtain information related to an indication target, a demonstrative pronoun, an instruction, or a function. The electronic device 401 may obtain information for performing a task including at least a part of an instruction or function related to an external device corresponding to device recognition information on the basis of the device recognition information and the obtained information related to the indication target, the demonstrative pronoun, the instruction, or the function. For example, when "that" (demonstrative pronoun) and "Turn on the light" (instruction) are obtained as the information related to the indication target, the demonstrative pronoun, the instruction, or the function, and device recognition information for a smart light is obtained as information of an identified at least one external device, the electronic device 401 may obtain information used for performing a task of providing an instruction to turn off the power of the smart light. According to an embodiment, the electronic device 401 may obtain, as information for performing a task of providing an instruction to turn off the power of the smart light, sequence information of states related to one or more operations of the electronic device 401, which are necessary for providing an instruction to turn off the power of the smart light, or of states related to a combination of the one or more operations. According to an embodiment, the sequence information of states related to the combination of the one or more operations may include information that allows the electronic device to perform the one or more operations separately or sequentially. For example, the sequence information of states related to the one or more operations of the electronic device 401, which are necessary for providing an instruction to turn off the power of the smart light, or of states related to the combination of the one or more operations may include information that allows the electronic device to separately or sequentially perform an operation of connecting for communication with the smart light, an operation of transmitting a power-off instruction to the smart light, and an operation of receiving a power-off result from the smart light.

The electronic device 401 may perform the task using information for performing the task using the external device, in operation 530. According to an embodiment, the electronic device 401 may separately or sequentially perform the operation of connecting for communication with the smart light, the operation of transmitting the power-off instruction to the smart light, and the operation of receiving the power-off result from the smart light, by using the sequence information of states of the one or more operations of the electronic device 401, which are necessary for providing an instruction to turn off the power of the smart light, or of states of the combination of the one or more operations, so as to perform the task of providing an instruction to turn off the power of the smart light.

Figure 6A:
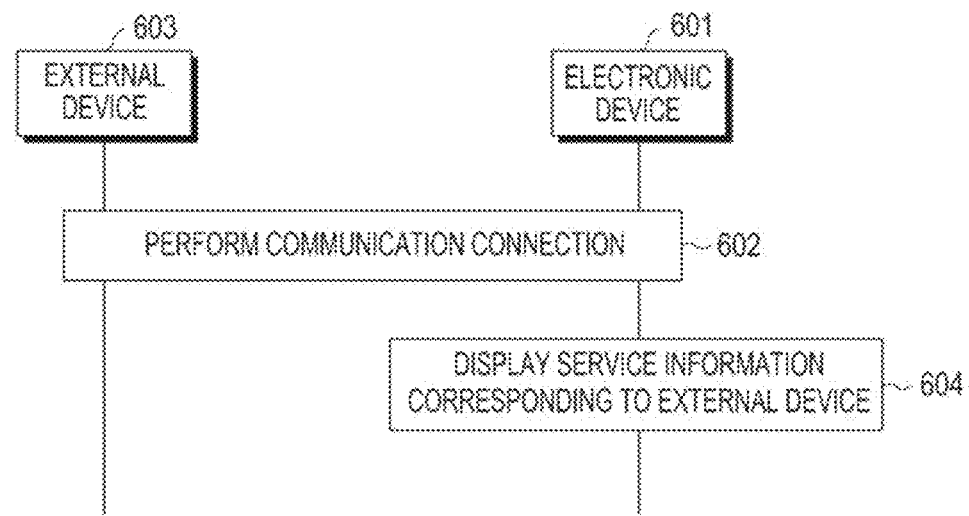
FIGS. 6A and 6B are flow diagrams illustrating operations of displaying service information corresponding to an external device by the electronic device according to various embodiments of the disclosure.
Figure 6B:
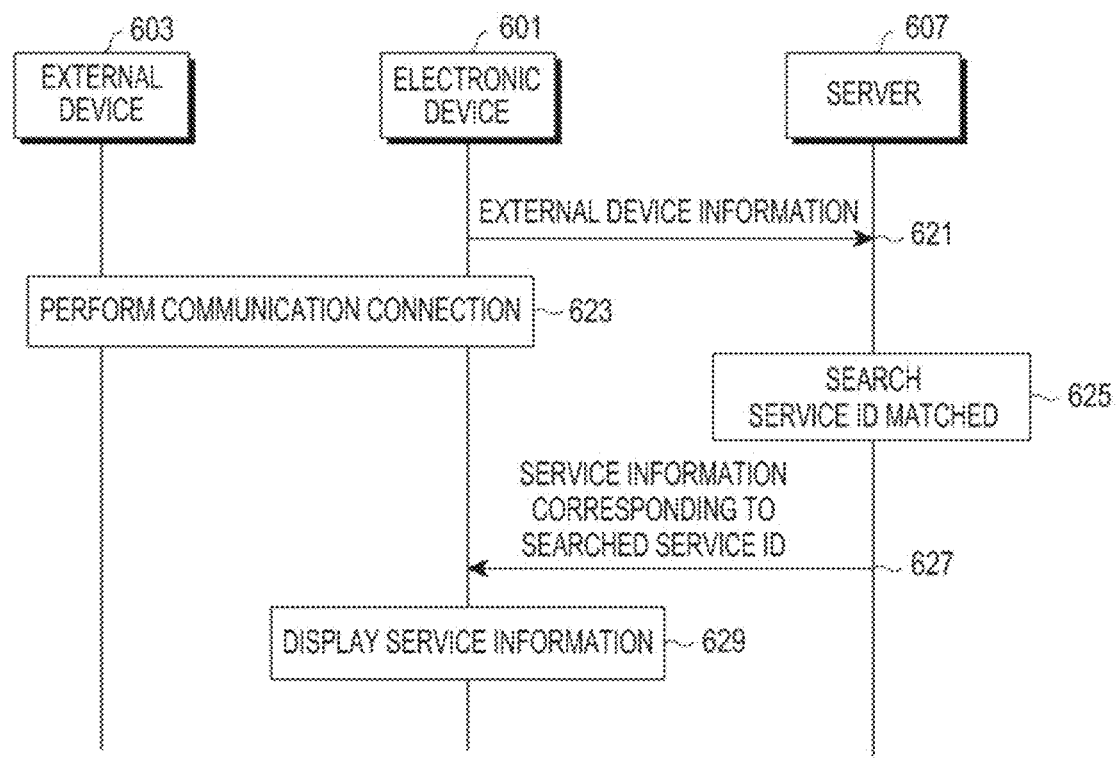

FIGS. 6A and 6B are flow diagrams illustrating operations of displaying service information corresponding to an external device by the electronic device according to various embodiments of the disclosure.

Referring to FIG. 6A, according to an embodiment, information for performing a task of displaying service information corresponding to an external device may include sequence information of states related to operations 602 and 604. An electronic device 601 (e.g., 101 of FIG. 1, 201 of FIG. 2, or 401 of FIG. 4) may perform operations 602 and 604 by using the sequence information of states related to operations 602 and 604. According to an embodiment, the sequence information of states related to operations 602 and 604 may include information that allows the electronic device 601 to separately or sequentially perform operations 602 and 604. According to an embodiment, the information that allows the electronic device 601 to separately or sequentially perform operations 602 and 604 may include at least a part of rule path information related to operations 602 and 604. For example, the rule path information may include information that enables the electronic device 601 to execute a specific application and separately or sequentially perform operations 602 and 604 via the executed specific application, or may include status information of each operation for performing a user instruction by the electronic device 601.

The electronic device 601 may perform communication connection with an external device 603 (e.g., an identified external device among the first to Nth external devices 403-1 to 403-N of FIG. 4 and FIGS. 5A and 5B), in operation 602.

The electronic device 601 may display service information corresponding to the external device 603 in operation 604. According to various embodiments, the service information corresponding to the external device 603 may include information indicating what the external device 603 is, information indicating what function the identified external device 603 provides, or information enabling control of a function provided by the identified external device 603. A user may figure out, on the basis of service information that is displayed in the electronic device 601 and corresponds to the identified external device 603, what the identified external device 603 is and what function the identified external device 603 provides, or may control the identified external device 603 on the basis of the information enabling control of the function provided by the identified external device 603.

Referring to FIG. 6B, according to an embodiment, an operation for performing a task of displaying service information corresponding to an external device may include operations 621 to 629. The electronic device 601 (e.g., 101 of FIG. 1, 201 of FIG. 2, or 401 of FIG. 4) may perform operations 621, 623, and 629 by using sequence information of states related to operations 621, 623, and 629. According to an embodiment, the sequence information of states related to operations 621, 623, and 629 may include information that allows the electronic device 601 to separately or sequentially perform operations 621, 623, and 629.

According to an embodiment, the information that allows the electronic device 601 to separately or sequentially perform operations 621, 623, and 629 may include rule path information related to at least a part of operations 621, 623, and 629. For example, the rule path information may include information that enables the electronic device 601 to execute a specific application and separately or sequentially perform operations 621, 623, and 629 via the executed specific application, or may include status information of operations 621, 623, and 629 for performing a user instruction by the electronic device 601.

The electronic device 601 may transmit information of the external device 603 (e.g., an identified external device among the first to Nth external devices 403-1 to 403-N of FIG. 4 and FIGS. 5A and 5B) to an external server 607 (e.g., 106 of FIG. 1 or 405 of FIG. 4) in operation 621. According to various embodiments, the server 607 may be a server capable of providing a service associated with the external device 603. For example, the information of the external device 603 may include device recognition information of the external device 603. According to various embodiments, the electronic device 601 may obtain information of the external device by using device recognition information included in a signal received from at least one external device, or may obtain information of the external device by using first information obtained based on data related to a user input and second information obtained based on at least one external device signal.

The electronic device 601 may perform communication connection with the external device 603 in operation 623. According to various embodiments, the electronic device 601 may perform communication connection to perform a service corresponding to the external device 603 by interworking with the external device 603 on the basis of the service information corresponding to the external device 603. According to various embodiments, when the electronic device 601 is to obtain only information of the service corresponding to the external device 603 without performing the service corresponding to the external device 603 by interworking with the external device 603, the electronic device 601 may not perform operation 623 of performing communication connection with the external device 603. According to an embodiment, the electronic device 601 may perform operation 623 of performing communication connection with the external device 603 before performing operation 621 of transmitting information of the external device 603 to the server 607.

The server 607 may search for a service ID matching the information of the external device 603 in operation 625, and may provide service information corresponding to the retrieved service ID in operation 627. According to an embodiment, the information of the external device 603 may include device information (e.g., a device ID) of the external device 603. According to an embodiment, the service ID, which is an ID for identification of a service, may correspond to device information, and service information corresponding to a service ID may be stored specific to a service ID in the server 607. According to various embodiments, the service information corresponding to the external device 603 may include information indicating what the external device 603 is, information indicating what function the external device 603 provides, or information enabling control of a function provided by the external device 603.

The electronic device 601 may display the provided service information in operation 629. According to various embodiments, the user may figure out, on the basis of service information displayed in the electronic device 601, what the identified external device 603 is and what function the identified external device 603 provides, or may control the identified external device 603 on the basis of the information enabling control of the function provided by the identified external device 603.

Figure 7A:
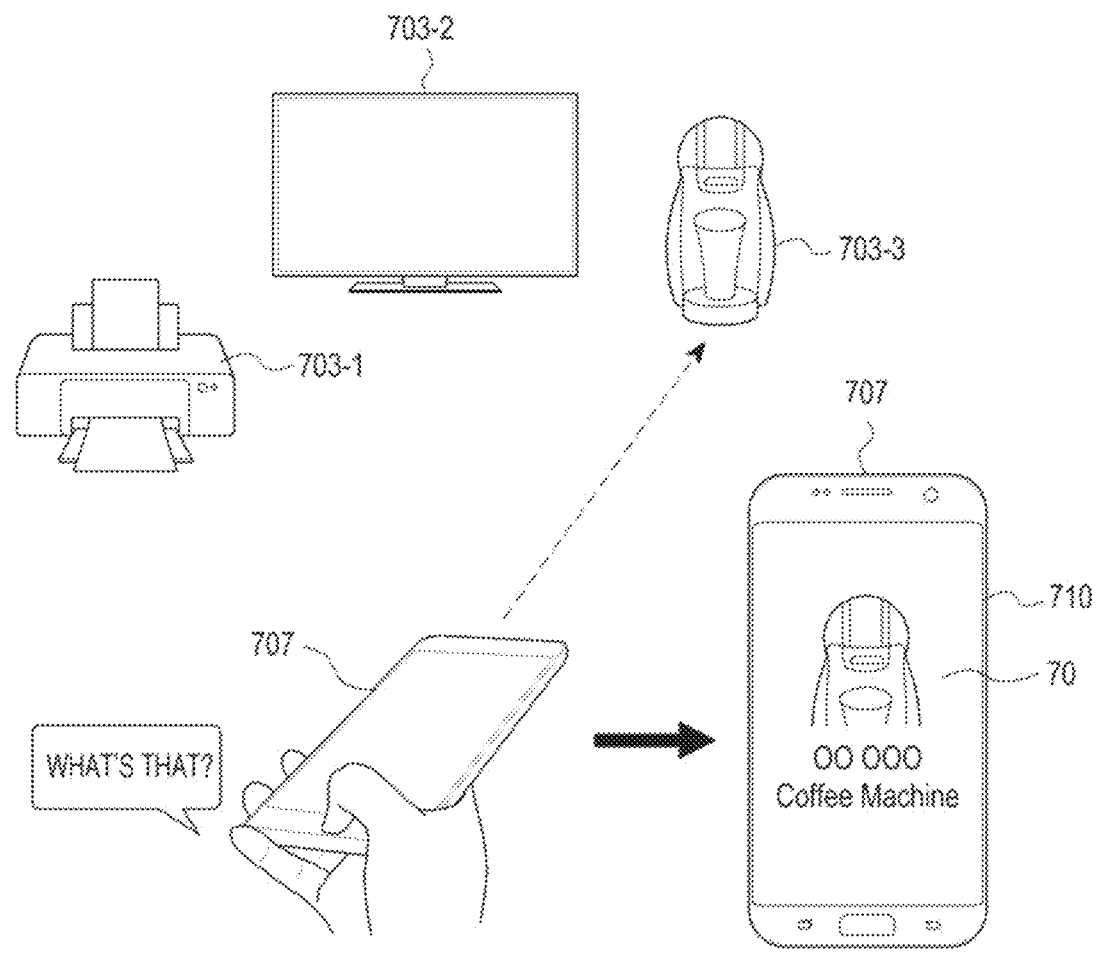
FIGS. 7A and 7B are diagrams illustrating examples of displaying service information corresponding to an external device by the electronic device according to various embodiments of the disclosure.
Figure 7B:
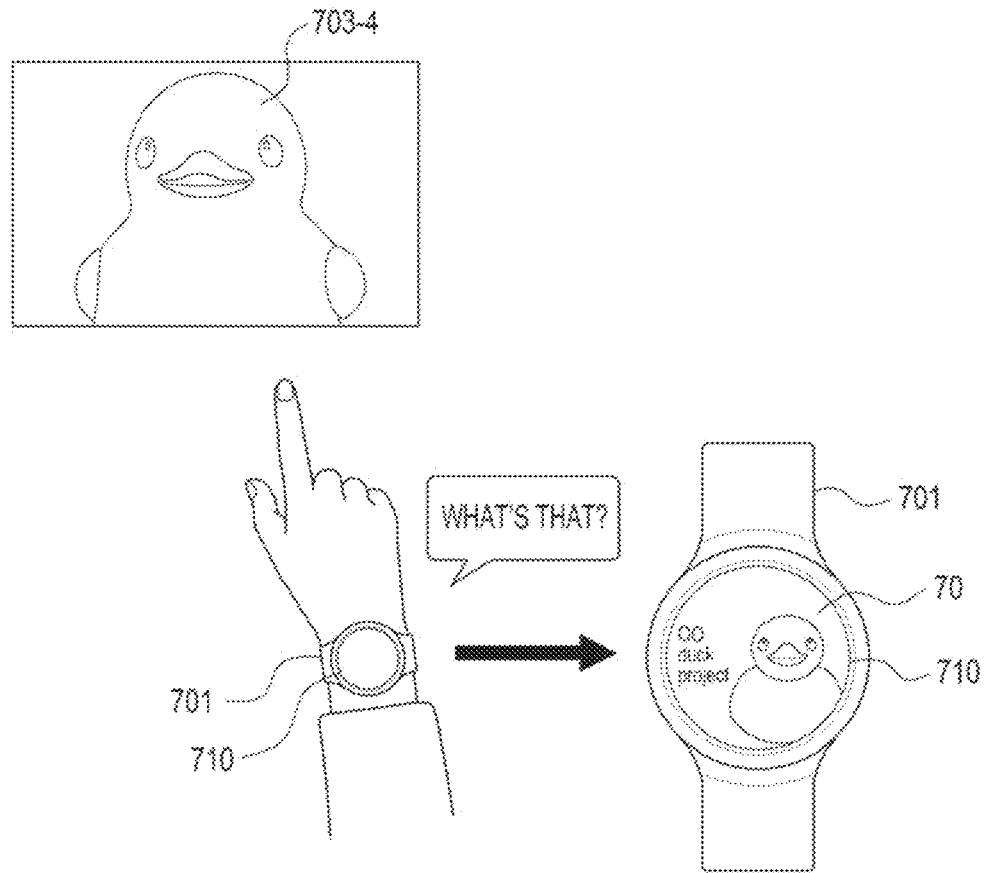

FIGS. 7A and 7B are diagrams illustrating examples of displaying service information corresponding to an external device by the electronic device according to various embodiments.

According to various embodiments, the electronic device may be one of various types of electronic devices, such as a wearable device 701 or a smartphone 707 (hereinafter, the wearable device 701 or the smartphone 707 is referred to as electronic device).

Referring to FIG. 7A, the electronic device 707 (e.g., 101 of FIG. 1. 201 of FIG. 2, 401 of FIG. 4, or 601 of FIGS. 6A and 6B) may receive a voice signal uttered by a user, for example, "What is that?", and may receive signals from multiple external devices 703-1 to 703-3. According to various embodiments, the electronic device 707 may autonomously perform voice recognition and natural-language understanding on the basis of the received voice signal to obtain information related to an indication target, a demonstrative pronoun, an instruction, or a function, or may transmit the voice signal (e.g., data corresponding to the voice signal) to an external server (e.g., the server 405) and may obtain, from the server, the information related to the indication target, the demonstrative pronoun, the instruction, or the function according to the results of performing the voice recognition and the natural-language understanding.

According to various embodiments, the electronic device 707 may transmit the voice signal (or data corresponding to the voice signal) to the external server (e.g., the server 405), and may receive, from the server 405, first information (e.g., an external device list) corresponding to the information related to the indication target, the demonstrative pronoun, the instruction, or the function according to the results of performing the voice recognition and the natural-language understanding. According to various embodiments, the electronic device 707 may identify at least one external device, for example, an external device 703-3 toward which the electronic device 707 is oriented, on the basis of first information based on the information related to the indication target, the demonstrative pronoun, the instruction, or the function, and second information (e.g., an external device having a phase difference equal to or smaller than a threshold value) according to a phase difference of signals from the multiple external devices 703-1 to 703-3, and may obtain information for performing a task of displaying service information corresponding to the identified external device 703-3. According to an embodiment, the electronic device 707 may transmit the first information and the second information to the external server (e.g., the server 405), and may receive, from the server 405, information for performing the task of displaying service information corresponding to the external device 703-3.

According to various embodiments, the information for performing the task of displaying service information corresponding to the external device 703-3 may include sequence information of states related to one or more operations necessary for displaying, by the electronic device 707, the service information corresponding to the external device 703-3, or of states related to a combination of the one or more operations. According to an embodiment, the sequence information may include information that allows the electronic device 707 to separately or sequentially perform the one or more operations to display the service information corresponding to the external device 703-3. According to an embodiment, the information that allows the electronic device 707 to separately or sequentially perform the task of displaying the service information corresponding to the external device 703-3 may include at least a part of rule path information. For example, the rule path information may include information that enables the electronic device 707 to execute a specific application and separately or sequentially perform the one or more operations in order to display service information corresponding to the external device 703-3 via the executed specific application, or may include status information of each operation for performing a user instruction by the electronic device 707.

The electronic device 707 may perform the task according to the information for performing the task of displaying the service information corresponding to the external device 703-3. For example, when the selected external device 703-3 is a coffee machine, the electronic device 707 may display service information corresponding to the coffee machine. According to various embodiments, when the selected external device 703-3 is a coffee machine, the electronic device 707 may receive service information corresponding to the coffee machine and may display the received information. According to an embodiment, the service information corresponding to the coffee machine may include information indicating that the external device is the coffee machine, information indicating that an operation of making coffee is being performed, or information indicating the method of controlling the coffee machine. In another example, when the selected external device 703-2 is a TV, service information corresponding to the TV may be displayed, and when the selected external device 703-1 is a printer, service information related to the printer may be displayed.

Referring to FIG. 7B, the electronic device 701 (e.g., 101 of FIG. 1. 201 of FIG. 2, 401 of FIG. 4, or 601 of FIGS. 6A and 6B) may receive a voice signal uttered by a user, for example, "What is that?", and may receive a signal from an external device 703-4 in a public place. For example, the external device 703-4 in a public place may be an electronic device included in a piece of artwork, drinking fountain, or monument installed in a public place, or a piece of artwork, sculpture, cultural property, etc. displayed in a museum.

According to various embodiments, the electronic device 701 may autonomously perform voice recognition and natural-language understanding on the basis of the received voice signal to obtain information related to an indication target, a demonstrative pronoun, an instruction, or a function, or may transmit the voice signal (e.g., data corresponding to the voice signal) to an external server (e.g., the server 405) and may obtain, from the server, the information related to the indication target, the demonstrative pronoun, the instruction, or the function according to the results of performing the voice recognition and the natural-language understanding. According to various embodiments, the electronic device 701 may transmit the voice signal (or data corresponding to the voice signal) to the external server (e.g., the server 405), and may receive, from the server 405, first information (e.g., an external device list) corresponding to the information related to the indication target, the demonstrative pronoun, the instruction, or the function according to the results of performing the voice recognition and the natural-language understanding.

According to various embodiments, the electronic device 701 may identify the external device 703-4 on the basis of first information based on information related to an indication target, a demonstrative pronoun, an instruction, or a function, and second information (e.g., whether a phase difference of a signal from the external device 703-4 is equal to or smaller than a threshold value) based on a phase difference of a signal from the external device 703-4, and may obtain information for performing a task of displaying service information corresponding to the identified external device 703-4. According to an embodiment, the electronic device 701 may transmit the first information and the second information to the external server (e.g., the server 405), and may receive, from the server 405, information for performing the task of displaying service information corresponding to the external device 703-4.

According to various embodiments, the information for performing the task of displaying service information corresponding to the external device 703-4 may include sequence information of states related to one or more operations necessary for displaying, by the electronic device 701, the service information corresponding to the external device 703-4, or of states related to a combination of the one or more operations. According to an embodiment, the information that allows the electronic device 701 to separately or sequentially perform the one or more operations to display service information corresponding to the external device 703-3 may include at least a part of rule path information. For example, the rule path information may include information that enables the electronic device 701 to execute a specific application and separately or sequentially perform the one or more operations via the executed specific application, or may include status information of each operation for performing a user instruction by the electronic device 701.

The electronic device 701 may perform the task according to the information for performing the task of displaying the service information corresponding to the external device 703-4. According to an embodiment, when the external device 703-4 corresponds to an artwork installed in a public place, the electronic device 701 may display service information 70 corresponding to the artwork on a display 710. For example, the electronic device 701 may receive the service information 70 corresponding to the artwork from an external server (e.g., the server 607), and may display the received information 70. According to various embodiments, the service information corresponding to the artwork may include description information corresponding to the artwork. According to various embodiments, when the selected external device corresponds to a product installed in a public place, service information corresponding to the product may be displayed. The service information corresponding to the product may include information, such as the year of production, the model name, the product price, or the name of a distributor where the product or product family is available.

Figure 8A:
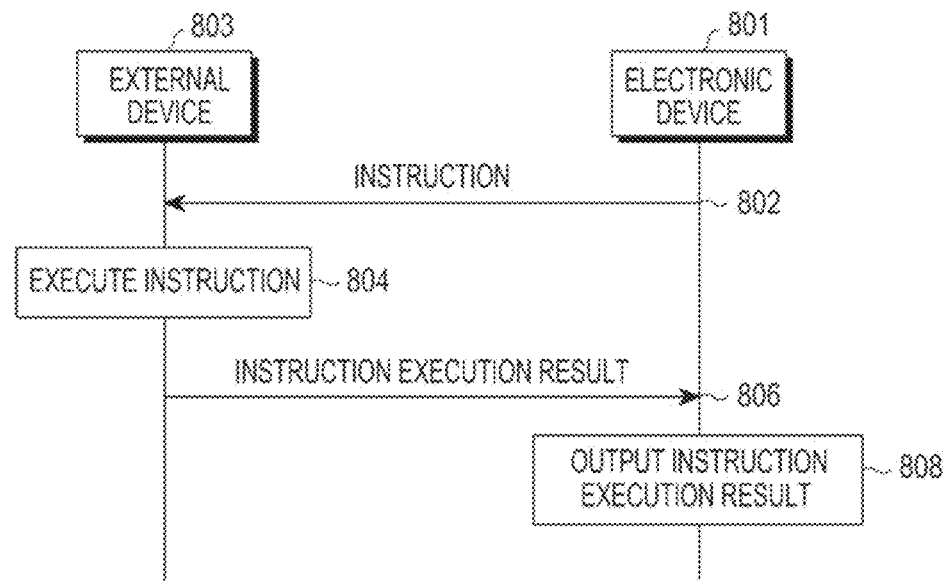
FIGS. 8A and 8B are flow diagrams illustrating operations of transmitting a control instruction to an external device by the electronic device according to various embodiments of the disclosure.
Figure 8B:
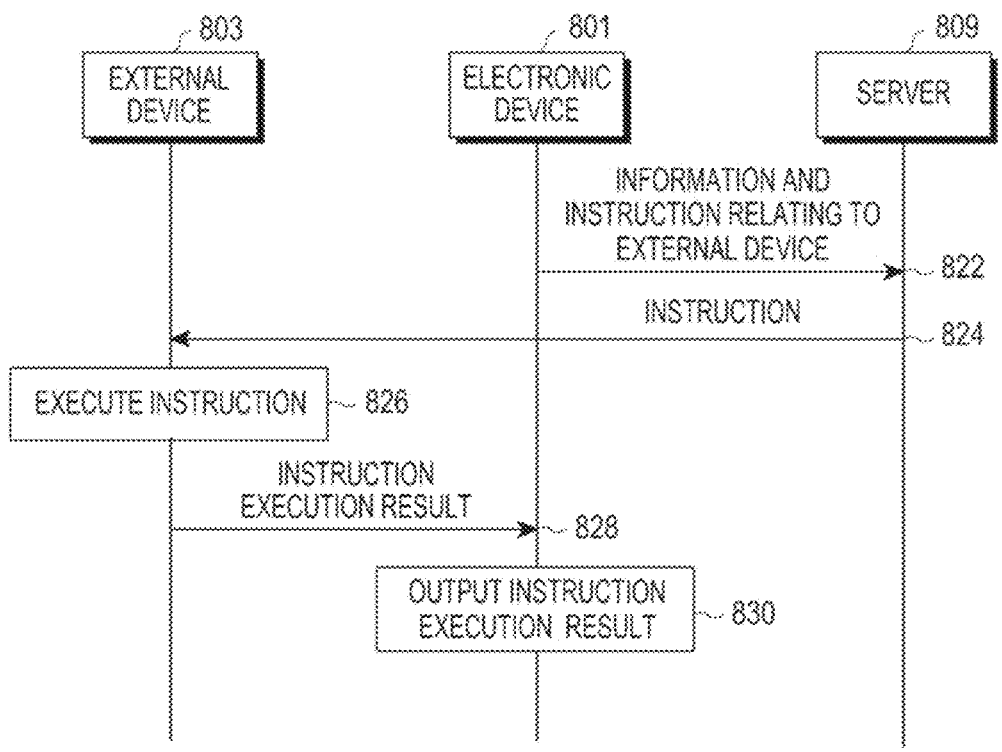

FIGS. 8A and 8B are flow diagrams illustrating operations of transmitting a control instruction to an external device by the electronic device according to various embodiments of the disclosure.

Referring to FIG. 8A, according to an embodiment, information for performing a task of transmitting a control instruction to an external device may include sequence information of states related to operations 802 to 808. An electronic device 801 (e.g., 101 of FIG. 1, 201 of FIG. 2, or 401 of FIG. 4) may perform operations 802 and 808 by using the sequence information of states related to operations 802 and 808 among the sequence information of states related to operations 802 to 808. According to an embodiment, the sequence information of states related to operations 802 and 808 may include information that allows the electronic device 801 to separately or sequentially perform operations 802 and 808. According to an embodiment, the information that allows the electronic device 801 to separately or sequentially perform operations 802 and 808 may include at least a part of rule path information related to operations 802 and 808. For example, the rule path information may include information that enables the electronic device 801 to execute a specific application and separately or sequentially perform operations 802 and 808 via the executed specific application, or may include status information of each operation for performing a user instruction by the electronic device 801.

The electronic device 801 may transmit an instruction to an external device 803 (e.g., an identified external device among the first to Nth external devices 403-1 to 403-N of FIG. 4 and FIGS. 5A and 5B), in operation 802. The instruction may include at least a part of information related to a task to be performed by the external device 803, at least partially on the basis of, for example, a user input (e.g., voice input, touch input, or gesture input) and a signal received from the external device 803 by the electronic device 801. According to an embodiment, the electronic device 801 may transmit the instruction by using a communication protocol enabling communication with the external device 803. According to an embodiment, the communication protocols may include at least one among a Bluetooth protocol, a Bluetooth low energy (BLE) protocol, a Wi-Fi protocol, a beacon protocol, a ZigBee protocol, and a near field communication (NFC) protocol. According to an embodiment, the communication protocols may further include another communication protocol designated for an internet-of-things (IoT) service.

The external device 803 may execute the instruction received from the electronic device 801, in operation 804. According to an embodiment, the external device 803 may determine a function corresponding to the instruction received from the electronic device 801 on the basis of the instruction, and may perform the determined function.

The external device 803 may transmit an instruction execution result to the electronic device 801 in operation 806. According to various embodiments, the instruction execution result may include information for notification of success in function performance according to the instruction, failure in function performance according to the instruction, or a function performance result according to the instruction.

The electronic device 801 may output the instruction execution result in operation 808. According to various embodiments, the electronic device 801 may output the instruction execution result in various forms of information, such as sound information, display information, vibration information, or a combination of at least some of the forms of information.

Referring to FIG. 8B, according to an embodiment, information for performing a task of transmitting a control instruction to an external device may include sequence information of states related to operations 822 to 830. An electronic device 801 (e.g., 101 of FIG. 1, 201 of FIG. 2, or 401 of FIG. 4) may perform operations 822 and 830 by using the sequence information of states related to operations 822 and 830, among the sequence information of states related to operations 822 to 830. According to an embodiment, the sequence information of states related to operations 822 and 830 may include information that allows the electronic device 801 to separately or sequentially perform operations 822 and 830. According to an embodiment, the information that allows the electronic device 801 to separately or sequentially perform operations 822 and 830 may include at least a part of rule path information. For example, the rule path information may include information that enables the electronic device 801 to execute a specific application and separately or sequentially perform operations 822 and 830 via the executed specific application, or may include status information of each operation for performing a user instruction by the electronic device 801.

The electronic device 801 may transmit an instruction and information of the external device 803 (e.g., an external device selected from among the first to Nth external devices 403-1 to 403-N of FIG. 4 and FIGS. 5A and 5B) to a server 809, in operation 822. The instruction may include at least a part of information related to a task to be performed by the external device 803, at least partially on the basis of, for example, a user input (e.g., voice input, touch input, or gesture input) and a signal received from the external device 803 by the electronic device 801.

According to various embodiments, the server 809 may be a server that is connected with the external device 803, manages the external device 803, and transmits information to the external device 803. According to an embodiment, the server 809 may obtain an instruction to be provided to the external device 803, on the basis of information (e.g., an instruction or information of an external device) received from the electronic device 801. According to an embodiment, the instruction to be provided to the external device 803 may be different from an instruction received from the electronic device 801. For example, the server 809 may store list information for a function that can be performed specific to device recognition information (e.g., a device ID), may select an external device on the basis of device recognition information thereof (e.g., a device ID) of the external device, which is received from the electronic device 801, and may obtain an instruction to be provided to the external device 803 by using the list information for a function that can be performed by the selected external device. According to various embodiments, the server 809 may receive, from the external device 803, and store information of a function that can be performed specific to a device ID, or may receive the information from a manufacturer of the external device 803 or a server related to the external device 803 and store the received information.

The server 809 may transmit the instruction to the external device 803 in operation 824. According to an embodiment, the server 809 may transmit the instruction obtained based on information (e.g., data based on a user input) received from the electronic device 801 to the external device 803 selected from among a plurality of electronic devices, which the server 809 itself manages, through wireless communication.

The external device 803 may execute the instruction in operation 826. According to an embodiment, the external device 803 may determine a function corresponding to the instruction received from the connection server 809 on the basis of the instruction, and may perform the determined function.

The external device 803 may transmit an instruction execution result to the electronic device 801 in operation 828. According to various embodiments, the instruction execution result may include information for notification of success in function performance according to the instruction, failure in function performance according to the instruction, or a function performance result according to the instruction.

The electronic device 801 may output the instruction execution result in operation 830. According to various embodiments, the electronic device 801 may output the instruction execution result in various forms of information, such as sound information, display information, vibration information, or a combination of at least two of the forms of information.

Figure 9A:
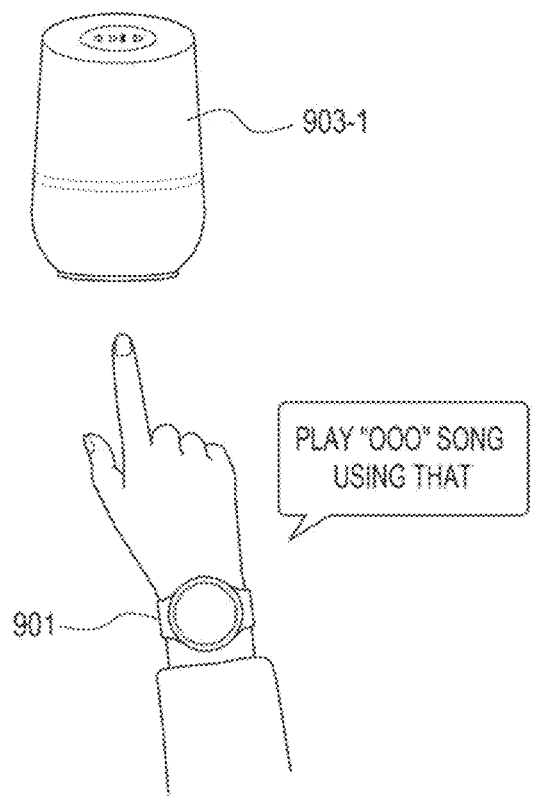
FIGS. 9A, 9B, 9C, 9D, 9E, 9F, 9G, 9H, 9I, 9J, 9K, 9L, 9M, and 9N are diagrams illustrating examples of transmitting a control instruction to an external device by the electronic device according to various embodiments of the disclosure.
Figure 9B:
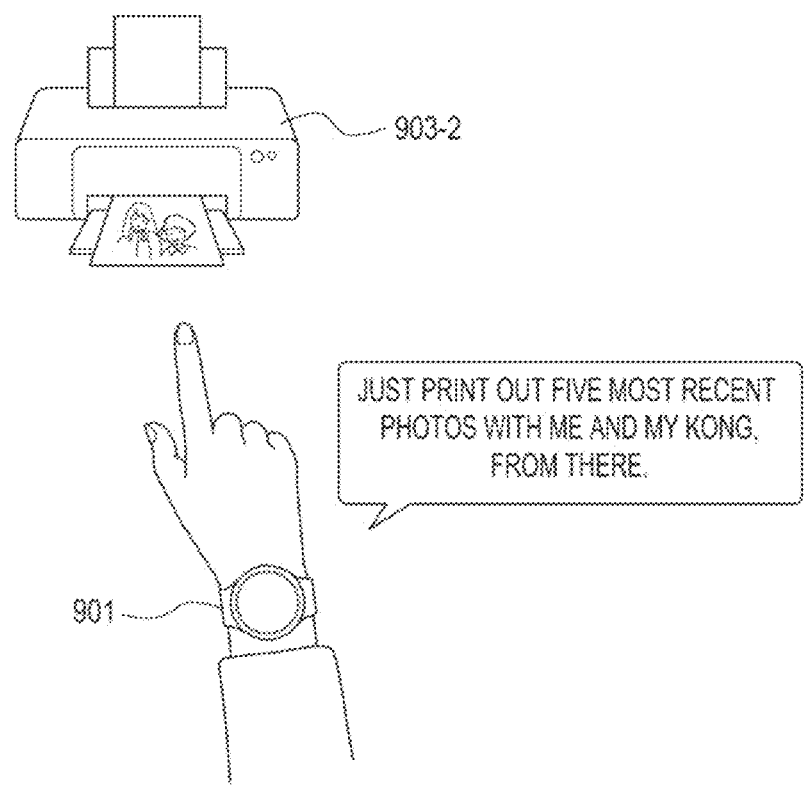
Figure 9C:
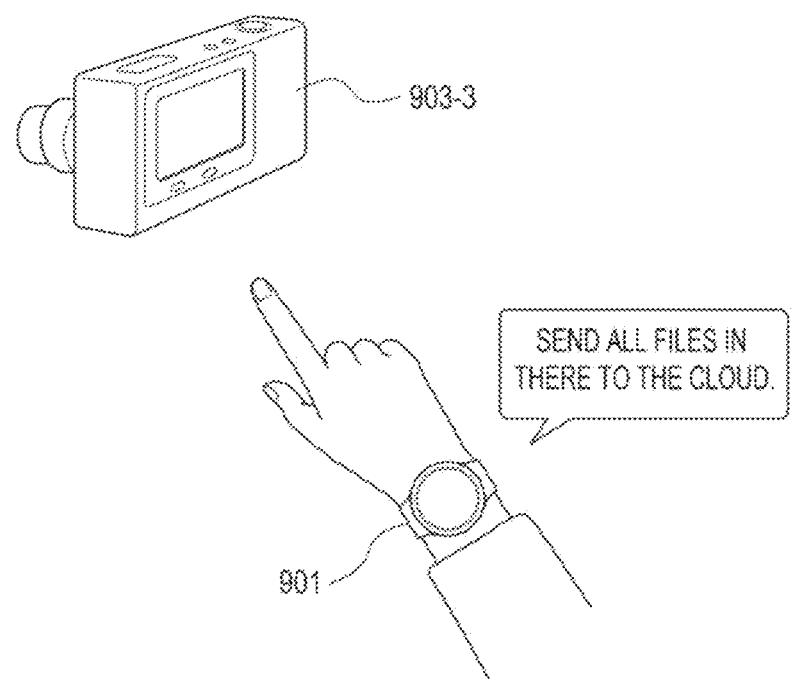
Figure 9D:
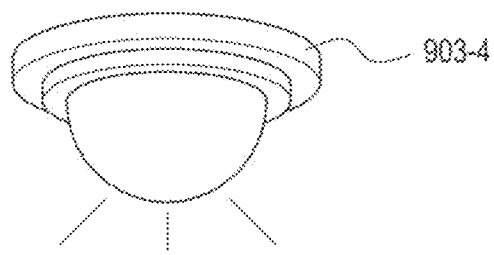
Figure 9D:
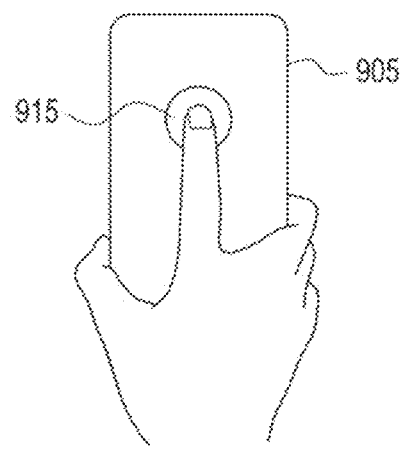
Figure 9E:
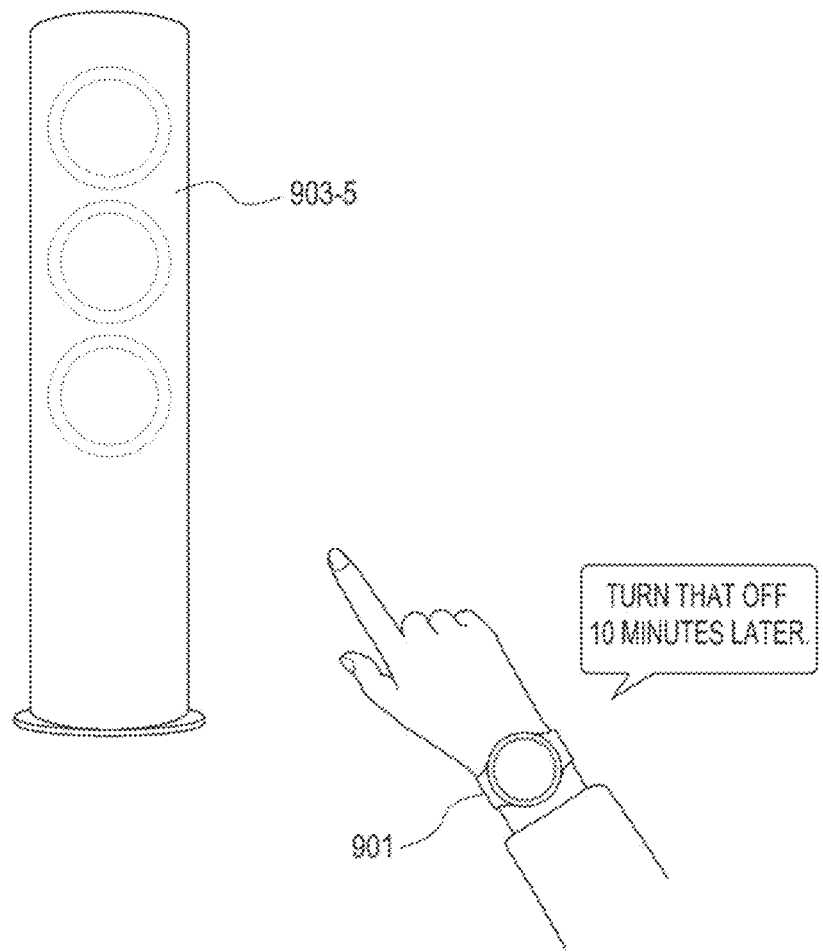
Figure 9F:
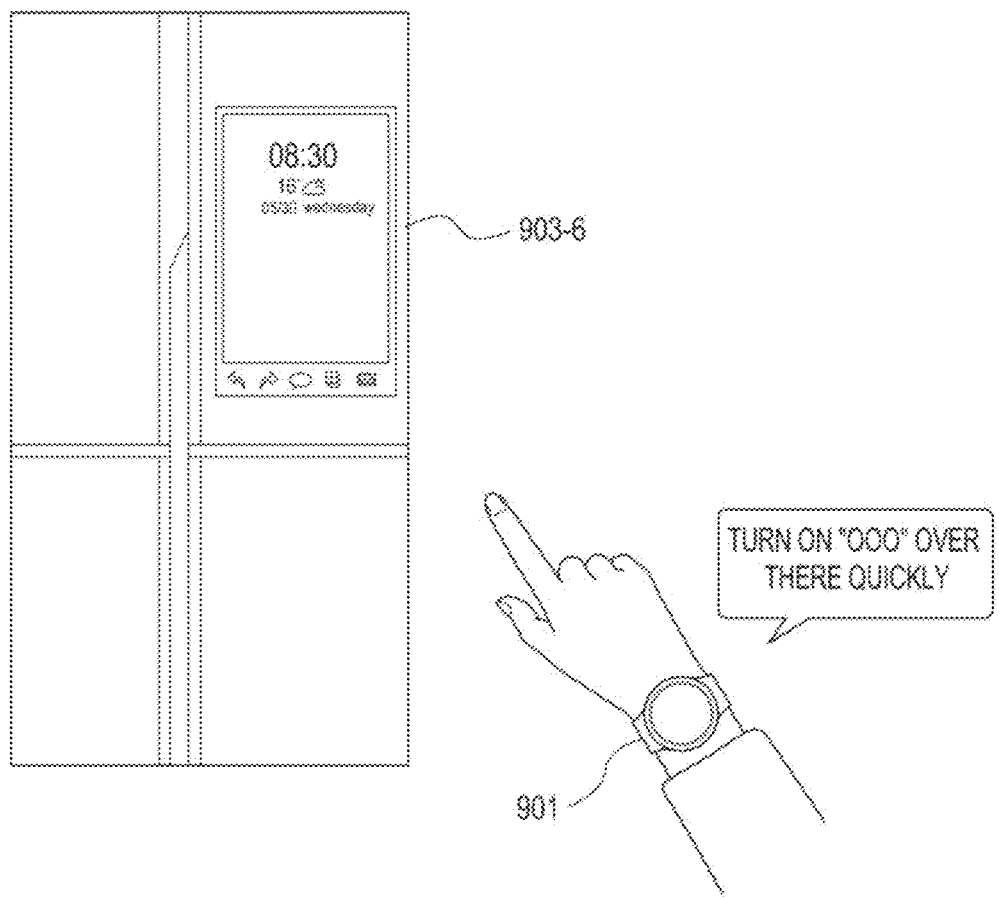
Figure 9G:
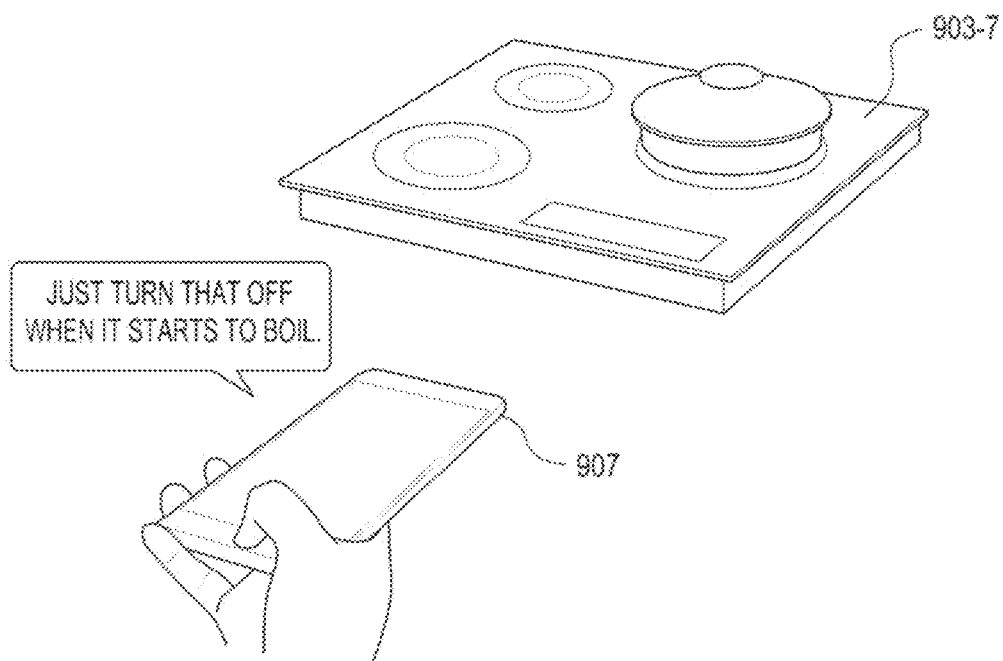
Figure 9H:
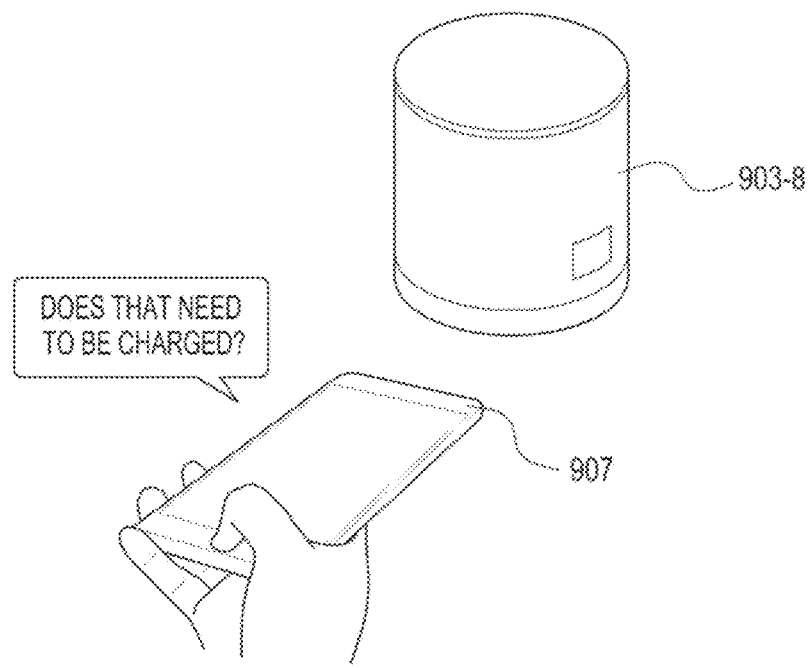
Figure 9I:
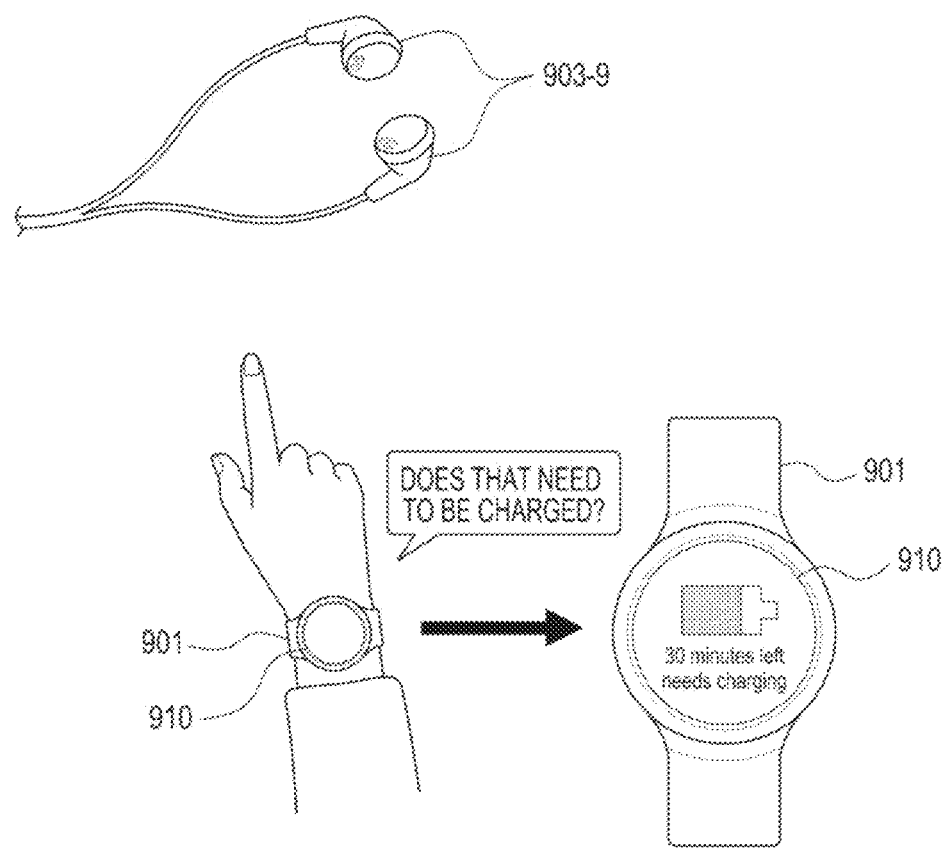
Figure 9J:
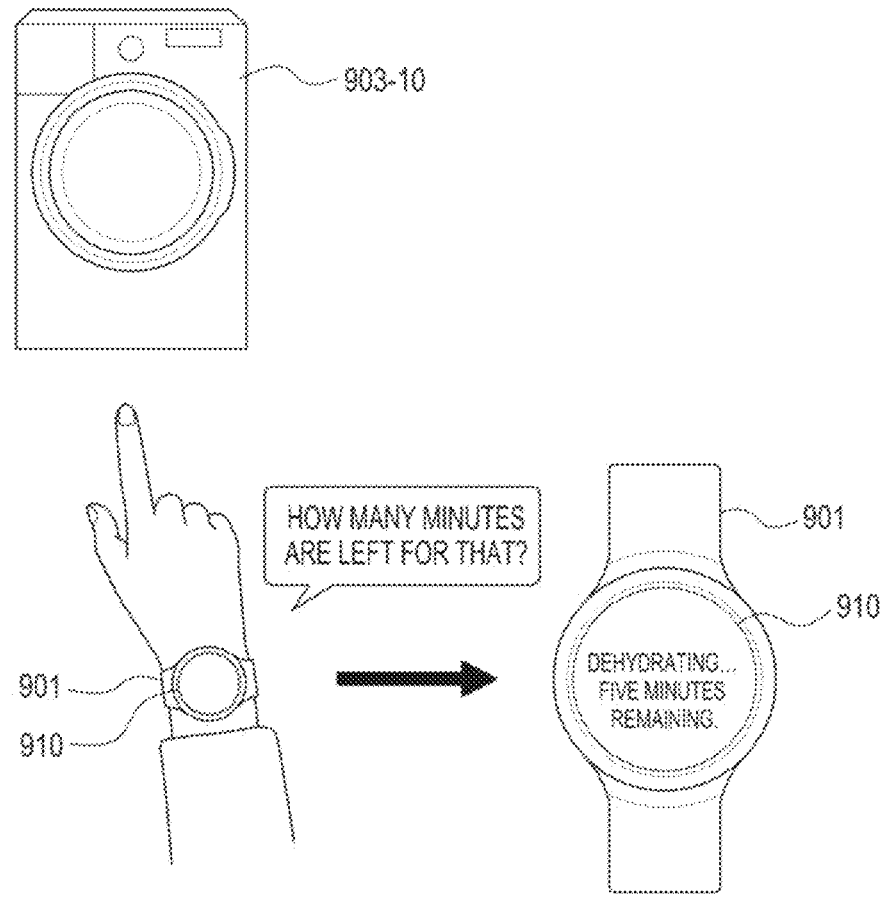
Figure 9K:
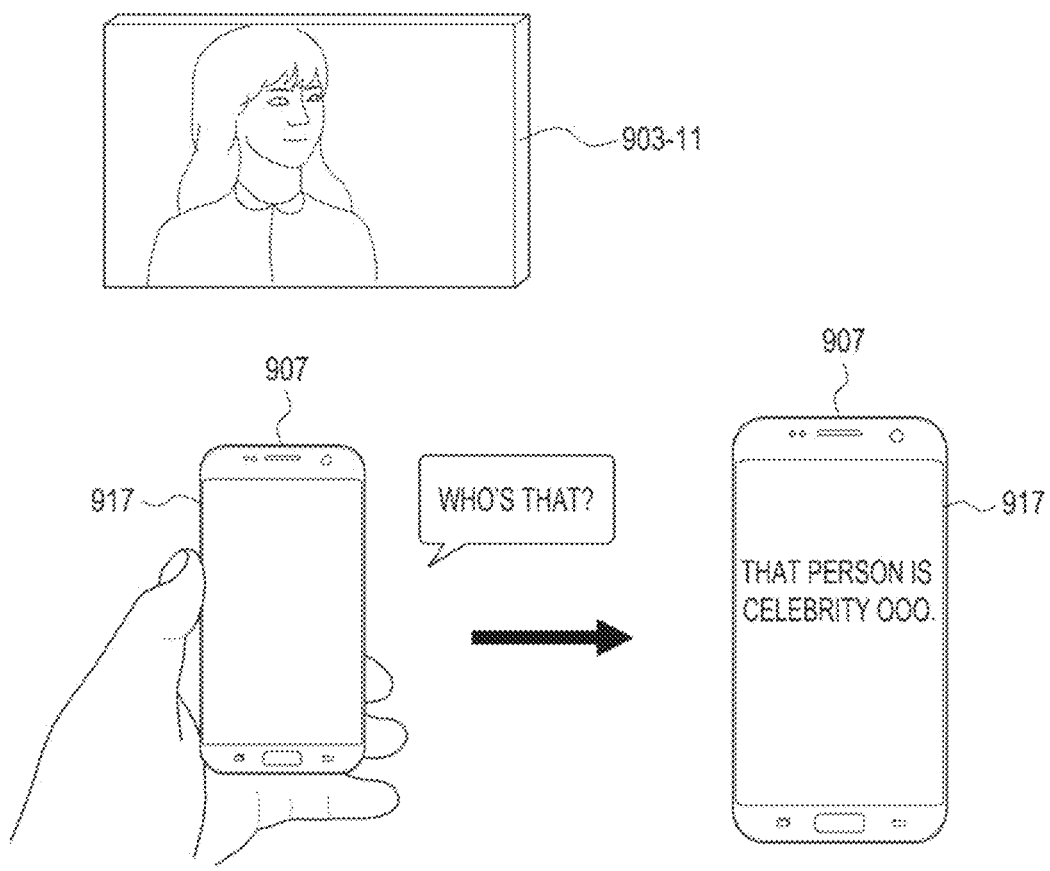
Figure 9L:
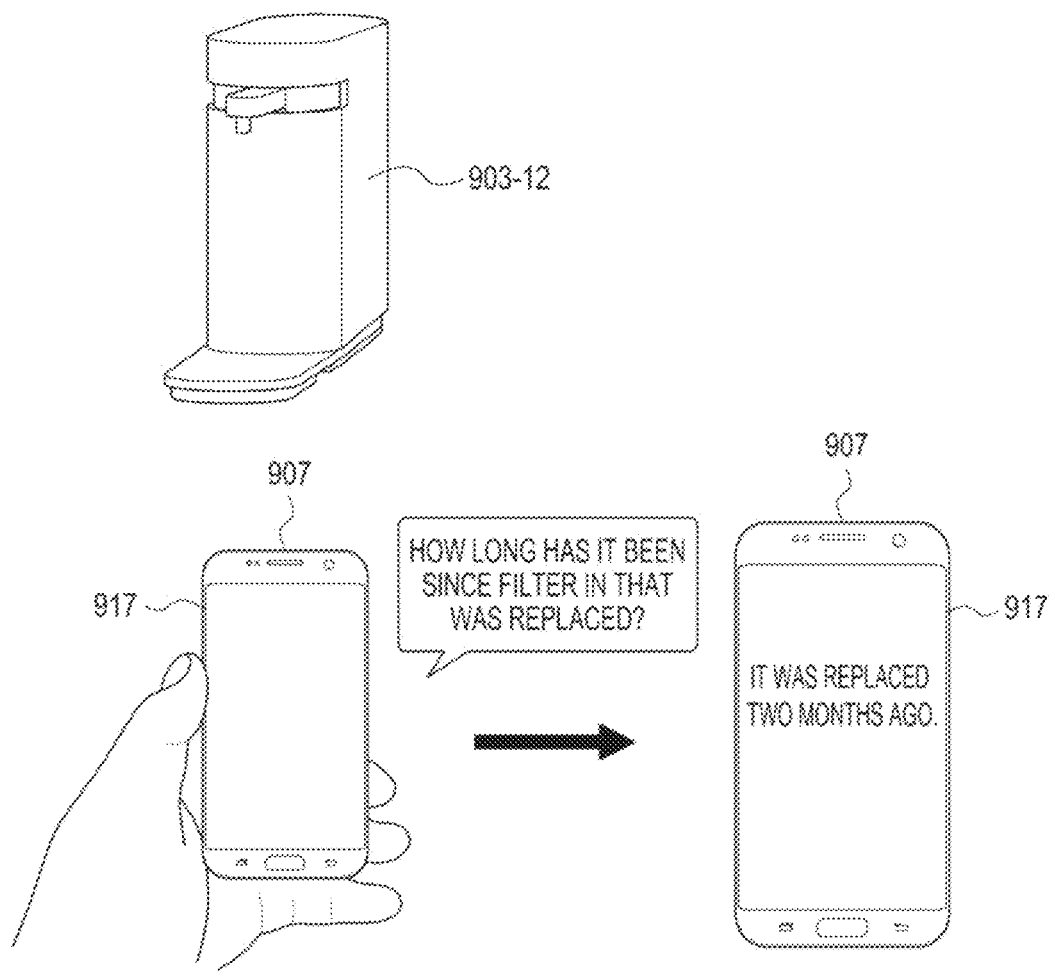
Figure 9M:
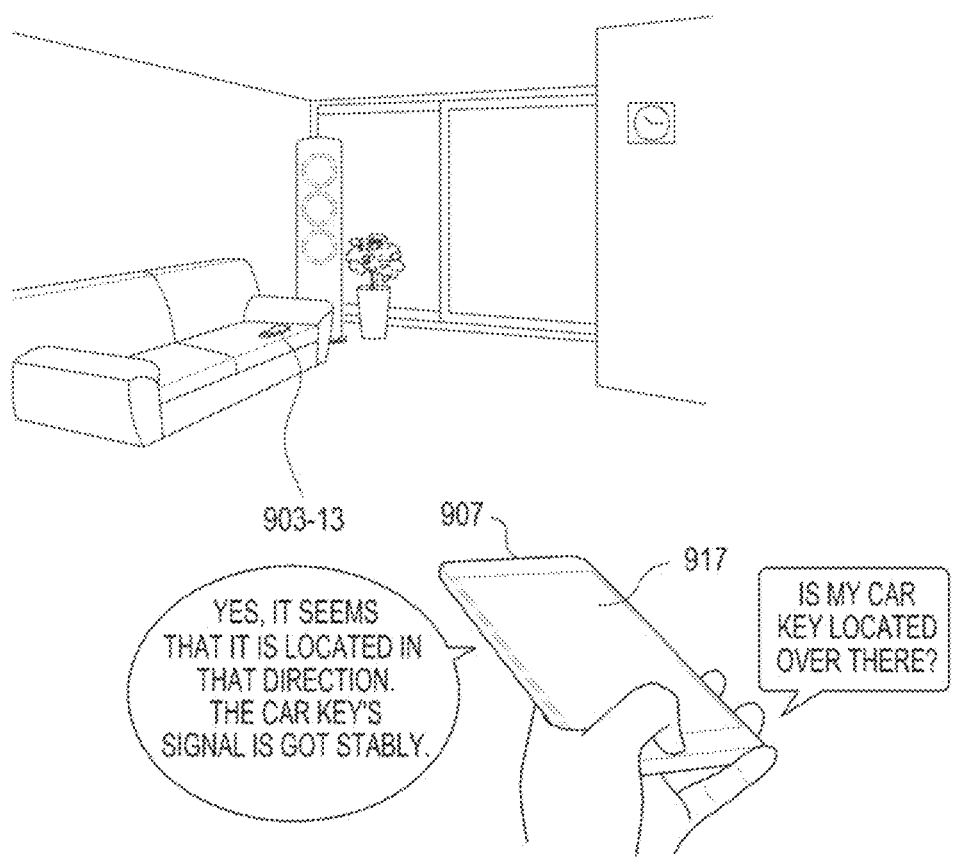
Figure 9N:
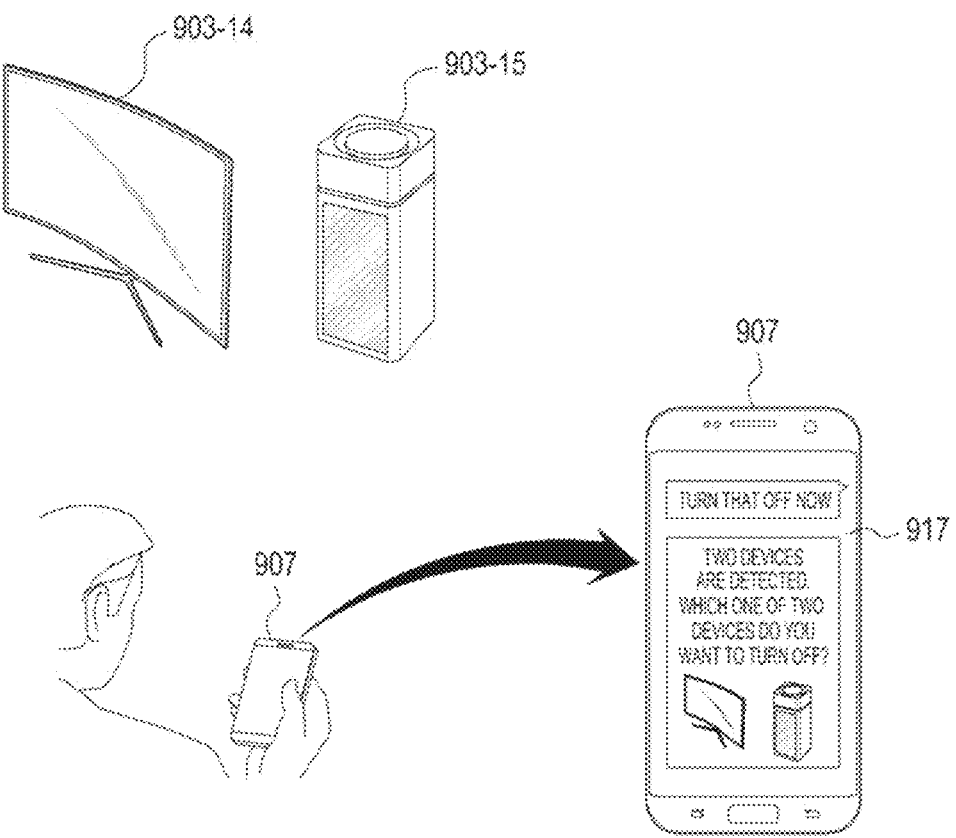

FIGS. 9A to 9N are diagrams illustrating examples of transmitting a control instruction to an external device by the electronic device according to various embodiments of the disclosure. According to various embodiments, the electronic device may be one of various types of electronic devices, such as a wearable device 901, a remote controller 905, or a smartphone 907 (hereinafter, the wearable device 901, the remote controller 905, or the smartphone 907 is referred to as electronic device), and may further be another type of an electronic device.

Referring to FIG. 9A, an electronic device 901 (e.g., 101 of FIG. 1, 201 of FIG. 2, 401 of FIG. 4, or 801 of FIGS. 8A and 8B) may receive a voice signal uttered by a user, for example, "Play OOO song using that", and may receive a signal from a speaker 903-1. The electronic device 901 may obtain first information for a list of devices that execute an instruction to reproduce audio on the basis of voice data "Play a song" which relates to a voice signal. According to various embodiments, the electronic device 901 may obtain first information (e.g., an external device list) corresponding to information related to an indication target, a demonstrative pronoun, an instruction, or a function on the basis of the received voice signal. According to various embodiments, the electronic device 901 may autonomously perform voice recognition and natural-language understanding on the basis of the received voice signal to obtain first information corresponding to information related to an indication target, a demonstrative pronoun, an instruction, or a function, or may transmit the voice signal (e.g., data corresponding to the voice signal) to an external server (e.g., the server 405) and may obtain, from the server, the first information corresponding to the information related to the indication target, the demonstrative pronoun, the instruction, or the function according to the results of performing the voice recognition and the natural-language understanding.

The electronic device 901 may obtain second information of a device toward which the electronic device 901 is oriented, on the basis of a phase difference of a signal received from the speaker 903-1. According to an embodiment, the electronic device 901 may receive signals from peripheral devices including the speaker 903-1, and may obtain the second information of the device toward which the electronic device 901 is oriented, on the basis of a phase difference of a signal received from each of the peripheral devices.

The electronic device 901 may identify that the external device to perform the instruction corresponding to the user input is the speaker 903-1, on the basis of the first information and the second information.

The electronic device 901 may obtain information for performing a task of transmitting an instruction to reproduce OOO song on the identified speaker 903-1. For example, the information for performing the task of transmitting the instruction to reproduce OOO song may include a title of OOO song and an instruction to allow the speaker 903-1 to reproduce OOO song. The electronic device 901 may perform the task according to the obtained information. For example, the electronic device 901 may directly transmit an instruction to reproduce OOO song on the identified speaker 903-1 according to the information for performing the task of transmitting the instruction to reproduce OOO song on the identified speaker 903-1, or may transmit the instruction via the server (e.g., 809 of FIG. 8B). The speaker 903-1 may execute the instruction by starting a function to output OOO song upon reception of the instruction. The speaker 903-1 may transmit, to the electronic device 901, an instruction execution result including information for notification of success in outputting OOO song, failure in outputting OOO song, or completion of outputting OOO song. According to various embodiments, the electronic device 901 may output the instruction execution result in various forms of information, such as sound information, display information, vibration information, or a combination of at least some of the forms of information. According to various embodiments, the speaker 903-1 may also output the instruction execution result in various forms of information, such as sound information, display information, or vibration information.

Referring to FIG. 9B, the electronic device 901 (e.g., 101 of FIG. 1, 201 of FIG. 2, 401 of FIG. 4, or 801 of FIGS. 8A and 8B) may receive a voice signal uttered by a user, "Just print out five most recent photos that My friend Kong and I took together, from there", and may receive a signal from a printer 903-2. The electronic device 901 may obtain first information for a list of devices that execute an instruction to output a photo, on the basis of at least a part of a received voice signal, for example, "photo" or "print out". According to various embodiments, the electronic device 901 may obtain first information (e.g., an external device list) corresponding to information related to an indication target, a demonstrative pronoun, an instruction, or a function on the basis of the received voice signal. According to various embodiments, the electronic device 901 may autonomously perform voice recognition and natural-language understanding on the basis of the received voice signal to obtain first information corresponding to the information related to the indication target, the demonstrative pronoun, the instruction, or the function, or may transmit the voice signal (e.g., data corresponding to the voice signal) to an external server (e.g., the server 405) and may obtain, from the server, the first information corresponding to the information related to the indication target, the demonstrative pronoun, the instruction, or the function according to the results of performing the voice recognition and the natural-language understanding.

The electronic device 901 may obtain second information of a device toward which the electronic device 901 is oriented, on the basis of a phase difference of a signal received from the printer 903-2. According to an embodiment, the electronic device 901 may receive signals from peripheral devices including the printer 903-2, and may obtain the second information of the device toward which the electronic device 901 is oriented, on the basis of a phase difference of a signal received from each of the peripheral devices.

The electronic device 901 may identify that the external device to perform the instruction corresponding to the user input is the printer 903-2, on the basis of the first information and the second information. The electronic device 901 may obtain information for performing a task of transmitting, to the identified printer 903-2, an instruction to output "five photos that My friend Kong and I took together". For example, the information for performing the task of transmitting the instruction to output "five photos that My friend Kong and I took together" may include an instruction to allow the printer 903-2 to search for "photos that My friend Kong and I took together" and output five photos among the retrieved photos. The electronic device 901 may perform the task according to the obtained information. For example, the electronic device 901 may directly transmit the instruction to the printer 903-2 according to the information for performing the task of transmitting, to the identified printer 903-2, the instruction to output "five photos that My friend Kong and I took together", or may transmit the instruction via the server (e.g., 809 of FIG. 8). In another example, the electronic device 901 may transmit data related to the photos to be output, to the printer 903-2. Upon reception of the instruction, the printer 903-2 may execute the instruction by searching a cloud or a network and a directory of another device connected via an account to obtain "five photos that My friend Kong and I took together", and outputting the obtained photos. The printer 903-2 may transmit, to the electronic device 901, an instruction execution result including information for notification of success in outputting photos, failure in outputting photos, or completion of outputting photos. The electronic device 901 may output the instruction execution result in various forms of information, such as sound information, display information, vibration information, or a combination of at least some of the forms of information. According to various embodiments, the printer 903-2 may also output the instruction execution result in various forms of information, such as sound information, display information, or vibration information.

Referring to FIG. 9C, an electronic device 901 (e.g., 101 of FIG. 1, 201 of FIG. 2, 401 of FIG. 4, or 801 of FIGS. 8A and 8B) may receive a voice signal uttered by a user, "Send all files in there to the cloud", and may receive a signal from a camera 903-3 (or a storage medium, hereinafter, referred to as a "camera"). The electronic device 901 may obtain first information for a list of devices that execute an instruction to transmit a file, on the basis of at least a part of a received voice signal, for example, "file" and "send".

The electronic device 901 may obtain second information of a device toward which the electronic device 901 is oriented, on the basis of a phase difference of signals received from the camera 903-3. According to an embodiment, the electronic device 901 may receive signals from peripheral devices including the camera 903-3, and may obtain the second information of the device toward which the electronic device 901 is oriented, on the basis of the phase differences of the respective received signals.

The electronic device 901 may identify that the external device to perform the instruction corresponding to the user input is the camera 903-3, on the basis of the first information and the second information. The electronic device 901 may obtain information for performing a task of transmitting, to the camera 903-3, an instruction to transmit all files to a cloud. For example, the information for performing the task of transmitting all files to the cloud may include an instruction to cause the camera 903-3 to search for all files and transmit all the retrieved files to the cloud. The electronic device 901 may perform the task according to the obtained information. For example, the electronic device 901 may directly transmit the instruction to the camera 903-3 according to the information for performing the task of transmitting, to the identified camera 903-3, the instruction to transmit all files to the cloud, or may transmit the instruction via the server (e.g., 809 of FIG. 8B). Upon reception of the instruction, the camera 903-3 may execute the instruction by communication-connecting with a cloud device (e.g., an external server or a PC) through a communication circuit and storing all files in a new directory or a designated directory of the connected cloud device. The camera 903-3 may transmit, to the electronic device 901, an instruction execution result including information for notification of file transmission success, file transmission failure, or file transmission completion. The electronic device 901 may output the instruction execution result in various forms of information, such as sound information, display information, vibration information, or a combination of at least some of the forms of information. According to various embodiments, the camera 903-3 may also output the instruction execution result in various forms of information, such as sound information, display information, or vibration information.

Referring to FIG. 9D, the electronic device 905 (e.g., 101 of FIG. 1, 201 of FIG. 2, 401 of FIG. 4, or 801 of FIGS. 8A and 8B) may be a remote controller, and may include a fingerprint sensor 915 (e.g., the sensor module 240 of FIG. 2). According to an embodiment, the electronic device 905 may be set to receive a user input when a fingerprint recognized by a fingerprint sensor 915 matches registered fingerprint information. The electronic device 905 may receive a voice signal uttered by a user, for example, "Turn that on", and may receive a signal from a smart light 903-4. The electronic device 905 may obtain first information for a list of devices that execute an instruction to "turn on", on the basis of at least a part of a voice signal, for example, "turn on".

The electronic device 905 may obtain second information of a device toward which the electronic device 905 is oriented, on the basis of a phase difference of a signal received from the smart light 903-4. According to an embodiment, the electronic device 905 may receive second information of the device toward which the electronic device 905 is oriented, on the basis of a phase difference of a signal received from each of the peripheral devices including the speaker 903-1.

The electronic device 905 may identify that the external device to perform an instruction corresponding to a user input is the smart light 903-4, on the basis of the first information and the second information. The electronic device 905 may obtain information for performing a task of transmitting, to the smart light 903-4, an instruction to turn on the light. For example, the information for performing the task of transmitting the instruction to turn on the light may include an instruction to allow the power of the smart light 903-4 to be turned on. The electronic device 905 may perform the task according to the obtained information. For example, the electronic device 905 may directly transmit the instruction to the smart light 903-4 according to the information for performing the task of transmitting, to the identified smart light 903-4, the instruction to turn on the light, or may transmit the instruction via the server (e.g., 809 of FIG. 8B). Upon reception of the instruction, the smart light 903-4 may execute the instruction by turning on the light. The smart light 903-4 may transmit, to the electronic device 905, an instruction execution result including information for notification of success in turning on the light, failure in turning on the light, or completion of turning on the light. According to various embodiments, the electronic device 905 may output the instruction execution result in various forms of information, such as sound information, display information, vibration information, or a combination of at least some of the forms of information. According to various embodiments, the smart light 903-4 may output the instruction execution result in various forms of information, such as sound information, display information, vibration information, or a combination of at least some of the forms of information.

Referring to FIG. 9E, an electronic device 901 (e.g., 101 of FIG. 1, 201 of FIG. 2, 401 of FIG. 4, or 801 of FIGS. 8A and 8B) may receive a voice signal uttered by a user, for example, "Turn that off 10 minutes later", and may receive a signal from a smart air conditioner 903-5. The electronic device 901 may obtain first information for a list of devices that execute an instruction "turn off", on the basis of at least a part of a voice signal, for example, "turn off".

The electronic device 901 may obtain second information of a device toward which the electronic device 905 is oriented, on the basis of a phase difference of a signal received from the smart air conditioner 903-5. According to an embodiment, the electronic device 901 may obtain the second information of the device toward which the electronic device 901 is oriented, on the basis of phase differences of the signals received from the peripheral devices including the smart air conditioner 903-5.

The electronic device 901 may identify that the external device to perform the instruction corresponding to the user input is the smart air conditioner 903-5, on the basis of the first information and the second information. The electronic device 901 may obtain information for performing a task of transmitting an instruction to turn off 10 minutes later to the identified smart air conditioner 903-5. For example, the information for performing the task of transmitting the instruction to turn off 10 minutes later may include time information indicating 10 minutes and an instruction to allow the smart air conditioner 903-5 to turn off the power thereof on the basis of the time information. The electronic device 901 may perform the task according to the obtained information. For example, the electronic device 901 may directly transmit the instruction to the smart air conditioner 903-5 according to the information for performing the task of transmitting, to the identified smart air conditioner 903-5, the instruction to turn off 10 minutes later, or may transmit the instruction via the server (e.g., 809 of FIG. 8B). Upon reception of the instruction, the smart air conditioner 903-5 may execute the instruction by stopping air-conditioning operation 10 minutes later. The smart air conditioner 903-5 may transmit, to the electronic device 901, an instruction execution result including information for notification of success in turning off the air conditioner, failure in turning off the air conditioner, or completion of turning off the air conditioner. According to various embodiments, the electronic device 901 may output the instruction execution result in various forms of information, such as sound information, display information, vibration information, or a combination of at least some of the forms of information. According to various embodiments, the smart air conditioner 903-5 may also output the instruction execution result in various forms of information, such as sound information, display information, or vibration information.

Referring to FIG. 9F, an electronic device 901 (e.g., 101 of FIG. 1, 201 of FIG. 2, 401 of FIG. 4, or 801 of FIGS. 8A and 8B) may receive a voice signal uttered by a user, for example, "Turn on OOO over there quickly", and may receive a signal from a smart refrigerator 903-6. The electronic device 901 may obtain first information for a list of devices that execute an instruction to "reproduce a content", on the basis of at least a part of a received voice signal, for example, "OOO" and "turn on".

The electronic device 901 may obtain second information of a device toward which the electronic device 901 is oriented, on the basis of a signal received from the smart refrigerator 903-6. According to an embodiment, the electronic device 901 may receive signals from peripheral devices including the smart refrigerator 903-6, and may obtain the second information of the device toward which the electronic device 901 is oriented, on the basis of the phase differences of the respective received signals.

The electronic device 901 may identify that the external device to perform the instruction corresponding to the user input is the smart refrigerator 903-6, on the basis of the first information and the second information. The electronic device 901 may obtain information for performing a task of transmitting, to the smart refrigerator 903-6, an instruction to reproduce OOO. For example, the information for performing the task of transmitting the instruction to reproduce OOO may include a content title corresponding to OOO, and an instruction to allow the smart refrigerator 903-6 to reproduce a content corresponding to OOO. The electronic device 901 may perform the task according to the obtained information. For example, the electronic device 901 may directly transmit the instruction to the smart refrigerator 903-6 according to the information for performing the task of transmitting, to the identified smart refrigerator 903-6, the instruction to reproduce OOO, or may transmit the instruction via the server (e.g., 809 of FIG. 8B). Upon reception of the instruction, the smart refrigerator 903-6 may execute the instruction by searching for OOO content and reproducing the retrieved OOO content. The smart refrigerator 903-6 may transmit, to the electronic device 901, an instruction execution result including information for notification of success in reproducing OOO content, failure in reproducing OOO content, or completion of reproducing OOO content. According to various embodiments, the electronic device 901 may output the instruction execution result in various forms of information, such as sound information, display information, vibration information, or a combination of at least some of the forms of information. According to various embodiments, the smart refrigerator 903-6 may also output the instruction execution result in various forms of information, such as sound information, display information, or vibration information.

Referring to FIG. 9G, an electronic device 907 (e.g., 101 of FIG. 1, 201 of FIG. 2, 401 of FIG. 4, or 801 of FIGS. 8A and 8B) may receive a voice signal uttered by a user, for example, "Just turn that off when it starts to boil", and may receive a signal from a smart cooktop 903-7. The electronic device 907 may obtain first information for a list of devices that execute an instruction to "boil" or "turn off", on the basis of at least a part of a received voice signal, for example, "boil" and "turn off".

The electronic device 907 may obtain second information of a device toward which the electronic device 907 is oriented, on the basis of a signal received from the smart cooktop 903-7. According to an embodiment, the electronic device 907 may receive signals from peripheral devices including the smart cooktop 903-7, and may obtain second information of the device toward which the electronic device 907 is oriented, on the basis of the phase differences of the respective received signals.

The electronic device 907 may identify that an external device to perform an instruction corresponding to a user input is the smart cooktop 903-7, on the basis of the first information and the second information. The electronic device 907 may obtain information for performing a task of transmitting, to the smart cooktop 903-7, an instruction to turn off when it boils. For example, the information for performing the task of transmitting the instruction to turn off when it boils may include power-off reference temperature information and an instruction to allow the smart cooktop 903-7 to turn off the power on the basis of power-off temperature information.

The electronic device 907 may perform the task according to the obtained information. For example, the electronic device 907 may directly transmit the instruction to the smart cooktop 903-7 according to the information for performing the task of transmitting, to the identified smart cooktop 903-7, the instruction to turn off when it boils, or may transmit the instruction via the server (e.g., 809 of FIG. 8B). Upon reception of the instruction, the smart cooktop 903-7 may execute the instruction by measuring temperature via a temperature sensor and stopping heat generation of a heat generator device when the measured temperature meets designated temperature information. The smart cooktop 903-7 may transmit, to the electronic device 907, an instruction execution result including information for notification of success in turning off when it starts to boil, failure in turning off when it starts to boil, or completion of turning off when it starts to boil. According to various embodiments, the electronic device 907 may output the instruction execution result in various forms of information, such as sound information, display information, vibration information, or a combination of at least some of the forms of information. According to various embodiments, the smart cooktop 903-7 may also output the instruction execution result in various forms of information, such as sound information, display information, or vibration information.

Referring to FIG. 9H, an electronic device 907 (e.g., 101 of FIG. 1, 201 of FIG. 2, 401 of FIG. 4, or 801 of FIGS. 8A and 8B) may receive a voice signal uttered by a user, for example, "Does that need to be charged?", and may receive a signal from a wireless speaker 903-8.

The electronic device 907 may obtain first information for a list of devices associated with at least a part of a received voice signal, for example, "charged".

The electronic device 907 may obtain second information of a device toward which the electronic device 907 is oriented, on the basis of a signal received from the wireless speaker 903-8. According to an embodiment, the electronic device 907 may obtain second information of the device toward which the electronic device 907 is oriented, on the basis of a phase difference of a signal received from each of the peripheral devices including the wireless speaker 903-8.

The electronic device 907 may identify that an external device to perform an instruction corresponding to a user input is the wireless speaker 903-8, on the basis of the first information and the second information. The electronic device 907 may obtain information for performing a task of transmitting, to the identified wireless speaker 903-8, an instruction to request charging-related information. For example, the information for performing the task of transmitting the instruction to request charging-related information may include the requested charging-related information (information on a full battery capacity, information on the remaining amount of battery power, or information on the time remaining until a battery is charged) and an instruction to allow the wireless speaker 903-8 to provide the requested charging-related information. The electronic device 907 may perform the task according to the obtained information. For example, the electronic device 907 may directly transmit the instruction to the wireless speaker 903-8 according to the information for performing the task of transmitting, to the identified wireless speaker 903-8, the instruction to request charging-related information, or may transmit the instruction via the server (e.g., 809 of FIG. 8B). Upon reception of the instruction, the wireless speaker 903-8 may execute the instruction by determining information on the full battery capacity, information on the remaining amount of battery power, or information on the time remaining until the battery is charged, and transmitting, to the electronic device 907, the charging-related information including the information on a full battery capacity, the information on the remaining amount of battery power, or the information on time remaining until a battery is charged. The wireless speaker 903-8 may transmit, to the electronic device 907, an instruction execution result including success in transmitting the charging-related information, failure in transmitting the charging-related information, or completion of transmitting the charging-related information. The electronic device 907 may output the received charging-related information or the instruction execution result in various forms of information, such as sound information, display information, vibration information, or a combination of at least some of the forms of information. According to various embodiments, the wireless speaker 903-8 may also output the charging-related information or the instruction execution result in various forms of information, such as sound information, display information, or vibration information. For example, the charging-related information or the instruction execution result may be displayed as text, may be displayed as a light emitting display (LED) pattern, or may be output as sound.

Referring to FIG. 9I, an electronic device 901 (e.g., 101 of FIG. 1, 201 of FIG. 2, 401 of FIG. 4, or 801 of FIGS. 8A and 8B) may receive a voice signal uttered by a user, for example, "Does that need to be charged?", and may receive a signal from a wireless earphone 903-9. The electronic device 901 may obtain first information for a list of devices associated with at least a part of a received voice signal, for example, "charged".

The electronic device 901 may obtain second information of a device toward which the electronic device 901 is oriented, on the basis of a signal received from the wireless earphone 903-9. According to an embodiment, the electronic device 901 may obtain second information of the device toward which the electronic device 901 is oriented, on the basis of a phase difference of a signal received from each of the peripheral devices including the wireless earphone 903-9.

The electronic device 901 may identify that the external device to perform the instruction corresponding to the user input is the wireless earphone 903-9, on the basis of the first information and the second information. The electronic device 901 may obtain information for performing a task of transmitting, to the identified wireless earphone 903-9, an instruction to request charging-related information. For example, the information for performing the task of transmitting the instruction to request charging-related information may include the requested charging-related information (information on a full battery capacity, information on the remaining amount of battery power, or information on an amount of time remaining until a battery is charged) and an instruction to allow the wireless earphone 903-9 to provide the requested charging-related information. The electronic device 901 may perform the task according to the obtained information. For example, the electronic device 901 may directly transmit the instruction to the wireless earphone 903-9 according to the information for performing the task of transmitting, to the identified wireless earphone 903-9, the instruction to request charging-related information, or may transmit the instruction via the server (e.g., 809 of FIG. 8B). Upon reception of the instruction, the wireless earphone 903-9 may execute the instruction by determining information on a full battery capacity, information on the remaining amount of battery power, or information on an amount of time remaining until a battery is charged, and transmitting, to the electronic device 901, the charging-related information including the information on a full battery capacity, the information on the remaining amount of battery power, or the information on an amount of time remaining until a battery is charged. The wireless earphone 903-9 may transmit, to the electronic device 901, an instruction execution result including success in transmitting the charging-related information, failure in transmitting the charging-related information, or completion of transmitting the charging-related information. The electronic device 901 may output the received charging-related information or the instruction execution result in various forms of information, such as sound information, display information, vibration information, or a combination of at least some of the forms of information. According to various embodiments, the wireless earphone 903-9 may also output the charging-related information or the instruction execution result in various forms of information, such as sound information, display information, or vibration information. For example, the electronic device 901 may display, on a display 910, information indicating that the time remaining until the battery is charged is 30 minutes.

Referring to FIG. 9J, an electronic device 901 (e.g., 101 of FIG. 1, 201 of FIG. 2, 401 of FIG. 4, or 801 of FIGS. 8A and 8B) may receive a voice signal uttered by a user, for example, "How many minutes are left for that?", and may receive a signal from a smart washing machine 903-10. The electronic device 901 may obtain first information for a list of devices associated with at least a part of a received voice signal, for example, "minutes" and "left".

The electronic device 901 may obtain second information of a device toward which the electronic device 901 is oriented, on the basis of a signal received from the smart washing machine 903-10. According to an embodiment, the electronic device 901 may obtain second information of the device toward which the electronic device 901 is oriented, on the basis of a phase difference of a signal received from each of the peripheral devices including the smart washing machine 903-10. The electronic device 901 may identify that the external device to perform the instruction corresponding to the user input is the smart washing machine 903-10, on the basis of the first information and the second information.

The electronic device 901 may obtain information for performing a task of transmitting, to the identified smart washing machine 903-10, an instruction to request progress information. For example, the information for performing the task of transmitting the instruction to request progress information may include an instruction to allow the smart washing machine 903-10 to provide information on the remaining time until operation of a function being performed is completed. The electronic device 901 may perform the task according to the obtained information. For example, the electronic device 901 may directly transmit the instruction to the smart washing machine 903-10 according to the information for performing the task of transmitting, to the identified smart washing machine 903-10, the instruction to request progress information, or may transmit the instruction via the server (e.g., 809 of FIG. 8B). The smart washing machine 903-10 may execute the instruction by determining progress information (e.g., the remaining time until operation of a function being performed is completed) and transmitting the progress information to the electronic device 901. The smart washing machine 903-10 may transmit, to the electronic device 901, an instruction execution result including success in transmitting the progress information, failure in transmitting the progress information, or completion of transmitting the progress information. The electronic device 901 may output the received progress information and the instruction execution result in various forms of information, such as sound information, display information, vibration information, or a combination of at least some of the forms of information. For example, the electronic device 901 may display information, such as "Dehydrating, five minutes remaining" on the display 910. According to various embodiments, the smart washing machine 903-10 may also output the progress information or the instruction execution result in various forms of information, such as sound information, display information, or vibration information.

Referring to FIG. 9K, an electronic device 907 (e.g., 101 of FIG. 1, 201 of FIG. 2, 401 of FIG. 4, or 801 of FIGS. 8A and 8B) may receive a voice signal uttered by a user, for example, "Who is that?", and may receive a signal from a smart TV 903-11.

The electronic device 907 may obtain first information for a list of devices that execute an instruction to provide personal information, on the basis of at least a part of a voice signal, for example, "that" and "who".

The electronic device 907 may obtain second information of a device toward which the electronic device 907 is oriented, on the basis of a signal received from the smart TV 903-11. According to an embodiment, the electronic device 907 may obtain second information of the device toward which the electronic device 907 is oriented, on the basis of a phase difference of a signal received from each of the peripheral devices including the smart TV 903-11.

The electronic device 907 may identify that an external device to perform an instruction corresponding to a user input is the smart TV 903-11, on the basis of the first information and the second information. The electronic device 907 may obtain information for performing a task of transmitting, to the identified smart TV 903-11, an instruction to request information of a displayed image. For example, the information for performing the task of transmitting the instruction to request information of an image displayed at a specific time may include time information (e.g., a specific time at which an instruction or an input is made by a user) and an instruction to allow the smart TV 903-11 to provide information of the image displayed at the specific time. The electronic device 907 may perform the task according to the obtained information. For example, the electronic device 907 may directly transmit the instruction to the smart TV 903-11 according to the information for performing the task of transmitting, to the identified smart TV 903-11, the instruction to request information of the displayed image, or may transmit the instruction via the server (e.g., 809 of FIG. 8B). According to various embodiments, upon reception of the instruction, the smart TV 903-11 may execute the instruction by capturing an image displayed at a specific time, searching for the captured image to extract a keyword via an external server, and transmitting information of the displayed image to the electronic device 907 on the basis of an image search result and the extracted keyword. The smart TV 903-11 may transmit, to the electronic device 907, an instruction execution result including success in transmitting information of the image displayed at the specific time, failure in transmitting information of the image displayed at the specific time, or completion of transmitting information of the image displayed at the specific time. The electronic device 907 may output the received information of the image or the instruction execution result in various forms of information, such as sound information, display information, vibration information, or a combination of at least some of the forms of information. For example, the electronic device 907 may display information, such as "That person is celebrity OOO" on the display 917. According to various embodiments, the smart TV 903-11 may also output the information of the image displayed at the specific time or the instruction execution result in various forms of information, such as sound information, display information, or vibration information.

Referring to FIG. 9L, an electronic device 907 (e.g., 101 of FIG. 1, 201 of FIG. 2, 401 of FIG. 4, or 801 of FIGS. 8A and 8B) may receive a voice signal uttered by a user, for example, "How long has it been since the filter in that was replaced?", and may receive a signal from a smart water purifier 903-12. The electronic device 907 may obtain first information for a list of devices associated with each other on the basis of at least a part of a received voice signal, for example, "filter", "replaced", and "how long".

The electronic device 907 may obtain second information of a device toward which the electronic device 907 is oriented, on the basis of a signal received from the smart water purifier 903-12. According to an embodiment, the electronic device 907 may obtain second information of the device toward which the electronic device 907 is oriented, on the basis of a phase difference of a signal received from each of the peripheral devices including the smart water purifier 903-12.

The electronic device 907 may identify that an external device to perform an instruction corresponding to a user input is the smart water purifier 903-12, on the basis of the first information and the second information. The electronic device 907 may obtain information for performing a task of transmitting, to the identified smart water purifier 903-12, an instruction to request information associated with filter replacement information. For example, the information for performing the task of transmitting the instruction to request information associated with filter replacement information may include required filter replacement information (e.g., the time point at which the filter was last replaced, and a sanitary condition of the current filter) and an instruction to allow the smart water purifier 903-12 to provide the required filter replacement information. The electronic device 907 may perform the task according to the obtained information. For example, the electronic device 907 may directly transmit the instruction to the smart water purifier 903-12 according to the information for performing the task of transmitting, to the identified smart water purifier 903-12, the instruction to request information associated with filter replacement information, or may transmit the instruction via the server (e.g., 809 of FIG. 8B). According to various embodiments, upon reception of the instruction, the smart water purifier 903-12 may execute the instruction by transmitting, to the electronic device 907, the filter replacement information including the time point at which the filter was last replaced, a sanitary condition of the current filter, or the like. According to another embodiment, the water purifier 903-12 may execute the instruction by updating, on a server (e.g., 809 of FIG. 8B), the filter replacement information including the time point at which the filter was last replaced, the sanitary condition of the current filter, and the like, and causing the electronic device 907 to transmit the first information and the second information to the server 809 so as to obtain the filter replacement information. The smart water purifier 903-12 may transmit, to the electronic device 907, an instruction execution result including success in transmitting the filter replacement information, failure in transmitting the filter replacement information, or completion of transmitting the filter replacement information. The electronic device 907 may output the received filter replacement information and the instruction execution result in various forms of information, such as sound information, display information, vibration information, or a combination of at least some of the forms of information. For example, the electronic device 907 may display information, such as "It was replaced two months ago" on the display 917. According to various embodiments, the smart water purifier 903-12 may also output the filter replacement information or the instruction execution result in various forms of information, such as sound information, display information, or vibration information.

Referring to FIG. 9M, the electronic device 907 (e.g., 101 of FIG. 1, 201 of FIG. 2, 401 of FIG. 4, or 801 of FIGS. 8A and 8B) may receive a voice signal uttered by a user, for example, "Is my car key located over there?", in the state in which a specific button is pressed by a user or a specific is being executed. The electronic device 907 may receive signals from peripheral devices including a small-sized device, for example, a smart key 903-13, at the moment when a voice signal is received.

The electronic device 907 may obtain first information for a list of devices associated with each other on the basis of at least a part of a received voice signal, for example, "my car key", "over there", and "located". The electronic device 907 may obtain second information of a device toward which the electronic device 907 is oriented, on the basis of signals received from the peripheral devices including a small-sized device such as the smart key 903-13. According to an embodiment, the electronic device 907 may obtain second information of the device toward which the electronic device 907 is oriented, on the basis of a phase difference of a signal received from each of the peripheral devices including the smart key 903-13.

The electronic device 907 may identify that an external device to perform an instruction corresponding to a user input is the smart key 903-13, on the basis of the first information and the second information. The electronic device 907 may obtain information for performing a task of providing position information of the identified smart key 903-13. For example, the information for performing the task of providing position information may include position information of the smart key 903-13. The electronic device 907 may perform the task according to the obtained information. For example, the electronic device 907 may provide the position information of the smart key 903-13 according to the information for performing the task of providing position information. According to an embodiment, the position information of the smart key 903-13 may be obtained based on a signal that the electronic device 907 has received from the smart key 903-13, or may be received from an external server related to the smart key 903-13. For example, the position information of the smart key 903-13 may include absolute position information of the smart key 903-13 or relative position information of the smart key 903-13. The absolute position information may be coordinate information based on a global positioning system (GPS). The relative position information may include information on how far away the smart key 903-13 is and the direction in which the smart key 903-13 is located from the electronic device 907.

The electronic device 907 may output the position information of the smart key 903-13 in various forms of information, such as sound information, display information, vibration information, or a combination of at least some of the forms of information. For example, the electronic device 907 may display information, such as "Yes, it seems that it is located in that direction. The signal is stable", or may output the information as a sound signal via the speaker. In another example, the electronic device 907 may display, on the display 917, the estimated position information of the smart key 903-13 on the basis of the direction of a signal received from the smart key 903-13. According to various embodiments, the smart key 903-13 may also output the position information of the smart key 903-13 in various forms of information, such as sound information, display information, or vibration information.

Referring to FIG. 9N, the electronic device 907 (e.g., 101 of FIG. 1, 201 of FIG. 2, 401 of FIG. 4, or 801 of FIGS. 8A and 8B) may receive a voice signal uttered by a user. According to an embodiment, the electronic device 907 may receive a voice of "Now, turn that off", in the state in which a voice recognition service is activated, and no movement oriented toward a specific external device occurs.

Further, the electronic device 907 may receive a voice signal and may receive signals transmitted from peripheral devices concurrently or separately. According to various embodiments, a signal transmitted from at least one peripheral device may include at least a part of a synchronization signal or discovery signal. According to an embodiment, when a smart TV 903-14 and an air purifier 903-15 are present as peripheral devices near the electronic device 907, the electronic device 907 may receive a synchronization signal or a discovery signal, which is transmitted from each of the smart TV 903-14 and the air purifier 903-15, and receive a voice signal, for example, "Now, turn that off" concurrently or separately.

The electronic device 907 may obtain first information for a list of devices that execute an instruction to turn off the power, on the basis of voice data of "Now, turn that off" which relates to a voice signal. According to various embodiments, the electronic device 907 may obtain first information (e.g., an external device list) corresponding to information related to an indication target, a demonstrative pronoun, an instruction, or a function, obtained on the basis of the received voice signal. According to various embodiments, the electronic device 907 may autonomously perform voice recognition and natural-language understanding on the basis of the received voice signal to obtain first information corresponding to the information related to the indication target, the demonstrative pronoun, the instruction, or the function, or may transmit the voice signal (e.g., data corresponding to the voice signal) to an external server (e.g., the server 405) and may receive, from the server, the first information corresponding to the information related to the indication target, the demonstrative pronoun, the instruction, or the function according to the results of performing the voice recognition and the natural-language understanding. The electronic device 907 may obtain first information for a list of devices associated with at least a part of a received voice signal, for example, "now" and "turn off". For example, the devices associated with "now" and "turn off" are devices capable of turning themselves off, and may be devices that are currently turned on and performing operation.

The electronic device 907 may obtain second information of the external device on the basis of the signal received from each of the smart TV 903-14 and the air purifier 903-15. According to an embodiment, the electronic device 907 may obtain second information for a list of external devices existing in the vicinity of the electronic device 907, on the basis of phase differences of the respective signals received from the smart TV 903-14 and the air purifier 903-15.

The electronic device 907 may identify an external device to perform an instruction corresponding to a user input, on the basis of the first information and the second information. According to an embodiment, the electronic device 907 may detect a duplicate external device in each list by comparing the list of external devices in the vicinity of the electronic device 907 with the list of devices capable of performing power-off, which are obtained based on "Now, turn that off". According to various embodiments, when there is one detected external device, the electronic device 907 may identify the one detected external device as the external device to execute the instruction corresponding to the user input. When two or more external devices are detected, the electronic device 907 may display the two or more detected external devices on the display 917. For example, when the smart TV 903-14 and the air purifier 903-15 are detected, the electronic device 907 may display the smart TV 903-14 and the air purifier 903-15 on the display 917, and may also display a message for requesting the user to make a selection, such as "Two devices are detected. Which one of the two devices do you want to turn off?" The electronic device 907 may identify an external device selected by the user from among the two or more external devices, as the external device to perform an instruction corresponding to the user input.

The electronic device 907 may obtain information for performing a task of transmitting an instruction to request an off function, to the identified external device (the smart TV 903-14 or the air purifier 903-15). For example, the information for performing the task of transmitting the instruction to request an off function may include an instruction to allow the smart TV 903-14 and the air purifier 903-15 to turn off their operating functions. The electronic device 907 may perform the task according to the obtained information. For example, the electronic device 907 may directly transmit the instruction to the smart TV 903-14 and the air purifier 903-15 according to the information for performing the task of transmitting, to the smart TV 903-14 and the air purifier 903-15, the instruction to request an off function, or may transmit the instruction via the server (e.g., 809 of FIG. 8B). Upon reception of the instruction, the smart TV 903-14 and the air purifier 903-15 may execute the instruction by turning off operating functions. The smart TV 903-14 and the air purifier 903-15 may transmit, to the electronic device 907, an instruction execution result including off function success or off function failure. The electronic device 907 may output the instruction execution result in various forms of information, such as sound information, display information, vibration information, or a combination of at least some of the forms of information.

Figure 10:
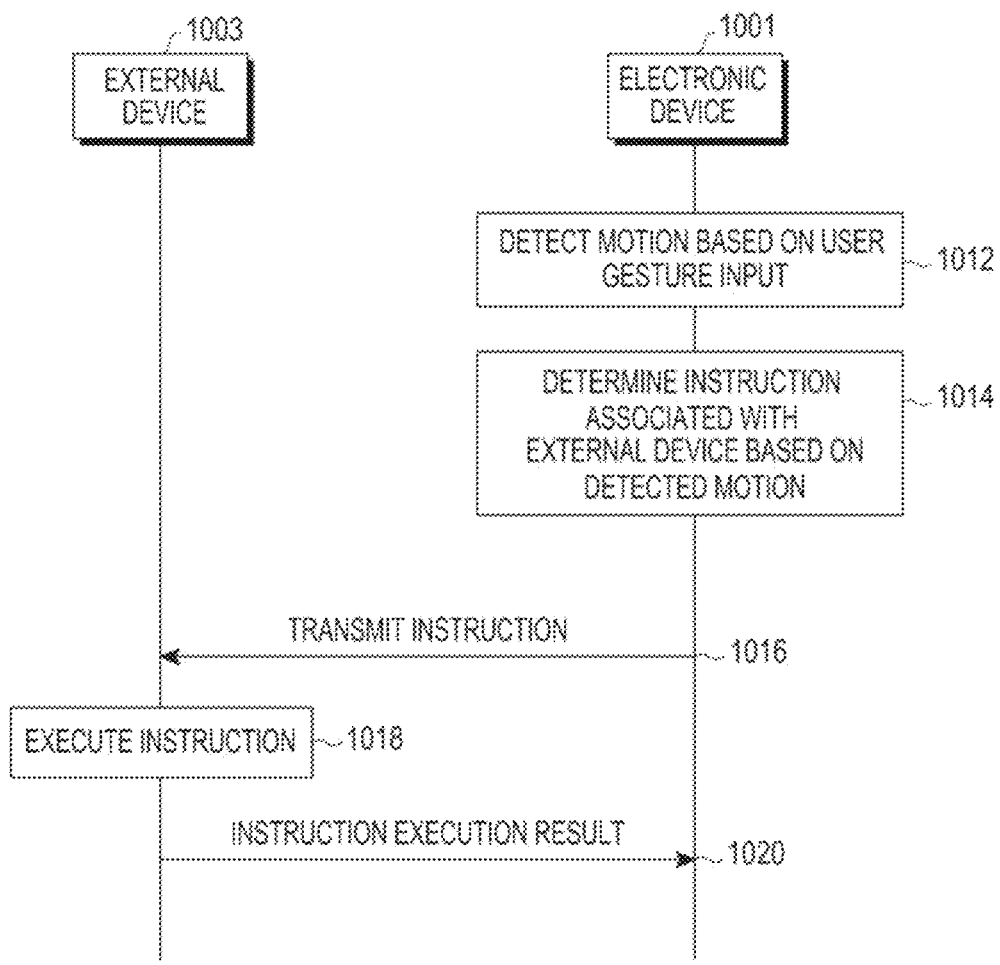
FIG. 10 is a flow diagram illustrating operations of transmitting a control instruction to an external device on the basis of a motion by a user gesture input into the electronic device according to an embodiment of the disclosure.

FIG. 10 is a flow diagram illustrating operations of transmitting a control instruction to an external device on the basis of a motion by a user gesture input into the electronic device according to an embodiment of the disclosure.

Referring to FIG. 10, according to an embodiment, information for performing a task of transmitting a control instruction to an external device on the basis of a motion corresponding to a user gesture may include sequence information of states related to operations 1012 to 1020. An electronic device 1001 (e.g., 101 of FIG. 1, 201 of FIG. 2, or 401 of FIG. 4) may perform operations 1012, 1014, and 1016 by using the sequence information of states related to operations 1012 to 1020. According to an embodiment, the sequence information of states related to operations 1012, 1014, and 1016 may include information that allows the electronic device 1001 to separately or sequentially perform operations 1012, 1014, and 1016. According to an embodiment, the information that allows the electronic device 1001 to separately or sequentially perform operations 1012, 1014, and 1016 may include rule path information related to at least a part of operations 1012, 1014, and 1016. For example, the rule path information may include information that enables the electronic device 1001 to execute a specific application and separately or sequentially perform operations 1012, 1014, and 1016 through the executed specific application, or may include status information of operations 1012, 1014, and 1016 for performing a user instruction by the electronic device 1001.

The electronic device 1001 (e.g., 101 of FIG. 1, 201 of FIG. 2, or 401 of FIG. 4) may detect an input by a user gesture in operation 1012. According to various embodiments, the electronic device 1001 may detect a motion by the user gesture, using at least one of, for example, a gyro sensor, an acceleration sensor, a geomagnetic sensor, a proximity sensor, a motion sensor, an illumination sensor, an RGB sensor, and a heart rate sensor. For example, the electronic device 1001 may detect a motion by a user gesture input, by detecting a pattern represented by accumulated sensor values or the magnitude of change in sensor values measured for a predetermined time by at least one sensor. According to an embodiment, in order to distinguish a user gesture input intended for instruction and a simple user gesture input, a separate trigger input may be additionally required to notify of the beginning of the user gesture input for instruction.

In operation 1014, the electronic device 1001 may identify an external device 1003 on the basis of a motion by the detected user gesture input, and may determine an instruction associated with the identified external device 1003 (e.g., the first to Nth external devices 403-1 to 403-N of FIG. 4 and FIGS. 5A and 5B). According to various embodiments, the electronic device 1001 may determine whether the pattern of the sensor value or the magnitude of change in the sensor value corresponding to the motion detected by the user gesture input is associated with at least one designated instruction.

The electronic device 1001 may transmit the instruction to the identified external device 1003, in operation 1016. According to an embodiment, the electronic device 1001 may transmit the instruction by using a communication protocol enabling communication with the identified external device 1003. According to an embodiment, the communication protocol may include at least one among a Bluetooth protocol, a Bluetooth low energy (BLE) protocol, a Wi-Fi protocol, a beacon protocol, a ZigBee protocol, and a near field communication (NFC) protocol. According to an embodiment, the communication protocol may further include another communication protocol designated for an internet-of-things (IoT) service.

The external device 1003 may execute the instruction in operation 1018. According to an embodiment, the external device 1003 may determine a function corresponding to the instruction received from the electronic device 1001 on the basis of the instruction, and may perform the determined function.

The external device 1003 may transmit an instruction execution result to the electronic device 1001 in operation 1020. According to various embodiments, the instruction execution result may include information for notification of success in function performance according to the instruction, failure in function performance according to the instruction, or a function performance result according to the instruction. The electronic device 1001 may output the instruction execution result. According to various embodiments, the electronic device 1001 may output the instruction execution result in various forms of information, such as sound information, display information, vibration information, or a combination of at least some of the forms of information.

Figure 11:
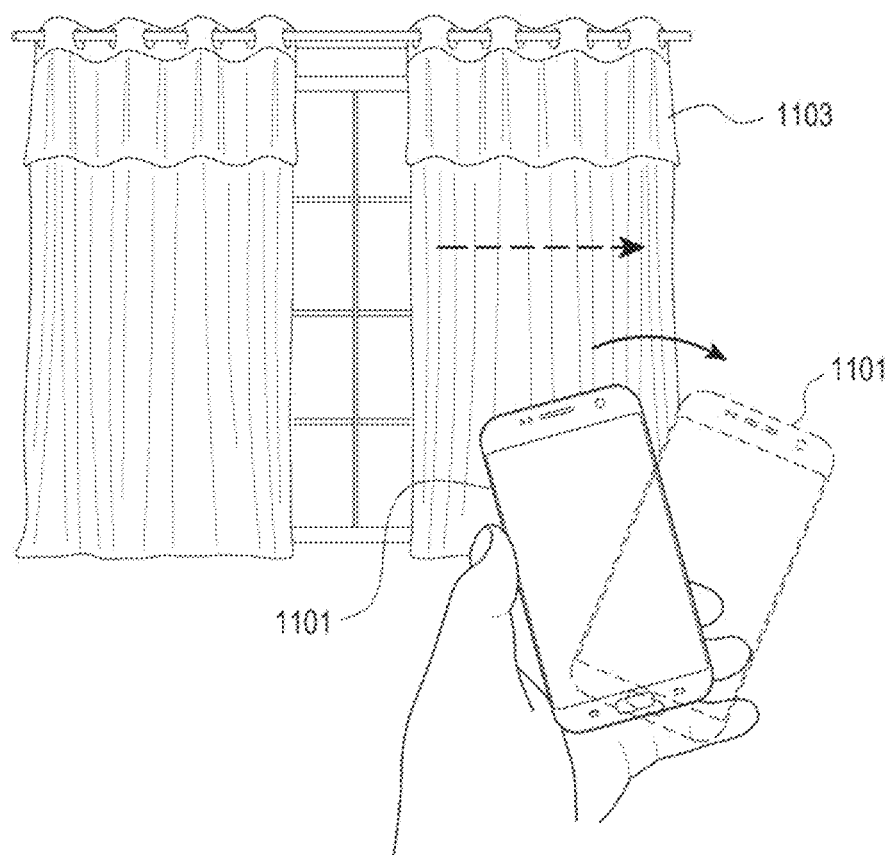
FIG. 11 is a diagram illustrating an example of transmitting a control instruction to an external device on the basis of a motion by a user gesture input into the electronic device according to an embodiment of the disclosure.

FIG. 11 is a diagram illustrating an example of transmitting a control instruction to an external device on the basis of a motion by a user gesture input into the electronic device according to an embodiment of the disclosure.

Referring to FIG. 11, a user gesture input may be received when an electronic device 1101 (e.g., 101 of FIG. 1, 201 of FIG. 2, 401 of FIG. 4, or 1001 of FIG. 10) is in the state in which the electronic device 1101 is oriented toward a smart curtain 1103, the electronic device 1101 may obtain first information for identifying an external device on the basis of a pattern of a sensor value or the magnitude of change in a sensor value corresponding to an electronic device 1101 motion made by a user gesture input; and on the basis of phase differences of signals received from peripheral devices, the electronic device 1101 may obtain second information of a device toward which the electronic device 1101 is oriented, so as to identify the smart curtain 1103 on the basis of the first information and second information.

The electronic device 1101 may obtain information for performing a task of transmitting a control instruction to the smart curtain 1103 identified on the basis of the motion by the user gesture input. The electronic device 1101 may perform the task according to the obtained information. For example, the electronic device 1101 may directly transmit a smart curtain 1103 instruction on the basis of the motion by the user gesture input according to the obtained information, and may transmit the instruction via a server (e.g., 809 of FIG. 8B). According to various embodiments, the electronic device 1101 may include at least one sensor among, for example, a gyro sensor, an acceleration sensor, a geomagnetic sensor, a proximity sensor, a motion sensor, an illumination sensor, an RGB sensor, and a heart rate sensor, and may detect the motion by the user gesture input by detecting a pattern represented by accumulated sensor values and the magnitude of change in sensor values measured for a predetermined time by using the at least one sensor. The electronic device 1101 may determine an instruction associated with the smart curtain 1103 on the basis of the motion by the detected user gesture input. According to various embodiments, the electronic device 1101 may determine the magnitude of change or the pattern, in which the detected magnitude of change in sensor values or the detected pattern of sensor values matches at least one magnitude of change and pattern which are predesignated and associated with an instruction by a predetermined degree or higher, and may determine the instruction corresponding to the magnitude of change and pattern which show matching by the predetermined degree or higher. For example, when the user performs, by using the electronic device 1101, a gesture of moving to the right, a gesture of moving to the left, or a gesture of moving downwards, the electronic device 1101 may detect a motion (e.g., moving the electronic device 1101 in a specific direction) by the gesture of moving to the right, the gesture of moving to the left, or the gesture of moving downwards, and may determine "moving to the right", i.e., an instruction corresponding to the gesture of moving to the right, "moving to the left" i.e., an instruction corresponding to the gesture of moving to the left, and "moving downwards" i.e., an instruction corresponding to the gesture of moving downwards on the basis of a detection result. The electronic device 1101 may transmit the instruction to the smart curtain 1103. According to an embodiment, the electronic device 1101 may transmit the instruction by using a communication protocol enabling communication with the smart curtain 1103.

The smart curtain 1103 may perform a curtain function according to the instruction. For example, the smart curtain 1103 may move the curtain to the right according to the instruction to move to the right, may move the curtain to the left according to the instruction to move to the left, or may move the curtain downwards according to the instruction to move downwards, and may transmit an instruction execution result to the electronic device 1101. According to various embodiments, the instruction execution result may include information that notifies of success, failure, or completion according to the instruction. The electronic device 1101 may output the instruction execution result. According to various embodiments, the electronic device 1101 may output the instruction execution result in various forms of information, such as sound information, display information, vibration information, or a combination of at least some of the forms of information.

Figure 12A:
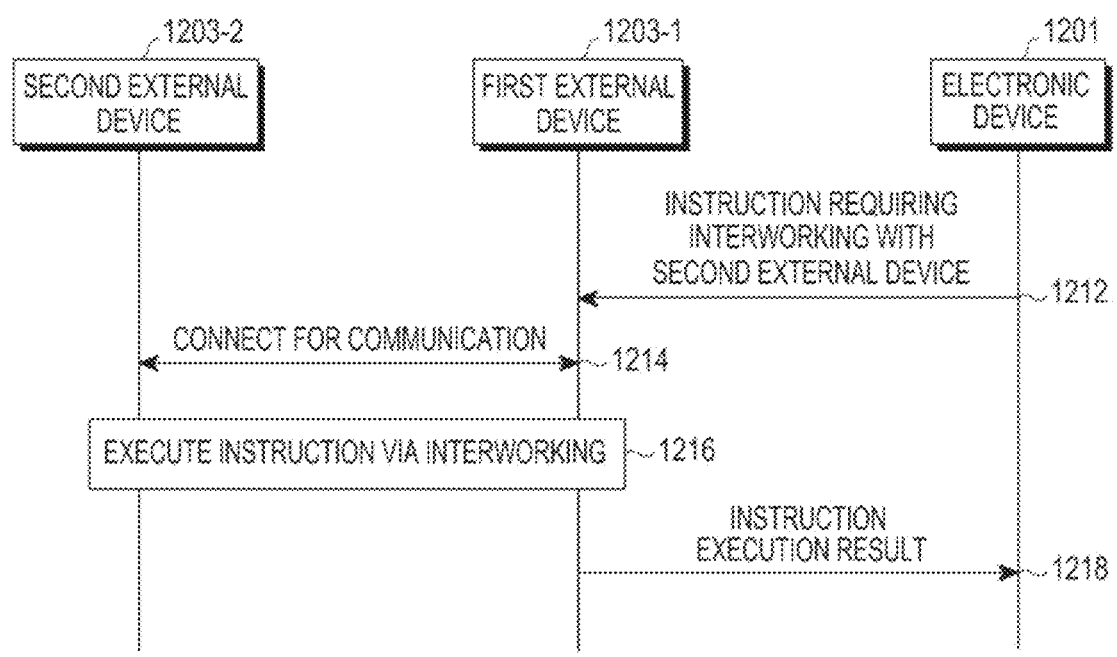
FIGS. 12A and 12B are flow diagrams illustrating operations of transmitting an instruction to allow an external device to interwork with another external device by the electronic device according to various embodiments of the disclosure.
Figure 12B:
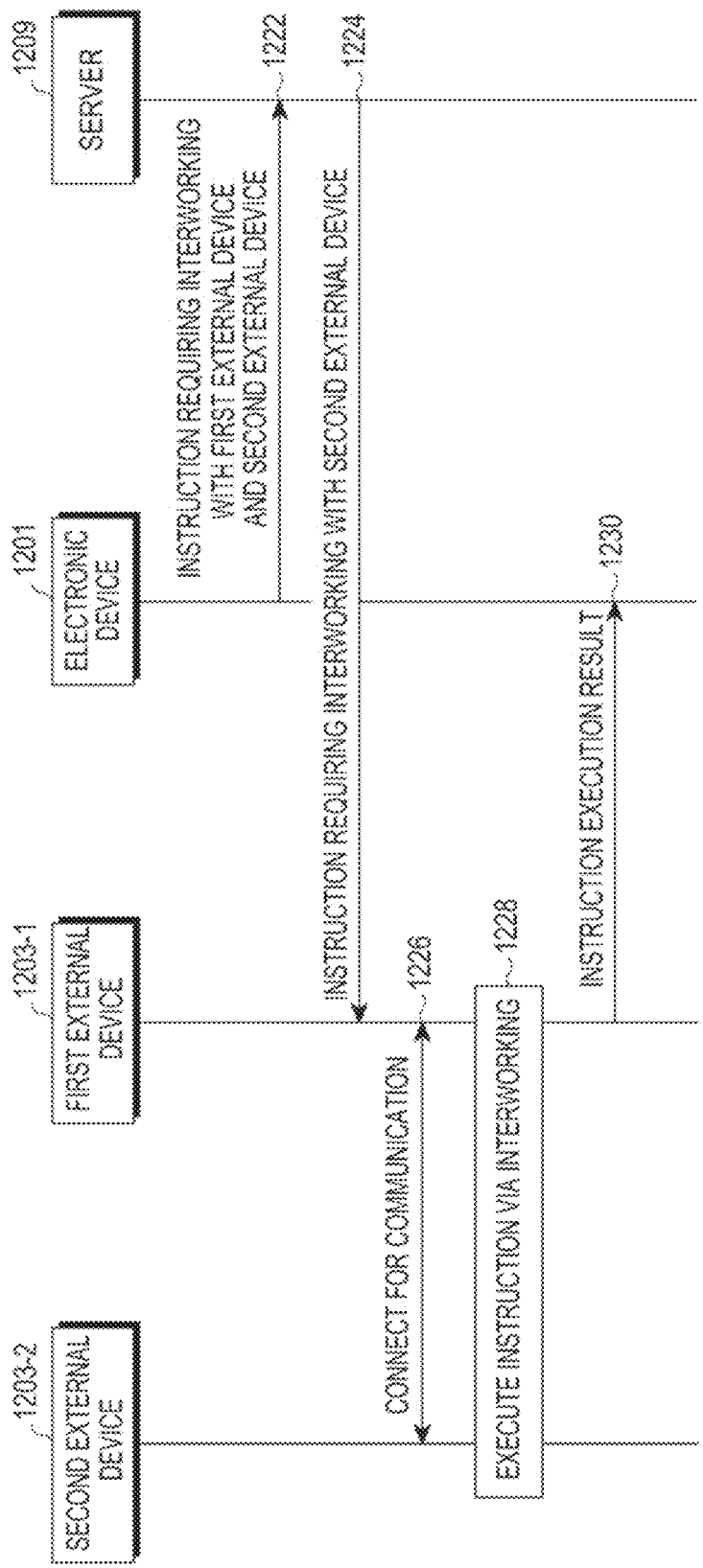

FIGS. 12A and 12B are flow diagrams illustrating operations of transmitting an instruction to allow an external device to interwork with another external device by the electronic device according to various embodiments of the disclosure.

Referring to FIG. 12A, according to an embodiment, information for performing a task of transmitting an instruction to allow an external device to interwork with another external device may include sequence information of states related to operations 1212 to 1218. An electronic device 1201 (e.g., 101 of FIG. 1, 201 of FIG. 2, or 401 of FIG. 4) may perform operation 1212 by using the sequence information of states related to operations 1212 and 1218. According to an embodiment, the sequence information of states related to operation 1212 may include information that allows the electronic device 1201 to perform operation 1212. According to an embodiment, the information that allows the electronic device 1201 to perform operation 1212 may include rule path information related to operation 1212. For example, the rule path information may include information that enables the electronic device 1201 to execute a specific application and perform operation 1212 via the executed specific application, or may include status information of operation 1212 for performing a user instruction by the electronic device 1201.

According to an embodiment, in operation 1212, the electronic device 1201 may transmit, to an identified external device (e.g., an identified first external device from among the first to Nth external devices 403-1 to 403-N in FIG. 4 and FIGS. 5A and 5B) (hereinafter, referred to as a "first external device"), an instruction requiring interworking with another identified external device (e.g., another identified external device from among the first to Nth external devices 403-1 to 403-N in FIG. 4 and FIGS. 5A and 5B) (hereinafter, referred to as a "second external device"). The instruction may include at least a part of information related to a task to be performed by a first external device 1203-1 or a second external device 1203-2 at least partially on the basis of, for example, a user input (e.g., voice input, touch input, gesture input, or the like) and signals received by the electronic device 1201 from the first external device 1203-1 and the second external device 1203-2.

According to an embodiment, the electronic device 1201 may transmit the instruction by using a communication protocol enabling communication with the first external device 1203-1. According to various embodiments, the communication protocol may include at least one among a Bluetooth protocol, a Bluetooth low energy (BLE) protocol, a Wi-Fi protocol, a beacon protocol, a ZigBee protocol, and a near field communication (NFC) protocol. According to an embodiment, the communication protocols may further include another communication protocol designated for an internet-of-things (IoT) service. According to various embodiments, the instruction requiring interworking with the second external device 1203-2 may include device recognition information of each of the first external device 1203-1 and the second external device 1203-2, a function-performing sequence of each of the first external device 1203-1 and the second external device 1203-2, or a function required to be performed by each of the first external device 1203-1 and the second external device 1203-2.

The first external device 1203-1 may perform communication connection with the second external device 1203-2 in operation 1214. The first external device 1203-1 may execute the instruction via interworking with the second external device 1216-2, in operation 1216. According to various embodiments, the first external device 1203-1 may execute a first function on the basis of the instruction requiring interworking with the second external device 1203-2, and may transmit, to the second external device 1203-2, data or information necessary for executing the instruction requiring interworking with the second external device 1203-2. The second external device 1203-2 may execute a second function on the basis of data or information received from the first external device 1203-1. By execution of the first function and the second function, the first external device 1203-1 and the second external device 1203-2 may interwork with each other to execute the instruction. The first external device 1203-1 may transmit an instruction execution result to the electronic device 1201 in operation 1218. For example, the first external device 1203-1 may receive the instruction execution result from the second external device 1203-2 and transmit the same to the electronic device 1201. According to various embodiments, one of the first external device 1203-1 and the second external device 1203-2 may transmit the instruction execution result to the electronic device 1201. According to various embodiments, the instruction execution result may include information for notification of success in function performance according to the instruction, failure in function performance according to the instruction, or a function performance result according to the instruction. The electronic device 1201 may output the instruction execution result. According to various embodiments, the electronic device 1201 may output the instruction execution result in various forms of information, such as sound information, display information, vibration information, or a combination of at least some of the forms of information. According to various embodiments, one of the first external device 1203-1 and the second external device 1203-2 may output the instruction execution result in various forms of information, such as sound information, display information, vibration information, or a combination of at least some of the forms of information.

Referring to FIG. 12B, according to an embodiment, information for performing a task of transmitting an instruction to allow an external device to interwork with another external device may include sequence information of states related to operations 1222 to 1230. The electronic device 1201 (e.g., 101 of FIG. 1, 201 of FIG. 2, or 401 of FIG. 4) may perform operation 1222 by using the sequence information of states related to operation 1222.

According to an embodiment, the information that allows the electronic device 1201 to perform operation 1222 may include rule path information related to operation 1222. For example, the rule path information may include information that enables the electronic device 1201 to execute a specific application and perform operation 1222 via the executed specific application, or may include status information of operation 1222 for performing a user instruction by the electronic device 1201.

According to an embodiment, in operation 1222, the electronic device 1201 may transmit, to the server 1209, an instruction requiring interworking between one identified external device 1203-1 (e.g., one identified external device from among the first to Nth external devices 403-1 to 403-N in FIG. 4 and FIGS. 5A and 5B) (hereinafter, referred to as a "first external device") and another identified external device 1203-2 (e.g., another identified external device from among the first to Nth external devices 403-1 to 403-N in FIG. 4 and FIGS. 5A and 5B) (hereinafter, referred to as a "second external device"). The instruction may include at least a part of information related to a task to be performed by each of the first external device 1203-1 and the second external device 1203-2 at least partially on the basis of, for example, a user input (e.g., voice input, touch input, gesture input, or the like) and signals received by the electronic device 1201 from the first external device 1203-1 and the second external device 1203-2.

According to an embodiment, the server 1209 may be a server that can connect with each of the first external device 1203-1 and the second external device 1203-2, may manage the first external device 1203-1 and the second external device 1203-2, and may transmit the instruction to each of the first external device 1203-1 and the second external device 1203-2. According to an embodiment, the instruction requiring interworking between the first external device 1203-1 and the second external device 1203-2 may include device recognition information (e.g., a device ID) of each of the first external device 1203-1 and the second external device 1203-2, a function-performing sequence of each of the first external device 1203-1 and the second external device 1203-2, or a function required to be performed by each of the first external device 1203-1 and the second external device 1203-2.

The server 1209 may transmit, to the first external device 1203-1, the instruction requiring interworking with the second external device 1203-2, in operation 1224. According to various embodiments, the instruction requiring interworking with the second external device 1203-2 may include device recognition information of each of the first external device 1203-1 and the second external device 1203-2, a function-performing sequence of each of the first external device 1203-1 and the second external device 1203-2, or a function required to be performed by each of the first external device 1203-1 and the second external device 1203-2.

The first external device 1203-1 may perform communication connection with the second external device 1203-2 in operation 1226. The first external device 1203-1 may execute the instruction via interworking with the second external device 1203-2, in operation 1228. According to an embodiment, the instruction may include an instruction to allow a first function of the first external device 1203-1 and a second function of the second external device 1203-2 to be performed. According to various embodiments, the first external device 1203-1 may execute the first function for the instruction requiring interworking with the second external device 1203-2, and may transmit, to the second external device 1203-2, data or information necessary for executing the instruction requiring interworking with the second external device 1203-2. The second external device 1203-2 may execute the second function on the basis of data or information received from the first external device 1203-1. By execution of the first function and the second function, the first external device 1203-1 and the second external device 1203-2 may execute the instruction requiring interworking with each other. The first external device 1203-1 may transmit an instruction execution result to the electronic device 1201 in operation 1230. According to various embodiments, at least one of the first external device 1203-1 and the second external device 1203-2 may transmit the instruction execution result to the electronic device 1201. According to various embodiments, the instruction execution result may include information for notification of success in function performance according to the instruction, failure in function performance according to the instruction, or a function performance result according to the instruction. The electronic device 1201 may output the instruction execution result. According to various embodiments, the electronic device 1201 may output the instruction execution result in various forms of information, such as sound information, display information, vibration information, or a combination of at least some of the forms of information. According to various embodiments, at least one of the first external device 1203-1 and the second external device 1203-2 may output the instruction execution result in various forms of information, such as sound information, display information, vibration information, or a combination of at least some of the forms of information.

FIGS. 13A to 13E are diagrams illustrating examples of transmitting an instruction to allow an external device to interwork with another external device by the electronic device according to various embodiments of the disclosure. According to various embodiments, the electronic device may be one of various types of electronic devices, such as a wearable device 1301, a remote controller 1305, or a smartphone 1307 (hereinafter, the wearable device 1301, the remote controller 1305, or the smartphone 1307 is referred to as electronic device), and may be another type of electronic device.

Figure 13A:
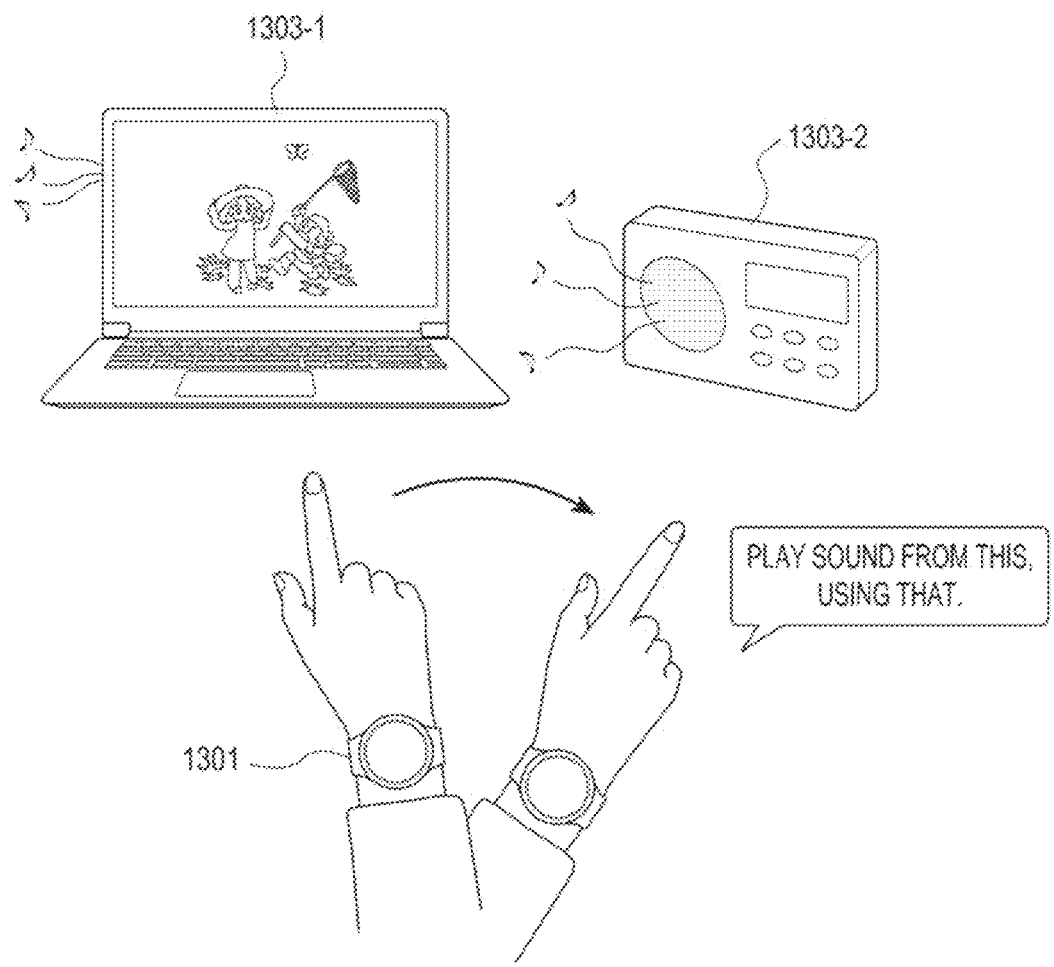
FIGS. 13A, 13B, 13C, 13D, and 13E are diagrams illustrating examples of transmitting an instruction to allow an external device to interwork with another external device by the electronic device according to various embodiments of the disclosure.

Referring to FIG. 13A, an electronic device 1301 (e.g., 101 of FIG. 1, 201 of FIG. 2, 401 of FIG. 4, or 1201 of FIGS. 12A and 12B) may receive a voice signal uttered by a user, for example, "Play sound from this, using that", and may receive signals from a notebook 1303-1 and a wireless speaker 1303-2.

The electronic device 1301 may obtain first information for a list of devices associated with each other on the basis of at least a part of a received voice signal, for example, "sound" and "play". According to various embodiments, the electronic device 1301 may obtain first information (e.g., an external device list) corresponding to information related to an indication target, a demonstrative pronoun, an instruction, or a function, obtained on the basis of the received voice signal. According to various embodiments, the electronic device 1301 may autonomously perform voice recognition and natural-language understanding on the basis of the received voice signal to obtain first information corresponding to the information related to the indication target, the demonstrative pronoun, the instruction, or the function, or may transmit the voice signal (e.g., data corresponding to the voice signal) to an external server (e.g., the server 405) and may obtain, from the server, the first information corresponding to the information related to the indication target, the demonstrative pronoun, the instruction, or the function according to the results of performing the voice recognition and the natural-language understanding.

The electronic device 1301 may obtain second information of a device toward which the electronic device 1301 is oriented, on the basis of a signal received from each of the notebook 1303-1 and the wireless speaker 1303-2. According to an embodiment, the electronic device 1301 may obtain second information of the device toward which the electronic device 1301 is oriented, on the basis of phase differences of the respective signals received from peripheral devices including the notebook 1303-1 and the wireless speaker 1303-2.

The electronic device 1301 may identify that an external device to perform an instruction corresponding to a user input is the notebook 1303-1 and the wireless speaker 1303-2, on the basis of the first information and the second information. The electronic device 1301 may obtain an instruction to allow audio data being reproduced by the notebook 1303-1 to be output by the wireless speaker 1303-2 according to the results of performing voice recognition and natural-language understanding with respect to "Play sound from this, using that". According to various embodiments, the instruction may include at least a part of information related to a task (e.g., a function for performance by each of the first external device 1303-1 and the second external device 1303-2) to be performed by each of the first external device 1303-1 and the second external device 1303-2 at least partially on the basis of, for example, a user input (e.g., voice input, touch input, gesture input, or the like) and signals received by the electronic device 1301 from the first external device 1303-1 and the second external device 1303-2. The electronic device 1301 may obtain information for performing the task of allowing audio data being reproduced by the notebook 1303-1 to be output by the wireless speaker 1303-2. The electronic device 1301 may perform the task according to the obtained information. For example, the electronic device 1301 may directly transmit the instruction to allow audio data being reproduced in the notebook 1303-1 to be output by the wireless speaker 1303-2, or may transmit, via a server (e.g., 1209 of FIG. 12B), the instruction to allow audio data being reproduced in the notebook 1303-1 to be output by the wireless speaker 1303-2. According to an embodiment, the instruction may include an instruction to allow the notebook 1303-1 to perform a first function and to allow the wireless speaker 1303-2 to perform a second function.

According to various embodiments, upon reception of the instruction, the notebook 1303-1 performs a first function of selecting sound source data for the currently reproduced sound and transferring the selected sound source data to the wireless speaker 1303-2, and the wireless speaker 1303-2 performs a second function of reproducing the sound source data received from the notebook 1303-1, so that the instruction to allow audio data being reproduced by the notebook 1303-1 to be output by the wireless speaker 1303-2 may be executed.

The notebook 1303-1 may transmit, to the electronic device 1301, an instruction execution result including instruction execution success, instruction execution failure, or instruction execution completion. According to various embodiments, the electronic device 1301 may output the received instruction execution result in various forms of information, such as sound information, display information, or vibration information. According to various embodiments, the notebook 1303-1 or the wireless speaker 1303-2 may also output the instruction execution result in various forms of information, such as sound information, display information, vibration information, or a combination of at least some of the forms of information. According to various embodiments, the note book 1303-1 may perform a second function, and the wireless speaker 1303-2 may perform a first function. For example, the wireless speaker 1303-2 may perform a first function of selecting sound source data for the currently reproduced sound and transferring the selected sound source data to the notebook 1303-1, and the notebook 1303-1 may perform a second function of reproducing the sound source data received from the wireless speaker 1303-2. According to various embodiments, the notebook 1303-1 and the wireless speaker 1303-2 are provided as examples of devices that output sound, and other sound output devices may execute the instruction via interworking with each other in the same manner as the notebook 1303-1 and the wireless speaker 1303-2.

Figure 13B:
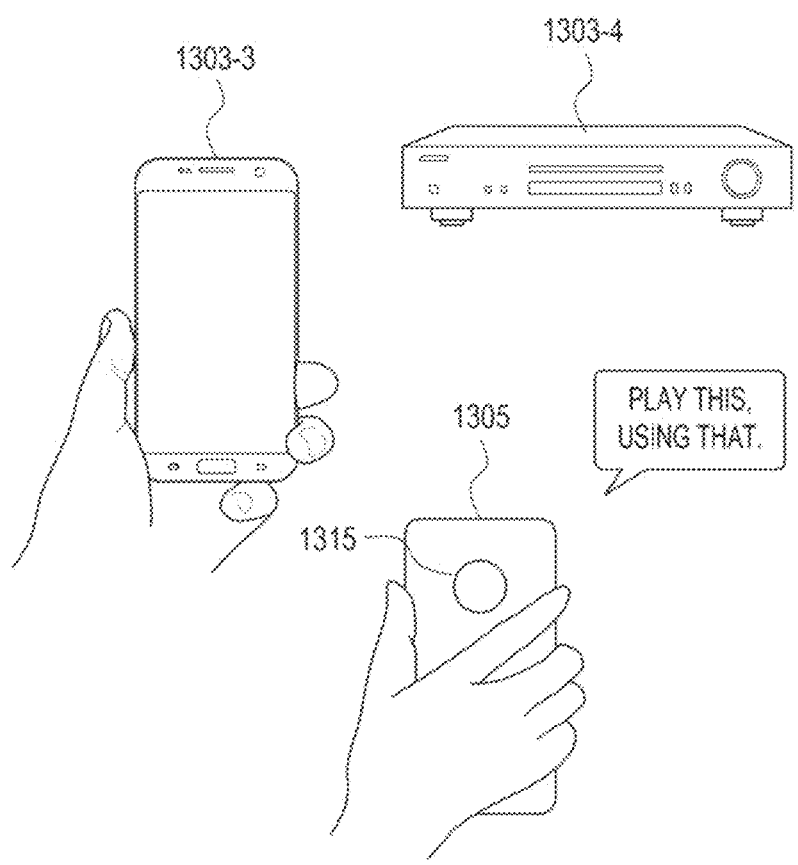

Referring to FIG. 13B, an electronic device 1305 (e.g., 101 of FIG. 1, 201 of FIG. 2, 401 of FIG. 4, or 1201 of FIGS. 12A and 12B) may take the form of a remote controller, and may include a fingerprint sensor 1315 (e.g., the sensor module 240 of FIG. 2). According to an embodiment, the electronic device 1305 may be set to receive a user input when a fingerprint recognized by a fingerprint sensor 1315 matches registered fingerprint information. The electronic device 1305 may receive a voice signal uttered by a user, for example, "Play this, using that", and may receive signals from a smartphone 1303-3 and a projector 1303-4.

The electronic device 1305 may obtain first information for a list of devices associated with each other on the basis of at least a part of a received voice signal, for example, "play".

The electronic device 1305 may obtain second information of a device toward which the electronic device 1305 is oriented, on the basis of a signal received from each of the smartphone 1303-3 and the projector 1303-4. According to an embodiment, the electronic device 1305 may obtain second information of the device toward which the electronic device 1305 is oriented, on the basis of phase differences of the respective signals received from peripheral devices including the smartphone 1303-3 and the projector 1303-4.

The electronic device 1305 may identify the projector 1303-4 on the basis of the first information and the second information. According to various embodiments, in a case where voice data contains two demonstrative pronouns, such as "this" and "that", while only one external device, such as the projector 1303-4, is identified, the electronic device 1305 may further identify another external device (e.g., the smartphone 1303-3) by searching for the external device closest to the electronic device 1305 from among peripheral devices, an external device most recently used by a user, or the external device currently reproducing media data.

According to an embodiment, the electronic device 1305 may obtain information for performing a task of allowing media data being reproduced by the smartphone 1303-3 to be mirrored to the projector 1303-4, on the basis of results of performing voice recognition and natural-language understanding with respect to "Play this, using that" and the identified smartphone 1303-3 and projector 1303-4. For example, according to the obtained information, the electronic device 1305 may directly transmit the instruction to allow media data, which is being reproduced by the smartphone 1303-3, to be mirrored to the projector 1303-4, or may transmit, to the smartphone 1303-3, the instruction to allow media data, which is being reproduced by the smartphone 1303-3, to be mirrored to the projector 1303-4, via a server (e.g., 1209 of FIG. 12B). According to an embodiment, the instruction may include an instruction to allow the smartphone 1303-3 to perform a first function and to allow the projector 1303-4 to perform a second function.

According to various embodiments, upon reception of the instruction, the smartphone 1303-3 performs a first function of transferring currently reproduced media data to the projector 1303-4, and the projector 1303-4 performs a second function of projecting the media data received from the smartphone 1303-3, so that the instruction to allow the media data being reproduced by the smartphone 1303-3 to be mirrored to the projector 1303-4 may be executed.

The smartphone 1303-3 and the projector 1303-4 may transmit, to the electronic device 1305, an instruction execution result including instruction execution success, instruction execution failure, or instruction execution completion. The electronic device 1305 may output the instruction execution result in various forms of information, such as sound information, display information, vibration information, or a combination of at least some of the forms of information. According to various embodiments, the smartphone 1303-3 or the projector 1303-4 may also output the instruction execution result in various forms of information, such as sound information, display information, or vibration information.

Figure 13C:
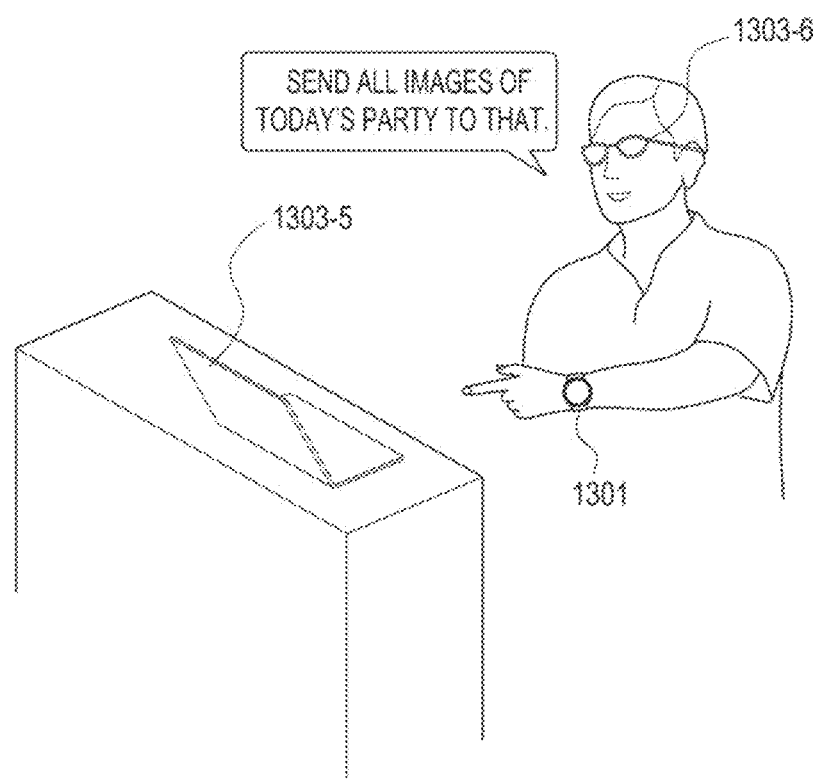

Referring to FIG. 13C, the electronic device 1301 (e.g., 101 of FIG. 1, 201 of FIG. 2, 401 of FIG. 4, or 1201 of FIGS. 12A and 12B) may receive a voice signal uttered by a user, for example, "Send all images of today's party to that", and may receive signals from a notebook 1303-5 and smart glasses 1303-6.

The electronic device 1301 may obtain first information for a list of devices associated with each other on the basis of at least a part of a received voice signal, for example, "images of today's party" and "send".

The electronic device 1301 may obtain second information of a device toward which the electronic device 1301 is oriented, on the basis of a signal received from each of the notebook 1303-5 and the smart glasses 1303-6. According to an embodiment, the electronic device 1301 may obtain second information of the device toward which the electronic device 1301 is oriented, on the basis of phase differences of the respective signals received from peripheral devices including the notebook 1303-5 and the smart glasses 1303-6.

The electronic device 1301 may identify the notebook 1303-5 on the basis of the first information and the second information. According to various embodiments, in a case where voice data contains an instruction, such as "send", which requires interworking with two devices while only one external electronic device, such as the notebook 1305-5, is identified, the electronic device 1301 may further identify another external device (e.g., the smart glasses 1303-6) by searching for an external device being worn by a user from among peripheral devices, the external device closest to the electronic device 1301, or an external device that is likely to have party images stored therein. According to an embodiment, the electronic device 1301 may obtain information for performing a task of allowing the smart glasses 1303-6 to store all party images captured on that day in the notebook 1303-5, on the basis of results of performing voice recognition and natural-language understanding with respect to "Send all images of today's party to that" and the identified notebook 1303-5 and smart glasses 1303-6. For example, the smart glasses 1303-6 may be implemented as the electronic device 201 in FIG. 2, and may capture an image by using a camera (e.g., the camera module 291 in FIG. 2). According to various embodiments, on the basis of the obtained information, the electronic device 1301 may directly transmit, to the smart glasses 1303-6, the instruction to allow all party images captured on that day to be stored in the notebook 1303-5, or may transmit the instruction to allow all party images captured on that day to be stored in the notebook 1303-5 to the smart glasses 1303-6 via a connection server (e.g., 1209 of FIG. 12B). According to an embodiment, the instruction may include an instruction to allow the smart glasses 1303-6 to perform a first function and to allow the notebook 1303-5 to perform a second function.

According to various embodiments, upon reception of the instruction, the smart glasses 1303-6 may perform a first function of searching for image data of today's party from among stored data and transferring the retrieved image data to the notebook 1303-5, and the notebook 1303-5 may perform a second function of storing party image data received from the smart glasses 1303-6, so that the task of storing all party images captured on that day in the notebook 1303-5 may be performed.

According to various embodiments, the notebook 1303-5 or the smart glasses 1303-6 may transmit, to the electronic device 1301, an instruction execution result including instruction execution success, instruction execution failure, or instruction execution completion. The electronic device 1301 may output the instruction execution result in various forms of information, such as sound information, display information, vibration information, or a combination of at least some of the forms of information. According to various embodiments, the notebook 1303-5 or the smart glasses 1303-6 may also output the instruction execution result in various forms of information, such as sound information, display information, or vibration information.

Figure 13D:
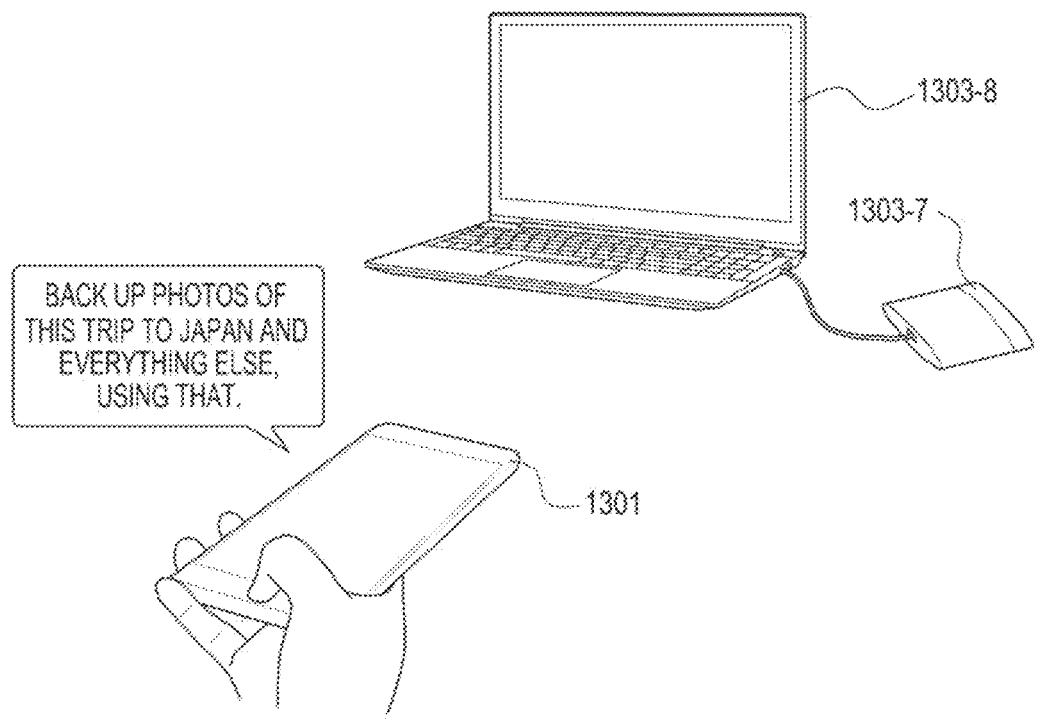

Referring to FIG. 13D, the electronic device 1301 (e.g., 101 of FIG. 1, 201 of FIG. 2, 401 of FIG. 4, or 1201 of FIGS. 12A and 12B) may receive a voice signal uttered by a user, for example, "Back up photos of this trip to Japan and everything else, using that", and may receive signals from a storage device 1303-7 (e.g., a hard drive disc (HDD) or SSD) and a notebook 1303-8.

The electronic device 1301 may obtain first information for a list of devices associated with each other on the basis of at least a part of a received voice signal, for example, "back up". According to various embodiments, the electronic device 1301 may obtain first information (e.g., an external device list) corresponding to information related to an indication target, a demonstrative pronoun, an instruction, or a function, on the basis of the received voice signal. According to various embodiments, the electronic device 1301 may autonomously perform voice recognition and natural-language understanding on the basis of the received voice signal to obtain first information corresponding to the information related to the indication target, the demonstrative pronoun, the instruction, or the function, or may transmit the voice signal (e.g., data corresponding to the voice signal) to an external server (e.g., the server 405) and may acquire, from the server, the first information corresponding to the information related to the indication target, the demonstrative pronoun, the instruction, or the function according to the results of performing the voice recognition and the natural-language understanding.

The electronic device 1301 may obtain second information of a device toward which the electronic device 1301 is oriented, on the basis of signals received from the storage device 1303-7 and the notebook 1303-8. According to an embodiment, the electronic device 1301 may obtain second information of the device toward which the electronic device 1301 is oriented, on the basis of phase differences of the respective signals received from peripheral devices including the storage device 1303-7 and the notebook 1303-8.

The electronic device 1301 may identify the storage device 1303-7 on the basis of the first information and the second information.

According to various embodiments, in a case where a storage device that stores "photos of trip to Japan and everything else" is not designated and only data to be stored, i.e., "photos of trip to Japan and everything else", is understood according to the results of performing voice recognition and natural-language understanding with respect to "Back up photos of this trip to Japan and everything else, using that", the electronic device 1301 may search for external devices that store photos of a trip to Japan so as to further select an external device, such as the notebook 1303-8, that stores photos of a trip to Japan. According to an embodiment, the electronic device 1301 may obtain information for performing a task of allowing all photos of the trip to Japan and other additional photos, which are stored in the notebook 1303-8, to be stored in the storage device 1303-7, on the basis of results of performing voice recognition and natural-language understanding with respect to "Back up photos of this trip to Japan and everything else, using that", and the identified storage device 1303-7 and notebook 1303-8.

According to various embodiments, on the basis of the obtained information, the electronic device 1301 may directly transmit, to the notebook 1303-8, the instruction to allow all photos of the trip to Japan and other additional photos to be stored in the storage device 1303-7, and may transmit the instruction to allow all photos of the trip to Japan and other additional photos to be stored in the storage device 1303-7 to the notebook 1303-8 via a connection server (e.g., 1209 of FIG. 12B). According to an embodiment, the instruction may include an instruction to allow the notebook 1303-8 to perform a first function and to allow the storage device 1303-7 to perform a second function.

According to various embodiments, upon reception of the instruction, the notebook 1303-8 may perform a first function of selecting all of photos of a trip to Japan and other additional photos from among stored data and transferring the selected photos to the storage device 1303-7, and the storage device 1303-7 may perform a second function of storing the received photos of a trip to Japan, so that the instruction to allow all photos of the trip to Japan and other additional photos to be stored in the storage device 1303-7 may be executed. According to an embodiment, the storage device 1303-7 may generate a directory to store photos of a trip to Japan and may store the photos of a trip to Japan in the generated directory.

The storage device 1303-7 or the notebook 1303-8 may transmit, to the electronic device 1301, an instruction execution result including instruction execution success, instruction execution failure, or instruction execution completion. The electronic device 1301 may output the instruction execution result in various forms of information, such as sound information, display information, vibration information, or a combination of at least some of the forms of information. According to various embodiments, the storage device 1303-7 or the notebook 1303-8 may also output the instruction execution result in various forms of information, such as sound information, display information, or vibration information. According to various embodiments, when another external device having a storage function is further selected in addition to the storage device 1303-7, the photos of a trip to Japan may also be transmitted to other selected external devices and stored therein.

Figure 13E:
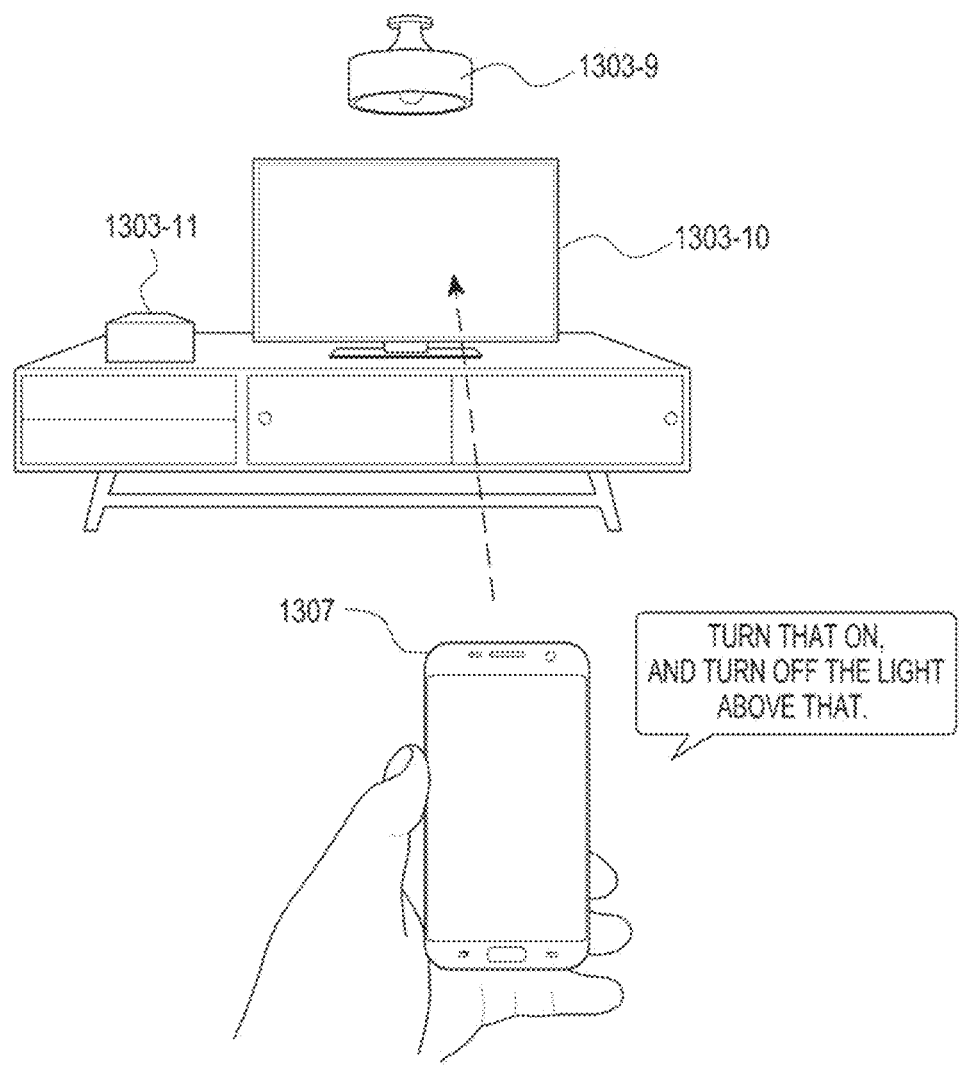

Referring to FIG. 13E, an electronic device 1307 (e.g., 101 of FIG. 1, 201 of FIG. 2, 401 of FIG. 4, or 1201 of FIGS. 12A and 12B) may receive a voice signal uttered by a user, for example, "Turn that on, and turn on the light above that", and may receive signals from a smart light 1303-9, a TV 1303-10, and a hub device 1303-11.

The electronic device 1301 may obtain first information for a list of devices associated with each other on the basis of at least a part of a received voice signal, for example, "turn on" and "turn on the light".

The electronic device 1307 may obtain second information of a device toward which the electronic device 1307 is oriented, on the basis of a signal received from each of the smart light 1303-9, the TV 1303-10, and the hub device 1303-11. According to an embodiment, the electronic device 1307 may obtain second information of the device toward which the electronic device 1307 is oriented, on the basis of phase differences of the respective signals received from peripheral devices including the smart light 1303-9, the TV 1303-10, and the hub device 1303-11.

The electronic device 1307 may identify each of the TV 1303-10 and the smart light 1303-9, toward which the electronic device 1307 is oriented, on the basis of the first information and the second information. According to various embodiments, the electronic device 1307 may determine whether the identified TV 1303-10 and smart light 1303-9 are devices connected to a connection server, for example, the hub device 1303-11, and may identify that the device to perform a control operation for the TV 1303-10 and the smart light 1303-9 according to a user input is the hub device 1303-11.

According to various embodiments, the electronic device 1307 may obtain information for performing a task of turning on the TV 1303-10 and turning on the smart light 1303-9, on the basis of a result of performing natural-language understanding with respect to "Turn that on, and turn off the light above that" and the identified TV 1303-10 and smart light 1303-9. According to various embodiments, the electronic device 1307 may transmit the instruction to turn on the TV 1303-10 and turn off the smart light 1303-9 to the hub device 1303-11 according to the obtained information. According to various embodiments, the instruction may include at least a part of information related to a task (e.g., a function for separate performance in the TV 1303-10 and the smart light 1303-9) for separate performance in the TV 1303-10 and the smart light 1303-9, at least partially on the basis of, for example, a user input (e.g., voice input, touch input, gesture input, or the like) and signals received by the electronic device 1307 from the TV 1303-10 and the smart light 1303-9.

According to various embodiments, upon reception of an instruction, the hub device 1303-11 may perform communication connection with each of the TV 1303-10 and the smart light 1303-9, and may execute an instruction to turn off the TV 1303-10 and turn on the smart light 1303-9 via interworking with each of the TV 1303-10 and the smart light 1303-9. According to an embodiment, the instruction may include a first function to allow the TV 1303-10 to turn off the power thereof, and a second function to allow the smart light 1303-9 to turn on the power thereof.

The hub device 1303-11 may transmit, to the electronic device 1307, an instruction execution result including instruction execution success, instruction execution failure, or instruction execution completion. The electronic device 1307 may output the instruction execution result in various forms of information, such as sound information, display information, vibration information, or a combination of at least some of the forms of information. According to various embodiments, the hub device 1303-11 or the TV 1303-10 and the smart light 1303-9 may also output the instruction execution result in various forms of information, such as sound information, display information, or vibration information.

Figure 14:
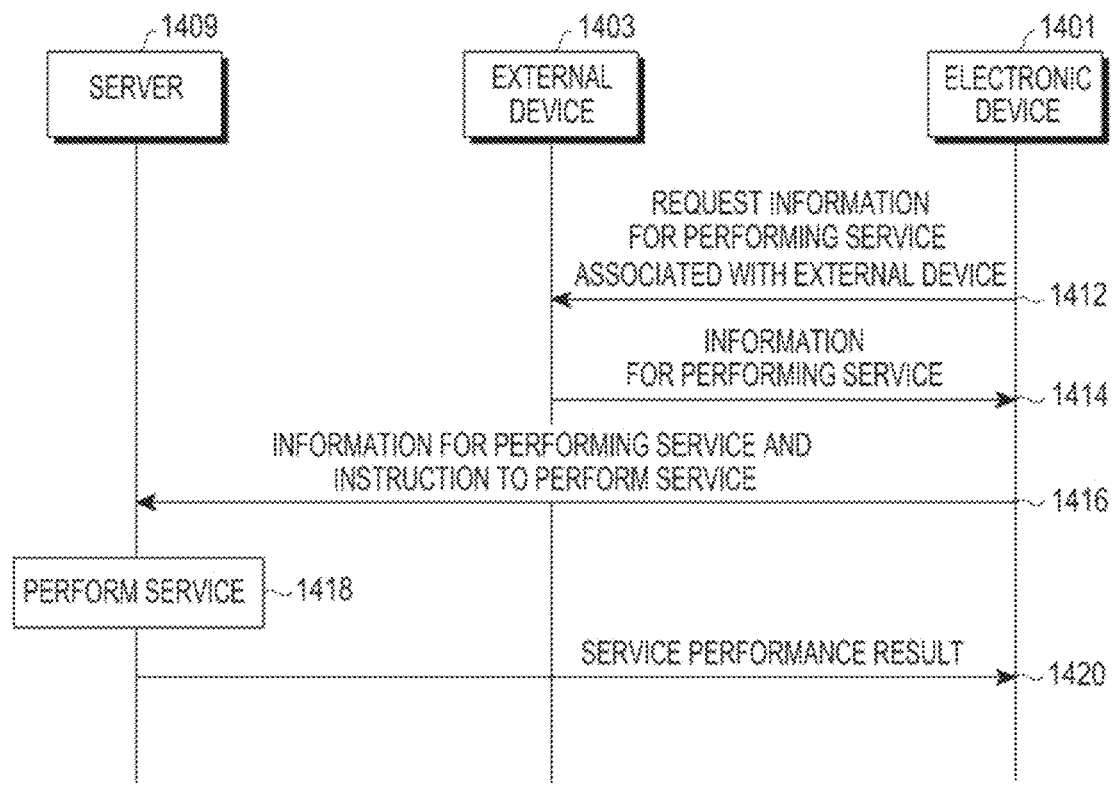
FIG. 14 is a flow diagram illustrating operations of receiving a service associated with an external device by the electronic device according to an embodiment of the disclosure.

FIG. 14 is a flow diagram illustrating operations of receiving a service associated with an external device by the electronic device according to an embodiment of the disclosure.

Referring to FIG. 14, according to an embodiment, information for performing a task of receiving a service associated with an external device may include sequence information of states relating to operations 1412 to 1420. An electronic device 1401 (e.g., 101 of FIG. 1, 201 of FIG. 2, or 401 of FIG. 4) may perform operations 1412, 1416, and 1420 by using the sequence information of states related to operations 1412, 1416, and 1420.

According to an embodiment, information that allows the electronic device 1401 to separately or sequentially perform operations 1412, 1416, and 1420 may include rule path information related to at least a part of operations 1412, 1416, and 1420. For example, the rule path information may include information that enables the electronic device 1401 to execute a specific application and separately or sequentially perform operations 1412, 1416, and 1420 via the executed specific application, or may include status information of operations 1412, 1416, and 1420 for performing a user instruction by the electronic device 1401.

According to an embodiment, in operation 1412, the electronic device 1401 may request, from an external device 1403 (e.g., an identified external device among the first to Nth external devices 403-1 to 403-N of FIG. 4 and FIGS. 5A and 5B), information necessary for performing a service associated with the external device 1403. According to an embodiment, the electronic device 1401 may transmit an information request by using a communication protocol enabling communication with the external device 1403. According to various embodiments, the communication protocol may include at least one among a Bluetooth protocol, a Bluetooth low energy (BLE) protocol, a Wi-Fi protocol, a beacon protocol, a ZigBee protocol, and a near field communication (NFC) protocol. According to an embodiment, the communication protocol may further include another communication protocol designated for an internet-of-things (IoT) service. According to various embodiments, the service associated with the external device 1403 may include various services, such as a purchase service, a sale service, or a booking service, which is associated with the external device 1403. According to various embodiments, information necessary for performing the service associated with the external device 1403 may include information related to purchase, sale, or booking, which is autonomously performed by the external device 1403, and information related to purchase, sale, or booking, which is provided via the external device 1403.

The external device 1403 may transmit the information necessary for performing the service associated with the external device 1403, in operation 1414. In operation 1416, the electronic device 1401 may transfer the information necessary for performing the service associated with the external device 1403 and a service performance instruction to the external server 1409 (e.g., a service server). The instruction may include at least a part of information related to a task (e.g., a function for performance by the server 1418) for performing the service associated with the external device 1403, at least partially on the basis of, for example, a user input (e.g., voice input, touch input, or gesture input) and a signal received by the electronic device 1401 from the external device 1403.

According to various embodiments, the server 1409 may be a server that provides a service related to purchase, sale, or booking.

In operation 1418, the server 1409 may receive the information necessary for performing the service and the service performance method so as to perform the service. According to various embodiments, a function related to purchase, sale, or booking may be performed using the information necessary for performing the service, according to the service performance instruction. For example, a function of purchase, sale, or booking of a product may be performed, or a function related to purchase, sale, or booking of the product may be performed.

The server 1409 may transmit a service performance result to the electronic device 1401 in operation 1420. According to various embodiments, the service performance result may include information for notification of success in service performance according to the instruction, failure in service performance according to the instruction, or a service performance result according to the instruction. The electronic device 1401 may output the instruction execution result. According to various embodiments, the electronic device 1401 may output the instruction execution result in various forms of information, such as sound information, display information, vibration information, or a combination of at least some of the forms of information.

Figure 15A:
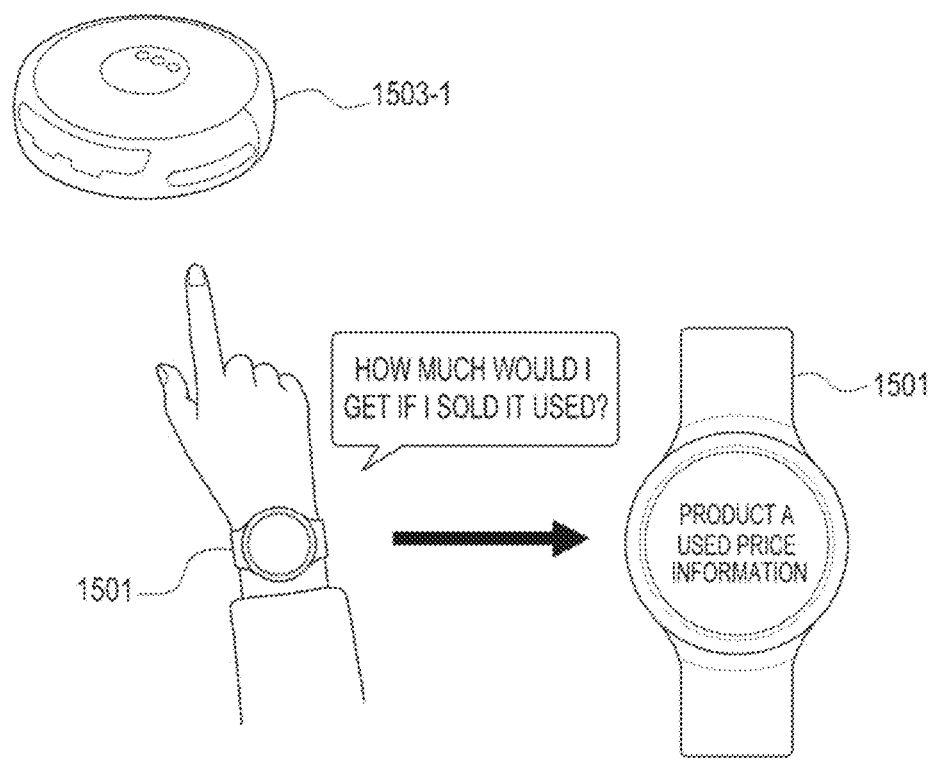
FIGS. 15A, 15B, and 15C are diagrams illustrating examples of receiving a service associated with an external device by the electronic device according to various embodiments of the disclosure.
Figure 15B:
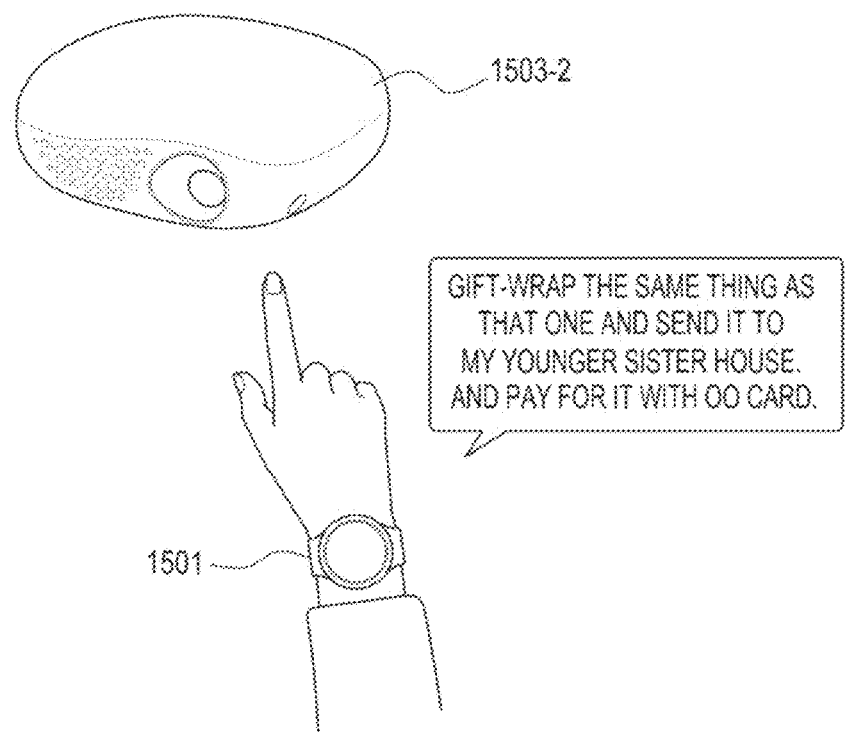
Figure 15C:
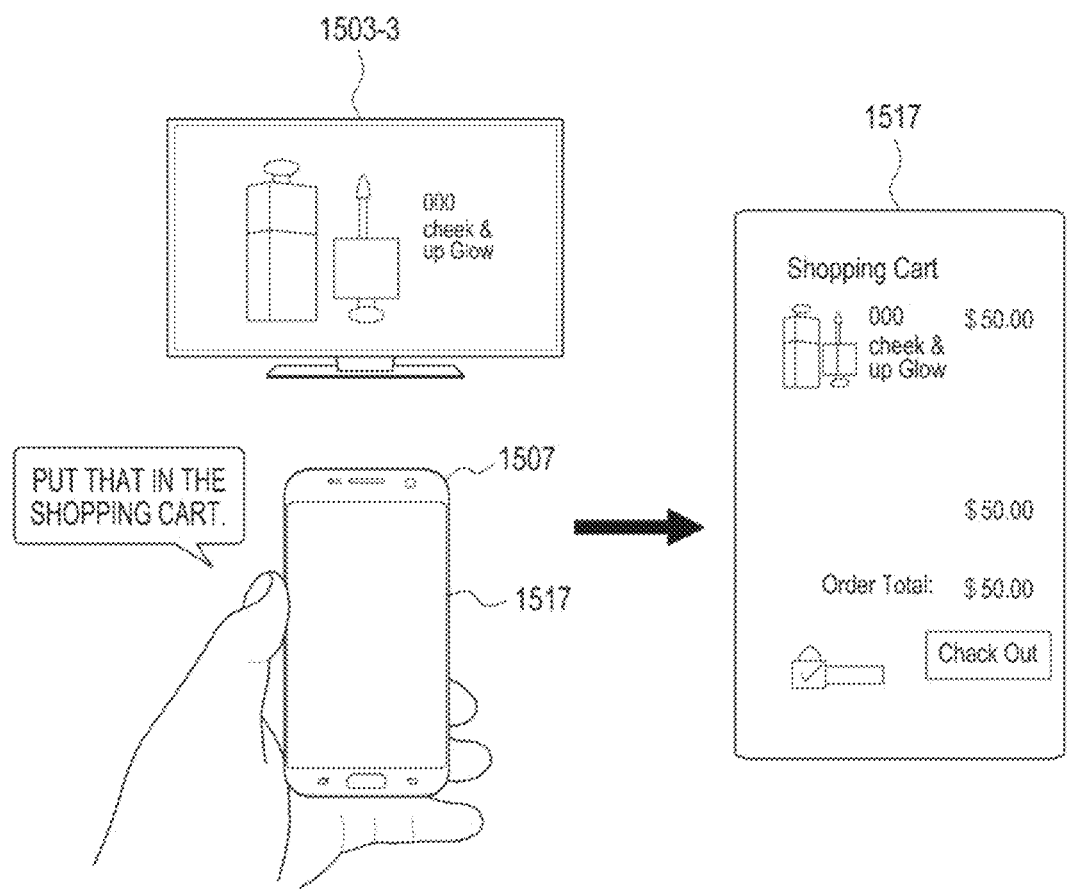

FIGS. 15A to 15C are diagrams illustrating examples of receiving a service associated with an external device by the electronic device according to various embodiments of the disclosure.

Referring to FIG. 15A, an electronic device 1501 (e.g., 101 of FIG. 1, 201 of FIG. 2, 401 of FIG. 4, or 1401 of FIG. 14) may receive a voice signal uttered by a user, for example, "How much would I get if I sold it used?", and may receive a signal from a CD player 1503-1. The electronic device 1501 may obtain first information for a list of devices associated with each other on the basis of at least a part of a received voice signal, for example, "used" and "sold". According to various embodiments, the electronic device 1501 may obtain first information (e.g., an external device list) corresponding to information related to an indication target, a demonstrative pronoun, an instruction, or a function, on the basis of the received voice signal. According to various embodiments, the electronic device 1501 may autonomously perform voice recognition and natural-language understanding on the basis of the received voice signal to obtain first information corresponding to the information related to the indication target, the demonstrative pronoun, the instruction, or the function, or may transmit the voice signal (e.g., data corresponding to the voice signal) to an external server (e.g., the server 405) and may acquire, from the server, the first information corresponding to the information related to the indication target, the demonstrative pronoun, the instruction, or the function according to the results of performing the voice recognition and the natural-language understanding.

The electronic device 1501 may obtain second information of a device toward which the electronic device 1501 is oriented, on the basis of a signal received from the CD player 1503-1. According to an embodiment, the electronic device 1501 may obtain second information of the device toward which the electronic device 1501 is oriented, on the basis of phase differences of the respective signals received from peripheral devices including the CD player 1503-1.

The electronic device 1501 may identify that an external device to perform an instruction corresponding to a user input is the CD player 1503-1, on the basis of the first information and the second information.

According to various embodiments, the electronic device 1501 may obtain information for performing a task of receiving used price information of the CD player 1503-1, on the basis of a result of performing natural-language understanding with respect to "How much would I get if I sold it used?" and the identified CD player 1503-1. According to various embodiments, the electronic device 1501 may transmit, to a server (e.g., the server 405), the voice signal relating to "How much would I get if I sold it used?" and information of the identified CD player 1503-1, and may receive information for performing the task of receiving the used price information of the CD player 1503-1 from the server 405.

According to various embodiments, the electronic device 1501 may request, from the CD player 1503-1, information necessary for obtaining a used price of the CD player 1503-1, according to the obtained information. According to various embodiments, the information necessary for obtaining the used price of the CD player 1503-1 may include a model name, a MAC address, an ID value, or the like.

According to various embodiments, the CD player 1503-1 may transmit the information necessary for obtaining the used price to the electronic device 1501. The electronic device 1501 may transfer the received information necessary for obtaining the used price and a used price search instruction to an external server (e.g., the server 1409). The server 1409 may obtain a used price of the CD player 1503-1 by searching for the model of the CD player 1503-1 by using a model name, a MAC address, or an ID value of the CD player 1503-1, and calculating an analysis value obtained by analyzing recent trading records or market prices of corresponding products or similar products, big data reputation, etc., in order to find out the price of the retrieved model at the latest sales and the maximum price when the CD player 1503-1 is sold on the used market. The server 1409 may transmit the obtained used price information to the electronic device 1501. The electronic device 1501 may output the used price information. According to various embodiments, the electronic device 1501 may output the used price information, in various forms of information, such as sound information, display information, or a combination of at least some of the forms of information. According to an embodiment, a server (e.g., the server 405) that receives the voice signal from the electronic device 1501 to provide results of performing voice recognition and natural-language understanding and a server (e.g., the server 1409) that provides the service may be separate servers or may be one integrated server.

Referring to FIG. 15B, the electronic device 1501 (e.g., 101 of FIG. 1, 201 of FIG. 2, 401 of FIG. 4, or 1401 of FIG. 14) may receive a voice signal uttered by a user, for example, "Gift-wrap the same thing as that one and send it to my younger brother/sister's house. And pay for it with OO card", and may receive a signal from a projector 1503-2.

The electronic device 1501 may obtain first information for a list of devices associated with each other on the basis of at least a part of a received voice signal, for example, "Gift-wrap the same thing as that one and send it to my younger sister/brother's house. And pay for it with OO card". For example, when there is no device associated with a part of "Gift-wrap the same thing as that one and send it to my younger sister/brother's house. And pay for it with OO card", the electronic device 1501 may obtain information providing an instruction to identify a device to perform a task by using, as first information of an associated device, second information of a device toward which the electronic device 1501 is oriented.

The electronic device 1501 may obtain the second information of the device toward which the electronic device 1501 is oriented, on the basis of a signal received from the projector 1503-2. According to an embodiment, the electronic device 1501 may receive the second information of the device toward which the electronic device 1501 is oriented, on the basis of phase differences of the respective signals received from peripheral devices including the projector 1503-2. The electronic device 1501 may identify the projector 1503-2 on the basis of the first information and the second information.

According to various embodiments, the electronic device 1501 may obtain information for performing the task of receiving a purchase service for the projector 1503-2, on the basis of a result of performing natural-language understanding of "Gift-wrap the same thing as that one and send it to my younger sister/brother's house. And pay for it with OO card" and the identified projector 1503-2. According to an embodiment, the electronic device 1501 may transmit, to a server (e.g., the server 405), the voice signal with respect to "Gift-wrap the same thing as that one and send it to my younger sister/brother's house. And pay for it with OO card" and information of the identified projector 1503-2, and may receive the information for performing the task of receiving the purchase service for the projector 1503-2 from the server 405.

According to various embodiments, the electronic device 1501 may request, from the projector 1503-2, information necessary for purchasing the projector 1503-2, according to the obtained information. According to various embodiments, the information necessary for purchasing the projector 1503-2 may include a MAC address, an ID value, or previously input name information of the projector 1503-2. The projector 1503-2 may transmit the information necessary for purchasing to the electronic device 1501. The electronic device 1501 may transfer the received information necessary for purchase and a purchase instruction to an external server (e.g., the server 1409). The server 409 may perform a purchase function of searching for the same model as the projector 1503-2 by using a MAC address, an ID value, or previously input name information of the projector 1503-2, selecting OO card from among previously input cards to make a payment, searching for contact information of a user, an address book, recent GPS, the user's SNS record, a recent shipping address, etc., and then setting automatic shipping to a final destination, i.e., a younger brother/sister's house. The server 1409 may transmit a function performance result to the electronic device 1501. The electronic device 1501 may output a purchase function performance result. According to various embodiments, the electronic device 1501 may output the purchase function performance result in various forms of information, such as sound information, display information, or the like. According to an embodiment, the server (e.g., the server 1409) may transmit, to the electronic device 1501, an instruction including information of operations to be performed in order to purchase the projector 1503-2, and the electronic device 1501 may perform the purchase function on the basis of the received instruction.

Referring to FIG. 15C, an electronic device 1507 (e.g., 101 of FIG. 1, 201 of FIG. 2, 401 of FIG. 4, or 1401 of FIG. 14) may receive a voice signal uttered by a user, for example, "Put that in the shopping cart", and may receive a signal from a display device 1503-3. The electronic device 1507 may obtain first information for a list of devices associated with each other on the basis of at least a part of a received voice signal, for example, "Put that in the shopping cart". For example, the electronic device 1507 may obtain devices capable of performing a shopping cart service, as first information of an associated device, on the basis of "put in the shopping cart" in "Put that in the shopping cart", or when no device associated with a part of "Put that in the shopping cart" is present, the electronic device 1507 may acquire, as first information, information providing an instruction to identify an electronic device to perform a task via second information of a device toward which the electronic device 1507 is oriented.

The electronic device 1507 may obtain the second information of the device toward which the electronic device 1507 is oriented, on the basis of a signal received from the display device 1503-3. According to an embodiment, the electronic device 1507 may obtain the second information of the device toward which the electronic device 1507 is oriented, on the basis of phase differences of the respective signals received from peripheral devices including the display device 1503-3. The electronic device 1507 may identify the display device 1503-3 on the basis of the first information and the second information.

According to various embodiments, the electronic device 1501 may obtain information for performing a task of receiving a service to put a product displayed on the display device 1503-3 in a shopping cart, on the basis of a result of performing natural-language understanding with respect to "Put that in the shopping cart" and the identified display device 1503-3. According to various embodiments, the electronic device 1507 may transmit, to a server (e.g., the server 405), a voice signal relating to "Put that in the shopping cart" and information of the identified display device 1503-3, and may receive, from the server 405, information for performing the task of receiving the service to put the product displayed on the display device 1503-3 in the shopping cart.

According to various embodiments, the electronic device 1501 may request, from the display device 1503-3, information associated with the product displayed on the display device 1503-3, according to the obtained information. According to various embodiments, the electronic device 1507 may request the information associated with the product displayed on the display device 1503-3, according to a result of performing natural-language understanding with respect to "Put that in the shopping cart". According to an embodiment, the information associated with the product displayed on the display device 1503-3 may include, for example, a keyword associated with the product displayed on the display device 1503-3, an image of the product displayed on the display device 1503-3, a name of the product displayed on the display device 1503-3, a manufacturer name, a distributor, or the like.

The display device 1503-3 may capture an image being displayed at a time point at which an information request is received from the electronic device 1507, may extract a keyword through an image search, may obtain information associated with the product displayed on the display device 1503-3 on the basis of the extracted keyword, and may transmit the obtained information to the electronic device 1507.

The electronic device 1507 may receive information associated with the product displayed on the display device 1503-3, and may transfer, to a service server (e.g., the service server 1409), a shopping cart addition instruction on the basis of the information associated with the product displayed on the display device 1503-3. According to various embodiments, upon reception of the shopping cart addition instruction, the service server 1409 may log-in to a shopping service site previously designated by a user, may search for a product matching the information associated with the product displayed on the display device 1503-3, and may put a retrieved product in a shopping cart of a user account. For example, the shopping service site designated by the user may be an online shopping mall server, and the shopping mall server may search for a product by using the information associated with the product displayed on the display device 1503-3, for example, a keyword associated with the product displayed on the display device 1503-3, an image of the product displayed on the display device 1503-3, a name of the product displayed on the display device 1503-3, a manufacturer name, a distributor, or the like.

The server 1409 may transmit a shopping cart addition function result to the electronic device 1507. The electronic device 1507 may output the shopping cart addition function result. According to various embodiments, the electronic device 1507 may output the shopping cart addition function result in various forms of information, such as sound information, display information, or the like. For example, the electronic device 1507 may display a shopping cart addition function result screen 1517.

Figure 16:
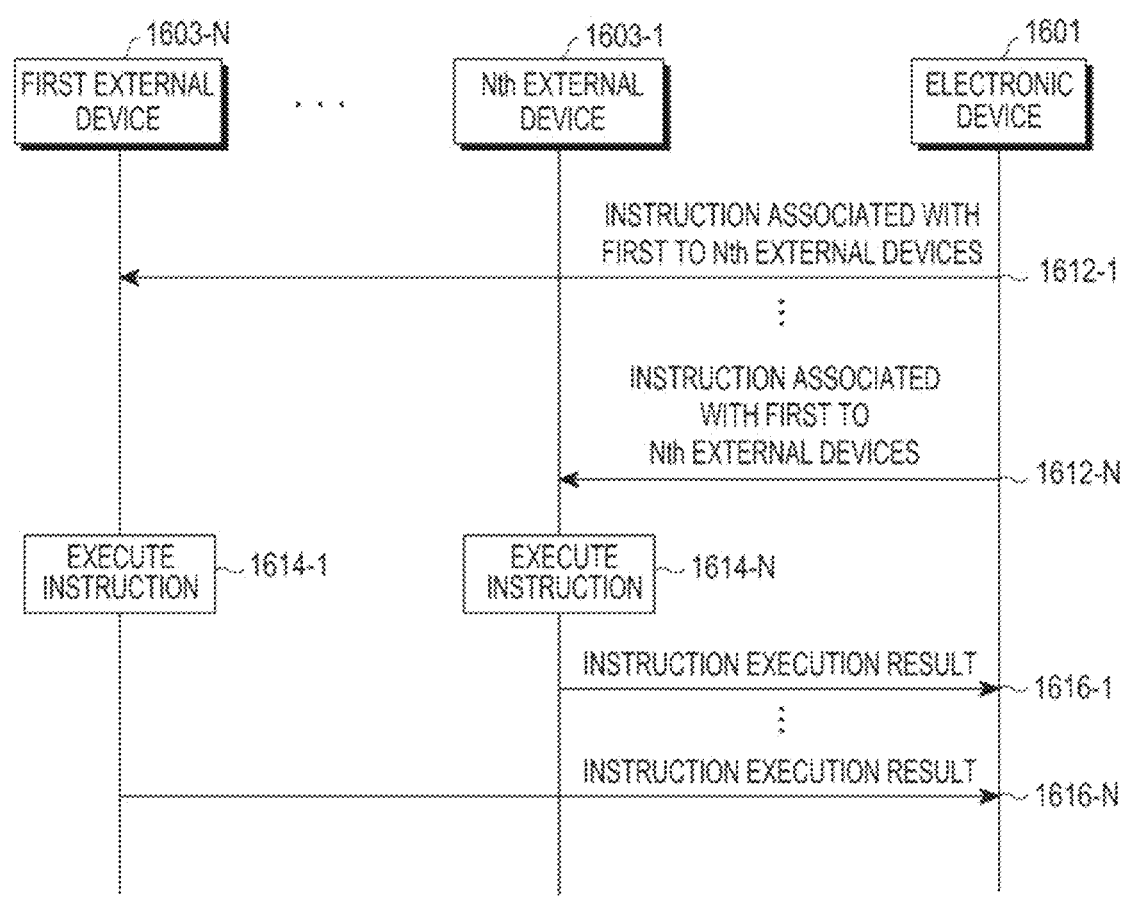
FIG. 16 is a flow diagram illustrating operations of transmitting an identical instruction to multiple external devices in the electronic device according to an embodiment of the disclosure.

FIG. 16 is a flow diagram illustrating operations of transmitting an identical instruction to multiple external devices in the electronic device according to an embodiment of the disclosure.

Referring to FIG. 16, according to an embodiment, information for performing a task of transmitting an identical instruction to multiple external devices may include sequence information of states related to operations 1612-1 to 1616-N. An electronic device 1601 (e.g., 101 of FIG. 1, 201 of FIG. 2, or 401 of FIG. 4) may perform operations 1612-1 to 1612-N by using the sequence information of states related to operations 1612-1 to 1612-N. According to an embodiment, the sequence information of states related to operations 1612-1 to 1612-N may include information that allows the electronic device 1601 to separately or sequentially perform operations 1612-1 to 1612-N. According to an embodiment, the information that allows the electronic device 1601 to separately or sequentially perform operations 1612-1 to 1612-N may include rule path information related to at least a part of operations 1612-1 to 1612-N. For example, the rule path information may include information that enables the electronic device 1601 to execute a specific application and separately or sequentially perform operations 1612-1 to 1612-N via the executed specific application, or may include status information of operations 1612-1 to 1612-N for performing a user instruction by the electronic device 1601.

According to an embodiment, in operations 1612-1 to 1612-N, the electronic device 1601 (e.g., 101 of FIG. 1, 201 of FIG. 2, 401 of FIG. 4) may transmit, to first to Nth selected external devices 1603-1 to 1603-N (e.g., the identified multiple external devices among the first to Nth external devices 403-1 to 403-N of FIG. 4 and FIGS. 5A and 5B), an instruction associated with each of the first to Nth selected external devices 1603-1 to 1603-N. According to various embodiments, the instruction associated with each of the first to Nth selected external devices 1603-1 to 1603-N may be identical to each other. The instruction may include at least a part of information related to a task to be performed by each of the first to Nth selected external devices 1603-1 to 1603-N, at least partially on the basis of a user input (e.g., voice input, touch input, gesture input, or the like) and signals received by the electronic device 1601 from the first to Nth selected external devices 1603-1 to 1603-N.

Each of the first to Nth selected external devices 1603-1 to 1603-N may execute an instruction in operations 1614-1 to 1614-N. According to an embodiment, on the basis of an instruction received from the electronic device 1601, each of the first to Nth selected external devices 1603-1 to 1603-N may determine a function corresponding to the instruction, and may perform the determined function.

Each of the first to Nth selected external devices 1603-1 to 1603-N may transmit an instruction execution result to the external device 1601 in operations 1616-1 to 1616-N. According to various embodiments, the instruction execution result may include information for notification of success in function performance according to the instruction, failure in function performance according to the instruction, or a function performance result according to the instruction.

The electronic device 1601 may output the instruction execution result obtained by each of the first to Nth selected external devices 1603-1 to 1603-N. According to various embodiments, the electronic device 1601 may output the instruction execution result obtained by each of the first to Nth selected external devices 1603-1 to 1603-N, in various forms of information, such as sound information, display information, vibration information, or a combination of at least some of the forms of information.

Figure 17A:
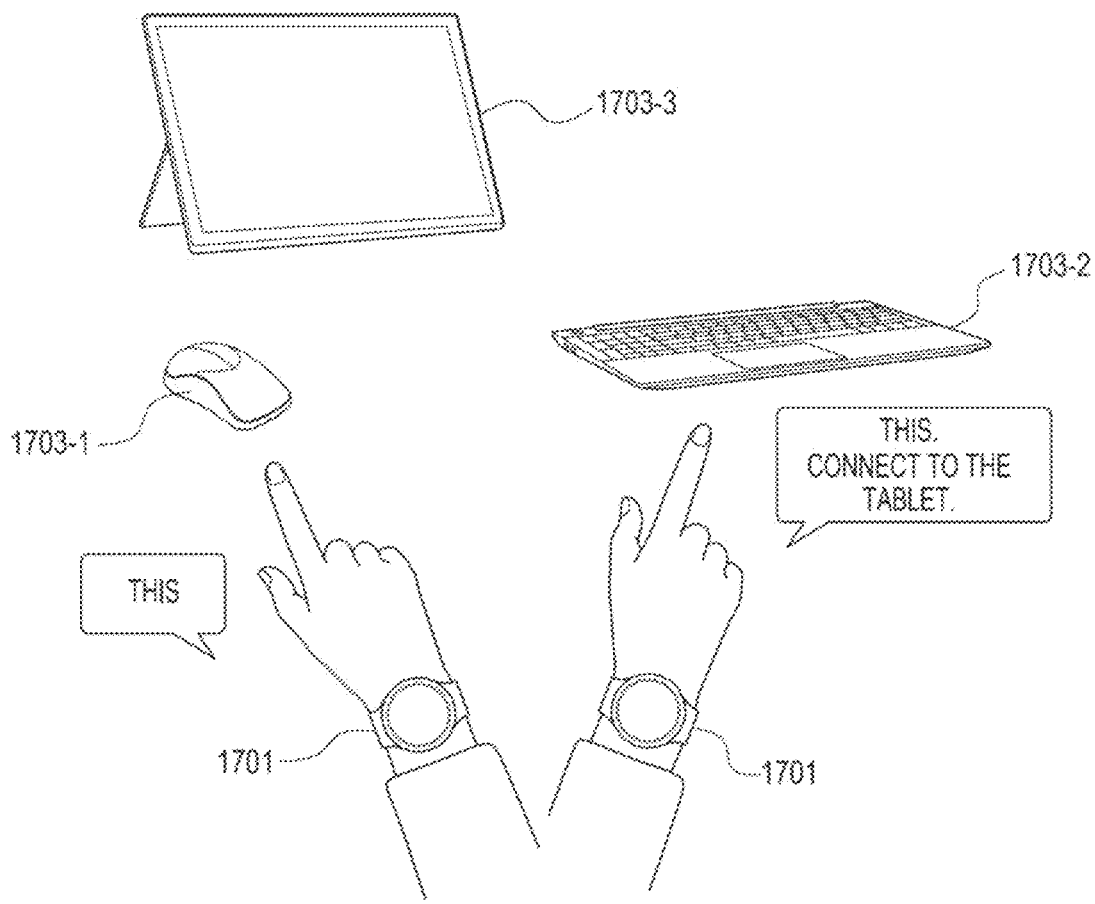
FIGS. 17A and 17B are diagrams illustrating examples of transmitting an identical instruction to multiple external devices in the electronic device according to various embodiments of the disclosure.
Figure 17B:
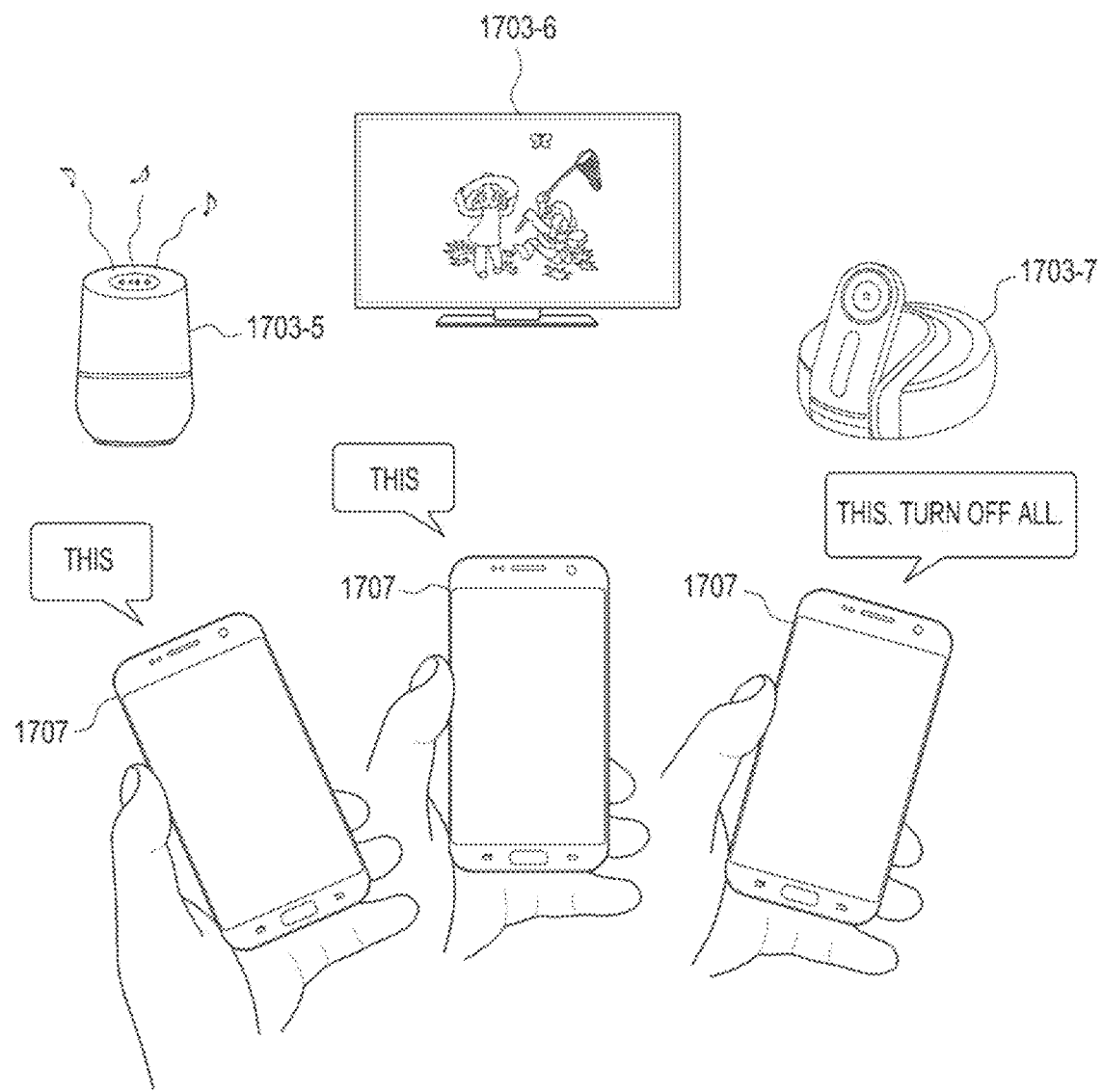

FIGS. 17A and 17B are diagrams illustrating examples of transmitting an identical instruction to multiple external devices in the electronic device according to various embodiments of the disclosure. According to various embodiments, an electronic device may be one of various types of electronic devices, such as a wearable device 1701 or a smartphone 1707 (hereinafter, the wearable device 1701 or the smartphone 1707 is referred to as electronic device), and may be another type of electronic device.

Referring to FIG. 17A, an electronic device 1701 (e.g., 101 of FIG. 1, 201 of FIG. 2, 401 of FIG. 4, or 1601 of FIG. 16) may sequentially receive voice signals uttered by a user, for example, "Connect this and this to the tablet", and may receive a signal from each of a wireless mouse 1703-1, a wireless keyboard 1703-2, and a tablet 1703-3.

According to various embodiments, the electronic device 1701 may obtain first information of devices associated with each other on the basis of at least a part of a received voice.

For example, the electronic device 1701 may acquire, as first information of associated devices, devices that can be connected with the tablet, on the basis of "connect to the table" from "Connect this and this to the tablet", or when there is no device associated with a part of "Connect this and this to the tablet", the electronic device 1701 may acquire, as first information, information providing an instruction to identify an electronic device to perform a task via second information of a device toward which the electronic device 1701 is oriented.

According to an embodiment, the electronic device 1701 may obtain first information (e.g., whether second information is needed) corresponding to information related to an indication target, a demonstrative pronoun, an instruction, or a function, obtained on the basis of a received voice signal. According to various embodiments, the electronic device 1701 may autonomously perform voice recognition and natural-language understanding on the basis of the received voice signal to obtain first information corresponding to the information related to the indication target, the demonstrative pronoun, the instruction, or the function, or may transmit the voice signal (e.g., data corresponding to the voice signal) to an external server (e.g., the server 405) and may acquire, from the server, the first information corresponding to the information related to the indication target, the demonstrative pronoun, the instruction, or the function according to the results of performing the voice recognition and the natural-language understanding.

According to various embodiments, the electronic device 1701 may obtain second information of a device toward which the electronic device 1701 is oriented, on the basis of signal received from the wireless mouse 1703-1, the wireless keyboard 1703-2, and the tablet 1703-3. According to an embodiment, the electronic device 1701 may obtain the second information of the device toward which the electronic device 1701 is oriented, on the basis of phase differences of the respective signals received from peripheral devices including the wireless mouse 1703-1, the wireless keyboard 1703-2, and the tablet 1703-3.

The electronic device 1701 may identify that external devices to perform an instruction corresponding to a user input are the wireless mouse 1703-1, the wireless keyboard 1703-2, and the tablet 1703-3, on the basis of the first information and the second information.

According to various embodiments, the electronic device 1701 may obtain information for performing a task of transmitting an instruction to connect with the wireless mouse 1703-1, the wireless keyboard 1703-2, and the tablet 1703-3, on the basis of a result of performing natural-language understanding with respect to "Connect this and this to the tablet" and the identified wireless mouse 1703-1, wireless keyboard 1703-2, and tablet 1703-3. The instruction may include at least a part of information related to a task to be performed by each of the wireless mouse 1703-1, the wireless keyboard 1703-2, and the tablet 1703-3, at least partially on the basis of a user input (e.g., voice input, touch input, gesture input, or the like) and a signal received by the electronic device 1701 from each of the wireless mouse 1703-1, the wireless keyboard 1703-2, and the tablet 1703-3.

According to various embodiments, on the basis of the obtained information, the electronic device 1701 may transfer an instruction to connect with the tablet 1703-3, which is an identical instruction on the basis of "connect them to the tablet", to each of the wireless mouse 1703-1 and the wireless keyboard 1703-2. According to various embodiments, the electronic device 1701 may directly transmit an instruction or may transmit the instruction via a server (e.g., 405 of FIG. 4 and FIG. 5A, or 809 of FIG. 8B). Upon reception of the instruction, each of the wireless mouse 1703-1 and the wireless keyboard 1703-2 may execute the instruction by starting a connection function with the tablet 1703-3. Each of the wireless mouse 1703-1 and the wireless keyboard 1703-2 may transmit, to the external device 1701, an instruction execution result including information for notification of success in connection with the tablet, failure in connection with the tablet, or completion of connection with the tablet. According to various embodiments, the electronic device 1701 may output the instruction execution result in various forms of information, such as sound information, display information, vibration information, or a combination of at least some of the forms of information. According to various embodiments, each of the wireless mouse 1703-1 and the wireless keyboard 1703-2 may also output the instruction execution result in various forms of information, such as sound information, display information, or vibration information.

Referring to FIG. 17B, an electronic device 1707 (e.g., 101 of FIG. 1, 201 of FIG. 2, 401 of FIG. 4, or 1601 of FIG. 16) may receive voice signals uttered by a user, for example, "Turn off this, this, and this" and may receive a signal from each of a speaker 1703-5, a TV 1703-6, and a lamp 1703-7. For example, in a case where a user orients the electronic device 1707 toward the speaker 1703-5 while uttering "Turn off this", orients the electronic device 1707 toward the TV 1703-6 while uttering "this" within a predetermined time, and then orients the electronic device 1707 toward the lamp 1703-7 while uttering "and this" within another predetermined time, the electronic device 1707 may obtain first information of associated devices on the basis of at least a part of voice signals "Turn off this", "this", and "and this" uttered by the user".

For example, an electronic device 1707 may obtain first information of devices associated with a power-off function on the basis of "turn off" in "Turn off this", "this", and "and this" or when no device associated with a part of "Turn off this", "this", and "and this" is present, the electronic device 1707 may acquire, as first information of an associated device, information providing an instruction to identify an electronic device to perform a task via second information of a device toward which the electronic device 1707 is oriented.

The electronic device 1707 may obtain first information including information indicating that the second information for obtaining information of devices associated based on "This" is required, and may obtain the second information of the device toward which the electronic device 1707 is oriented, on the basis of phase differences of the respective signals received from peripheral devices, for example, the speaker 1703-5, the TV 1703-6, and the lamp 1703-7. For example, when voices such as "Turn off this", "this", and "and this" is sequentially received, the electronic device 1707 may obtain the second information of the device toward which the electronic device 1707 is oriented, on the basis of a phase difference of each of signals received from the speaker 1703-5, the TV 1703-6, and the lamp 1703-7 during the reception period of each voice.

For example, the electronic device 1701 may identify the speaker 1703-5 on the basis of first information corresponding to the first "this" and second information obtained during the reception period of the first "This", may identify the TV 1703-6 on the basis of first information corresponding to the second "this" and second information obtained during the reception period of the second "this", and may identify the lamp 1703-7 on the basis of first information corresponding to "Turn off this" and second information obtained during the reception period of "Turn off this".

According to various embodiments, the electronic device 1707 may obtain information for performing a task of transmitting an instruction to turn off the power to the speaker 1703-5, the TV 1703-6, and the lamp 1703-7, on the basis of a result of performing natural-language understanding with respect to "Turn off this, this, and this" and the identified speaker 1703-5, TV 1703-6, and lamp 1703-7. The instruction may include at least a part of information related to a task to be performed by each of the speaker 1703-5, the TV 1703-6, and the lamp 1703-7, at least partially on the basis of a user input (e.g., voice input, touch input, gesture input, or the like) and a signal received by the electronic device 1707 from each of the speaker 1703-5, the TV 1703-6, and the lamp 1703-7.

According to various embodiments, on the basis of the obtained information, the electronic device 1707 may transfer an identical instruction to "turn off" to each of the speaker 1703-5, the TV 1703-6, and the lamp 1703-7. According to various embodiments, the electronic device 1707 may directly transmit an instruction or may transmit the instruction via a connection server (e.g., 405 of FIG. 4 and FIG. 5A, or 809 of FIG. 8B). Upon reception of the instruction, each of the speaker 1703-5, the TV 1703-6, and the lamp 1703-7 may execute the instruction by starting to power off. Each of the speaker 1703-5, the TV 1703-6, and the lamp 1703-7 may transmit, to the electronic device 1701, an instruction execution result including information for notification of success in starting to turn off the power or failure in starting to turn off the power. According to various embodiments, the electronic device 1707 may output the instruction execution result in various forms of information, such as sound information, display information, vibration information, or a combination of at least some of the forms of information. According to various embodiments, the speaker 1703-5, the TV 1703-6, and the lamp 1703-7 may also output the instruction execution result in various forms of information, such as sound information, display information, or vibration information.

Figure 18:
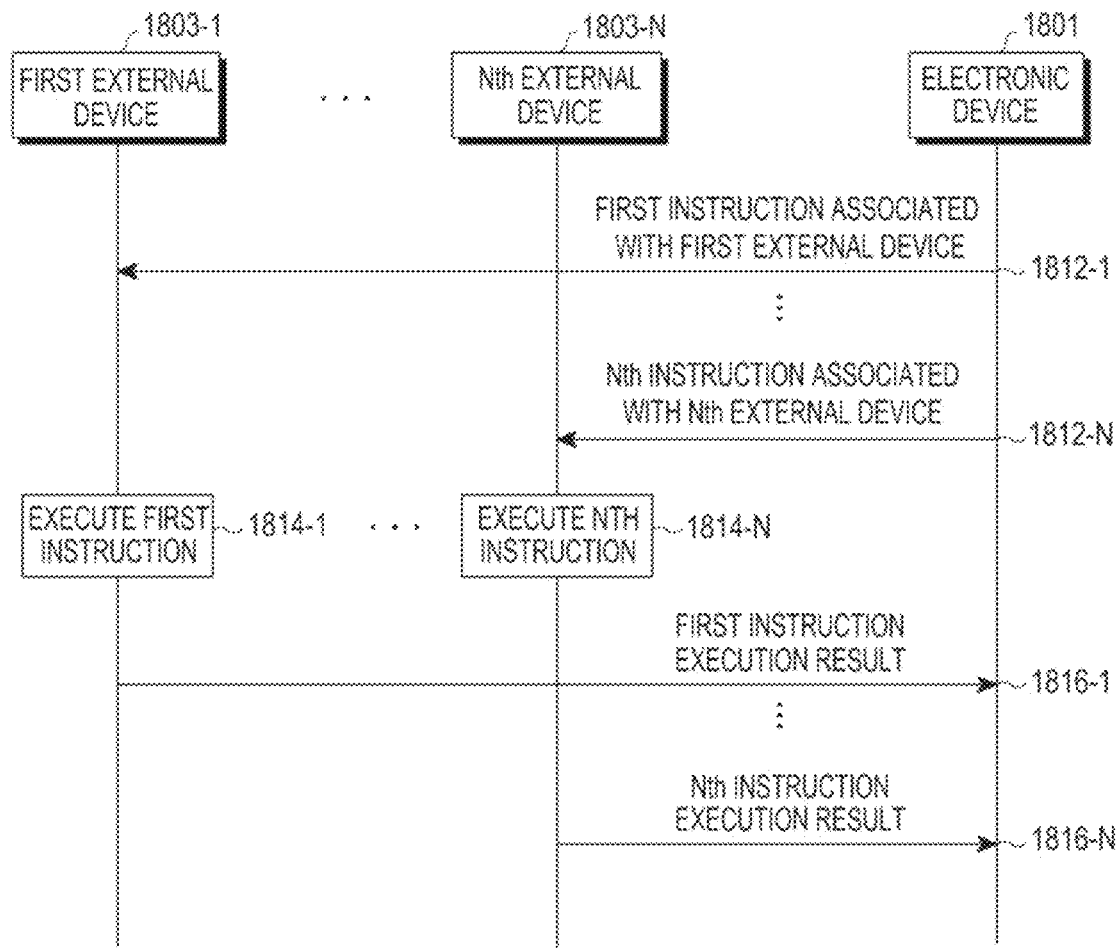
FIG. 18 is a flow diagram illustrating operations of transmitting different instructions to multiple external devices in the electronic device according to an embodiment of the disclosure.

FIG. 18 is a flow diagram illustrating operations of transmitting different instructions to multiple external devices in the electronic device according to an embodiment of the disclosure.

Referring to FIG. 18, according to an embodiment, information for performing a task of transmitting different instructions to multiple external devices may include sequence information of states related to operations 1812-1 to 1816-N. An electronic device 1801 (e.g., 101 of FIG. 1, 201 of FIG. 2, or 401 of FIG. 4) may perform operations 1812-1 to 1812-N by using the sequence information of states related to operations 1812-1 to 1812-N. According to an embodiment, the sequence information of states related to operations 1812-1 to 1812-N may include information that allows the electronic device 1801 to separately or sequentially perform operations 1812-1 to 1812-N. According to an embodiment, the information that allows the electronic device 1801 to separately or sequentially perform operations 1812-1 to 1812-N may include rule path information related to at least a part of operations 1812-1 to 1812-N. For example, the rule path information may include information that enables the electronic device 1801 to execute a specific application and separately or sequentially perform operations 1812-1 to 1812-N via the executed specific application, or may include status information of operations 1812-1 to 1812-N for performing a user instruction by the electronic device 1801.

According to an embodiment, in operations 1812-1 to 1812-N, the electronic device 1801 may transmit, to first to Nth selected external devices 1803-1 to 1803-N (e.g., the identified multiple external devices among the first to Nth external devices 403-1 to 403-N of FIG. 4 and FIGS. 5A and 5B), first to Nth instructions associated with the respective first to Nth selected external devices 1803-1 to 1803-N. The instruction may include at least a part of information related to a task to be performed by the first to Nth external devices 1803-1 to 1803-N at least partially on the basis of a user input (e.g., voice input, touch input, gesture input, or the like) and signals received by the electronic device 1801 from the first to Nth external devices 1803-1 to 1803-N.

According to various embodiments, the first to Nth instructions associated with the respective first to Nth selected external devices 1803-1 to 1803-N may be different from each other. For example, the external device 1803-1 having received the first instruction may perform a different function from that of the electronic device 1803-N having received the Nth instruction.

The first to Nth selected external devices 1803-1 to 1803-N may execute the first to Nth instructions, respectively, in operations 1814-1 to 1814-N. According to an embodiment, on the basis of an instruction received from the electronic device 1801, each of the first to Nth selected external devices 1803-1 to 1803-N may determine a function corresponding to the instruction, and may perform the determined function.

Each of the first to Nth selected external devices 1803-1 to 1803-N may transmit an instruction execution result to the external device 1801 in operations 1816-1 to 1816-N. According to various embodiments, the instruction execution result may include information for notification of success in function performance according to the instruction, failure in function performance according to the instruction, or a function performance result according to the instruction.

The electronic device 1801 may output the first to Nth instruction execution results obtained by the respective first to Nth selected external devices 1803-1 to 1803-N. According to various embodiments, the electronic device 1801 may output the instruction execution result obtained by each of the first to Nth selected external devices 1803-1 to 1803-N, in various forms of information, such as sound information, display information, vibration information, or a combination of at least some of the forms of information.

FIGS. 19A to 19E are diagrams illustrating examples of transmitting different instructions to multiple external devices in the electronic device according to various embodiments of the disclosure. According to various embodiments, the electronic device may be one of various types of electronic devices, such as a wearable device 1901, a remote cot 1905 or a smartphone 1907 (hereinafter, the wearable device 1901 or the smartphone 1907 are referred to as electronic device), and may be another type of electronic device.

Figure 19A:
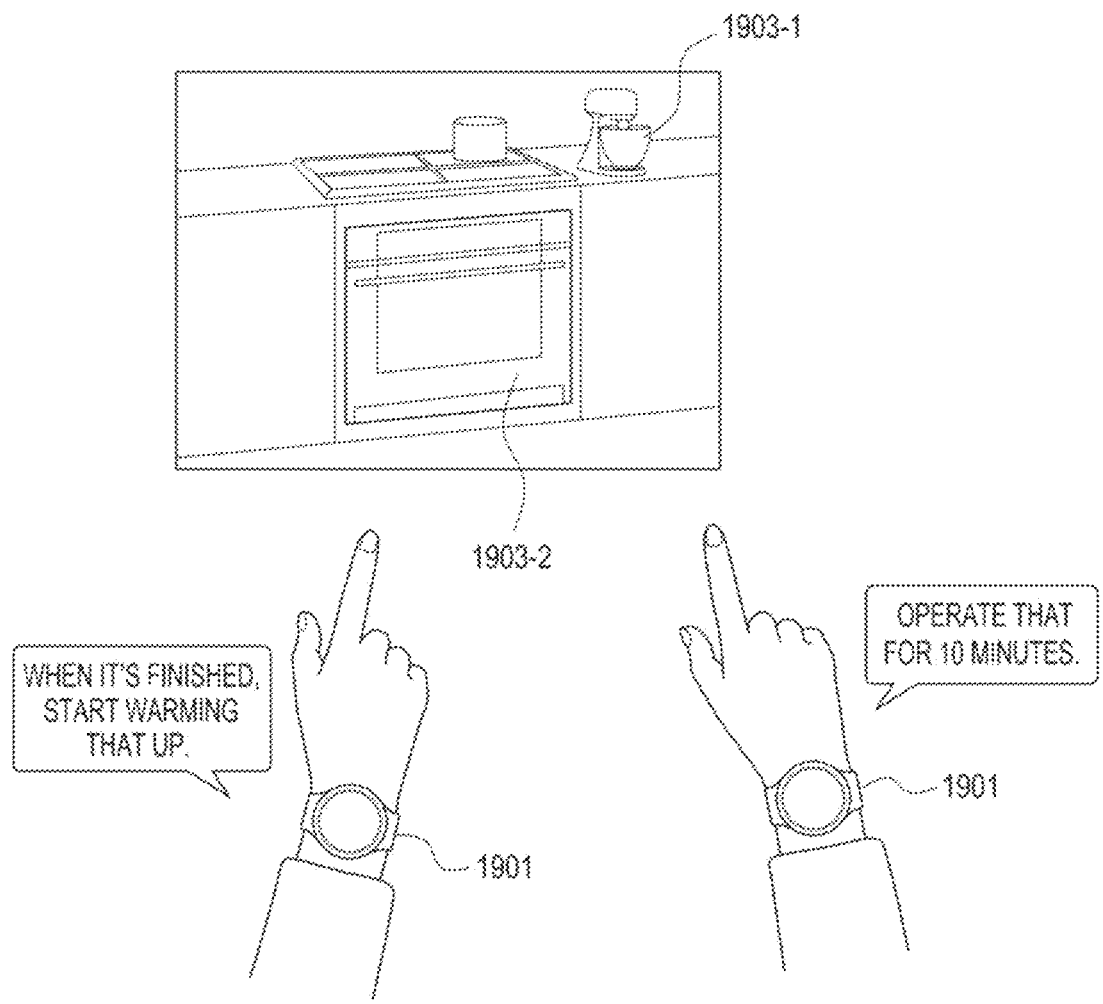
FIGS. 19A, 19B, 19C, 19D, and 19E are diagrams illustrating examples of transmitting different instructions to multiple external devices in the electronic device according to various embodiments of the disclosure.

Referring to FIG. 19A, an electronic device 1901 (e.g., 101 of FIG. 1, 201 of FIG. 2, 401 of FIG. 4, or 1801 of FIG. 18) may receive voice signals uttered by a user, for example, "Operate that for 10 minutes", and "When it's finished, start warming that up", and may receive a signal from each of an electronic kneader 1903-1 and an electronic oven 1903-2. For example, in a case where the user orients the electronic device 1901 toward the electronic kneader 1903-1 while uttering "Operate that for 10 minutes", and orients the electronic device 1901 toward the electronic oven 1903-2 while uttering "When it's finished, start warming that up" within a predetermined time, the electronic device 1901 may obtain first information of associated devices on the basis of, for example, at least a part of "Operate that for 10 minutes", and "When it's finished, start warming that up".

For example, the electronic device 1901 may acquire, as the first information of associated devices, a device having a function of operating for 10 minutes, on the basis of "Operate that for 10 minutes", and a device having a function of warming up, on the basis of "When it's finished, start warming that up", or when no device associated with at least a part of "Operate that for 10 minutes", and "When it's finished, start warming that up" is present, the electronic device 1901 may acquire, as first information, information providing an instruction to identify an electronic device to perform a task via second information of a device toward which the electronic device 1901 is oriented. For example, the electronic device 1901 may obtain first information including information indicating that second information for obtaining information of associated devices on the basis of "that" is required, and may obtain the second information of the device toward which the electronic device 1901 is oriented, on the basis of a phase difference of a signal received from each of the electronic kneader 1903-1 and the electronic oven 1903-2. According to an embodiment, when the utterances, such as "Operate that for 10 minutes", and "When it's finished, start warming that up" are sequentially received, the electronic device 1901 may obtain the second information of the device toward which the electronic device 1901 is oriented, on the basis of phase differences of the respective signals received from the electronic kneader 1903-1 and the electronic oven 1903-2 during a reception period of each of the received voices.

The electronic device 1901 may identify the electronic kneader 1903-1 and the electronic oven 1903-2 on the basis of the first information and the second information. For example, the example 1901 may identify the electronic kneader 1903-1 on the basis of the first information corresponding to "Operate that for 10 minutes" and the second information obtained during a voice reception period of "Operate that for 10 minutes", and may identify the electronic oven 1903-2 on the basis of the first information corresponding to "When it's finished, start warming that up" and the second information obtained during a voice reception period of "When it's finished, start warming that up".

According to various embodiments, the electronic device 1901 may obtain information for performing a task of transmitting different instructions to the electronic kneader 1903-1 and the electronic oven 1903-2, on the basis of a result of performing natural-language understanding with respect to "Operate that for 10 minutes", and "When it's finished, start warming that up", and the identified electronic kneader 1903-1 and electronic oven 1903-2. The instruction may include at least a part of information related to a task to be performed by each of the electronic kneader 1903-1 and the electronic oven 1903-2, at least partially on the basis of a user input (e.g., voice input, touch input, gesture input, or the like) and a signal received by the electronic device 1901 from each of the electronic kneader 1903-1 and the electronic oven 1903-2.

According to various embodiments, on the basis of the obtained information, the electronic device 1901 may transfer an instruction to knead dough for 10 minutes to the electronic kneader 1903-1, and may transfer an instruction to warm up to 180 degrees in 10 minutes to the electronic oven 1903-2. According to various embodiments, the electronic device 1901 may directly transmit an instruction or may transmit the instruction via a server (e.g., 405 of FIG. 4, or 809 of FIG. 8B). According to an embodiment, the electronic device 1901 may transfer an instruction having a set reserved time (e.g., 10 minutes later) or may transfer an instruction at a set time (e.g., in 10 minute), to the electronic oven 1903-2. Each of the electronic kneader 1903-1 and the electronic oven 1903-2 may execute the instruction received from the electronic device 1901. Each of the electronic kneader 1903-1 and the electronic oven 1903-2 may transmit an instruction execution result to the electronic device 1901. According to various embodiments, the electronic device 1901 may output the instruction execution result in various forms of information, such as sound information, display information, vibration information, or a combination of at least some of the forms of information. According to various embodiments, each of the electronic kneader 1903-1 and the electronic oven 1903-2 may also output the instruction execution result in various forms of information, such as sound information, display information, or vibration information.

Figure 19B:
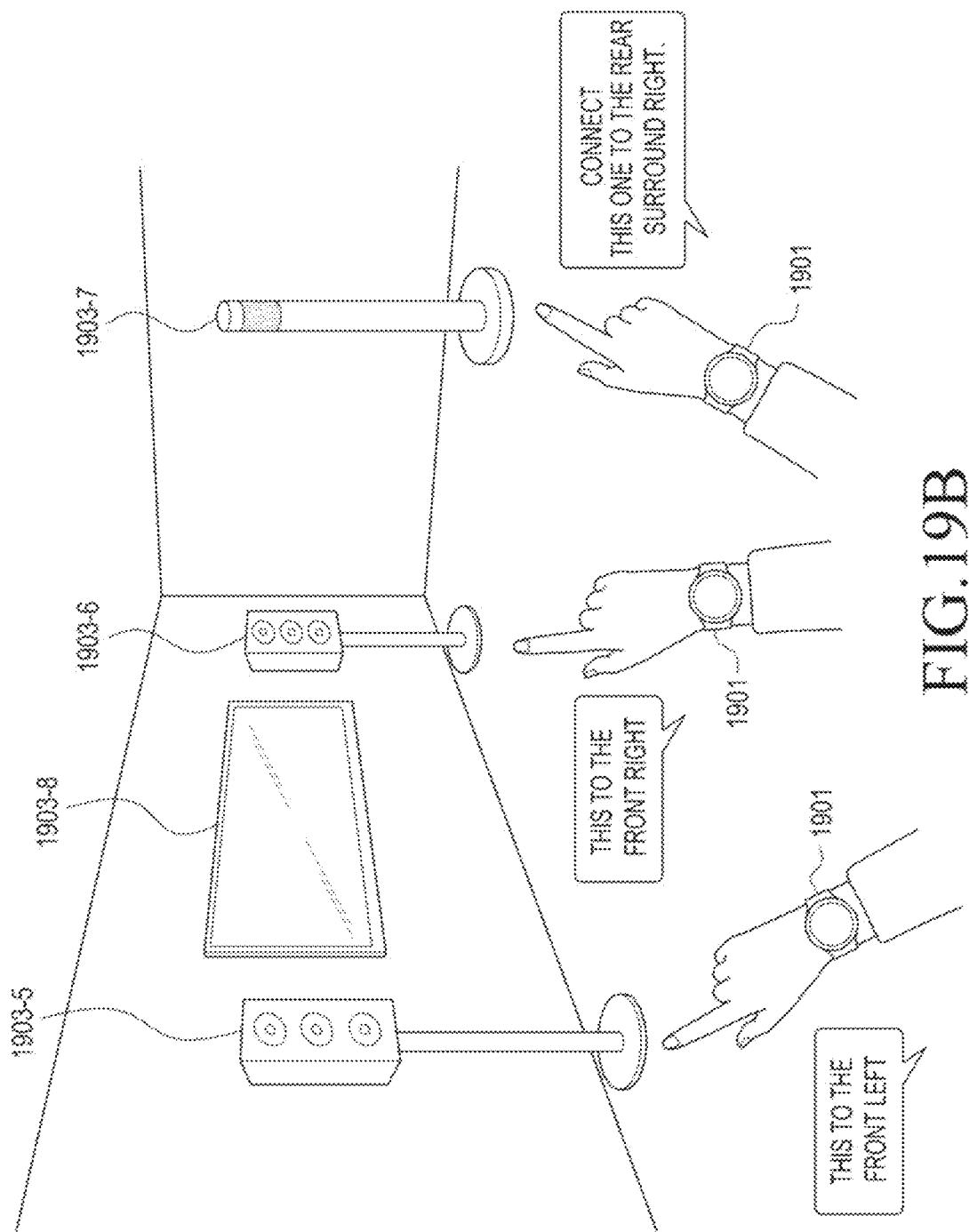

Referring to FIG. 19B, the electronic device 1901 (e.g., 101 of FIG. 1, 201 of FIG. 2, 401 of FIG. 4, or 1801 of FIG. 18) may receive voice signals uttered by a user, for example, "Connect this to the front left", "This to the front right", and "This one to the rear surround right", and may receive a signal from each of a first audio output device 1903-5, a second audio output device 1903-6, and a third audio output device 1903-7. For example, in a case where the user orients the electronic device 1901 toward the first audio output device 1903-5 while uttering "Connect this to the front left", orients the electronic device 1901 toward the second audio output device 1903-6 while uttering "This to the front right" within a predetermined time, and orients the electronic device 1901 toward the third audio output device 1903-7 while uttering "This one to the rear surround right" within another predetermined time, the electronic device 1901 may obtain first information including information indicating that second information for obtaining information of associated devices on the basis of "This" and "This one" is required.

According to various embodiments, the electronic device 1901 may obtain second information of a device toward which the electronic device 1901 is oriented, on the basis of phase differences of the respective signals received from the first audio output device 1903-5, the second audio output device 1903-6, and the third audio output device 1903-7. According to various embodiments, when the utterances "Connect this to the front left", "This to the front right", and "This one to the rear surround right" are sequentially received, the electronic device 1901 may obtain second information of the device toward which the electronic device 1901 is oriented, on the basis of phase differences of the respective signals received from the first audio output device 1903-5, the second audio output device 1903-6, and the third audio output device 1903-7 during a reception period of each of the received voices.

The electronic device 1901 may identify the first audio output device 1903-5, the second audio output device 1903-6, and the third audio output device 1903-7 on the basis of the first information and the second information. For example, the electronic device 1901 may identify the first audio output device 1903-5 on the basis of first information corresponding to "Connect this to the front left" and second information corresponding to a reception period of "Connect this to the front left", may identify the second audio output device 1903-6 on the basis of first information corresponding to "This to the front right" and second information corresponding to a reception period of "This to the front right", and may identify the third audio output device 1903-7 on the basis of first information corresponding to "This one to the rear surround right" and second information corresponding to a reception period of "This one to the rear surround right".

According to various embodiments, the electronic device 1901 may obtain information for performing a task of transmitting an instruction corresponding to each of the first to third audio output devices 1903-5 to 1903-7, on the basis of a result of natural-language understanding of "Connect this to the front left", "This to the front right", and "This one to the rear surround right" and the identified third audio output devices 1903-5 to 1903-7. The instruction may include at least a part of information related to a task to be performed by each of the first audio output device 1903-5, the second audio output device 1903-6, and the third audio output device 1903-7, at least partially on the basis of a user input (e.g., voice input, touch input, or gesture input) and the signal received by the electronic device 1901 from each of the first audio output device 1903-5, the second audio output device 1903-6, and the third audio output device 1903-7.

According to various embodiments, on the basis of the obtained information, the electronic device 1901 may transfer, to the first output device 1903-5, a first instruction to connect with a media device 1903-8 and then set the first output device 1903-5 as a front left speaker, may transfer, to the second audio output device 1903-6, a second instruction to connect with the media device 1903-8 and then set the second audio output device 1903-6 as a front right speaker, and may transfer, to the third audio output device 1903-7, a third instruction to connect with the media device 1903-8 and then set the third audio output device 1903-7 as a rear surround right speaker. According to various embodiments, the electronic device 1901 may directly transmit an instruction or may transmit the instruction via a server (e.g., 405 of FIG. 4, or 809 of FIG. 8B). Each of the first audio output device 1903-5, the second audio output device 1903-6, and the third audio output device 1903-7 may execute the instruction received from the electronic device 1901. Each of the first audio output device 1903-5, the second audio output device 1903-6, and the third audio output device 1903-7 may transmit an instruction execution result to the electronic device 1901. According to various embodiments, the electronic device 1901 may output the instruction execution result in various forms of information, such as sound information, display information, vibration information, or a combination of at least some of the forms of information. According to various embodiments, each of the first audio output device 1903-5, the second audio output device 1903-6, and the third audio output device 1903-7 may also output the instruction execution result in various forms of information, such as sound information, display information, or vibration information.

Figure 19C:
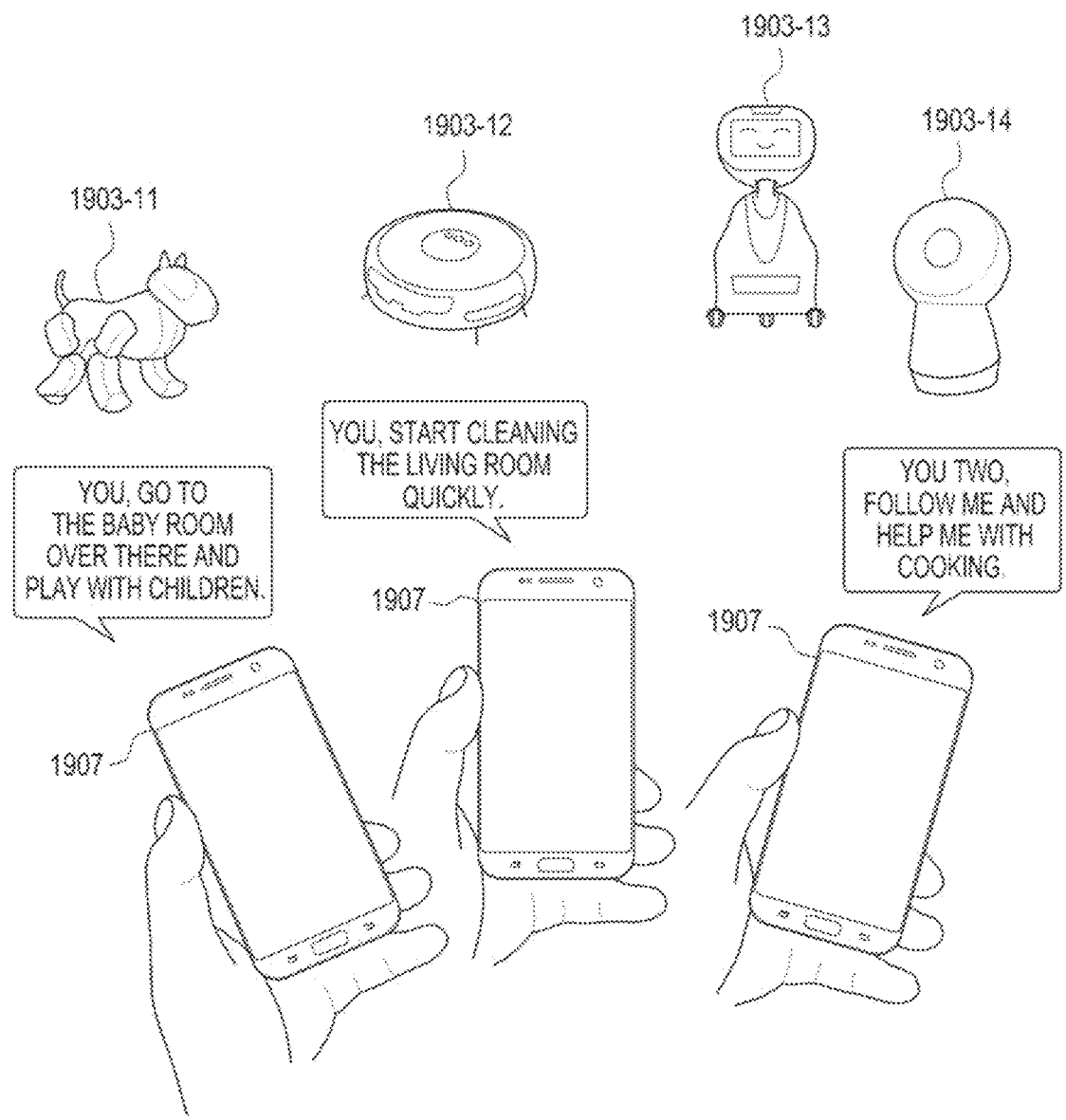

Referring to FIG. 19C, the electronic device 1907 may receive voice signals uttered by a user, for example, "You, go to the baby room over there, and play with children", "You, start cleaning the living room quickly", and "You two, follow me and help me with cooking", and may receive a signal from each of a first robot device 1903-11, a second robot device 1903-12, a third robot device 1903-13, and a fourth robot device 1903-14.

For example, in a case where the user orients the electronic device 1907 toward the first robot device 1903-11 while uttering "You, go to the baby room over there, and play with children", orients the electronic device 1907 toward the second robot device 1903-12 while uttering "You, start cleaning the living room quickly" within a predetermined time, and orients the electronic device 1907 toward the third robot device 1903-13 and the fourth robot device 1903-14 while uttering "You two, follow me and help me with cooking" within another predetermined time, the electronic device 1907 may obtain first information including information indicating that second information for obtaining information of associated devices on the basis of "You" and "You two" is required.

According to various embodiments, the electronic device 1907 may obtain second information of a device toward which the electronic device 1907 is oriented, on the basis of phase differences of the respective signals received from the first robot device 1903-11, the second robot device 1903-12, the third robot device 1903-13, and the fourth robot device 1903-14. According to various embodiments, when the utterances "You, go to the baby room over there, and play with children", "You, start cleaning the living room quickly", and "You two, follow me and help me with cooking" are sequentially received, the electronic device 1907 may obtain second information of the device toward which the electronic device 1907 is oriented, on the basis of phase differences of the respective signals received from the first robot device 1903-11, the second robot device 1903-12, the third robot device 1903-13, and the fourth robot device 1903-14 during a reception period of each of the received voices.

According to various embodiments, the electronic device 1901 may identify the first robot device 1903-11, the second robot device 1903-12, the third robot device 1903-13, and the fourth robot device 1903-14 on the basis of the first information and the second information.

For example, the electronic device 1907 may identify the first robot device 1903-11 on the basis of first information corresponding to "You, go to the baby room over there, and play with children" and second information corresponding to a reception period of "You, go to the baby room over there, and play with children", may identify the second robot device 1903-12 on the basis of first information corresponding to "You, start cleaning the living room quickly" and second information corresponding to a reception period of "You, start cleaning the living room quickly", and may identify the third robot device 1903-13, and the fourth robot device 1903-14 on the basis of first information corresponding to "You two, follow me and help me with cooking" and second information corresponding to a reception period of "You two, follow me and help me with cooking".

According to various embodiments, the electronic device 1907 may obtain information for performing a task of transmitting an instruction corresponding to each of the first to fourth robot devices 1903-11 to 1903-14, on the basis of a result of natural-language understanding of "You, go to the baby room over there, and play with children", "You, start cleaning the living room quickly", and "You two, follow me and help me with cooking" and the identified first to fourth robot devices 1903-11 to 1903-14. The instruction may include at least a part of information related to a task to be performed by each of the first robot device 1903-11, the second robot device 1903-12, the third robot device 1903-13, and the fourth robot device 1903-14, at least partially on the basis of a user input (e.g., voice input, touch input, gesture input, or the like) and signals received by the electronic device 1907 from the first robot device 1903-11, the second robot device 1903-12, the third robot device 1903-13, and the fourth robot device 1903-14.

According to various embodiments, on the basis of the obtained information, the electronic device 1907 may transfer, to the first robot device 1903-11, an instruction to go to the baby room and play with children, may transfer, to the second robot device 1903-12, an instruction to clean the living room, and may transfer, to the third robot device 1903-13 and the fourth robot device 1903-14, an instruction to follow the user and help him/her with cooking. According to various embodiments, the electronic device 1907 may directly transmit an instruction or may transmit the instruction via a connection server (e.g., 809 of FIG. 8B). Each of the first robot device 1903-11, the second robot device 1903-12, the third robot device 1903-13, and the fourth robot device 1903-14 may execute the instruction received from the electronic device 1907. Each of the first robot device 1903-11, the second robot device 1903-12, the third robot device 1903-13, and the fourth robot device 1903-14 may transmit an instruction execution result to the electronic device 1907. According to various embodiments, the electronic device 1907 may output the instruction execution result in various forms of information, such as sound information, display information, vibration information, or a combination of at least some of the forms of information. According to various embodiments, each of the first to fourth robot devices 1903-11 to 1903-14 may also output the instruction execution result in various forms of information, such as sound information, display information, or vibration information.

Figure 19D:
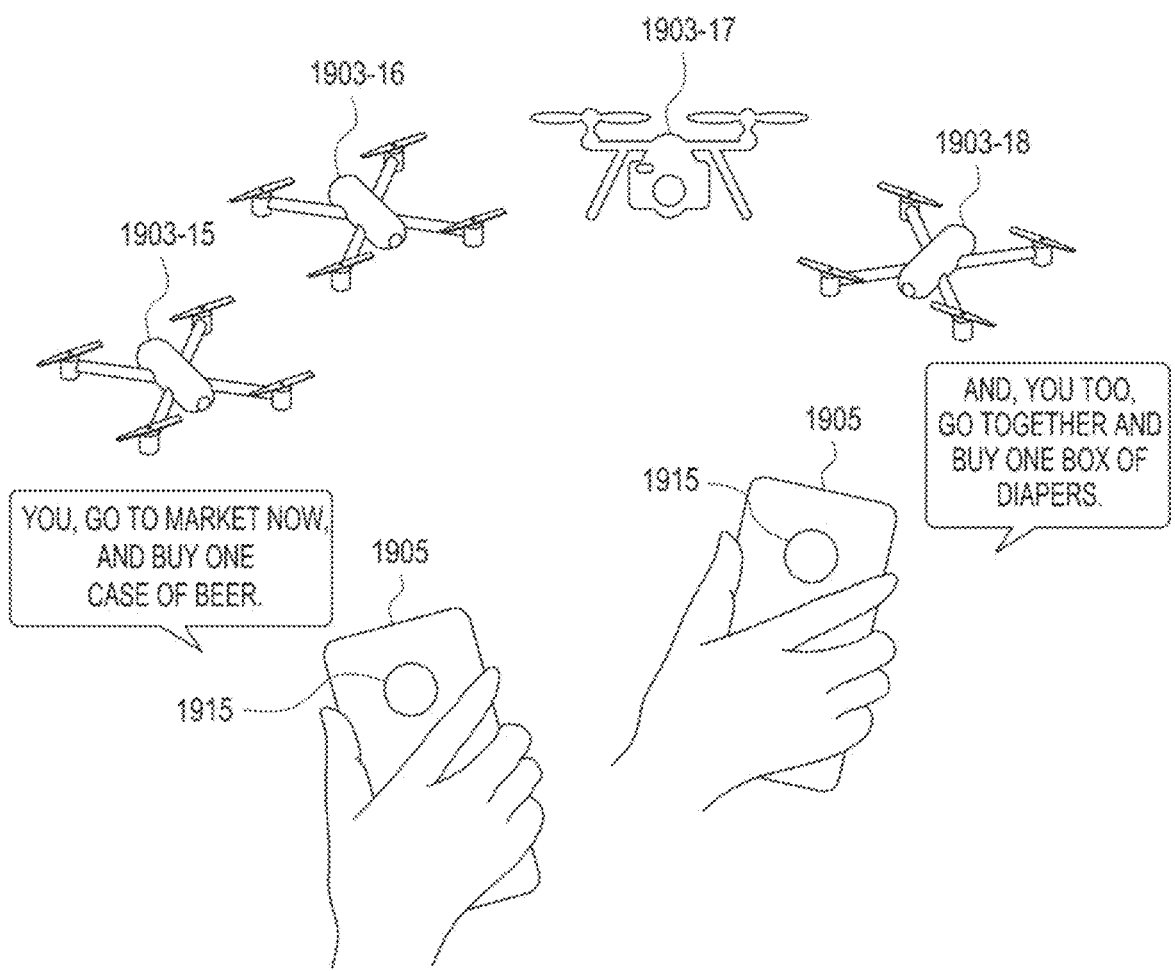

Referring to FIG. 19D, an electronic device 1905 (e.g., 101 of FIG. 1, 201 of FIG. 2, 401 of FIG. 4, or 1801 of FIG. 18) may be a remote controller, and may include a fingerprint sensor 1915 (e.g., the sensor module 240 of FIG. 2). According to an embodiment, the electronic device 1905 may be set to receive a user input when a fingerprint recognized by the fingerprint sensor 1915 matches registered fingerprint information. The electronic device 1905 may receive voice signals uttered by a user, for example, "You, go to OO now, and buy a case of beer", and "And, you too, go together and buy a box of diapers", and may receive a signal from each of first to fourth drone devices 1903-15 to 1903-18.

For example, in a case where the user orients the electronic device 1907 toward the first drone device 1903-15 while uttering "You, go to OO now, and buy a case of beer", and orients the electronic device 1907 toward the fourth drone device 1903-18 while uttering "And, you too, go together and buy a box of diapers", the electronic device 1907 may obtain first information including information indicating that second information for obtaining information of devices associated with each other on the basis of, for example, at least a part of the voice signals uttered by the user "you" and "you too" is required.

According to an embodiment, the electronic device 1907 may obtain second information of the device toward which the electronic device 1907 is oriented, on the basis of phase differences of the respective signals received from the first drone device 1903-15 and the fourth drone device 1903-18. According to an embodiment, when the utterances "You, go to OO now, and buy a case of beer", and "And, you too, go together and buy a box of diapers" are sequentially received, the electronic device 1907 may obtain second information of the electronic device toward which the electronic device 1907 is oriented, on the basis of phase differences of the respective signals received from the first drone device 1903-15 and the fourth drone device 1903-18.

The electronic device 1907 may identify the first drone device 1903-15 and the fourth drone device 1903-18 on the basis of the first information and the second information. For example, the electronic device 1907 may identify the first drone device 1903-15 on the basis of first information corresponding to "You, go to OO now, and buy a case of beer" and second information corresponding to a reception period of "You, go to OO now, and buy a case of beer", and may identify the fourth drone device 1903-18 on the basis of first information corresponding to "And, you too, go together and buy a box of diapers" and second information corresponding to a reception period of "And, you too, go together and buy a box of diapers".

According to various embodiments, the electronic device 1907 may obtain information for performing a task of transmitting an instruction corresponding to each of the first drone device 1903-15 and the fourth drone device 1903-18, on the basis of a result of performing natural-language understanding with respect to "You, go to OO now, and buy a case of beer", and "And, you too, go together and buy a box of diapers" and the identified first drone device 1903-15 and fourth drone device 1903-18. The instruction may include at least a part of information related to a task to be performed by each of the first drone device 1903-15 and the fourth drone device 1903-18, at least partially on the basis of a user input (e.g., voice input, touch input, gesture input, or the like) and signals received by the electronic device 1907 from the first drone device 1903-15 and the fourth drone device 1903-18.

According to various embodiments, the electronic device 1907 may transfer, to the first drone device 1903-15, an instruction to go OO and buy a case of beer, and may transfer, to the fourth drone device 1903-18, an instruction to go together with the first drone device 1903-15 and buy a box of diapers. According to various embodiments, the electronic device 1907 may directly transmit an instruction or may transmit the instruction via a server (e.g., 405 of FIG. 4, or 809 of FIG. 8B). Each of the first drone device 1903-15 and the fourth drone device 1903-18 may execute the instruction received from the electronic device 1907. Each of the first drone device 1903-15 and the fourth drone device 1903-18 may transmit an instruction execution result to the electronic device 1907. According to various embodiments, the electronic device 1907 may output the instruction execution result in various forms of information, such as sound information, display information, vibration information, or a combination of at least some of the forms of information. According to various embodiments, the first drone device 1903-15 and the fourth drone device 1903-18 may also output the instruction execution result in various forms of information, such as sound information, display information, or vibration information.

Figure 19E:
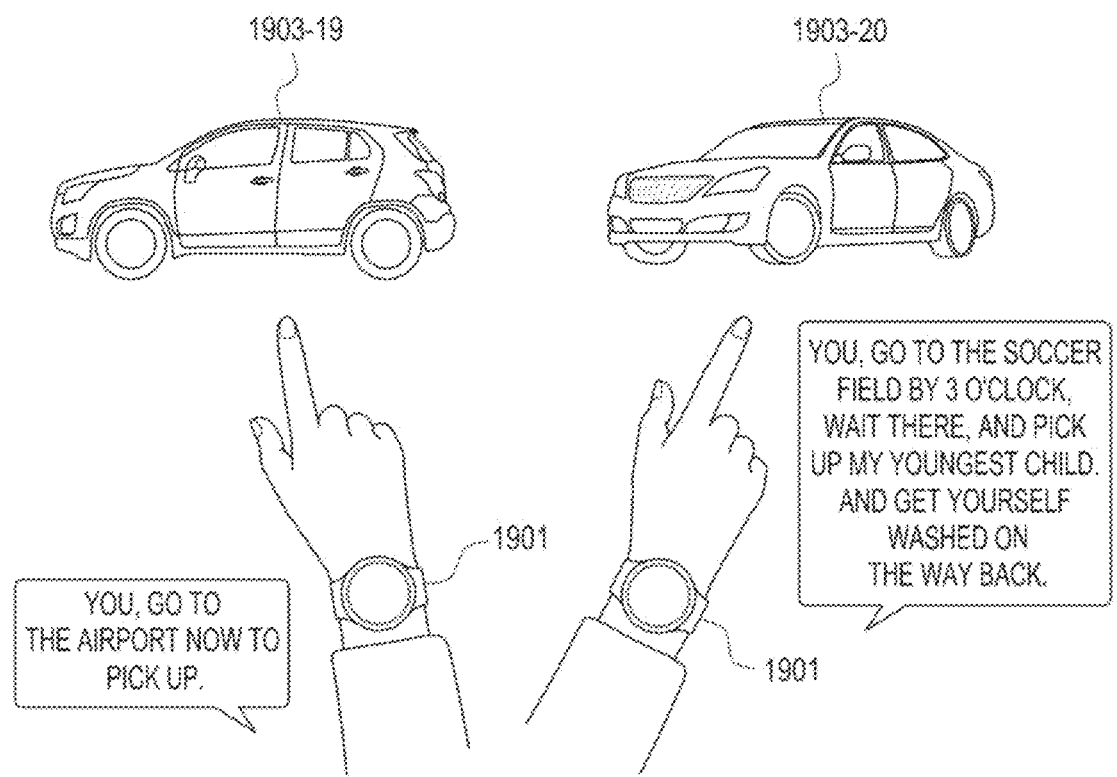

Referring to FIG. 19E, the electronic device 1901 (e.g., 101 of FIG. 1, 201 of FIG. 2, 401 of FIG. 4, or 1801 of FIG. 18) may receive voice signals uttered by a user, for example, "You, go to the airport now to pick up Youngjin" and "You, go to the soccer field by 3 o'clock, wait there, and pick up my youngest child. And get yourself washed on the way back", and may receive a signal from each of a first smart car 1903-19 and a second smart car 1903-20.

For example, in a case where the user orients the electronic device 1901 toward the first smart car 1903-19 while uttering "You, go to the airport now to pick up Youngjin", and orients the electronic device 1901 toward the second smart car 1903-20 while uttering "You, go to the soccer field by 3 o'clock, wait there, and pick up my youngest child. And get yourself washed on the way back" within a predetermined time, the electronic device 1901 may obtain first information including information indicating that second information for obtaining information of associated devices on the basis of at least a part of the voice signals uttered by the user "you" is required.

According to an embodiment, the electronic device 1901 may obtain second information of the device toward which the electronic device 1901 is oriented, on the basis of phase differences of the respective signals received from the first smart car 1903-19 and the second smart car 1903-20. According to an embodiment, when the utterances "You, go to the airport now to pick up Youngjin" and "You, go to the soccer field by 3 o'clock, wait there, and pick up my youngest child. And get yourself washed on the way back" are sequentially received, the electronic device 1901 may obtain second information of the electronic device toward which the electronic device 1901 is oriented, on the basis of phase differences of the respective signals received from the first smart car 1903-19 and the second smart car 1903-20 during a reception period of each voice.

The electronic device 1901 may identify the first smart car 1903-19 and the second smart car 1903-20 on the basis of the first information and the second information. For example, the electronic device 1901 may identify the first smart car 1903-19 on the basis of first information corresponding to "You, go to the airport now to pick up Youngjin" and second information corresponding to a reception period of "You, go to the airport now to pick up Youngjin", and may identify the second smart car 1903-20 on the basis of the first information corresponding to "You, go to the soccer field by 3 o'clock, wait there, and pick up my youngest child. And get yourself washed on the way back" and second information corresponding to a reception period of "You, go to the soccer field by 3 o'clock, wait there, and pick up my youngest child. And get yourself washed on the way back".

According to various embodiments, the electronic device 1901 may obtain information for performing a task of an instruction corresponding to each of the first smart car 1903-19 and the second smart car 1903-20, on the basis of a result of performing natural-language understanding with respect to "You, go to the airport now to pick up Youngjin" and "You, go to the soccer field by 3 o'clock, wait there, and pick up my youngest child. And get yourself washed on the way back" and the identified first smart car 1903-19 and second smart car 1903-20. The instruction may include at least a part of information related to a task to be performed by each of the first smart car 1903-19 and the second smart car 1903-20, at least partially on the basis of a user input (e.g., voice input, touch input, gesture input, or the like) and signals received by the electronic device 1907 from the first smart car 1903-19 and the second smart car 1903-20. According to an embodiment, the electronic device 1901 may perform authentication as to whether the user currently wearing or holding the electronic device 1901 is an authorized user, and then, when the authentication is successful, the electronic device 1901 may obtain information for performing a task of transmitting a corresponding instruction to each of the first smart car 1903-19 and the second smart car 1903-20. For example, the user authentication may be performed based on biometrics recognition which includes various types of recognition, such as face recognition, fingerprint recognition, iris recognition, electrocardiogram pattern matching, wrist blood vessel pattern recognition, etc. for a user.

According to various embodiments, the electronic device 1901 may transfer, to the first smart car 1903-19, an instruction corresponding to going to the airport to pick up Youngjin, and may transfer, to the second smart car 1903-20, an instruction corresponding to going to the soccer field by 3 o'clock, waiting there, picking up my youngest child, and getting the second smart car 1903-20 washed on the way back. According to various embodiments, the electronic device 1901 may directly transmit an instruction or may transmit the instruction via a server (e.g., 405 of FIG. 4, or 809 of FIG. 8B). Each of the first smart car 1903-19 and the second smart car 1903-20 may execute the instruction received from the electronic device 1901. Each the first smart car 1903-19 and the second smart car 1903-20 may transmit an instruction execution result to the electronic device 1901. According to various embodiments, the electronic device 1901 may output the instruction execution result in various forms of information, such as sound information, display information, vibration information, or a combination of at least some of the forms of information. According to various embodiments, the first smart car 1903-19 and the second smart car 1903-20 may also output the instruction execution result in various forms of information, such as sound information, display information, or vibration information.

Figure 20:
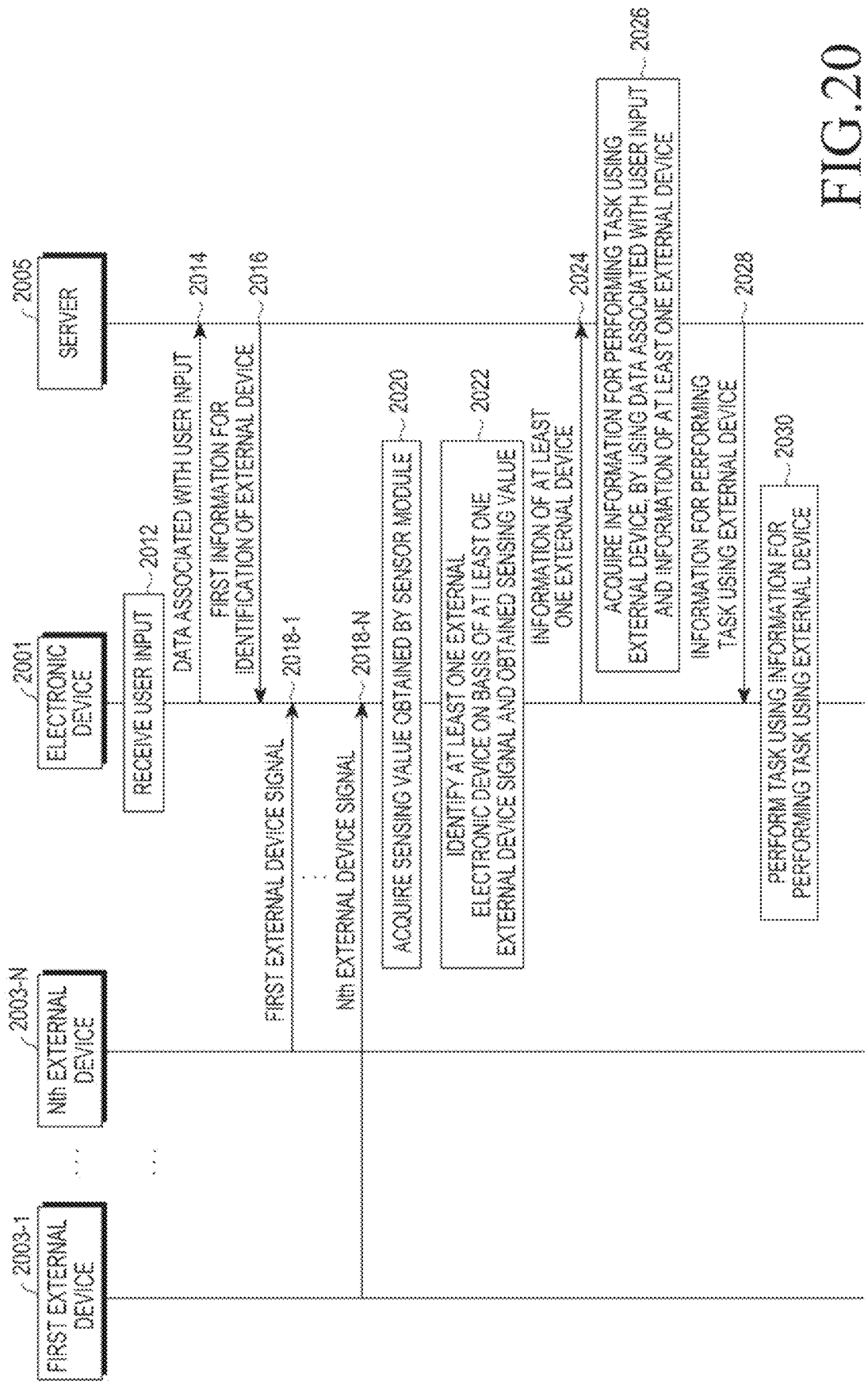
FIG. 20 is a flow diagram illustrating operations of identifying an external device on the basis of data related to a user input, at least one received signal, and a sensing value by a sensor module according to an embodiment of the disclosure.

FIG. 20 is a flow diagram illustrating operations of identifying an external device on the basis of data related to a user input, at least one received signal, and a sensing value by a sensor module according to an embodiment of the disclosure.

Referring to FIG. 20, an electronic device 2001 (e.g., 101 of FIG. 1, 201 of FIG. 2, or 401 of FIG. 401) may receive a user input in operation 2012. The electronic device 2001 may convert the received user input into data related to the user input. According to an embodiment, the electronic device 2001 may receive a voice signal uttered by a user through a microphone. For example, the user may utter a voice including an instruction, such as "turn off the light", "what is that?", "play music using that", "turn that off 10 minutes later", and "Does that need to be charged?", etc., or a voice including an instruction and a demonstrative pronoun. The electronic device 2001 may receive the uttered voice signal through a microphone, and may convert the received voice signal into voice data related to the user input.

The electronic device 2001 may transmit, to a server 2005, data associated with a user input, in operation 2014. According to various embodiments, the data associated with the user input may be one of data associated with various types of user inputs, such as voice data associated with a voice signal uttered by the user, data associated with motion sensing of a gesture made by the user, data associated with a touch input made by the user through a touch screen, and data associated with a key input made through various keys.

The server 2005 may transmit, to the electronic device 2001, first information for identifying at least one external device, on the basis of the data associated with the user input, which is received from the electronic device 2001. According to various embodiments, the server 2005 may perform voice recognition on the basis of the voice data received from the electronic device 2001, may perform natural-language understanding to obtain information related to an indication target, a demonstrative pronoun, an instruction, or a function, and may obtain first information for identifying at least one external device on the basis of the obtained information related to the indication target, the demonstrative pronoun, the instruction, or the function and transmit the obtained first information to the electronic device 2001. According to an embodiment, the first information may include an external device list. The external device list may include device recognition information of at least one external device. In addition, the first information may further include information indicating that the electronic device 2001 requires second information for identifying the external device.

According to various embodiments, the electronic device 2001 may autonomously obtain the first information for identifying at least one external device on the basis of the voice data, without transmitting the voice data to the server 2005. In a case where the electronic device 2001 autonomously acquires the first information for identifying at least one external device on the basis of the voice data, without transmitting the voice data to the server 2005, operations 2014 and 2016 may be omitted.

The electronic device 2001 may obtain at least one signal through a communication circuit in operations 2018-1 to 2018-N. For example, the electronic device 2001 may receive a signal broadcasted from each of the first to Nth external devices 2003-1 to 2003-N. The electronic device 2001 may receive a signal periodically broadcasted from each of the first to Nth external devices 2003-1 to 2003-N, and may request signals from the first to Nth external devices 2003-1 to 2003-N and then receive the signals broadcasted from the first to Nth external devices 2003-1 to 2003-N. According to various embodiments, the electronic device 2001 may include a plurality of antennas, and may receive at least one wireless communication signal via the plurality of antennas. For example, the electronic device 2001 may receive signals from the respective first to Nth external devices 2003-1 to 2003-N via the plurality of antennas. When at least one signal is received by the plurality of antennas, phase differences may occur between the signals received by the plurality of antennas. According to an embodiment, when signals transmitted from the first external device 2003-1 are received through two antennas, a phase difference may occur between the signals received through the two antennas due to the difference between the times of arrival of the signals at the two antennas. According to various embodiments, the electronic device 2001 may receive signals from the respective first to Nth external devices 2003-1 to 2003-N via the plurality of antennas, may detect a phase difference for the signals from the respective first to Nth external devices 2003-1 to 2003-N, and may determine an external device corresponding to a signal having a phase difference equal to or smaller than a predetermined threshold value from among the signals from the first to Nth external devices 2003-1 to 2003-N. An external device that transmits a signal having a phase difference equal to or smaller than the predetermined threshold value may be determined to be located in the direction toward which the plurality of antennas of the electronic device 201 are oriented. The electronic device 2001 may obtain second information of the external device corresponding to the signal having the phase difference equal to or smaller than the predetermined threshold value. For example, the second information may include device recognition information of the external device corresponding to the signal having the phase difference equal to or smaller than the predetermined threshold value.

In operation 2020, the electronic device 2001 may obtain a sensing value through a sensor module (e.g., the sensor module 240 of FIG. 2). According to various embodiments, a sensing value may be obtained by at least one sensor module among a gesture sensor, a gyro sensor, an air pressure sensor, a magnetic sensor, an acceleration sensor, a grip sensor, a proximity sensor, an RGB sensor, a biometric sensor, a temperature/humidity sensor, an illumination sensor, and a UV sensor. According to various embodiments, the electronic device 2001 may obtain a sensing value obtained by at least one sensor module according to a gesture input that is made by the user to designate a range, and may obtain the moving range of the electronic device, for example, a moving direction and a moving distance of the electronic device, on the basis of a sensing value obtained by the gesture sensor and a sensing value obtained by the gyro sensor.

In operation 2022, the electronic device 2001 may identify at least one external device on the basis of at least one external device signal and a sensing value obtained by at least one sensing module. According to various embodiments, the electronic device 2001 may identify at least one external device on the basis of the first information obtained on the basis of data related to the user input, the second information obtained on the basis of at least one external device signal, and at least one sensing value obtained by at least one sensor module. For example, the electronic device 2001 may identify, from among external devices included in the first information (e.g., an external device list) obtained based on the voice data, at least one external device corresponding to a signal, received via the plurality of antennas within a moving range of the electronic device and having a phase difference equal to or smaller than a predetermined threshold value, according to the moving range of the electronic device and the second information. For example, the electronic device 2001 may identify, from among at least one external device identified by the voice signal uttered by the user, at least one external device included in the range according to the gesture input that is made using the electronic device 2001 by a user to designate the range.

In operation 2024, the electronic device 2001 may transmit information of the at least one external device to the server 2005. According to various embodiments, the electronic device 2001 may transmit the device recognition information (e.g., a device ID) of the identified at least one external device to the electronic device 2001.

In operation 2026, the server 2005 may obtain information for performing a task using the external device on the basis of the received data associated with the user input and information of the identified at least one external device. According to various embodiments, when the server 2005 receives voice data as the data related to the user input and receives device recognition information as information of the at least one external device, the server 2005 may perform voice recognition on the basis of the received voice data, perform natural-language understanding with respect to the recognized voice to obtain information related to an indication target, a demonstrative pronoun, an instruction, or a function, and may obtain information for performing the task, which includes at least a part of the instruction or function related to the external device corresponding to the device recognition information, on the basis of the information related to the indication target, the demonstrative pronoun, the instruction, or the function. For example, when "that" (demonstrative pronoun) and "turn on the light" (instruction) are obtained as the information related to the indication target, the demonstrative pronoun, the instruction, or the function, and a device ID of a smart light are obtained as information of the identified at least one external device, the server 2005 may obtain information for performing a task of providing an instruction to turn on the power of the smart light.

The server 2005 may transmit the information for performing the task using the external device to the electronic device 2001, in operation 2028. According to an embodiment, the server 2005 may transmit, as information for performing the task of providing an instruction to turn off the power of the smart light, sequence information of states related to one or more operations of the electronic device 2001, which are necessary for providing an instruction to turn off the power of the smart light, or of states related to a combination of the one or more operations. For example, the sequence information of states related to one or more operations of the electronic device 2001, which are necessary for providing an instruction to turn off the power of the smart light, or of states related to a combination of the one or more operations may include each or a combination of a status related to communication-connecting with the smart light, a status related to transmitting a power-off command to the smart light, and a status related to reception of a power-off result from the smart light.

In operation 2030, the electronic device 2001 may perform the task using information for performing the task using the external device. According to an embodiment, the electronic device 2001 may perform the task of providing an instruction to turn off the power of the smart light by performing each or a combination of connecting-communication with the smart light, transmitting the power-off instruction to the smart light, and receiving the power-off result from the smart light, by using the sequence information of states of the one or more operations of the electronic device 2001, which are necessary for providing an instruction to turn off the power of the smart light, or of states of the combination of the one or more operations.

Figure 21:
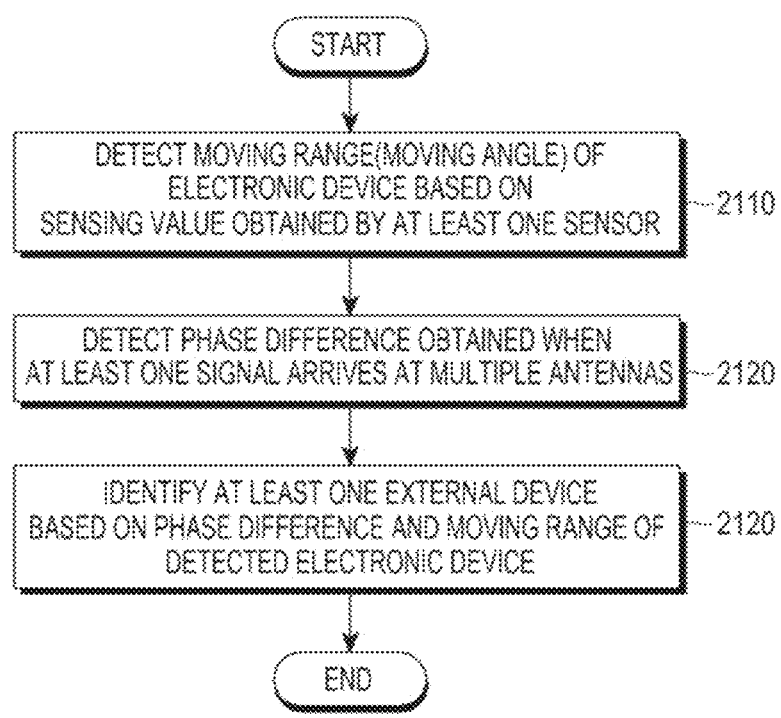
FIG. 21 is a flow diagram illustrating operations of identifying at least one external device by using at least one external device signal and a sensing value sensed by at least one sensor according to an embodiment of the disclosure.

FIG. 21 is a flow diagram illustrating operations of identifying at least one external device by using at least one external device signal and a sensing value sensed by at least one sensor according to an embodiment of the disclosure.

Referring to FIG. 21, in operation 2110, the electronic device 2001 (e.g., 101 of FIG. 1, 201 of FIG. 2, or 401 of FIG. 4) may detect a moving range (e.g., a moving direction and a moving distance of the electronic device 2001) of the electronic device 2001 by using at least one sensor, for example, a gyro sensor and an acceleration sensor, on the basis of a gesture input made by a user to designate a range. According to an embodiment, the electronic device 2001 may detect a moving direction and a moving distance of the electronic device 2001 on the basis of sensing values detected by each of the gyro sensor and the acceleration sensor at each of points constituting a trajectory generated based on a user gesture for designating the range, and may determine a range start point and a range end point on the basis of the moving direction and moving distance of the electronic device 2001.

In operation 2120, the electronic device 2001 may detect a phase difference generated due to arrival of at least one signal at a plurality of antennas. According to an embodiment, the electronic device 2001 may detect a phase difference generated due to arrival of at least one signal at the plurality of antennas, at each of points constituting the trajectory generated based on the user gesture for designating the range.

In operation 2130, the electronic device 2001 may identify at least one external device on the basis of the moving range of the electronic device 2001 and the detected phase difference. According to an embodiment, the electronic device 2001 may identify at least one external device, in which the phase difference is equal to or smaller than the predetermined threshold value, between the range start point and the range end point which are determined based on the moving direction and moving distance of the electronic device 2001 detected by the gyro sensor and the acceleration sensor.

Figure 22:
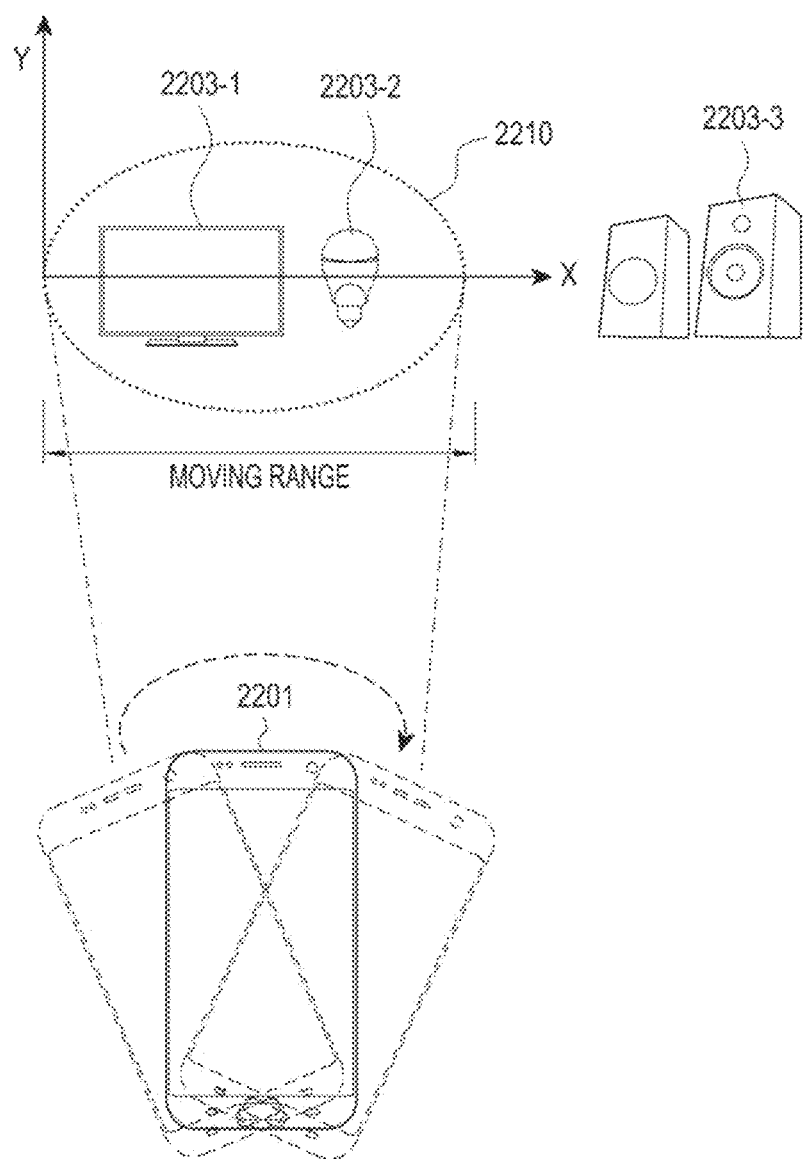
FIG. 22 is a diagram illustrating an example of identifying at least one external device on the basis of at least one external device signal and a sensing value sensed by at least one sensor according to an embodiment of the disclosure.

FIG. 22 is a diagram illustrating an example of identifying at least one external device on the basis of at least one external device signal and a sensing value sensed by at least one sensor according to an s embodiment of the disclosure.

Referring to FIG. 22, according to an embodiment, an electronic device (e.g., 101 of FIG. 1, 201 of FIG. 2, 401 of FIG. 4, or 2001 of FIG. 20) may detect a moving range of the electronic device on the basis of a sensing value detected using a gyro sensor and an acceleration sensor at each of points constituting a trajectory 2210 obtained by a user gesture according to a gesture input made by a user to designate a range, or using other sensors in combination therewith. The electronic device 2001 may determine a range start point and a range end point on the basis of the detected moving range of the electronic device. For example, the electronic device 2001 may determine the range start point and the range end point on the basis of an x-axis representing a right/left direction and a y-axis representing an up/down direction.

The electronic device 2001 may detect a phase difference between each of signals arriving at a plurality of antennas, the signals from respective first to third external devices 2203-1 to 2203-3 existing near each of the points constituting the trajectory obtained by the user gesture for designation of a range. The electronic device 2001 may identify first and second external devices 2203-1 and 2203-2 corresponding to at least one external device in which the phase difference between the range start point and the range end point, which are determined based on the moving range, is equal to or smaller than a predetermined threshold value.

According to an embodiment, when a phase difference of signals arriving at two antennas is detected, the electronic device 2201 may identify at least one external device in which the phase difference between the range start point and the range end point for the x-axis is equal to or smaller than the predetermined threshold value. According to an embodiment, when the electronic device 2201 detects a phase difference of signals arriving at three antennas, the electronic device 2201 may detect a minimum angle (linear distance angle) from each of the first to third external devices 2203-1 to 2203-3 in a three-dimensional space, may compare the minimum angle with the angle detected at each of the points constituting the trajectory obtained by the user gesture for designation of the range, and then may identify at least one external device in which the number of points having the difference between the minimum angle and the detected angle is equal to or smaller than a predesignated angle is equal to or greater than the predetermined number of points.

Figure 23:
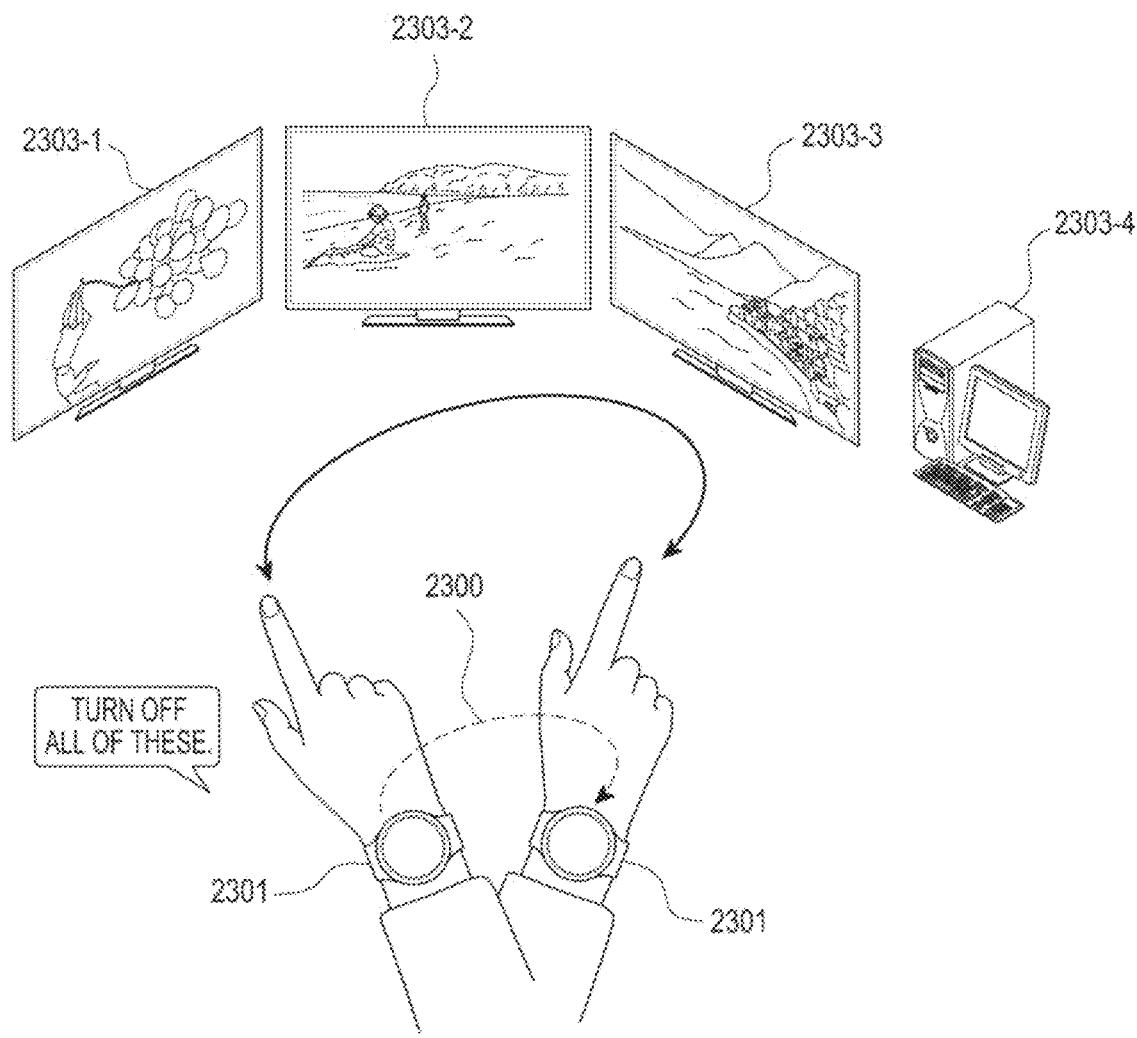
FIG. 23 is a diagram illustrating an example of transmitting an instruction to an external device within a range designated by a user gesture according to an embodiment of the disclosure.

FIG. 23 is a diagram illustrating an example of transmitting an instruction to an external device within a range designated by a user gesture according to an embodiment of the disclosure.

Referring to FIG. 23, a user may utter a voice "Turn off all of these", and the electronic device 2301 (e.g., 101 of FIG. 1, 201 of FIG. 2, 401 of FIG. 4, or 2001 of FIG. 20) may move along a trajectory 2300 for designation of a range according to a user gesture.

According to various embodiments, the electronic device 2301 may obtain first information including information indicating that second information is required based on "Turn off all of these", and may obtain second information of a device within the range designated by the user, on the basis of the trajectory 2300 corresponding to a moving range of the electronic device 2301, which is detected based on the gesture input made by the user to designate the range, and a phase difference generated when at least one signal arrives at a plurality of antennas at each of points constituting the trajectory 2300, and may thus identify the first to fourth external devices 2303-1 to 2303-4 on the basis of the first information and the second information.

According to various embodiments, the electronic device 2301 may obtain information for performing a task of transmitting an instruction corresponding to each of the first to fourth external devices 2303-1 to 2303-4, on the basis of a result of performing natural-language understanding of "Turn off all of these" and the identified first to fourth external devices 2303-1 to 2304-4. The instruction may include at least a part of information related to a task to be performed by each of the first to fourth external devices 2303-1 to 2303-4, at least partially on the basis of a voice input of the user and the signal received by each of the first to fourth external devices 2303-1 to 2303-4.

According to various embodiments, the electronic device 2301 may transfer a power off instruction to the first to fourth external devices 2303-1 to 2303-4 on the basis of the obtained information. According to various embodiments, the electronic device 2301 may directly transmit an instruction or may transmit the instruction via a server (e.g., 405 of FIG. 4, or 809 of FIG. 8B). Each of the first to fourth external devices 2303-1 to 2303-4 may perform power-off according to the instruction received from the electronic device 2301.

Figure 24:
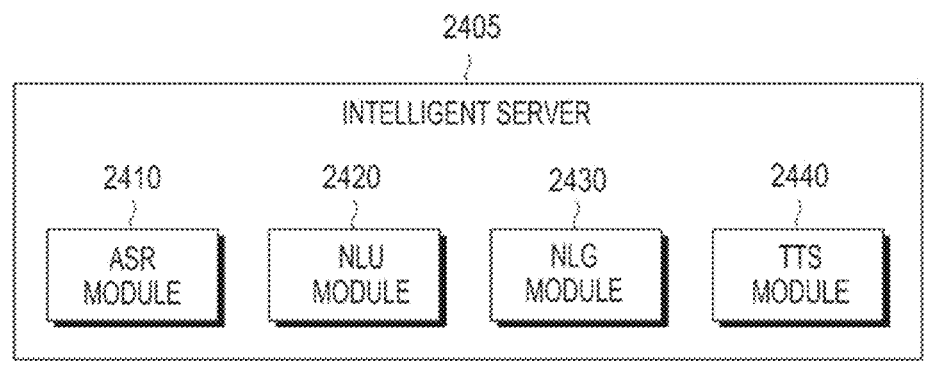
FIG. 24 and FIG. 25 are diagrams illustrating the configuration of a server according to various embodiments of the disclosure.
Figure 25:
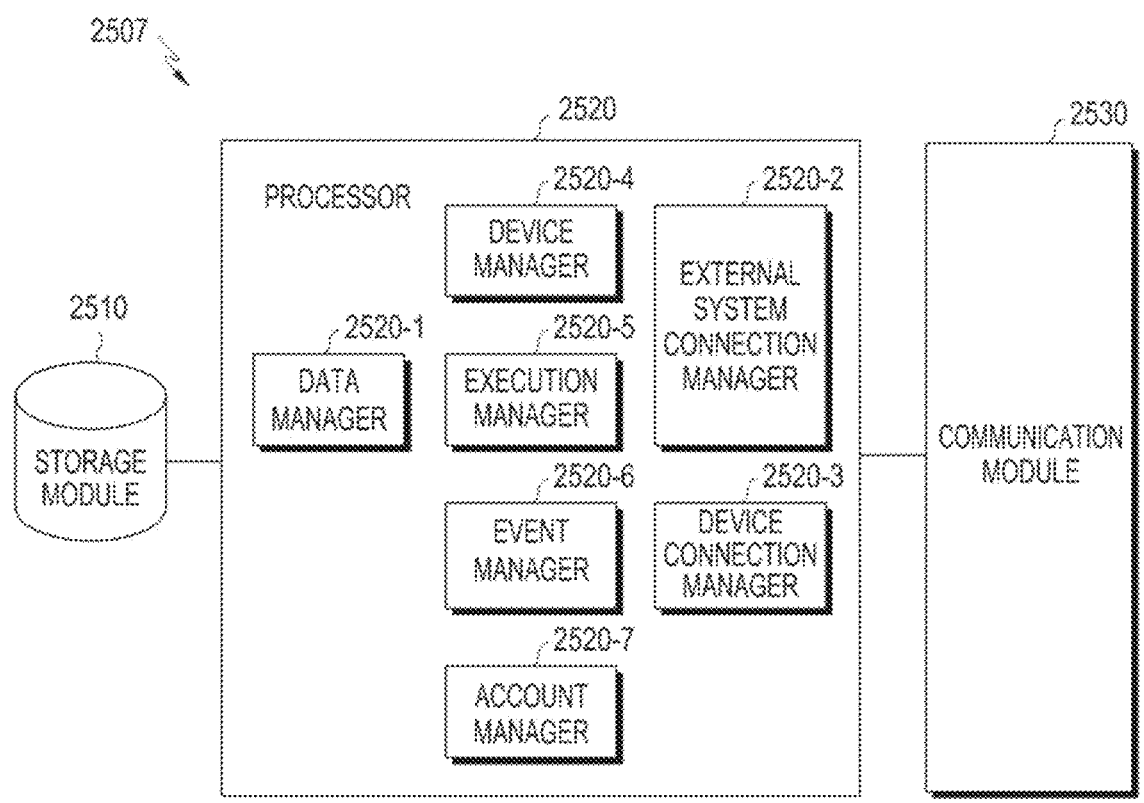

FIGS. 24 and 25 are diagrams illustrating the configuration of a server according to various embodiments of the disclosure.

Referring to FIGS. 24 and 25, a server (e.g., 405 of FIG. 4) may include all or some of the elements included in a first server 2405 of FIG. 24 and a second server 2507 of FIG. 25.

Referring to FIG. 24 the first server 2405 may include an automatic speech recognition (ASR) module 2410, a natural-language understanding (NLU) module 2420, a natural language generator (NLG) module 2430, and a text-to-speech (TTS) module 2440. According to an embodiment, the first server 2405 may be an intelligent server.

The ASR module 2410 may be an automatic voice recognition module. The ASR module 2410 may recognize a voice signal received from an electronic device (e.g., 101 of FIG. 1, 201 of FIG. 2, or 401 of FIG. 4), and may convert the recognized voice signal into voice information (e.g., text data).

According to an embodiment, the ASR module 2410 may include an utterance recognition module. The utterance recognition module may include an acoustic model and a language model. For example, the acoustic model may include information related to utterance, and the language model may include unit phoneme information and information on a combination of unit phoneme information. In addition, the language model may select a part of the unit phoneme information or may apply a weight value to the part of the unit phoneme information, on the basis of a surrounding condition (e.g., a location, peripheral device information, etc.), a use condition (e.g., an application status, a previous query history, etc.), and the like. The utterance recognition module may convert the utterance of the user into text data by using the information related to utterance and the unit phoneme information. Information relating to the acoustic model and the language model may be stored in, for example, an automatic voice recognition database.

According to an embodiment, the first server 2405 may further include a speaker recognition module. The speaker recognition module may recognize a speaker by analyzing a user utterance from a voice signal on the basis of user information stored in a database. The speaker recognition module may generate a speaker recognition model on the basis of an utterance that is input by a user at an initial use, and may store the generated speaker recognition model in the database. According to an embodiment, the speaker recognition model may determine, on the basis of the speaker recognition model stored in the database, whether a speaker is registered in the model, wherein, for example, when the speaker recognition module determines that a voice signal is generated by a registered speaker, the voice signal may be analyzed, but when the speaker recognition module determines that a voice signal is generated by a non-registered speaker, the voice signal may not be analyzed. For example, the speaker recognition module may be utilized for one activation method (wakeup recognition) for determining whether a voice is uttered by a registered speaker, and performing voice recognition or natural language processing with respect to the voice of a registered speaker, thereby activating a voice recognition function.

According to an embodiment, the NLU module 2420 may be a natural-language-understanding module. The NLU module 2420 may identify a user's intent by performing syntactic analysis and semantic analysis. The syntactic analysis may divide a user input into syntactic units (e.g., a word, a phrase, a morpheme, etc.) and may identify the kinds of syntactic elements that the divided units have. The semantic analysis may be performed using semantic matching, rule matching, formula matching, and the like. Accordingly, the NLU module 2420 may obtain, from voice information, a domain, an intent, and a parameter (or slot) necessary for expressing the intent. For example, the NLU module 2420 may identify the user's intent by matching the domain, the intent, and the parameter to each case, using a matching rule included in a rule-based algorithm. According to an embodiment, the NLU module 2420 may determine whether voice information includes an intent of indication or an intent of providing an instruction, via identification of a user intent by performing the syntactic analysis and the semantic analysis, and may designate indication information (e.g., a demonstrative pronoun) on the basis of the intent of indication and instruction information (e.g., an instruction) corresponding to the intent of providing an instruction in accordance with a determination result.

According to an embodiment, the NLG module 2340 may be a natural language generation module and may convert designated information into a text form. The text form may be a form of a natural language utterance. The designated information may be, for example, information for additional input, information for notification of operation completion, etc., and the information converted into the text form may be transmitted to the electronic device and displayed on a display or may be transmitted to a text-to-voice conversion module and converted into a voice form.

According to an embodiment, the text-to-speech (TTS) module 2440 is the text-to-voice conversion module and may change text-form information into voice-form information. The text-to-voice conversion module may receive text-form information from the natural language generation module and may change the text-form information into voice-form information so as to transmit the voice-form information to the electronic device. The electronic device may output the voice-form information to a speaker.

According to an embodiment, a function of the ASR module 1410, the NLU module 2430, the NLG module 2430, or the text-to-speech (TTS) module 2440 may be performed by one or more processors. The one or more processors may perform voice recognition based on a voice received from the electronic device (e.g., 101 of FIG. 1, 201 of FIG. 2, or 401 of FIG. 4), may recognize a speaker of the utterance, and may identify a user intent by performing syntactic analysis and semantic analysis of voice information via the natural-language understanding, by using the ASR module 2410, the NLU module 2420, the NLG module 2430, or the text-to-speech (TTS) module 2440. According to an embodiment, the one or more processors may determine whether the voice information includes an intent of indication or includes an intent of providing an instruction via voice recognition and analysis, and may designate, according to the determination result, information (e.g., a demonstrative pronoun) on the intent of indication or information (e.g., an instruction) corresponding to the intent of providing an instruction, and may convert the designated demonstrative pronoun or instruction into text. According to various embodiments, the one or more processors may perform voice recognition on the basis of the voice data, may perform natural-language understanding to obtain information related to an indication target, a demonstrative pronoun, an instruction, or a function, and may transmit, to the electronic device, first information for identifying at least one external device on the basis of the obtained information related to the indication target, the demonstrative pronoun, the instruction, or the function. According to various embodiments, the one or more processors may transmit, to the electronic device, the information related to the indication target, the demonstrative pronoun, the instruction, or the function according to the results of performing voice recognition and natural-language understanding with respect to the voice data, or the one or more processors may transmit, to the electronic device, first information including the information (e.g., an external device list) of an external device related on the basis of the information related to the indication target, the demonstrative pronoun, the instruction, or the function according to the results of performing voice recognition and natural-language understanding with respect to the voice data. According to an embodiment, when information related to the indication target is not identified (e.g., when only information related to the demonstrative pronoun, the instruction, or the function is identified) according to the results of performing voice recognition and natural-language understanding, the one or more processors may transmit, to the electronic device, first information further including information indicating that second information for identification of the external device is required.

For example, the one or more processors may transmit, to the electronic device, information related to the indication target, the demonstrative pronoun, the instruction, or the function, which are associated with turning on the light, according to the results of performing voice recognition and natural-language understanding on the basis of voice data corresponding to "Turn on the light", and may transmit, to the electronic device, first information including an external device list indicating external devices capable of performing an instruction related to turning on the light, on the basis of the voice data corresponding to "turning on the light". For example, the one or more processors may transmit, to the electronic device, information indicating that second information for identification of the external device on the basis of a demonstrative pronoun, such as "that" in voice data corresponding to "Turn on the light of that", is required, and the first information including the external device list indicating external devices capable of executing the instruction related to turning on the light on the basis of an instruction, such as "turn on the light".

Referring to FIG. 25, the second server 2507 may include a storage module 2510, a processor 2520, and a communication module 2530.

The storage module 2510 may store information of a device that can be connected to the second server 2507, an instruction set for controlling at least one device, and account information for connection to the second server 2507. According to an embodiment, the storage module 2510 may further store device information for collectively controlling at least one device connected to an IoT system (e.g., the system in FIG. 4). According to various embodiments, the device information may include at least one of device recognition information, device function information, device status information, device event information, and device instruction information. According to an embodiment, the device recognition information is information that enables device recognition, and may include at least one among a device ID, a manufacturer, a serial number, and a media access control (MAC) address. According to an embodiment, the device function information (device capacity data) may include at least one function which may be performed by the device. According to an embodiment, the device status information (device status data) may include at least one status indicating the current status of the device. According to an embodiment, the device event information (device event data) may include at least one event occurring in the device. According to an embodiment, the device instruction information (device instruction data) may include at least one instruction necessary for controlling the device. According to an embodiment, the storage module 2510 may further store an instruction set. The instruction set may be performed on the basis of at least one of a random user instruction and an internal/external event. The instruction set may include at least one among event information, condition information, and at least one piece of instruction information. Accordingly, the second server 2507 may perform conditional operations as in the following examples.

1. When CO gas is detected [event], ring an emergency bell [instruction].
2. When the front door is opened [event] at 5 pm [condition], play music [first instruction], and turn on the light in the living room [second instruction].
3. Turn on the TV [first instruction], set the IPTV channel to 13 [second instruction], and change the light in the living room to yellow [third instruction].

The communication module 2530 may function as an interface for data communication with the second server 2507 and an electronic device (e.g., 101 of FIG. 1, 201 of FIG. 2, or 401 of FIG. 4), first to Nth external devices (e.g., 403-1 to 403-N of FIG. 4), or another system. According to an embodiment, the communication module 2530 may support various types of network interfaces. Further, the communication module 2530 may correspond to various types of communication protocols.

The processor 2520 may function to control the entire operation of the second server 2507, and may include one or more processors. According to an embodiment, the processor 2520 may be configured to have at least one among a data manager 2520-1, an external system connectivity manager 2520-2, a device connectivity manager 2520-3, a device manager 2520-4, an execution manager 2520-5, an event manager 2520-6, and an account manager 2520-7.

The data manager 2520-1 is a module capable of managing data that is stored or may be stored in the storage module 2510, and may interwork with the storage module 2510 to generate, collect, store, modify, analyze, view, and delete various data. Further, the data manager 2520-1 may generate a new instruction set via analysis operation for the data stored in the storage module 2510.

The external system connectivity manager 2520-2 may manage a communication channel with an external server, and may control operation for data exchange via the communication channel. For example, the external system connectivity manager 2520-2 may operate in a Host mode in a RESTful scheme in order to respond to an information request from an external Internet service server. In another example, the external system connectivity manager 2520-2 may operate in a Client mode in a RESTful scheme in order to obtain information from the external Internet service server.

The device connectivity manager 2520-3 may manage the communication channel between the second server 2507 and devices connected with the second server 2507, and may control operation for data exchange through the communication channel.

The device manager 2520-4 may perform one among registration, deregistration, status viewing (status query), activation, and deactivation of an electronic device that is registered or may be registered.

The execution manager 2520-5 may allow an electronic device identified via the storage module 2510 to perform an execution instruction for the electronic device.

The event manager 2520-6 may identify an event occurring outside or in the electronic device, and in order to identify an instruction set corresponding to the event, the event manager 2520-6 may query about the instruction set stored in the storage module 2510, via the storage module 2510. According to another example, the event manager 2520-6 may detect a status change event occurring in the electronic device, and may modify status information of the electronic device, which is stored in the storage module 2510, through the data manager 2520-1.

The account manager 2520-7 may manage whether the electronic device is connected to the second server 2507, with reference to account information stored in the storage module 2510, and may control access to a device registered in the second server 2507. For example, the account manager 2520-7 may control, for any user, a viewing/modification rights for all or at least some devices in the second server 2507.

According to an embodiment, the processor 2520 may transmit, to the electronic device, information for performing a task using an external device on the basis of information of at least one external device and data associated with a user input, by using at least one among the data manager 2520-1, the external system connectivity manager 2520-2, the device connectivity manager 2520-3, the device manager 2520-4, the execution manager 2520-5, the event manager 2520-6, and the account manager 2520-7.

According to various embodiments, an electronic device (e.g., 101 of FIG. 1, 201 of FIG. 2, 401 of FIG. 4, 601 of FIGS. 6A and 6B, 701 of FIGS. 7A and 7B, 801 of FIGS. 8A and 8B, 901 of FIGS. 9A to 9L, 1001 of FIG. 10, 1101 of FIG. 11, 1201 of FIGS. 12A and 12B, 1301 of FIGS. 13A to 13E, 1401 of FIG. 14, 1501 of FIGS. 15A to 15C, 1601 of FIGS. 16A and 16B, 1701 of FIG. 17A, 1801 of FIG. 18, 1901 of FIGS. 19A and 19B, 2001 of FIG. 20, operations 2101 of FIG. 21, 2201 of FIG. 22, or 2301 of FIG. 23) may include: a housing; a display (e.g., the display 160 of FIG. 1 or the display 260 of FIG. 2) positioned inside the housing and exposed through a first portion of the housing; a microphone (e.g., the microphone 288 of FIG. 2) positioned inside the housing and exposed through a second portion of the housing; at least one speaker (e.g., the speaker 282 of FIG. 2) positioned inside the housing and exposed through a third portion of the housing; a wireless communication circuit (e.g., the communication interface 170 of FIG. 1 or the communication module 220 of FIG. 2) positioned inside the housing; a processor (e.g., 120 of FIG. 1 or 210 of FIG.

2) positioned inside the housing and electrically connected with the display 160, the microphone 288, the speaker 282, and the wireless communication circuit 170; and a memory (e.g., the memory 130 of FIG. 1 or the memory 230 of FIG. 2) positioned inside the housing and electrically connected with the processor 120, wherein the memory 130 stores instructions that, when executed, cause the processor to: receive a user input including a request for performing a task using at least one external device, through the display 160 or the microphone 288; identify the at least one external device, based at least partially on at least one signal obtained via the wireless communication circuit 170; transmit data associated with the user input to an external server via the wireless communication circuit 170; transmit information on the at least one external device to the external server via the wireless communication circuit 170, along with the data or after transmitting the data; receive a response including information on a sequence of states of the electronic device to perform at least a part of the task using the external device, from the external server via the wireless communication circuit 170; and perform the task by obtaining the sequence of the states.

According to various embodiments, the instructions may cause the processor 120 to: obtain first information for identification of the at least one external device, based on the data associated with the user input; obtain second information for identification of the at least one external device, based on the at least one signal; and identify the at least one external device based on the first information and the second information.

According to various embodiments, the electronic device may further include a sensor module (e.g., the sensor module 240 of FIG. 2) electrically connected with the processor 120, wherein the instructions cause the processor 120 to identify the at least one external device additionally based on the data obtained by the sensor module.

According to various embodiments, the instructions may cause the processor 120 to obtain first information for identification of the at least one external device based on voice data corresponding to a voice signal uttered by the user.

According to various embodiments, the electronic device may further include a plurality of antennas electrically connected with the wireless communication circuit 170, wherein the instructions cause the processor 120 to: obtain at least one signal via the plurality of antennas; detect a phase difference obtained when the at least one signal arrives at the plurality of antennas; and obtain the second information based on the phase difference.

According to various embodiments, the electronic device may further include a gyro sensor (e.g., the gyro sensor 240B) electrically connected with the processor 120, wherein the instructions cause the processor 120 to obtain the second information based on data obtained by the gyro sensor 240B and the phase difference of each of the at least one signal.

According to various embodiments, the at least one signal may include a broadcasting signal including a device ID of the at least one external device.

According to various embodiments, the instructions may cause the processor 120 to receive a trigger input that activates a task performance mode using the at least one external device.

According to various embodiments, the instructions may cause the processor 120 to perform at least one task from among: displaying service information corresponding to the identified at least one external device; transmitting a control instruction to the identified at least one external device; and transmitting, to the identified at least one external device, an instruction that causes the identified at least one external device to interwork with another external device.

Figure 26A:
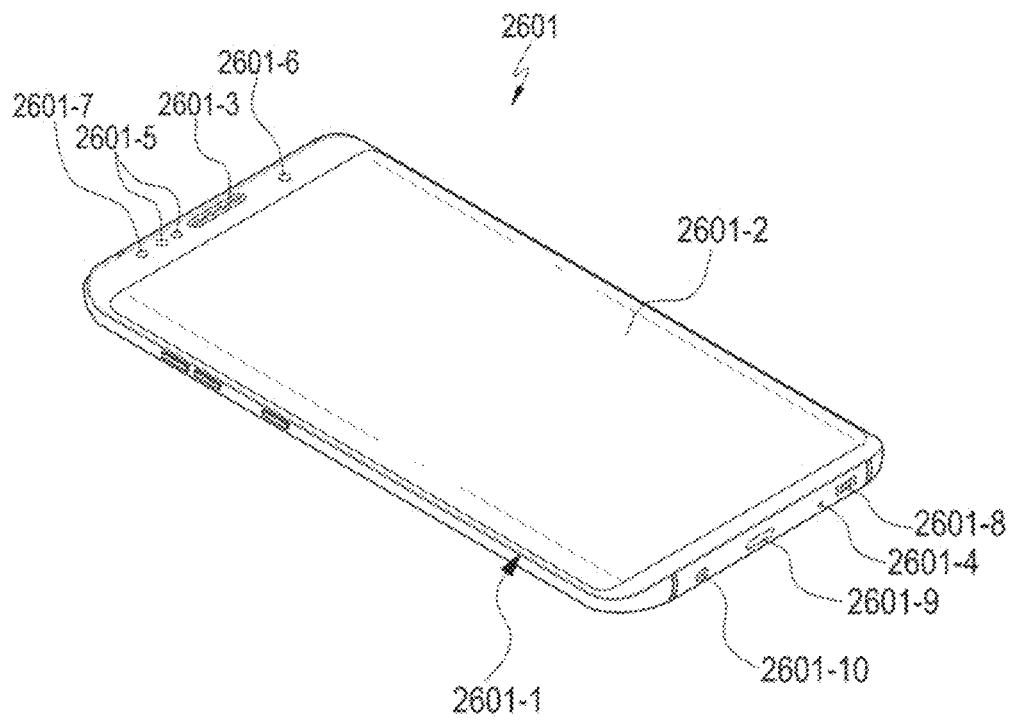
FIG. 26A is a perspective view of the electronic device according to an embodiment of the disclosure.

FIG. 26A is a perspective view of the electronic device according to an embodiment of the disclosure.

Referring to 26A, "X" in a triaxial rectangular coordinate system may represent the width direction of an electronic device 1601 (e.g., 101 of FIG. 1, 201 of FIG. 2, or 401 of FIG. 4), may represent the longitudinal direction of the electronic device 2601, or may represent the thickness direction of the electronic device 2601.

The electronic device 2601 may include a housing 2601-1. According to an embodiment, a housing 2601-1 may be formed of a conductive member and/or a non-conductive member. According to an embodiment, the electronic device 2601 may include a touch screen display 2601-2 disposed in a manner such that the touch screen display 2601-2 is exposed through at least a part of the area of the housing 2601-1. According to an embodiment, the touch screen display 2601-2 may include a pressure sensor, and may operate as a pressure responsive touch screen display. According to an embodiment, the electronic device 2601 may be disposed in the housing 2601-1, and may include a receiver 2601-3 for outputting a voice of the other end of the line. According to an embodiment, the electronic device 2601 may be disposed in the housing 2601-1, and may include a microphone device 2601-4 for transmitting a user's voice to the other end of the line. According to various embodiments, the electronic device 2601 may include components disposed in a manner such that the components are exposed on the touch screen display 2601-2, or are not exposed while performing functions via a window, so as to perform various functions of the electronic device 2601. According to an embodiment, the components may include at least one sensor module 2601-5. The sensor module 2601-5 may include, for example, an illumination sensor (e.g., a light sensor), a proximity sensor (e.g., a light sensor), an infrared sensor, an ultrasonic sensor, a fingerprint sensor, or an iris recognition sensor. According to an embodiment, the component may include a camera device 2601-6. According to an embodiment, the component may include an indicator 2601-7 (e.g., an LED device) for visually providing the user with status information of the electronic device. According to an embodiment, at least one of the components may be disposed to be exposed through at least a part of the area of the housing 2601-1. According to various embodiments, the electronic device 2601 may include a speaker device 2601-8 disposed on one side of the microphone device 2601-4.

According to various embodiments, the electronic device may include an interface connector port 2601-9 that is disposed on the other side of the microphone device 2601-4 and receives a data transmission/reception function by an external device and external power so as to charge the electronic device 2601. According to various embodiments, the electronic device 2601 may include an ear jack assembly 2601-10 that is disposed on one side of the interface connector port 2601-9.

Figure 26B:
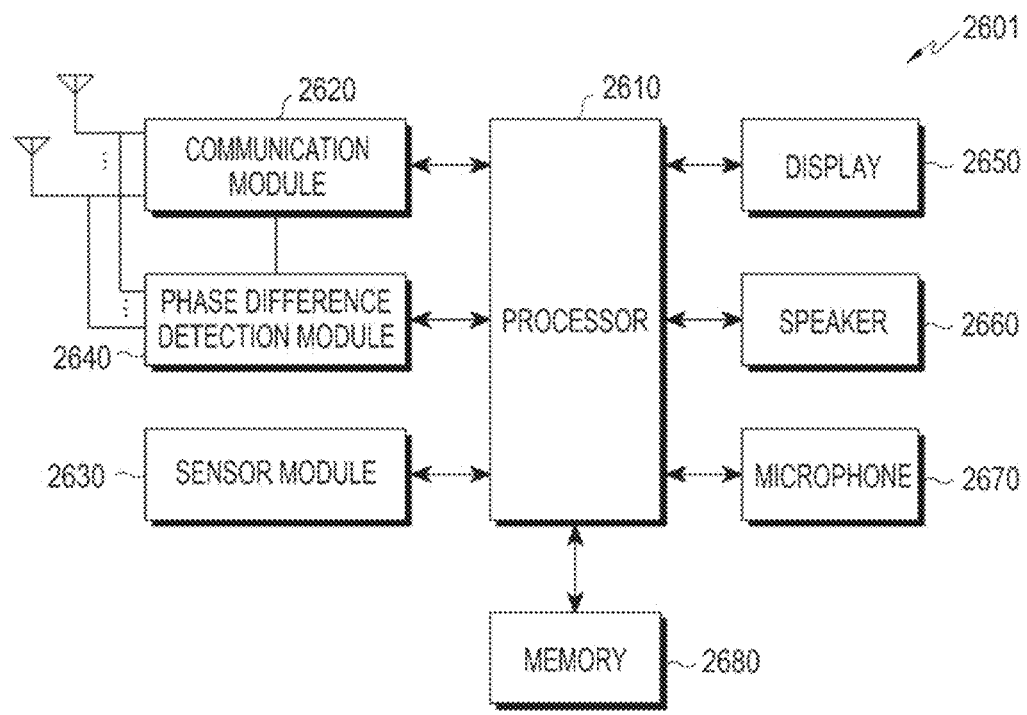
FIG. 26B is a configuration diagram of the electronic device according to an embodiment of the disclosure.

FIG. 26B is a configuration diagram of the electronic device according to an embodiment of the disclosure.

Referring to FIG. 26B, the electronic device 2601 (e.g., 101 of FIG. 1, 201 of FIG. 2, 401 of FIG. 4, 601 of FIGS. 6A and 6B, 701 of FIGS. 7A and 7B, 801 of FIGS. 8A and 8B, 901 of FIGS. 9A to 9N, 1001 of FIG. 10, 1101 of FIG. 11, 1201 of FIGS. 12A and 12B, 1301 of FIGS. 13A to 13E, 1401 of FIG. 14, 1501 of FIGS. 15A to 15C, 1601 of FIG.

16, 1701 of FIG. 17A, 1801 of FIG. 18, 1901 of FIG. 19, 2001 of FIG. 20, operations 2101 of FIG. 21, 2201 of FIG. 22, or 2301 of FIG. 23) may include the processor 2610, a communication module 2620, a sensor module 2630, a phase difference detection module 2640, a display 2650, a speaker 2660, and a microphone 2670.

The communication module 2620 may include all of a part of the communication interface 170 of FIG. 1 and the communication module 220 of FIG. 2. According to various embodiments, the communication module 2620 may be connected with two or more antennas, and may transmit or receive a radio frequency (RF) signal through the two or more antennas. According to various embodiments, the communication module 2620 may transmit or receive a radio frequency signal via at least one communication protocol from among a Bluetooth protocol, a Bluetooth low energy (BLE) protocol, a Wi-Fi protocol, a beacon protocol, a ZigBee protocol, near field communication (NFC) protocol, and another communication protocol designated for an internet-of-things (IoT) service. According to an embodiment, the communication module 2620 may receive a signal from at least one external device (e.g., the first to Nth external device 403-1 to 403-N of FIG. 4). According to an embodiment, the communication module 2620 may receive a signal broadcasted from each of the at least one external device (e.g., the first to Nth external device 403-1 to 403-N of FIG. 4). The communication module 2620 may receive a signal periodically broadcasted from the at least one external device, and may request a signal from the at least one external device and then receive the signal broadcasted from the at least one external device.

The phase difference detection module 2640 may be connected with the plurality of antennas, and may detect a phase difference obtained when the at least one signal obtained by the communication module 2620 arrives at the plurality of antennas. According to an embodiment, when the communication module 2620 receives at least one signal through two antennas, the at least one signal may separately arrive at the two antennas, and the phase difference detection module 2640 may detect an arrival phase difference between a signal arriving at a first antenna among the two antennas (hereinafter, referred to as "a first signal") and a signal arriving at a second antenna of the two antennas (hereinafter, referred to as "a second signal"). According to an embodiment, the phase difference detection module 2640 may detect a signal magnitude difference between the first signal arriving at the first antenna and the second signal arriving at the second antenna. According to an embodiment, the phase difference detection module 2640 may detect a phase difference of the first signal and the second signal on the basis of a phase of the first signal arriving at the first antenna and a phase of the second signal arriving at the second antenna.

The processor 2610 (e.g., 120 of FIG. 1 or 210 of FIG. 2) may control the overall operation of the electronic device 2601. The processor 2610 may include one or more among a central processing unit, an application processor, a communication processor (CP). The processor 2610 may perform, for example, operation or data processing relating to control and/or communication of at least one other element of the electronic device 2601.

According to various embodiments, the processor 2610 may receive a user input through the sensor module 2630, the display 2650, or the microphone 2670, and may obtain data related to the received user input. According to an embodiment, the electronic device 2601 may receive a voice signal uttered by a user through the microphone 2670. For example, the user may utter a sentence including an instruction, such as "Turn off the light", "What is that?", "Play music using that", "Turn that off 10 minutes later", and "Does that need to be charged?", etc., or including an instruction and a demonstrative pronoun. The processor 2610 may convert the voice signal received through the microphone 2670 into voice data. The processor 2610 may obtain first information for identification of at least one external device on the basis of the voice data. The processor 2610 may provide the voice data to an external server (e.g., 405 of FIG. 4), and may obtain the first information for identification of at least one external device from the external server or may autonomously obtain the first information for identification of the at least one external device.

In the case of autonomously obtaining the first information, the processor 2610 may perform voice recognition on the basis of the voice data, may perform natural-language understanding to obtain information related to an indication target, a demonstrative pronoun, an instruction, or a function, and may obtain the first information for identification of the at least one external device on the basis of the obtained information related to the indication target, the demonstrative pronoun, the instruction, or the function. According to an embodiment, the first information may include an external device list. The external device list may include device recognition information of at least one external device. In addition, the first information may further include information indicating that second information for identification of the external device is required.

The processor 2610 may obtain second information for identification of the external device on the basis of the phase difference for each of the at least one signal, which is detected by the phase difference detection module 2640. According to an embodiment, the processor 2610 may determine at least one signal having a phase difference equal to or smaller than a predetermined threshold value, on the basis of the phase difference for each of at least one signal, and may obtain second information of an external device corresponding to the at least one signal having the phase difference equal to or smaller than the predetermined threshold value. For example, the second information may include device recognition information of the external device corresponding to the signal having the phase difference equal to or smaller than the predetermined threshold value.

The processor 2610 may obtain at least one external device on the basis of the first information and the second information. According to an embodiment, the processor 2610 may identify an external device, in which a phase difference is equal to or smaller than the predetermined threshold value, from among the external device list obtained based on voice data. For example, the processor 2610 may identify at least one external device corresponding to a signal received via the plurality of antennas, which has a phase difference thereof equal to or smaller than the predetermined threshold value, according to the second information, from among external devices included in the first information (e.g., an external device list) obtained based on the voice data. For example, the processor 2610 may identify the external device by identifying an external device in the direction toward which the electronic device 2601 is oriented, from among the external devices identified via first information based on the voice signal uttered by the user.

The process 2610 may obtain information for performing a task using the external device on the basis of data associated with the user input and information of the identified at least one external device. According to various embodiments, the data related to the user input may include voice data, and the identified at least one external device may include device recognition information (e.g., a device ID). According to various embodiments, the processor 2610 may transmit voice data and voice recognition information to an external server, may acquire, from the external server, information for performing a task using the obtained external device on the basis of the voice data and the voice recognition information, or may autonomously obtain information for performing the task using the external device by using the voice data and the device recognition information.

According to an embodiment, in the case of autonomously obtaining information for performing the task using the external device by using the voice data and the device recognition information, the processor 2610 may perform voice recognition on the basis of the voice data, may perform natural-language understanding with respect to the recognized voice to obtain information related to an indication target, a demonstrative pronoun, an instruction, or a function, and may obtain information for performing the task, which includes at least a part of the instruction or function related to the external device corresponding to the device recognition information, on the basis of the device recognition information and the information related to the indication target, demonstrative pronoun, instruction, or function. For example, when "that" (demonstrative pronoun) and "turn on the light" (instruction) are obtained as information related to an indication target, a demonstrative pronoun, an instruction, or a function, and device recognition information for a smart light is obtained as information of an identified at least one external device, the processor 2610 may obtain information used for performing a task of providing an instruction to turn on the power of the smart light. According to an embodiment, the processor 2610 may acquire, as information for performing a task of providing an instruction to turn off the power of the smart light, sequence information of states related to one or more operations of the electronic device 2601, which are necessary for providing an instruction to turn off the power of the smart light, or of states related to a combination of the one or more operations. For example, the sequence information of states related to the one or more operations of the electronic device 2601, which are necessary for providing an instruction to turn off the power of the smart light, or of states relating to the combination of the one or more operations may include each or a combination of connecting for communication with the smart light, transmitting a power-off instruction to the smart light, and receiving a power-off result from the smart light.

According to various embodiments, the process 2610 may perform a task by using information for performing the task using the external device. According to an embodiment, the process 2610 may perform the task of providing an instruction to turn off the power of the smart light by performing each or a combination of connecting-communication with the smart light, transmitting the power-off instruction to the smart light, and receiving the power-off result from the smart light, by using the sequence information of states of the one or more operations of the electronic device 2601, which are necessary for providing an instruction to turn off the power of the smart light, or of states of the combination of the one or more operations. According to various embodiments, the processor 2610 may perform a task of displaying service information corresponding to the identified at least one external device, may perform a task of transmitting, to the identified at least one external device, a control instruction to allow the identified at least one external device to perform the control instruction, or may perform a task of transmitting, to the identified at least one external device, an instruction to allow the identified at least one external device to interwork with another external device.

Figure 26C:
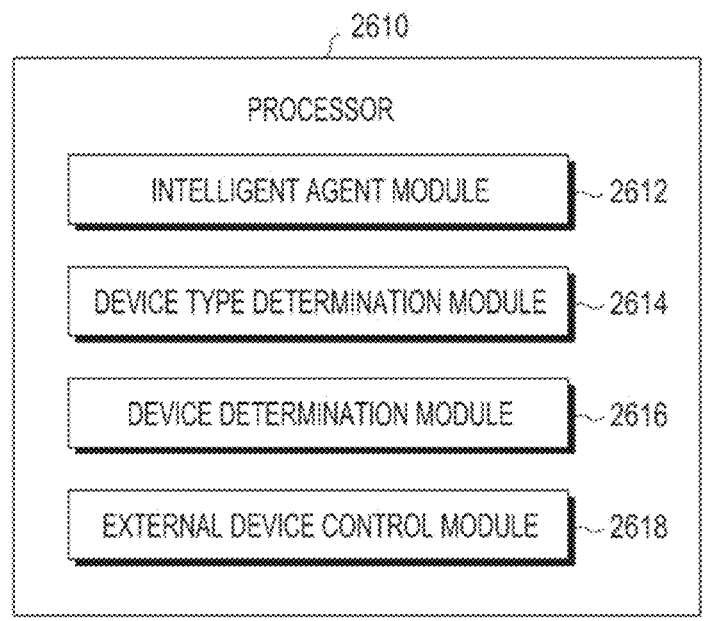
FIG. 26C is a configuration diagram of a processor of the electronic device according to an embodiment of the disclosure.

According to an embodiment, the processor 2610 may include all or some of an intelligent agent module, a device type determination module, a device determination module, and an external device control module. As shown in FIG. 26C, the processor 2610 may operate using all or some of the intelligent agent module 2612, the device type determination module 2614, the device determination module 2616, and the external device control module 2618.

A memory 2680 (e.g., the memory 130) may include a volatile and/or non-volatile memory. The memory 2680 may store, for example, an instruction or data related to at least one other element of the electronic device 1001. According to an embodiment, the memory 2680 may store software and/or a program. According to an embodiment, the memory 2680 may store instructions for performing operations performed by the processor 2610.

The sensor module 2630 (e.g., 240 of FIG. 2) may include at least one sensor, and may obtain a sensing value obtained by the at least one or more sensors. According to various embodiments, the sensor module may include at least one sensor among a gesture sensor, a gyro sensor, an air pressure sensor, a magnetic sensor, an acceleration sensor, a grip sensor, a proximity sensor, an RGB sensor, a biometric sensor, a temperature/humidity sensor, an illumination sensor, and a UV sensor. According to an embodiment, a sensing value obtained by the at least one sensor may be used to correct a phase difference of at least one signal. According to an embodiment, the sensor module 2630 may obtain a sensing value obtained by at least one sensor (e.g., a gyro sensor and an acceleration sensor) according to a gesture input made by a user to designate a range, and the obtained sensing value may be transferred to the processor 2610 so as to be used to determine information relating to a posture of the electronic device 2601 or a direction toward which the electronic device 2601 is oriented, or to correct the information relating to the posture of the electronic device 2601 or the direction toward which the electronic device 2601 is oriented.

FIG. 26C is a configuration diagram of a processor of the electronic device according to an embodiment of the disclosure.

Referring to FIG. 26C, the processor 2610 may include all or some of the intelligent agent module 2612, the device type determination module 2614, the device determination module 2616, and the external device control module 2618.

The intelligent agent module 2612 may perform an operation of obtaining first information for identification of at least one external device on the basis of a voice signal received through the microphone 1370 and voice data related to the received voice signal. The intelligent agent module 2612 may provide voice data to an external server (405 of FIG. 4), may acquire, from the external server, information related to an indication target, a demonstrative pronoun, an instruction, or a function according to the results of performing voice recognition and natural-language understanding with respect to the voice data, or may autonomously perform voice recognition and natural-language understanding on the basis of the voice data, so as to obtain the information related to the indication target, the demonstrative pronoun, the instruction, or the function. The intelligent agent module 2612 may provide the device type determination module 2614 with the information related to the indication target, the demonstrative pronoun, the instruction, or the function which are obtained based on the voice data. For example, the intelligent agent module 2612 may obtain a demonstrative pronoun corresponding to "that" and a control instruction "turn on the light" on the basis of the voice data corresponding to a user's voice "Turn on the light of that".

The device type determination module 2614 may generate first information for identification of at least one external device, on the basis of the information related to the indication target, the demonstrative pronoun, the instruction, or the function, which is provided from the intelligent agent module 2612. The device type determination module 2614 may transfer, to the external device control module 2618, an external device list generated based on the information related to the indication target, the demonstrative pronoun, the instruction, or the function, which is provided from the intelligent agent module 2612. According to an embodiment, the first information may include an external device list. The external device list may include device recognition information of at least one external device. In addition, the first information may further include information indicating that second information for identification of the external device is required.

For example, the device type determination module 2614 may receive a demonstrative pronoun corresponding to "that" and a control instruction "turn on the light" from the intelligent agent module 2612, and may generate first information on the basis of the demonstrative pronoun corresponding to "that" and the control instruction "turn on the light" from the intelligent agent module 2612. For example, the device type determination module 2614 may identify external devices controllable by the current user by using a registration account, and may generate an external device list including an external device capable of performing the control instruction "turn on the light" from among the external devices controllable by the user or may identify external devices registered in the current electronic device 2601, and may generate the external device list including the external device capable of performing the control instruction "turn on the light" from among the external devices registered in the current electronic device 2601. According to various embodiments, the device type determination module 2614 may generate the external device list by associating with an external IoT server on the basis of a part of information of the current electronic device 2601 or account information registered in the electronic device 2601, and may generate the external device list by using sensing information (e.g., location information, etc.) obtained by the current electronic device 2601 or context information stored in the electronic device 2601. For example, when the current location of the electronic device 2601 is an office, the electronic device 2601 may generate an external device list (hereinafter, referred to as a "first external device list") having external devices currently capable of performing the control instruction "turn on the light" from among external devices controllable at the office via the electronic device 2601.

According to various embodiments, the device determination module 2616 may obtain second information for identification of the external device on the basis of a phase difference for each of the at least one signal, which is detected by the phase difference detection module 2640. According to an embodiment, the device determination module 2616 may determine at least one signal having a phase difference equal to or smaller than a predetermined threshold value, on the basis of the phase difference for each of at least one signal, and may obtain second information of an external device corresponding to the at least one signal having the phase difference equal to or smaller than the predetermined threshold value. For example, the second information may include an external device list (hereinafter, referred to as a "second external device list") corresponding to the signal having the phase difference equal to or smaller than the predetermined threshold value. For example, the device determination module 2616 may determine the direction that the electronic device 2601 indicates, on the basis of the phase difference for each of at least one signal, and may specify the at least one external device toward which the electronic device 2601 is oriented, by using the determination of the direction. According to an embodiment, the device determination module 2616 may specify at least one external device toward which the electronic device 2601 is oriented, by further using information received from various sensors or information associated with RF, such as an SNR for each of at least one signal or the signal magnitude of each of the at least one signal, in addition to the phase difference for each of the at least one signal. According to an embodiment, the device determination module 2616 may further receive a sensing value obtained by at least one sensor included in the sensor module 2630, or context information collected from outside the electronic device, such as the season, weather, time, etc., may correct the phase difference for each of the at least one signal by using the received sensing value or context information, and may determine the direction that the electronic device 2601 indicates, on the basis of the corrected phase difference for each of the at least one signal. The device determination module 2616 may sense the distance between the at least one external device and the electronic device 2601 by using the phase difference for each of the at least one signal and the signal magnitude of each of the at least one signal.

The external device control module 2618 may identify at least one external device on the basis of information related to an indication target, a demonstrative pronoun, an instruction, or a function, first information, and second information, and may obtain information for performing a task using the identified at least one external device. According to an embodiment, the external device control module 2618 may identify at least one external device for performing a task, by comparing a first external device list included in the first information with a second external device list included in the second information. According to an embodiment, the external device control module 2618 may obtain information for performing a task using the identified at least one external device and information related to an indication target, a demonstrative pronoun, an instruction, or a function. For example, the external device control module 2618 may obtain information for performing a task including at least a part of an instruction or a function related to an external device corresponding to device recognition information, on the basis of the device recognition information of the identified at least one external device and the information related to the indication target, the demonstrative pronoun, the instruction, or the function. For example, when "that" (demonstrative pronoun) and "turn on the light" (instruction) are obtained as the information related to the indication target, the demonstrative pronoun, the instruction, or the function, and device recognition information for a smart light is obtained as information of the identified at least one external device, the external device control module 2618 may obtain information for performing a task of providing an instruction to turn off the power of a smart light. According to an embodiment, the external device control module 2618 may acquire, as information for performing the task of providing an instruction to turn off the power of the smart light, sequence information of states related to one or more operations of the electronic device 2601, which are necessary for providing an instruction to turn off the power of the smart light, or of states related to a combination of the one or more operations. For example, the sequence information of states related to the one or more operations of the electronic device 2601, which are necessary for providing an instruction to turn off the power of the smart light, or of states relating to the combination of the one or more operations may include each or a combination of connecting for communication with the smart light, transmitting a power-off instruction to the smart light, and receiving a power-off result from the smart light.

According to various embodiments, the external device control module 2618 may perform the task by using information for performing the task using the external device. According to an embodiment, the external device control module 2618 may perform the task of providing an instruction to turn off the power of the smart light by performing each or a combination of connecting-communication with the smart light, transmitting the power-off instruction to the smart light, and receiving the power-off result from the smart light, by using the sequence information of states of the one or more operations of the electronic device 2601, which are necessary for providing an instruction to turn off the power of the smart light, or of states of the combination of the one or more operations. According to various embodiments, the external device control module 2618 may perform a task of displaying service information corresponding to the identified at least one external device, may perform a task of transmitting, to the identified at least one external device, a control instruction to allow the identified at least one external device to perform the control instruction, or may perform a task of transmitting, to the identified at least one external device, an instruction to allow the identified at least one external device to interwork with another external device.

According to various embodiments, a method for performing a task using an external device by an electronic device (e.g., 101 of FIG. 1, 201 of FIG. 2, 401 of FIG. 4, 601 of FIGS. 6A and 6B, 701 of FIGS. 7A and 7B, 801 of FIGS. 8A and 8B, 901 of FIGS. 9A to 9L, 1001 of FIG. 10, 1101 of FIG. 11, 1201 of FIGS. 12A and 12B, 1301 of FIGS. 13A to 13E, 1401 of FIG. 14, 1501 of FIG. 15A through FIG. 15C, 1601 of FIG. 16, 1701 of FIG. 17A, 1801 of FIG. 18, 1901 of FIGS. 19A and 19B, 2001 of FIG. 20, operations 2101 of FIG. 21, 2201 of FIG. 22, 2301 of FIG. 23, or 2601 of FIGS. 26A and 26B) may include: receiving a user input including a request for performing a task using at least one external device; identifying the at least one external device based at least partially on at least one signal obtained via a wireless communication circuit; and performing the task on the basis of data related to the user input and at least a part of information of the identified at least one external device.

According to various embodiments, the method may further include: transmit data associated with the user input to an external server via the wireless communication circuit; transmitting information on the at least one external device to the external server via the wireless communication circuit (e.g., the communication module 2620), along with the data or after transmitting the data; receiving a response including information on a sequence of states of the electronic device, to perform at least a part of the task using the external device, from the external server via the wireless communication circuit 2620; and performing the task by obtaining the sequence of the states.

According to various embodiments, the identifying of the at least one external device may include: obtaining first information for identification of the at least one external device, based on the data associated with the user input; obtaining second information for identification of the at least one external device, based on at least one signal; and identifying the at least one external device based on the first information and the second information.

According to various embodiments, the identifying of the at least one external device may include identifying the at least one external device additionally based on data obtained by a sensor module (e.g., the sensor module 2630).

According to various embodiments, the obtaining of the first information may include obtaining the first information for identification of the at least one external device, based on voice data corresponding to a voice signal uttered by the user.

According to various embodiments, the obtaining of the second information may include: obtaining the at least one signal via a plurality of antennas; detecting a phase difference obtained when the at least one signal arrives at the plurality of antennas; and obtaining the second information based on the phase difference.

According to various embodiments, the obtaining of the second information may include obtaining the second information based on the data obtained by a gyro sensor (e.g., the gyro sensor 240B) and the phase difference of each of the at least one signal.

According to various embodiments, the at least one signal may include a broadcasting signal including device information (e.g., a device ID) of the at least one external device.

According to an embodiment, the method further includes receiving a trigger input for activating a task performance mode using the at least one external device.

Figure 27A:
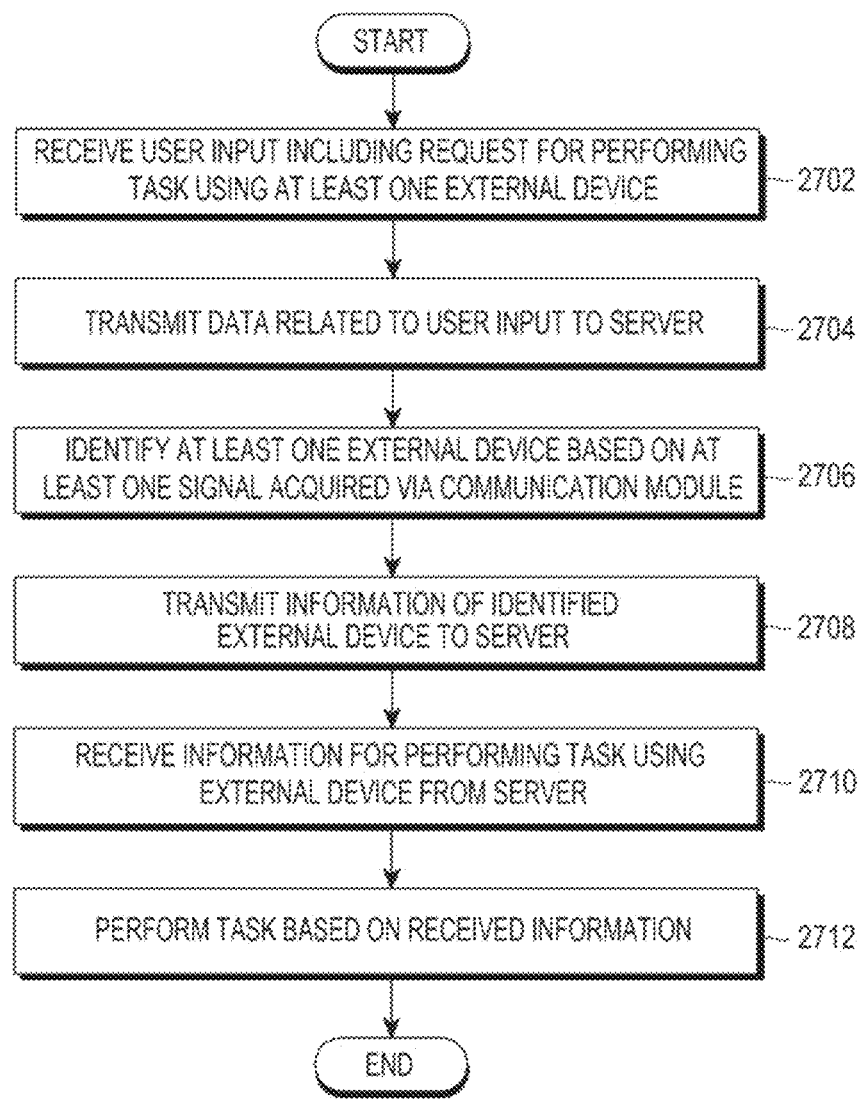
FIGS. 27A and 27B is a flow diagram of operations of the electronic device according to various embodiments of the disclosure.
Figure 27B:
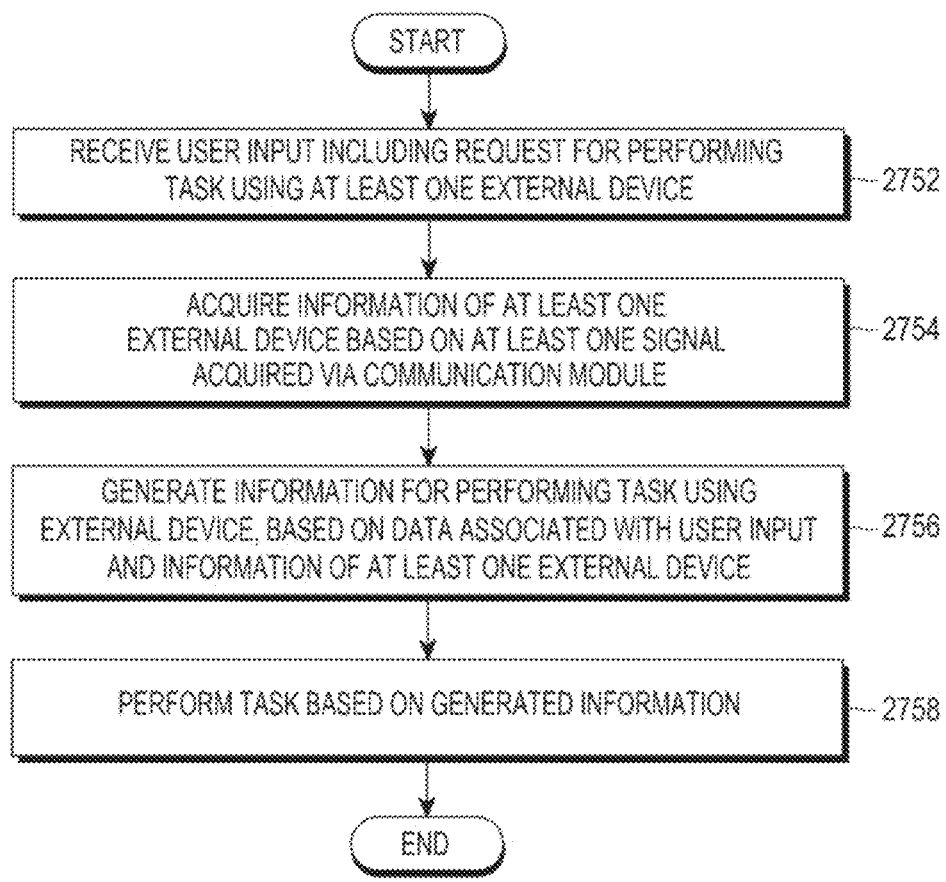

FIGS. 27A and 27B are flow diagrams of operations of the electronic device according to various embodiments of the disclosure.

Referring to 27A, a processor (e.g., 120 of FIG. 1, 210 of FIG. 2, or 2610 of FIG. 26B) (hereinafter, taking an example of the processor 2610 for description) of the electronic device (e.g., 101 of FIG. 1, 201 of FIG. 2, 401 of FIG. 4, or 2601 of FIGS. 26A and 26B) (hereinafter, taking an example of the electronic device 2601 for description) may receive a user input including a request for performing a task using an external device, in operation 2702.

According to an embodiment, the electronic device 2601 may receive the user input through a display (e.g., 2650 of FIG. 26B) or a microphone (e.g., 2670 of FIG. 26B), and may obtain data related to the received user input. According to an embodiment, the electronic device 2601 may receive a voice signal uttered by a user through the microphone 2670. According to various embodiments, the electronic device 2601 may receive a voice signal including instructions, such as voice signals uttered by the user through the microphone 2670, for example, "Turn off the light", "What's that?", "Play songs using that", "Turn that off 10 minutes later", "Does that need to be charged?", etc., or including an instruction and a demonstrative pronoun. The processor 2610 may convert the voice signal received through the microphone 2670 into voice data.

The electronic device 2601 may transmit data related to the user input to an external server (e.g., 106 of FIG. 1 or 405 or FIG. 4) at operation 2704. According to an embodiment, the data related to the user input may be voice data related to a voice signal uttered by the user. According to various embodiments, the external server may perform voice recognition on the basis of the voice data, may perform natural-language understanding to obtain information related to an indication target, a demonstrative pronoun, an instruction, or a function, and may obtain first information for identification of at least one external device on the basis of the obtained information related to the indication target, the demonstrative pronoun, the instruction, or the function and transmit the obtained first information to the electronic device 2601. According to an embodiment, the first information may include an external device list. The external device list may include device recognition information (e.g., a device ID) of at least one external device. In addition, the first information may further include information indicating that the electronic device 2601 requires second information for identifying the external device. According to various embodiments, the process 2610 may autonomously obtain the first information for identification of at least one external device on the basis of the voice data, without transmitting the voice data to the external server.

The electronic device 2601 may identify at least one external device on the basis of at least one signal obtained via a communication module (e.g., 2620 of FIG. 26B), in operation 2706. According to various embodiments, the processor 2610 may obtain at least one external device by using the first information obtained based on the data related to the user input and the second information obtained based on at least one external device signal. For example, the processor 2610 may identify at least one external device corresponding to a signal arriving at a plurality of antennas, which has a phase difference thereof equal to or smaller than a predetermined threshold value, according to the second information, from among external devices included in the first information (e.g., an external device list) obtained based on the voice data. For example, among external devices identified by a voice signal uttered by the user, the processor 2610 may identify an external device to perform a task, by identifying the external device toward which the user orients the electronic device 2601.

The electronic device 2601 may transmit information of the identified at least one external device to the external server (e.g., 106 of FIG. 1 or 405 of FIG. 4), in operation 2708. According to various embodiments, the processor 2610 may transmit device recognition information of the identified at least one external device to the external server via the communication module 2620. According to various embodiments, the external server may receive data (e.g., voice date) related to the user input and device recognition information (e.g., a device ID) of at least one external device. The external server may perform voice recognition on the basis of the voice data, may perform natural-language understanding with respect to the recognized voice to obtain information related to an indication target, a demonstrative pronoun, an instruction, or a function, and may obtain information for performing a task including at least a part of an instruction or a function related to an external device corresponding to the device recognition information on the basis of the device recognition information and the information related to the indication target, the demonstrative pronoun, the instruction, or the function, so as to transmit the obtained information to the electronic device 2601. For example, when "that" (demonstrative pronoun) and "turn on the light" (instruction) are obtained as the information related to the indication target, the demonstrative pronoun, the instruction, or the function, and a device ID of a smart light are obtained as information of the identified at least one external device, the external server may generate information for performing a task of providing an instruction to turn off the power of the smart light so as to transmit the generated information to the electronic device 2601.

In operation 2710, the electronic device 2601 may receive, from the external server, information for performing the task using the external device. According to an embodiment, the processor 2610 may receive, as information for performing a task of providing an instruction to turn off the power of the smart light, sequence information of states related to one or more operations of the electronic device 2601, which are necessary for providing an instruction to turn off the power of the smart light, or of states related to a combination of the one or more operations, from an external server.

The electronic device 2601 may perform the task on the basis of the received information, in operation 2712. According to an embodiment, the processor 2610 may perform the task of providing an instruction to turn off the power of the smart light, by performing each or a combination of connecting-communication with the smart light, transmitting the power-off instruction to the smart light, and receiving the power-off result from the smart light, by using the sequence information of states of the one or more operations of the electronic device 2601, which are necessary for providing an instruction to turn off the power of the smart light, or of states of the combination of the one or more operations.

Referring to 27B, a processor (e.g., 120 of FIG. 1, 210 of FIG. 2, or 2610 of FIG. 26B) (hereinafter, taking an example of the processor 2610 for description) of the electronic device (e.g., 101 of FIG. 1, 201 of FIG. 2, 401 of FIG. 4, or 2601 of FIGS. 26A and 26B) (hereinafter, taking an example of the electronic device 2601 for description) may receive a user input including a request for performing a task using an external device, in operation 2752. According to an embodiment, the electronic device 2601 may receive the user input through a display (e.g., 2650 of FIG. 26B) or a microphone (e.g., 2670 of FIG. 26B), and may obtain data related to the received user input. According to an embodiment, the electronic device 2601 may receive a voice signal uttered by a user through the microphone 2670. According to various embodiments, the electronic device 2601 may receive a voice signal including instructions, such as voice signals uttered by the user through the microphone 2670, for example, "Turn off the light", "What's that?", "Play songs using that", "Turn that off 10 minutes later", "Does that need to be charged?", etc., or including an instruction and a demonstrative pronoun. The processor 2610 may convert the voice signal received through the microphone 2670 into voice data.

The electronic device 2601 may identify information of at least one external device on the basis of at least one signal obtained via a communication module (e.g., 2620 of FIG. 26B), in operation 2754.

The electronic device 2601 may generate information for performing a task using an external device on the basis of data related to the user input and information of at least one external device, in operation 2756. According to various embodiments, the data related to the user input may include voice data related to a voice signal uttered by the user, and information of at least one external device may include second information of the at least one external device toward which the electronic device 2601 is oriented. For example, the second information may include device recognition information (e.g., a device ID) of an external device (e.g., an electronic device toward which the electronic device 2601 is oriented), in which a phase difference of a signal arriving at a plurality of antennas is equal to or smaller than a predetermined threshold value, from among peripheral devices of the electronic device 2601. According to various embodiments, the electronic device 2601 may perform voice recognition on the basis of the received voice data, may perform natural-language understanding to obtain information related to an indication target, a demonstrative pronoun, an instruction, or a function, and may obtain first information of at least one external device on the basis of the obtained information related to the indication target, the demonstrative pronoun, the instruction, or the function. According to an embodiment, the first information may include an external device list. The external device list may include device recognition information (e.g., a device ID) of at least one external device. The electronic device 2601 may identify at least one external device to perform a user input-based task on the basis of the first information and the received second information. According to various embodiments, the electronic device 2601 may perform voice recognition on the basis of the voice data, may perform natural-language understanding to obtain information related to an indication target, a demonstrative pronoun, an instruction, or a function with respect to the recognized voice, and may obtain information for performing a task related to the identified external device, on the basis of device recognition information of the identified external device and the information related to the indication target, the demonstrative pronoun, the instruction, or the function.

For example, when "that" (demonstrative pronoun) and "turn on the light" (instruction) are obtained as the information related to an indication target, a demonstrative pronoun, an instruction, or a function, and device recognition information of a smart light is obtained as information of an identified at least one external device, the electronic device 2601 may generate information used for performing a task of providing an instruction to turn off the power of the smart light. For example, the electronic device 2601 may generate, as information for performing a task of providing an instruction to turn off the power of a smart light, sequence information of states related to one or more operations of the electronic device 2601, which are necessary for providing an instruction to turn off the power of the smart light, or of states related to a combination of the one or more operations.

The electronic device 2601 may perform the task on the basis of the generated information, in operation 2758. According to an embodiment, the processor 2610 may perform the task of providing an instruction to turn off the power of the smart light, by performing each or a combination of connecting-communication with the smart light, transmitting the power-off instruction to the smart light, and receiving the power-off result from the smart light, by using the sequence information of states of the one or more operations of the electronic device 2601, which are necessary for providing an instruction to turn off the power of the smart light, or of states of the combination of the one or more operations.

Figure 28:
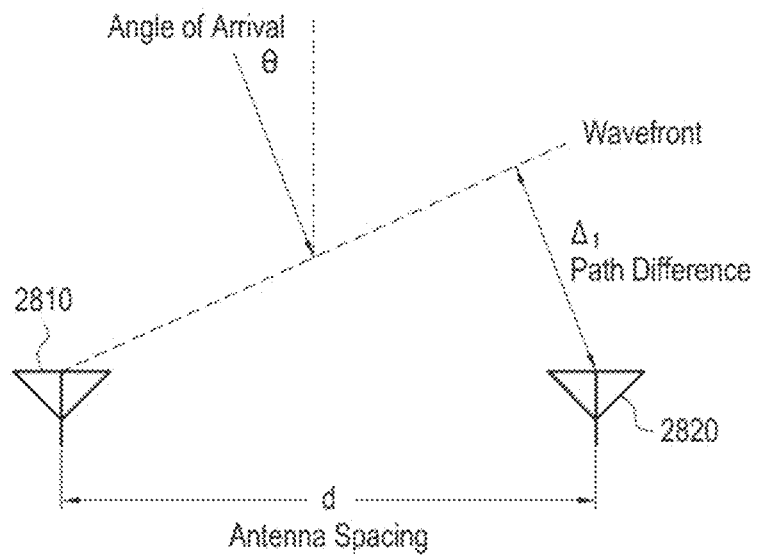
FIGS. 28, 29, and 30 are diagrams for describing a phase difference detection method using a plurality of antennas in the electronic device according to various embodiments of the disclosure.
Figure 29:
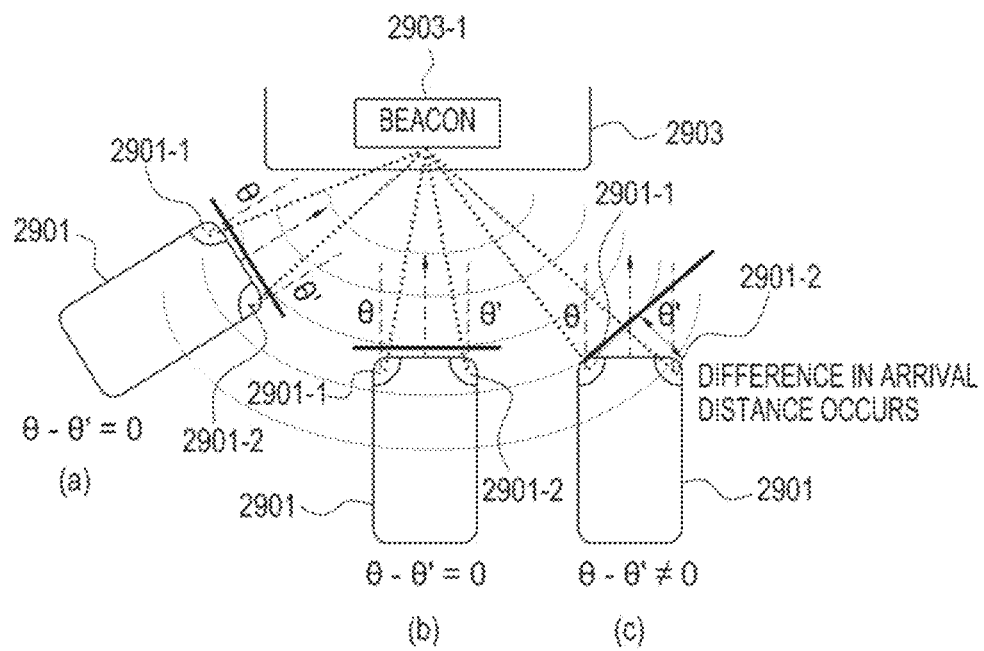
Figure 30:
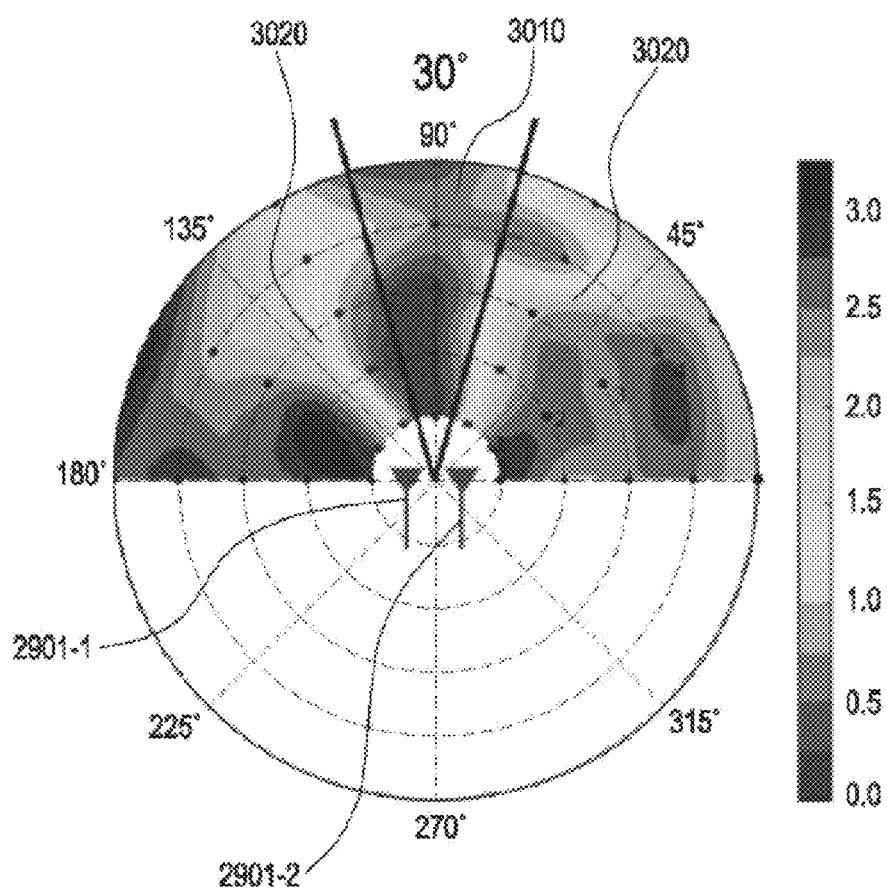

FIGS. 28 to 30 are diagrams for describing a phase difference detection method using a plurality of antennas in the electronic device according to various embodiments of the disclosure.

Referring to FIG. 28, when at least one signal is received via two antennas of an electronic device (e.g., 101 of FIG. 1, 201 of FIG. 2, 401 of FIG. 4, or 2601 of FIGS. 26A and 26B), which are a first antenna 2810 and a second antenna 2820 disposed to have predetermined antenna spacing (d), an arrival time and the angle (θ) of arrival for at least one signal arriving at the first antenna 2810 may be different from those for the at least one signal arriving at the second antenna 2820. According to the difference between the angle of arrival for at least one signal arriving at the first antenna 2810 and the angle of arrival for the at least one signal arriving at the second antenna 2820, a phase difference (Δ1) may occur between a first signal received through the first antenna 2810 and a second signal received through the second antenna 2820, and the phase difference (Δ1) may be smaller as the at least one signal is received in a straight line (to the front) by each of the first antenna 2810 and the second antenna 2820. Accordingly, it may be seen that, as the phase difference (Δ1) obtained according to arrivals of the at least one signal at the first antenna 2810 and the second antenna 2820 is smaller, the first antenna 2810 and the second antenna 2820 receive the at least one signal in a straight line, and the first antenna 2810 and the second antenna 2820 are oriented toward the external device that transmits the at least one signal.

Referring to FIG. 29, a case where an external device 2903 transmits a wireless signal, such as BLE or Wi-Fi, via a beacon 2903-1, and the electronic device 2901 having two antennas, that is, a first antenna 2901-1 and a second antenna 2901-2 is oriented toward a specific direction at each of positions (a), (b), and (c) is shown. When the electronic device 2901 is oriented toward the external device 2903 as shown in positions (a) and (b), the difference between the angle (θ) of arrival for the first antenna 2901-1 and the angle (θ') of arrival for the second antenna 2901-2 may be 0. However, when the electronic device 2901 is not oriented toward the external device 2903 as shown in position (c), a phase difference may occur between the angle (θ) of arrival for the first antenna 2901-1 and the angle (θ') of arrival for the second antenna 2901-2.

Referring to FIG. 30, a phase pattern measured through an actual experiment on the electronic device 2901 having two antennas, that is, the first antenna 2901-1 and the second antenna 2901-2 is shown. According to an embodiment, when the electronic device 2901 having two antennas, that is, the first antenna 2901-1 and the second antenna 2901-2 is oriented toward an external device, a phase difference value corresponding to a section having a small phase difference may be measured as shown in a first section 3010, and a phase difference value corresponding to a section having a large phase difference, as a second section 3020 in which the electronic device 2901 having two antennas, that is, the first antenna 2901-1 and the second antenna 2901-2 is not oriented toward the external device, may be detected.

Figure 31A:
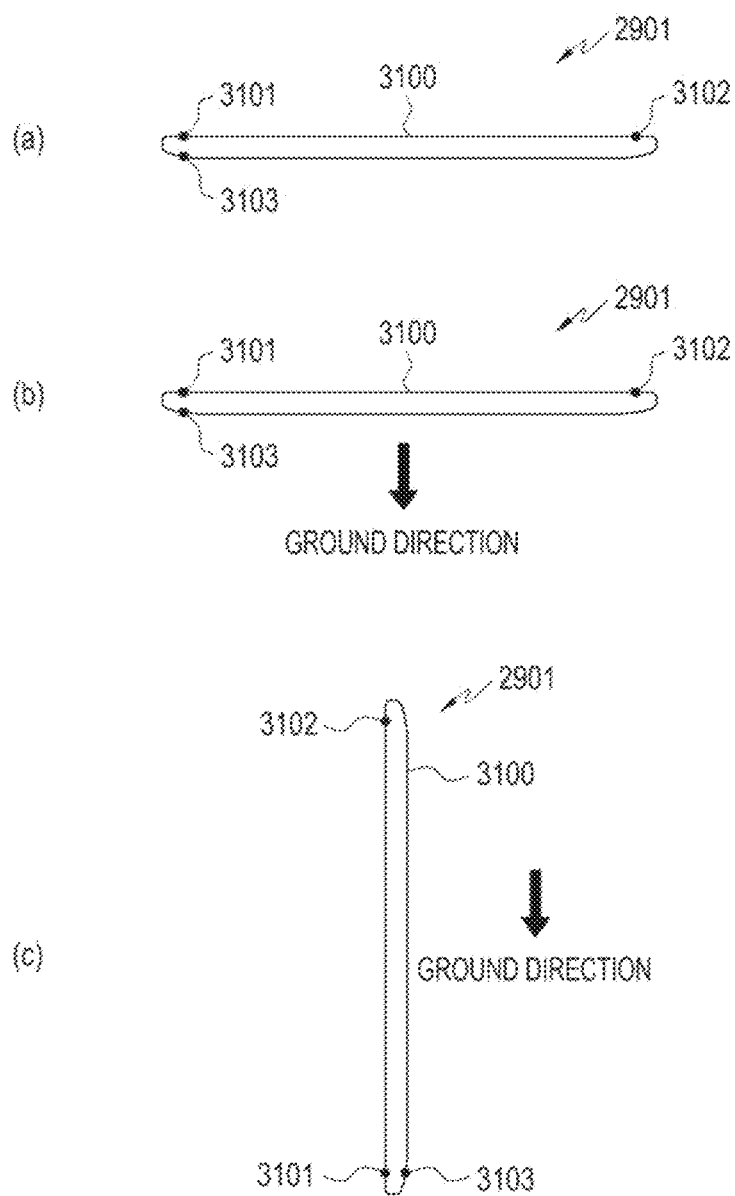
FIGS. 31A and 31B are examples of arranging a plurality of antennas in the electronic device according to various embodiments of the disclosure.
Figure 31B:
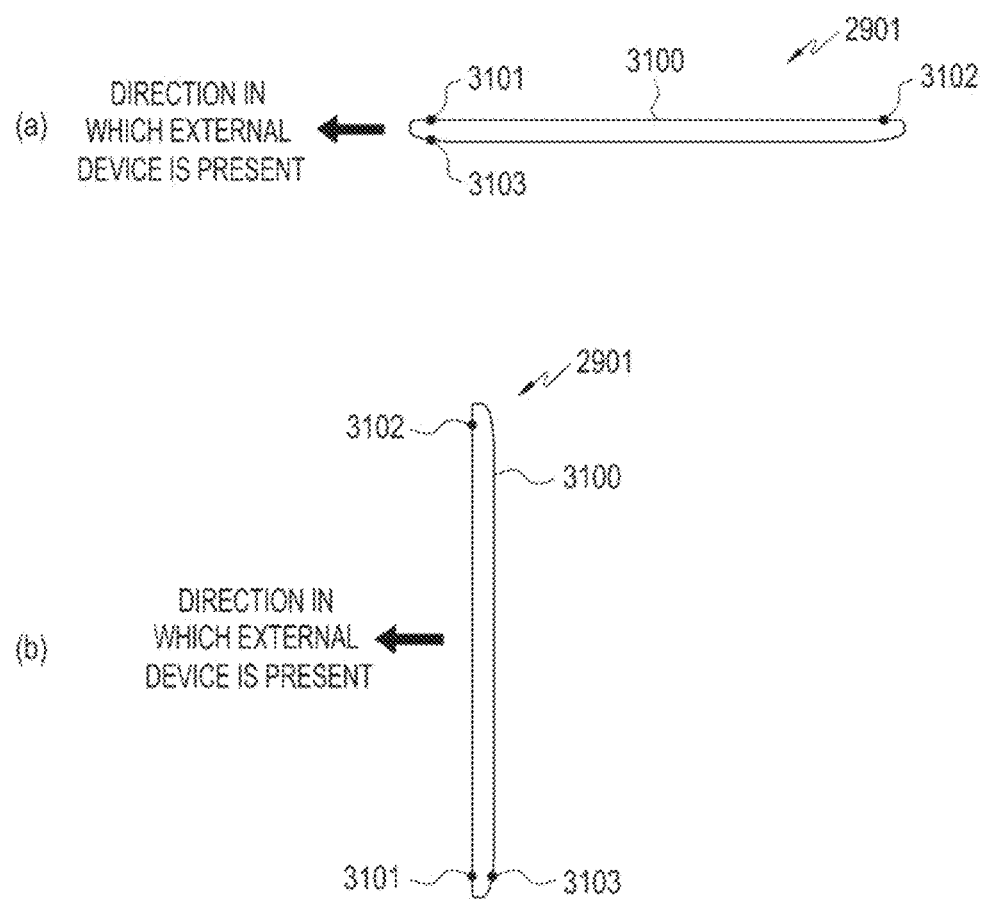

FIGS. 31A and 31B are examples of arranging a plurality of antennas in the electronic device according to various embodiments of the disclosure.

Referring to FIGS. 31A and 31B, an end surface 3100 of the electronic device 2901 (e.g., 101 of FIG. 1, 201 of FIG. 2, 401 of FIG. 4, or 2601 of FIGS. 26A and 26B) is shown, and first to third antennas 3101, 3102, and 3103 may be arranged to be spaced apart from each other by a predetermined distance on the basis of the end surface 3100 of the electronic device. According to various embodiments, the electronic device 2901 may selectively use at least two antennas from among the first to third antennas 3101, 3102, and 3103.

Referring to (a) to (c) of FIG. 31A, the electronic device 2901 according to an embodiment may determine a direction of the ground, may selectively use at least two antennas among a plurality of antennas, for example, the first to third antennas 3101, 3102, and 3103, on the basis of the direction of the ground, or may selectively use at least two antennas among the plurality of antennas, for example, the first to third antennas 3101, 3102, and 3103, on the basis of the direction in which an external device is present.

For example, in the case of the direction of the ground as shown in (b) of FIG. 31A, the electronic device 2901 may use the first and second antennas 3101 and 3102 capable of directing toward the front side of the electronic device 2901, from among the first to third antennas 3101, 3102, and 3103. For example, in the case of the direction of the ground as shown in (c) of FIG. 31A, the electronic device 2901 may use the first and third antennas 3101 and 3103 capable of directing toward the front side of the electronic device 2901, from among the first to third antennas 3101, 3103, and 3103. According to an embodiment, the electronic device 2901 may determine the direction of the ground by using a gravity sensor. According to an embodiment, the electronic device 2901 may determine the direction of the ground by additionally using a gyro sensor. According to various embodiments, the electronic device 2901 may use the first and second antennas 3101 and 3102 along the direction of the ground and then may change to use the first and third antennas 3101 and 3103.

Referring to (a) and (b) of FIG. 31B, in the case for the direction in which an external device is present, as shown in (a) of FIG. 31B, the electronic device 2901 may use the first and third antennas 3101 and 3103 among the first to third antennas 3101, 3102, and 3103. For example, in the case for the direction in which an external device is present, as shown in (b) of FIG. 31B, the electronic device 2901 may use the first and second antennas 3101 and 3102 among the first to third antennas 3101, 3102, and 3103. According to an embodiment, the direction in which an external device is present may be determined based on the magnitude of a signal from the external device. According to various embodiments, the electronic device 2901 may use the first and third antennas 3101 and 3103 along the direction in which an external device is present, and then may change to use the first and second antennas 3101 and 3102.

According to various embodiments, the electronic device 2901 may detect a phase difference by using two or more antennas among the plurality of antennas, and may obtain y-axis (the y-axis in FIG. 26A) information as well as x-axis (the x-axis of FIG. 26A) information of the external device toward which the electronic device 2901 is oriented, by using a first phase difference detected by the first and second antennas 3101 and 3102 and a second phase difference detected by the first and third antennas 3101 and 3103. The electronic device 2901 may identify an external device toward which the electronic device 2901 is oriented, by obtaining the x-axis (right and left) information and the y-axis (up and down) information of the external device toward which the electronic device 2901 is oriented.

Figure 32:
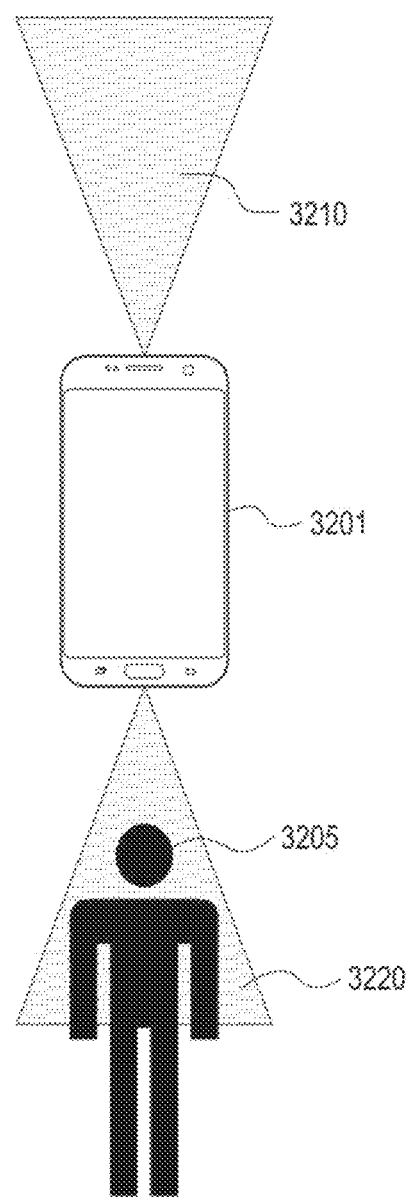
FIG. 32 is a diagram for describing a method for determining the front and rear of a plurality of antennas in the electronic device according to an embodiment of the disclosure.

FIG. 32 is a diagram for describing a method for determining the front and rear of a plurality of antennas in the electronic device according to various embodiments of the disclosure.

Referring to FIG. 32, when an electronic device 3201 (e.g., 101 of FIG. 1, 201 of FIG. 2, 401 of FIG. 4, or 2601 of FIGS. 26A and 26B) selects a low phase point as the front side by using two antennas, theoretically, all devices located in the vertical and horizontal directions in a circular shape around the two antennas have a low phase, or the vertical direction is filtered in some degree according to a beamforming design and devices located in the horizontal direction have a low phase.

Meanwhile, in a case where a user 3205 holds, wears, or carries the electronic device 3201, in relation to the rear side 3320 of the electronic device 3201 in the horizontal direction, unlike the front side 3210 toward which the electronic device 3201 is oriented, the user may be on the rear side 3220, which is the opposite direction of the front side 3210, and therefore it may be difficult to receive an accurate signal. For example, a pattern of a signal received on the front side 3210 toward which the electronic device 3201 is oriented and a pattern of a signal received on the rear side 3220, which is the opposite of the direction toward which the electronic device 3201 is oriented may have different characteristics, for example, different signal deviations or characteristics of radio wave signals (channel state information). The electronic device 3201 may provide a guide to indicate the direction toward which the front side of the electronic device 3201 is oriented, on the basis of a pattern of a signal received in each direction.

According to various embodiments, the electronic device (e.g., 101 of FIG. 1, 201 of FIG. 2, 401 of FIG. 4, or 2601 of FIGS. 26A and 26B) may receive a predesignated trigger input, and may activate a task performance mode using at least one external device upon reception of the predesignated trigger input.

According to an embodiment, the predesignated trigger input may be an input of shaking the electronic device (e.g., 101 of FIG. 1, 201 of FIG. 2, 401 of FIG. 4, or 2601 of FIGS. 26A and 26B) or tapping the electronic device by the user. According to an embodiment, the predesignated trigger input may be an input according to sensor values obtained by various sensors included in the electronic device (e.g., 101 of FIG. 1, 201 of FIG. 2, 401 of FIG. 4, or 2601 of FIGS. 26A and 26B). According to an embodiment, the predesignated trigger input may be an input of a specific button of the electronic device (e.g., 101 of FIG. 1, 201 of FIG. 2, 401 of FIG. 4, or 2601 of FIGS. 26A and 26B). According to an embodiment, the predesignated trigger input may be an input of a specific voice signal (speech trigger) to the electronic device (e.g., 101 of FIG. 1, 201 of FIG. 2, 401 of FIG. 4, or 2601 of FIGS. 26A and 26B).

FIGS. 33A through 35 are diagrams illustrating examples of activating a task performance mode by using an external device by the electronic device according to various embodiments of the disclosure.

Figure 33A:
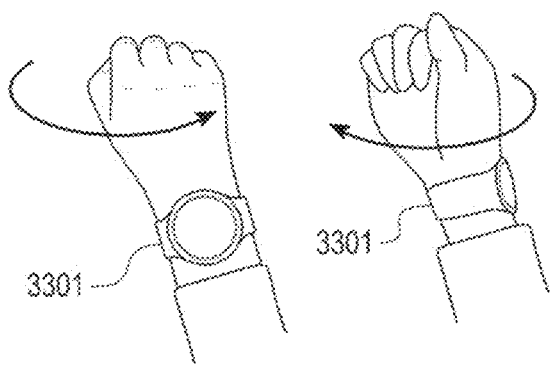
FIGS. 33A, 33B, 33C, 34, and 35 are diagrams illustrating examples of activating a task performance mode by using an external device by the electronic device according to various embodiments of the disclosure.
Figure 33B:
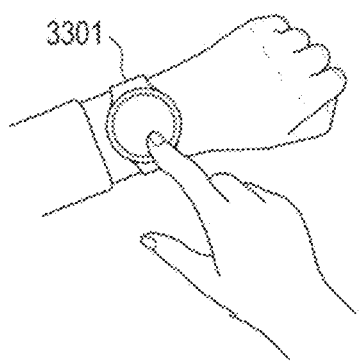
Figure 33C:
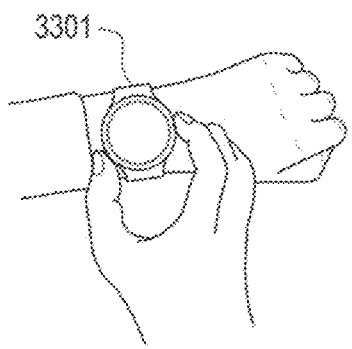

Referring to FIGS. 33A through 33C, an electronic device 3301 (e.g., 101 of FIG. 1, 201 of FIG. 2, 401 of FIG. 4, or 2601 of FIGS. 26A and 26B) according to an embodiment may be a wearable electronic device (e.g., a smart watch). According to various embodiments, as illustrated in (a), on the basis of a gesture of shaking the electronic device 3301 from side to side in the state in which a user has put on the electronic device 3301, a sensing value may be detected when the user shakes the electronic device 3301 from side to side, by using at least one sensing module, and when the detected sensing value is a sensing value corresponding to the predesignated trigger, the task performance mode using at least one external device may be activated. According to various embodiments, the at least one sensing module used to sense a gesture of shaking from side to side may include at least one among an acceleration sensor, a gyro sensor, a compass sensor, and an illumination sensor.

According to various embodiments, the electronic device 3301 may further perform identification authentication using a biometric sensor (e.g., an electrocardiogram sensor, a fingerprint sensor, a face recognition sensor, an iris recognition sensor, or a blood vessel recognition sensor).

According to various embodiments, as illustrated in (b), on the basis of a gesture of tapping the electronic device 3301, a sensing value may be detected when the user taps a screen of the electronic device 3301, by using at least one sensing module, and when the detected sensing value is a sensing value corresponding to the predesignated trigger, the task performance mode using at least one external device may be activated. According to various embodiments, at least one sensing module used to sense a gesture of tapping the screen may include at least one among an acceleration sensor, an illumination sensor, a microphone, and a pressure sensor, and other sensor modules may additionally be used.

According to various embodiments, as illustrated in (c), the electronic device 3301 may activate the task performance mode using at least one external device, according to pressing, by the user, a specific button or key provided in the electronic device 3301. According to various embodiments, the specific button or key may be a specific hardware key, such as a hold button or hold key, a home button or home key, or a crown button or crown button key (a button or key corresponding to a crown of a smart watch), and may be a software key, such as an icon displayed on the screen of the electronic device. For example, the electronic device 3301 may activate the task performance mode using at least one external device when the user presses a home button or a side button of the electronic device for a long time or presses the same button several times in rapid succession.

According to various embodiments, the electronic device 3301 may further perform identification authentication using a biometric sensor (e.g., an electrocardiogram sensor, a fingerprint sensor, a face recognition sensor, an iris recognition sensor, or a blood vessel recognition sensor), and then may activate the task performance mode using at least one external device.

Figure 34:
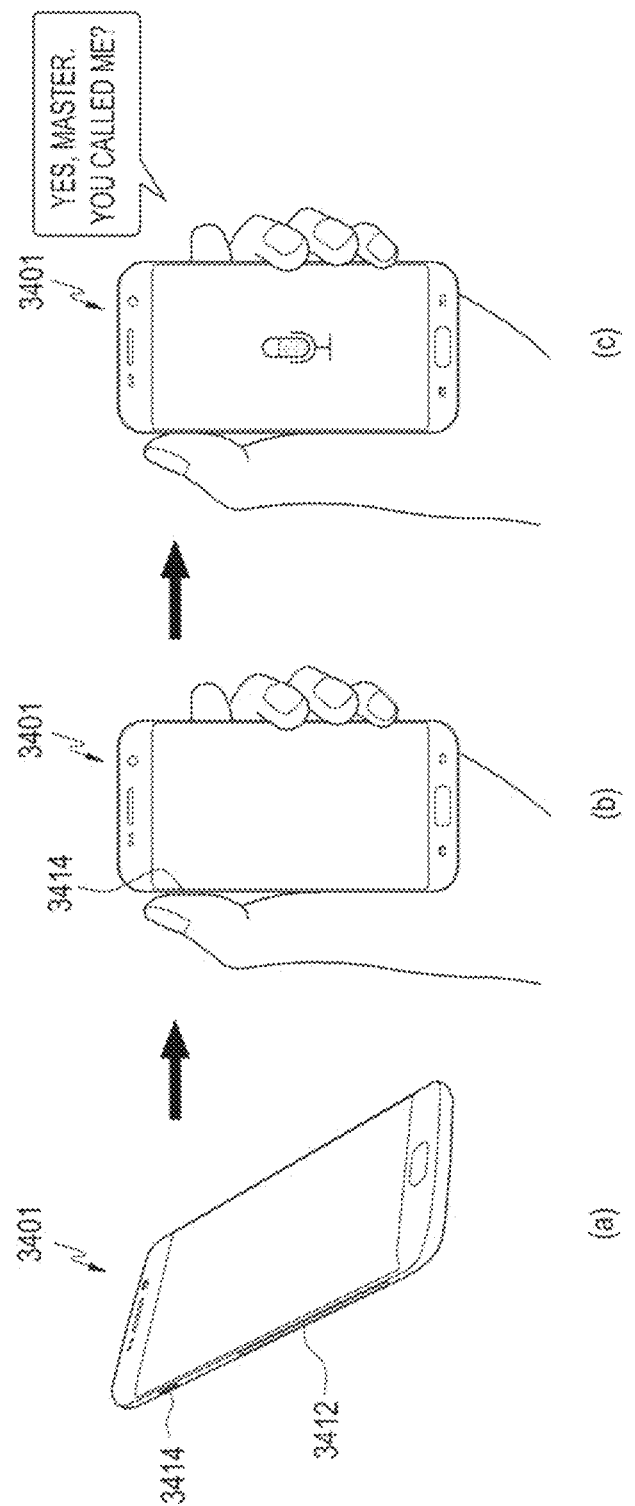

Referring to FIG. 34, an electronic device 3401 (e.g., 101 of FIG. 1, 201 of FIG. 2, 401 of FIG. 4, or 2601 of FIGS. 26A and 26B) may include a contact sensor or a temperature sensor in at least a part of at least a part of a housing, and may activate the task performance mode using at least one external device on the basis of a sensing value obtained by the contact sensor or the temperature sensor. According to various embodiments, as illustrated in (a) of FIG. 34, the electronic device 3401 may have a temperature sensor 3412 or a contact sensor 3414 provided on at least a part of the housing.

According to various embodiments, as illustrated in (b) of FIG. 34, the electronic device 3401 may activate the task performance mode using at least one external device when a sensing value of the temperature sensor 3412, which is obtained when a part of a user's body touches the temperature sensor 3412, meets a predesignated sensing value, or a sensing value of the contact sensor 3414, which is obtained when a part of the user's body contacts the contact sensor 3414, meets a predesignated sensing value. According to various embodiments, at least one sensor module used to sense a user's body contact may further include a touch sensor, a piezo sensor, or a pressure sensor, and other sensor modules may be additionally used.

According to various embodiments, as illustrated in (c) of FIG. 34, the electronic device 3401 may activate the task performance mode using an external device when a sensing value of the temperature sensor 3412 or the contact sensor 3414 meets a sensing value corresponding to a predesignated trigger input, and may output, through a speaker, voice information indicating that the task performance mode using an external device is activated, or may output, via a display, display information indicating that the task performance mode using an external device is activated.

Figure 35:
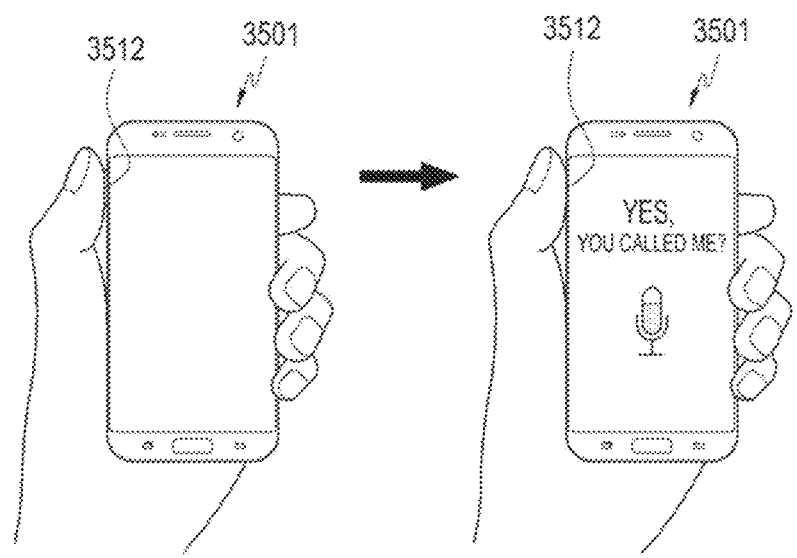

Referring to FIG. 35, an electronic device 3501 (e.g., 101 of FIG. 1, 201 of FIG. 2, 401 of FIG. 4, or 2601 of FIGS. 26A and 26B) according to an embodiment may activate the task performance mode using at least one external device when a button 3512 designated for a specific purpose is pressed in a manner corresponding to a predesignated trigger input scheme. For example, the electronic device 3501 may activate the task performance mode using at least one external device when a hardware (HW) or software (SW) button (e.g., a sound adjustment button designated for the purpose of sound adjustment) is pressed for a time equal to or longer than one second.

Figure 36:
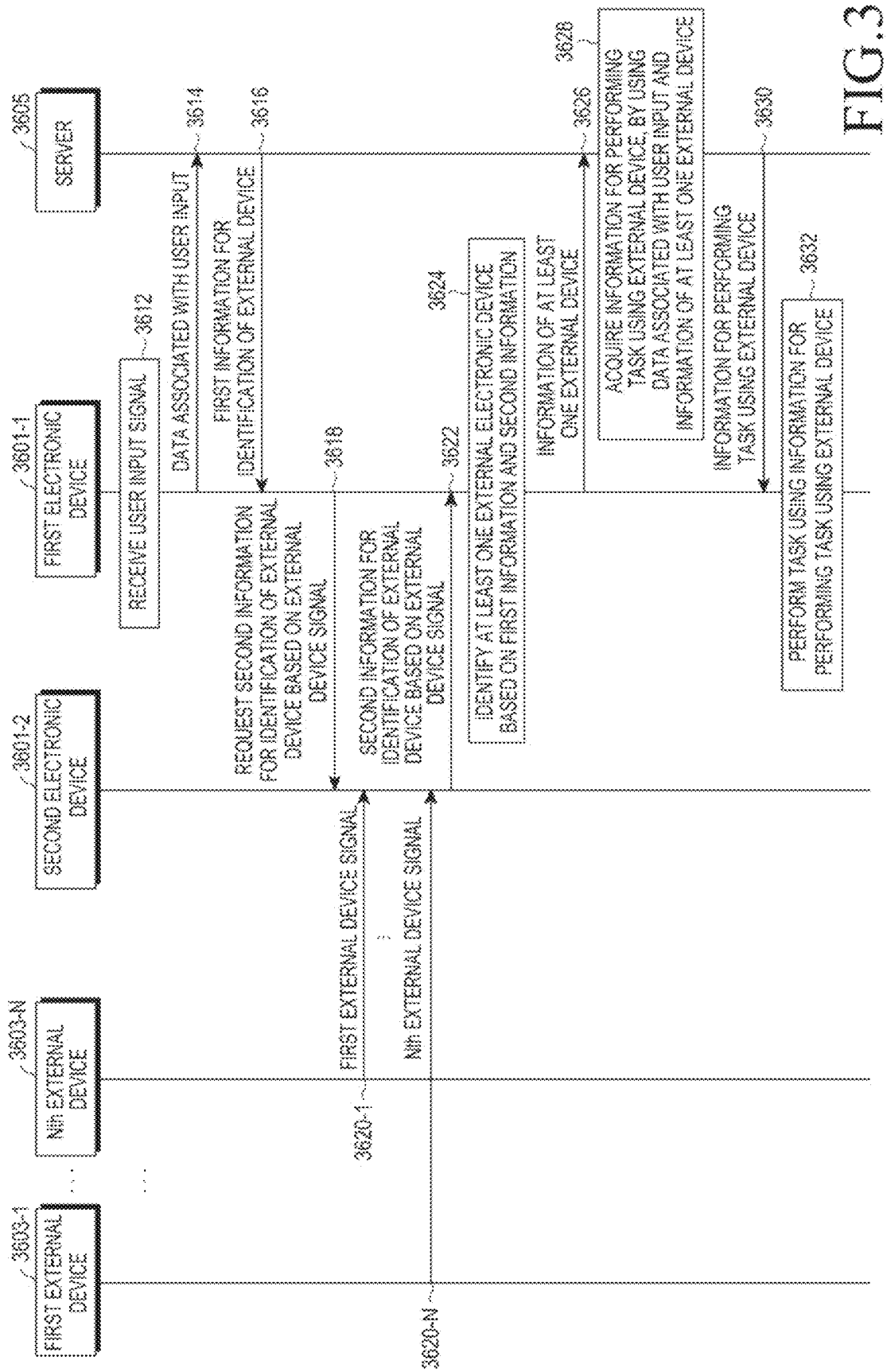
FIG. 36 is a flow diagram illustrating operations of a case where the electronic device identifies an external device by using another electronic device according to an embodiment of the disclosure.

FIG. 36 is a flow diagram illustrating operations of a case where the electronic device identifies an external device by using another electronic device according to an embodiment of the disclosure.

According to various embodiments, another electronic device may be a peripheral electronic device of the electronic device that is worn or used by a user, for example, another peripheral electronic device that is worn or used by the user, other than the electronic device, wherein another peripheral electronic device may be at least one among a smart phone, an AP, a wireless charging pad, a speaker, a necklace, sunglasses, glasses, tops, bottoms, a belt, shoes, a bracelet, or a ring.

Referring to FIG. 36, the electronic device (e.g., 101 of FIG. 1, 201 of FIG. 2, 401 of FIG. 4, or 2601 of FIG. 26B) may be a first electronic device 3601-1, and another electronic device used by the electronic device may be a second electronic device 3601-2.

The first electronic device 3601-1 may receive a user input, in operation 3612. The first electronic device 3601-1 may convert the received user input into data related to the user input. According to various embodiments, the data associated with the user input may be one of data associated with various types of user inputs, such as voice data associated with a voice signal uttered by the user, data associated with motion sensing of a gesture made by the user, data associated with a touch input made by the user through a touch screen, and data associated with a key input through various keys. According to an embodiment, the first electronic device 3601-1 may receive a voice signal uttered by a user through a microphone. For example, the user may utter a voice including an instruction, such as "turn off the light", "what is that?", "play music using that", "turn that off 10 minutes later", and "Does that need to be charged?", etc., or a voice including an instruction and a demonstrative pronoun. The first electronic device 3601-1 may receive the uttered voice signal through a microphone, and may convert the received voice signal into voice data that is data related to the user input.

The first electronic device 3601-1 may transmit, to a server 3605, data associated with the user input, in operation 3614.

The server 3605 may transmit, to the first electronic device 3601-1, first information for identifying at least one external device, on the basis of the data associated with the user input, which is received from the first electronic device 3601-1. According to various embodiments, the server 3605 may perform voice recognition on the basis of the voice data received from the first electronic device 3601-1, may perform natural-language understanding to obtain information related to an indication target, a demonstrative pronoun, an instruction, or a function, and may obtain first information for identifying at least one external device on the basis of the obtained information related to the indication target, the demonstrative pronoun, the instruction, or the function and transmit the obtained first information to the first electronic device 3601-1.

According to various embodiments, the first electronic device 3601-1 may autonomously obtain first information. In a case where the first electronic device 3601-1 autonomously acquires the first information, operations 3614 and 3616 may be omitted, and the first electronic device 3601-1 may not transmit voice data to the server 3605, may autonomously perform voice recognition and natural-language understanding on the basis of the voice data to obtain information related to an indication target, a demonstrative pronoun, an instruction, or a function, and may obtain the first information for identification of the at least one external device on the basis of the obtained information related to the indication target, the demonstrative pronoun, the instruction, or the function. For example, the first information may include an external device list related to the indication target, the demonstrative pronoun, the instruction, or the function. The external device list may include device recognition information of at least one external device. In addition, the first information may further include information indicating that the first electronic device 3601-1 requires second information for identification of the external device.

In operation 3618, the first electronic device 3601-1 may request second information for identification of the external device on the basis of an external electronic device signal from the second electronic device 3601-2.

According to various embodiments, the first electronic device 3601-1 may search for an electronic device worn by a user in addition to the first electronic device 3601-1, or may search a peripheral electronic device being used by the user in addition to the first electronic device 3601-1, and may request, from the retrieved second electronic device 3601-2, second information for identification of the external device on the basis of the external electronic device signal.

According to various embodiments, when multiple second electronic devices are retrieved, the first electronic device 3601-1 may select the second electronic device 3601-2 according to predetermined criteria or a priority from among the retrieved multiple second electronic devices.

According to an embodiment, the first electronic device 3601-1 may select the second electronic device 3601-2 from among the retrieved multiple second electronic devices, on the basis of a part of the user body, on which the second electronic device is to be worn, or a location and a manner of arrangement of the second electronic device on the basis of a location of the user. Information for determining a part of the user body, on which each of the retrieved multiple second electronic devices is to be worn, or information for determining a location and a manner of arrangement of the retrieved multiple second electronic devices on the basis of a location of the user may be obtained using information received from each of the retrieved multiple second electronic devices. For example, the information received from each of the retrieved multiple second electronic devices may include a name and a device ID of each of the retrieved multiple second electronic devices, an acceleration sensor value or an acceleration sensor change value of each of the retrieved multiple second electronic devices, or an application use record, an instruction record, a wireless communication connection record, or a related service name stored in each of the retrieved multiple second electronic devices.

The parts of the user body, on which the retrieved multiple second electronic devices are to be worn, or the locations and manner of arrangement of the retrieved multiple second electronic devices on the basis of the location of the user may be interpreted and determined by an artificial intelligence server on the basis of the information received from each of the retrieved multiple second electronic devices, and may be autonomously determined by the first electronic device 3601-1 on the basis of an keyword extracted from each of the retrieved multiple second electronic devices.

Further, according to an embodiment, when multiple second electronic devices are selected on the basis of the parts of the user body on which the second electronic devices are to be worn, or the locations and manner of arrangement of the second electronic devices on the basis of the location of the user, the first electronic device 3601-1 may select, from among the selected multiple second electronic devices, the second electronic device 3601-2, in which the speed of response to the search request made by the first electronic device 3601-1 is fastest.

According to various embodiments, when the first electronic device 3601-1 does not move toward the external device in the state in which a voice signal is received, when an external electronic device signal is unable to be received, or when the second electronic device 3601-2 is designated to obtain second information for identification of the external device on the basis of the external electronic device signal, the first electronic device 3601-1 may request, from the second electronic device 3601-2, the second information for identification of the external device on the basis of the external electronic device signal. For example, after the first electronic device 3601-1, which has been in a sleep mode state before reception of a voice signal, receives a voice signal, if the change range of a sensing value obtained by an acceleration sensor is equal to or smaller than a predetermined range, it may be determined that the first electronic device 3601-1 has not moved toward the external device. Further, when no signal is received from the external device, or when a communication circuit capable of receiving a signal from the external device does not operate normally, it may be determined that the first electronic device 3601-1 is unable to receive an external device signal.

When the first electronic device 3601-1 requests second information for identification of the external device on the basis of the external electronic device signal, the second electronic device 3601-2 may receive a signal transmitted from each of first to Nth external devices 3603-1 to 3603-N through the communication circuit, in operations 3620-1 to 3620-N. For example, the signal transmitted from each of the first to Nth external devices 3603-1 to 3603-N may include a synchronization signal or a discovery signal. The second electronic device 3601-2 may receive a signal periodically broadcasted from each of the first to Nth external devices 3603-1 to 3603-N, and may request signals from the first to Nth external devices 3603-1 to 3603-N and then receive the signals broadcasted from the first to Nth external devices 3603-1 to 3603-N. According to various embodiments, the second electronic device 3601-2 may include a plurality of antennas, and may receive at least one wireless communication signal via the plurality of antennas. For example, the second electronic device 3601-2 may receive signals from the respective first to Nth external devices 3603-1 to 3603-N via the plurality of antennas.

The second electronic device 3601-2 may acquire, in operations 3620-1 to 3620-N, second information for identification of the external device on the basis of the external electronic device signal, based on the signals received from respective first to Nth external devices 3603-1 to 3603-N, and may transfer, in operation 3622, the second information for identification of the external device on the basis of the external electronic device signal to the first electronic device 3601-1. According to various embodiments, the second information for identification of the external device may include the external device list including device recognition information of an external device existing in the vicinity of the second electronic device 3601-2 or including device recognition information of an external device in the direction that the second electronic device 3601-2 indicates. According to an embodiment, in the second electronic device 3601-2, the signals transmitted from the respective first to Nth external devices 3603-1 to 3603-N may obtain device recognition information existing in the vicinity of the second electronic device 3601-2 on the basis of a synchronization signal or a discovery signal. Further, the second electronic device 3601-2 may detect a phase difference occurring between the signals received by the plurality of antennas, and may obtain device recognition information of the electronic device corresponding to a signal having a phase difference equal to or smaller than a predetermined threshold value from among the signals from the first to Nth external devices 3603-1 to 3603-N. The second electronic device 3601-2 may transfer, to the first electronic device 3601-1, the external device list including device recognition information of the external device existing in the vicinity of the second electronic device 3601-2 or including device recognition information of the external device in the direction that the second electronic device 3601-2 indicates.

The first electronic device 3601-1 may identify at least one external device on the basis of the first information and the second information, in operation 3624. According to an embodiment, the first electronic device 3601-1 may identify at least one external device on the basis of the first information obtained based on the data related to the user input, and the second information received from the second electronic device 3601-2. For example, the first electronic device 3601-1 may identify the external device to perform an input or an instruction corresponding to the user input, by comparing the external device list obtained based on the data related to the user input with the external device list obtained via the second external device 3601-2.

In operation 3626, the first electronic device 3601-1 may transmit information of the identified at least one external device to the server 3605. According to various embodiments, the first electronic device 3601-1 may transmit the device recognition information (e.g., a device ID) of the identified at least one external device to the server 3605.

In operation 3628, the server 3605 may obtain information for performing a task using the external device on the basis of the received data associated with the user input and information of the identified at least one external device. According to various embodiments, when the server 3605 receives voice data as the data related to the user input and receives device recognition information as information of the at least one external device, the server 3605 may perform voice recognition on the basis of the received voice data, perform natural-language understanding with respect to the recognized voice to obtain information related to an indication target, a demonstrative pronoun, an instruction, or a function, and may obtain information for performing the task, which includes at least a part of the instruction or function related to the external device corresponding to the device recognition information, on the basis of the information related to the indication target, demonstrative pronoun, instruction, or function, and the device recognition information. For example, when "that" (demonstrative pronoun) and "turn on the light" (instruction) are obtained as the information related to an indication target, a demonstrative pronoun, an instruction, or a function, and a device ID of a smart light is obtained as information of the identified at least one external device, the server 3605 may obtain information for performing a task of providing an instruction to turn off the power of the smart light.

The server 3605 may transmit the information for performing the task using the external device to the first electronic device 3601-1, in operation 3630. According to an embodiment, the server 3605 may transmit, as information for performing the task of providing an instruction to turn off the power of the smart light, sequence information of states related to one or more operations of the first electronic device 3601-1, which are necessary for providing an instruction to turn off the power of the smart light, or of states related to a combination of the one or more operations, to the first electronic device 3601-1. For example, the sequence information of states related to one or more operations of the first electronic device 3601-1, which are necessary for providing an instruction to turn off the power of the smart light, or of states related to a combination of the one or more operations may include each or a combination of a status related to communication-connecting with the smart light, a status related to transmitting a power off instruction to the smart light, and a status related to receiving a power off result from the smart light.

In operation 3632, the first electronic device 3601-1 may perform the task using information for performing the task using the external device. According to an embodiment, the first electronic device 3601-1 may perform the task of providing an instruction to turn off the power of the smart light by performing each or a combination of connecting-communication with the smart light, transmitting the power-off instruction to the smart light, and receiving the power-off result from the smart light, by using the sequence information of states of the one or more operations of the first electronic device 3601-1, which are necessary for providing an instruction to turn off the power of the smart light, or of states of the combination of the one or more operations. According to an embodiment, the server 3605 may transmit, to the external device, information for performing the task using the external device so as to allow the external device to perform the task. For example, the data related to the user input received from the first electronic device 3601-1 via operation 3612 and the sequence information of states related to one or more operations or of states related to a combination of the one or more operations may be transmitted to the external device (e.g., at least one of the first external device to Nth external device), the sequence information being generated based on information of the at least one external device, which is received via operation 3626.

Figure 37:
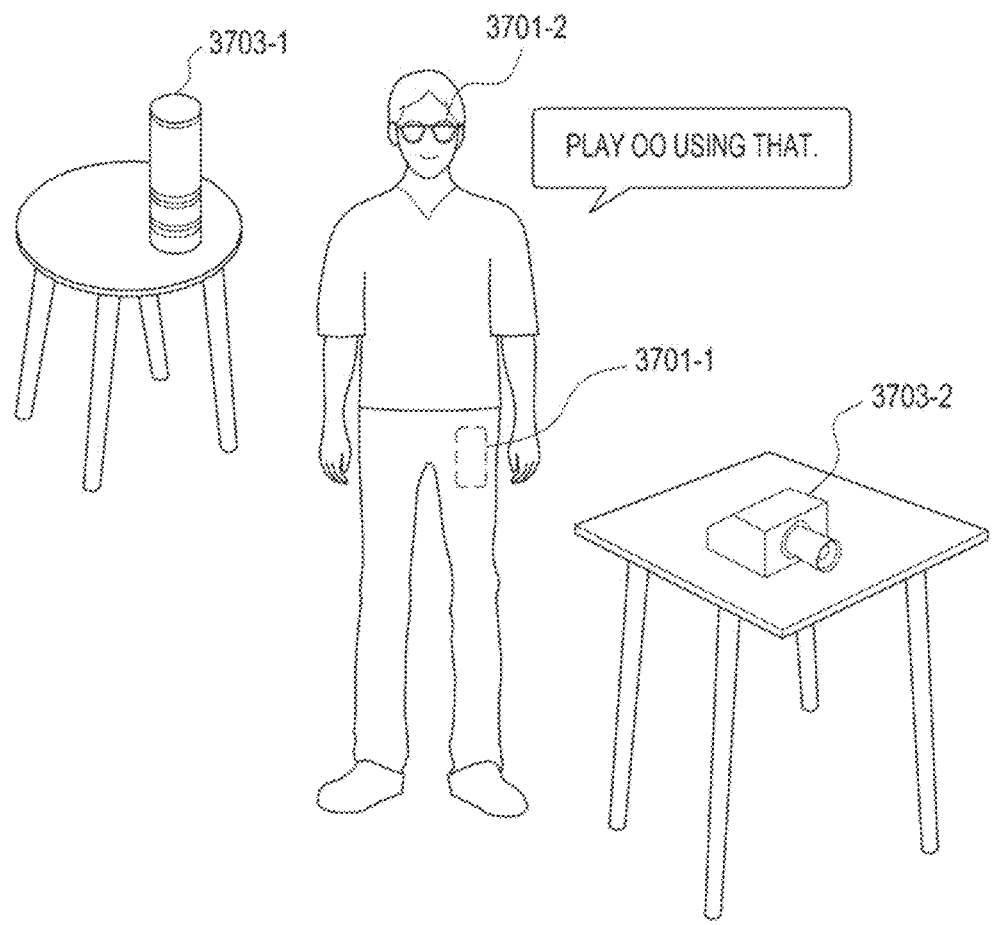
FIG. 37 is a diagram illustrating an example in which the electronic device identifies an external device by using another electronic device and uses the identified external device according to an embodiment of the disclosure.

FIG. 37 is a diagram illustrating an example in which the electronic device identifies an external device by using another electronic device and uses the identified external device according to an embodiment of the disclosure.

Referring to FIG. 37, a first electronic device 3701-1 (e.g., 3601-1 of FIG. 36) may receive a voice signal uttered by a user, for example, "Play Shrek using that". The first electronic device 3701-1 may obtain first information of an associated device on the basis of at least a part of the received voice signal, for example, "Shrek" and "play". According to various embodiments, the first electronic device 3701-1 may obtain first information (e.g., an external device list) corresponding to information related to an indication target, a demonstrative pronoun, an instruction, or a function, obtained on the basis of the received voice signal. According to various embodiments, the first electronic device 3701-1 may autonomously perform voice recognition and natural-language understanding on the basis of the received voice signal to obtain first information corresponding to information related to an indication target, a demonstrative pronoun, an instruction, or a function, or may transmit the voice signal (e.g., data corresponding to the voice signal) to an external server (e.g., the server 405) and may receive, from the server, the first information corresponding to the information related to the indication target, the demonstrative pronoun, the instruction, or the function according to the results of performing the voice recognition and the natural-language understanding.

When the first electronic device 3701-1 does not move toward an external device in the state in which a voice signal is received, or when an external electronic device signal is unable to be received, or when a second electronic device 3701-2 is designated to obtain second information for identification of the external device on the basis of an external electronic device signal, the first electronic device 3701-1 may request, from the second electronic device 3701-2, the second information for identification of the external device on the basis of the external electronic device signal.

According to various embodiments, the first electronic device 3701-1 may search for an electronic device worn by a user in addition to the first electronic device 3701-1, or may search for a peripheral electronic device being used by the user in addition to the first electronic device 3701-1, and may request, from retrieved second electronic device 3701-2, second information for identification of the external device on the basis of the external electronic device signal.

According to various embodiments, when multiple second electronic devices are retrieved, the first electronic device 3701-1 may select the second electronic device 3701-2 according to predetermined criteria or a priority from among the retrieved multiple second electronic devices. For example, the first electronic device 3701-1 may select the second electronic device 3701-2 from among the retrieved multiple second electronic devices, on the basis of a part of the user body, on which the second electronic device is to be worn, or a location and a manner of arrangement of the second electronic device on the basis of a location of the user, or may select, from among the selected multiple second electronic devices, the second electronic device 3701-2 in which the speed of response to the search request made by the first electronic device 3701-1 is the fastest. The first electronic device 3701-1 may request, from the second electronic device 3601-2, second information for identification of the external device on the basis of the external electronic device signal.

The second electronic device 3701-2 may receive, through a communication circuit, a signal transmitted from each of an artificial intelligence (AI) speaker 3703-1 and a projector 3703-2 which are present in the vicinity thereof, when the first electronic device 3701-1 requests the second information for identification of the external device on the basis of the external electronic device signal. For example, the signal transmitted from each of the AI speaker 3703-1 and the projector 3703-2 may include a synchronization signal or a discovery signal. The second electronic device 3701-2 may receive a signal periodically broadcasted from each of the AI speaker 3703-1 and the projector 3703-2, and may request signals from the AI speaker 3703-1 and the projector 3703-2 and then receive the signals broadcasted from the AI speaker 3703-1 and the projector 3703-2. According to various embodiments, the second electronic device 3701-2 may include a plurality of antennas, and may receive at least one wireless communication signal via the plurality of antennas. For example, the second electronic device 3701-2 may receive the signal from each of the AI speaker 3703-1 and the projector 3703-2 via the plurality of antennas.

The second electronic device 3701-2 may obtain the second information for identification of the external device on the basis of the external electronic device signal, on the basis of the signal received from each of the AI speaker 3703-1 and the projector 3703-2, and may transfer the obtained second information to the first electronic device 3701-1. According to various embodiments, the second information for identification of the external device may include an external device list including device recognition information of each of the AI speaker 3703-1 and the projector 3703-2 or including device recognition information of a device, among the AI speaker 3703-1 and the projector 3703-2, toward which the second electronic device 3702-2 is oriented.

The first electronic device 3701-1 may identify the external device to perform an instruction corresponding to the user input, on the basis of the first information and the second information.

According to various embodiments, the first electronic device 3701-1 may identify the external device through which to perform input or an instruction corresponding to the user input, by comparing the external device list obtained based on the data related to the user input with the external device list obtained based on the external electronic device signal. For example, the first electronic device 3701-1 may compare the external device list including external devices capable of performing reproducing of Shrek obtained based on at least a part of "Play Shrek using that" with the external device list including the AI speaker 3703-1 and the projector 3703-2 which are obtained based on the signal from each of the AI speaker 3703-1 and the projector 3703-2, so as to identify the AI speaker 3703-1 or the projector 3703-2, as the external device to execute "Play Shrek using that".

The first electronic device 3701-1 may acquire, autonomously or via the server 3605, information for performing a task including at least a part of instructions to allow the AI speaker 3703-1 or the projector 3703-2 to reproduce Shrek, according to the identified external device and results of performing voice recognition and natural-language understanding with respect to "Play Shrek using that".

The first electronic device 3701-1 may perform the task according to the obtained information. For example, on the basis of the obtained information, the first electronic device 3701-1 may directly transmit the instruction to allow the AI speaker 3703-1 or the projector 3703-2 to reproduce Shrek, or may transmit, via the server (e.g., 1209 of FIG. 12B), the instruction to allow the AI speaker 3703-1 or the projector 3703-2 to reproduce Shrek.

According to various embodiments, upon reception of the instruction, the AI speaker 3703-1 or the projector 3703-2 may execute the instruction to reproduce Shrek.

The AI speaker 3703-1 or the projector 3703-2 may transmit, to the first electronic device 3701-1, an instruction execution result including instruction execution success, instruction execution failure, or instruction execution completion. The first electronic device 3701-1 may output the received instruction execution result in various forms of information, such as sound information, display information, or vibration information. According to various embodiments, the AI speaker 3703-1 or the projector 3703-2 may also output the instruction execution result in various forms of information, such as sound information, display information, vibration information, or a combination of at least some of the forms of information.

Each of the above-described component elements of hardware according to the disclosure may be configured with one or more components, and the names of the corresponding component elements may vary based on the type of electronic device. The electronic device according to various embodiments may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more thereof. The term "module" may be interchangeably used with, for example, the term "unit", "logic", "logical block", "component", or "circuit". The "module" may be a minimum unit of an integrated component element or a part thereof. The "module" may be the smallest unit that performs one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which are currently known or are to be developed in the future.

According to various embodiments, at least some of the devices (for example, modules or functions thereof) or the method (for example, operations) according to the disclosure may be implemented by an instruction stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like.

According to various embodiments, a recording medium (or storage medium) may store a program for performing a task using an external device, and the program, in an electronic device, may perform receiving a user input including a request for performing a task using at least one external device, identifying the at least one external device at least partially on the basis of at least one signal obtained through a wireless communication circuit, and performing the task on the basis of at least a part of information of the identified at least one external device and data related to the user input.

In addition, the program instructions may include high-level language code, which can be executed in a computer by using an interpreter, as well as machine code made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments may be executed sequentially, in parallel, repeatedly, or in a heuristic manner. Further, some operations may be executed in another order or may be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a display positioned inside the housing and exposed through a first portion of the housing;
   a microphone positioned inside the housing and exposed through a second portion of the housing;
   at least one speaker positioned inside the housing and exposed through a third portion of the housing;
   a wireless communication circuit positioned inside the housing;
   at least one processor positioned inside the housing and electrically connected with the display, the microphone, the speaker, and the wireless communication circuit; and
   a memory positioned inside the housing and electrically connected to the at least one processor,
   wherein the memory stores instructions that, when executed, cause the at least one processor to:
      receive a user input including a request for performing a task using at least one external device, through the display or the microphone,
      obtain information associated with the at least one external device, based at least partially on phase differences obtained from signals received via the wireless communication circuit from a plurality of external devices around the electronic device,
      transmit the information associated with the at least one external device and data associated with the user input to an external server via the wireless communication circuit,
      receive a response including information on a sequence of states of the electronic device to perform at least a part of the task using the at least one external device based on the information associated with the at least one external device and the data associated with the user input, from the external server via the wireless communication circuit, and
      perform the task by obtaining the sequence of the states.

2. The electronic device of claim 1, wherein the instructions further cause the at least one processor to:
   obtain first information for identification of the at least one external device, based on the data associated with the user input;
   obtain second information for identification of the at least one external device, based on the at least one signal; and
   identify the at least one external device based on the first information and the second information.

3. The electronic device of claim 2, further comprising:
   a sensor electrically connected with the at least one processor,
   wherein the instructions further cause the at least one processor to identify the at least one external device additionally based on data obtained by the sensor.

4. The electronic device of claim 2, wherein the instructions further cause the at least one processor to obtain first information for identification of the at least one external device based on voice data corresponding to a voice signal uttered by the user.

5. The electronic device of claim 2, further comprising:
   a plurality of antennas electrically connected with the wireless communication circuit, wherein the instructions further cause the at least one processor to:
obtain the signals via the plurality of antennas,
detect the phase differences obtained when the signals arrive at the plurality of antennas, and
obtain the second information based on the phase differences.

6. The electronic device of claim 5, further comprising:
a gyro sensor electrically connected with the at least one processor,
wherein the instructions further cause the at least one processor to obtain the second information based on data obtained by the gyro sensor and the phase differences of the signals.

7. The electronic device of claim 1, wherein the signals include a broadcasting signal including a device ID of the at least one external device.

8. The electronic device of claim 1, wherein the instructions further cause the at least one processor to receive a trigger input that activates a task performance mode using the at least one external device.

9. The electronic device of claim 1, wherein the instructions further cause the at least one processor to:
display service information corresponding to the identified at least one external device;
transmit a control instruction to the identified at least one external device; or
perform at least one task during transmission, to the identified at least one external device, an instruction to allow the identified at least one external device to interwork with another external device.

10. A method for performing a task using at least one external device by an electronic device, the method comprising:
receiving a user input including a request for performing a task using the at least one external device;
obtaining information associated with the at least one external device, based at least partially on phase differences obtained from signals received via the wireless communication circuit from a plurality of external devices around the electronic device;
transmitting the information associated with the at least one external device and data associated with the user input to an external server via the wireless communication circuit;
receiving a response including a sequence of states of the electronic device to perform at least a part of the task using the at least one external based on the information associated with the at least one external device and the data associated with the user input, from the external server via the wireless communication circuit; and
performing the task by obtaining the sequence of the states.

11. The method of claim 10, wherein the identifying of the at least one external device comprises:
obtaining first information for identification of the at least one external device, based on data associated with the user input;
obtaining second information for identification of the at least one external device, based on the at least one signal; and
identifying the at least one external based on the first information and the second information.

12. The method of claim 11, wherein the identifying of the at least one external device comprises identifying the at least one external device additionally based on data obtained by a sensor.

13. The method of claim 11, wherein the obtaining of the first information comprises obtaining the first information for identification of the at least one external device, based on voice data corresponding to a voice signal uttered by the user.

14. The method of claim 11, wherein the obtaining of the second information comprises:
obtaining the at least one signal via a plurality of antennas;
detecting the phase differences obtained when the signals arrive at the plurality of antennas; and
obtaining the second information based on the phase differences.

15. The method of claim 14, wherein the obtaining of the second information comprises:
obtaining the second information based on data obtained by a gyro sensor and the phase differences of the signals.

16. The method of claim 10, wherein the signals include a broadcasting signal including a device ID of the at least one external device.

17. The method of claim 10, further comprising:
receiving a trigger input that activates a task performance mode using the at least one external device.

18. A non-transitory computer-readable recording medium that stores a program for performing a task using at least one external device, wherein, in an electronic device, the program is configured to:
receive a user input including a request for performing a task using the at least one external device,
obtain information associated with the at least one external device, based at least partially on phase differences obtained from signals received via the wireless communication circuit from a plurality of external devices around the electronic device,
transmit the information associated with the at least one external device and data associated with the user input to an external server via the wireless communication circuit,
receive a response including information on a sequence of states of the electronic device to perform at least a part of the task using the at least one external based on the information associated with the at least one external device and the data associated with the user input, from the external server via the wireless communication circuit, and
perform the task by obtaining the sequence of the states.

19. The non-transitory computer-readable recording medium of claim 18, wherein, in the electronic device, the program is further configured to:
obtain first information for identification of the at least one external device, based on data associated with the user input; obtain second information for identification of the at least one external device, based on the at least one signal; and
identify the at least one external based on the first information and the second information.

20. The non-transitory computer-readable recording medium of claim 19, wherein, in the electronic device, the program is further is configured to further obtain the at least one external device additionally based on data obtained by a sensor.

* * * * *